(12) United States Patent
Harris et al.

(10) Patent No.: US 8,151,323 B2
(45) Date of Patent: Apr. 3, 2012

(54) SYSTEMS AND METHODS FOR PROVIDING LEVELS OF ACCESS AND ACTION CONTROL VIA AN SSL VPN APPLIANCE

(75) Inventors: James Harris, San Jose, CA (US); Max He, Saratoga, CA (US); Arkesh Kumar, Santa Clara, CA (US); Ajay Soni, San Jose, CA (US); Charu Venkatraman, Bangalore (IN); Shashi Najundaswamy, Bangalore (IN); Amarnath Mullick, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 930 days.

(21) Appl. No.: 11/566,975

(22) Filed: Dec. 5, 2006

(65) Prior Publication Data
US 2007/0245409 A1     Oct. 18, 2007

Related U.S. Application Data

(60) Provisional application No. 60/744,720, filed on Apr. 12, 2006.

(51) Int. Cl.
*H04L 29/06*     (2006.01)
(52) U.S. Cl. .............................. 726/4; 726/13
(58) Field of Classification Search ................ 726/4, 13; 707/9
See application file for complete search history.

(56) References Cited

U.S. PATENT DOCUMENTS
4,935,870 A    6/1990   Burk, Jr. et al.
(Continued)

FOREIGN PATENT DOCUMENTS
WO    WO-0213037    2/2002
(Continued)

OTHER PUBLICATIONS

Pedro Hernandez, Tacit Adds to Softricity's Spark, Nov. 18, 2005. Available online at: www.enterpriseitplanet.com/networking/news/article.php/3565401.

(Continued)

*Primary Examiner* — Jason Gee
(74) *Attorney, Agent, or Firm* — Foley and Lardner LLP; Christopher J. McKenna

(57) ABSTRACT

The present invention relates to systems and methods to identify a level of access for a resource being accessed via a secure socket layer virtual private network (SSL VPN) connection to a network, and to control the action on the resource based on the identified level of access. The appliance described herein provides intelligent secure access and action control to resources based on a sense and respond mechanism. When a user requests access to a resource via the SSL VPN connection of the appliance, the appliance obtains information about the client to determine the user access scenario—the location, device, connection and identify of the user or client. Based on the collected information, the appliance responds to the detected user scenario by identifying a level of access to the resource for the user/client, such as rights to view, print, edit or save a document, Based on the identified level of access, the appliance controls the actions performs on the resource by various techniques described herein so that the user can only perform the allowed action n accordance with the level of access. As such, the present invention allows organization to control and provide the appropriate level of access to valuable, confidential or business critical information accessed remotely or via a pubic network while protecting such information by controlling the types of actions performed or allowed to be performed remotely on the information.

28 Claims, 78 Drawing Sheets

U.S. PATENT DOCUMENTS

| | | |
|---|---|---|
| 5,483,630 A | 1/1996 | Unuma et al. |
| 5,485,460 A | 1/1996 | Schrier et al. |
| 5,561,769 A | 10/1996 | Kumar et al. |
| 5,742,829 A | 4/1998 | Davis et al. |
| 5,874,960 A | 2/1999 | Mairs et al. |
| 5,881,229 A | 3/1999 | Singh et al. |
| 5,909,559 A | 6/1999 | So |
| 5,941,988 A | 8/1999 | Bhagwat et al. |
| 5,960,170 A | 9/1999 | Chen et al. |
| 6,023,724 A | 2/2000 | Bhatia et al. |
| 6,026,440 A | 2/2000 | Shrader et al. |
| 6,032,260 A | 2/2000 | Sasmazel et al. |
| 6,061,796 A | 5/2000 | Chen et al. |
| 6,085,247 A | 7/2000 | Parsons, Jr. et al. |
| 6,088,728 A | 7/2000 | Bellemore et al. |
| 6,151,599 A | 11/2000 | Shrader et al. |
| 6,202,096 B1 | 3/2001 | Williams et al. |
| 6,289,382 B1 | 9/2001 | Bowman-Amuah |
| 6,292,172 B1 | 9/2001 | Makhlouf |
| 6,314,452 B1 | 11/2001 | Dekel et al. |
| 6,332,163 B1 | 12/2001 | Bowman-Amuah |
| 6,339,832 B1 | 1/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,549 B1 | 8/2002 | Schneider |
| 6,442,748 B1 | 8/2002 | Bowman-Amuah |
| 6,449,658 B1 | 9/2002 | Lafe et al. |
| 6,452,915 B1 | 9/2002 | Jorgensen |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,213 B1 | 12/2002 | Bowman-Amuah |
| 6,522,342 B1 | 2/2003 | Gagnon et al. |
| 6,529,909 B1 | 3/2003 | Bowman-Amuah |
| 6,529,948 B1 | 3/2003 | Bowman-Amuah |
| 6,539,396 B1 | 3/2003 | Bowman-Amuah |
| 6,546,425 B1 | 4/2003 | Hanson et al. |
| 6,549,949 B1 | 4/2003 | Bowman-Amuah |
| 6,550,057 B1 | 4/2003 | Bowman-Amuah |
| 6,553,377 B1 | 4/2003 | Eschelbeck et al. |
| 6,571,282 B1 | 5/2003 | Bowman-Amuah |
| 6,578,068 B1 | 6/2003 | Bowman-Amuah |
| 6,578,073 B1 | 6/2003 | Starnes et al. |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |
| 6,615,199 B1 | 9/2003 | Bowman-Amuah |
| 6,615,253 B1 | 9/2003 | Bowman-Amuah |
| 6,636,242 B2 | 10/2003 | Bowman-Amuah |
| 6,640,238 B1 | 10/2003 | Bowman-Amuah |
| 6,640,240 B1 | 10/2003 | Hoffman et al. |
| 6,640,244 B1 | 10/2003 | Bowman-Amuah |
| 6,640,248 B1 | 10/2003 | Jorgensen |
| 6,640,249 B1 | 10/2003 | Bowman-Amuah |
| 6,665,726 B1 | 12/2003 | Leighton et al. |
| 6,691,232 B1 | 2/2004 | Wood et al. |
| 6,697,849 B1 | 2/2004 | Carlson |
| 6,715,145 B1 | 3/2004 | Bowman-Amuah |
| 6,721,286 B1 | 4/2004 | Williams et al. |
| 6,742,015 B1 | 5/2004 | Bowman-Amuah |
| 6,750,877 B2 | 6/2004 | Rosenberg et al. |
| 6,772,347 B1 | 8/2004 | Xie et al. |
| 6,842,906 B1 | 1/2005 | Bowman-Amuah |
| 6,868,451 B1 | 3/2005 | Peacock |
| 6,877,043 B2 | 4/2005 | Mallory et al. |
| 6,882,634 B2 | 4/2005 | Bagchi et al. |
| 6,885,920 B2 | 4/2005 | Yakes et al. |
| 6,888,844 B2 | 5/2005 | Mallory et al. |
| 6,891,881 B2 | 5/2005 | Trachewsky et al. |
| 6,894,981 B1 | 5/2005 | Coile et al. |
| 6,898,204 B2 | 5/2005 | Trachewsky et al. |
| 6,912,522 B2 | 6/2005 | Edgar |
| 6,918,113 B2 | 7/2005 | Patel et al. |
| 6,920,502 B2 | 7/2005 | Araujo et al. |
| 6,934,288 B2 | 8/2005 | Dempo et al. |
| 6,954,800 B2 | 10/2005 | Mallory |
| 6,959,320 B2 | 10/2005 | Shah et al. |
| 6,963,981 B1 | 11/2005 | Bailey et al. |
| 6,975,655 B2 | 12/2005 | Fischer et al. |
| 6,976,090 B2 | 12/2005 | Ben-Shaul et al. |
| 6,981,047 B2 | 12/2005 | Hanson et al. |
| 6,987,987 B1 | 1/2006 | Vacanti et al. |
| 6,988,236 B2 | 1/2006 | Ptasinski et al. |
| 6,993,101 B2 | 1/2006 | Trachewsky et al. |
| 6,993,421 B2 | 1/2006 | Pillar et al. |
| 7,000,031 B2 | 2/2006 | Fischer et al. |
| 7,013,290 B2 | 3/2006 | Ananian et al. |
| 7,035,285 B2 | 4/2006 | Holloway et al. |
| 7,043,524 B2 | 5/2006 | Shah et al. |
| 7,100,054 B2 | 8/2006 | Wenisch et al. |
| 7,107,309 B1 | 9/2006 | Geddes et al. |
| 7,117,359 B2 | 10/2006 | Wood et al. |
| 7,126,955 B2 | 10/2006 | Nabhan et al. |
| 7,136,645 B2 | 11/2006 | Hanson et al. |
| 7,139,983 B2 | 11/2006 | Kelts |
| 7,149,771 B1 | 12/2006 | Gifford |
| 7,155,243 B2 | 12/2006 | Baldwin et al. |
| 7,165,222 B1 | 1/2007 | Suzuki |
| 7,184,866 B2 | 2/2007 | Squires et al. |
| 7,194,521 B1 | 3/2007 | Wang |
| 7,197,570 B2 | 3/2007 | Eylon et al. |
| 7,246,230 B2 | 7/2007 | Stanko |
| 7,260,840 B2 | 8/2007 | Swander et al. |
| 7,353,533 B2 | 4/2008 | Wright et al. |
| 7,363,347 B2 | 4/2008 | Thomas |
| 7,380,039 B2 | 5/2008 | Miloushev et al. |
| 7,380,120 B1* | 5/2008 | Garcia ........................ 713/160 |
| 7,420,992 B1 | 9/2008 | Fang et al. |
| 2001/0023421 A1 | 9/2001 | Numao et al. |
| 2001/0030970 A1 | 10/2001 | Wiryaman et al. |
| 2001/0047406 A1 | 11/2001 | Araujo et al. |
| 2002/0007404 A1 | 1/2002 | Vange et al. |
| 2002/0007456 A1* | 1/2002 | Peinado et al. ............. 713/164 |
| 2002/0032725 A1 | 3/2002 | Araujo et al. |
| 2002/0035451 A1 | 3/2002 | Rothermel |
| 2002/0038339 A1 | 3/2002 | Xu |
| 2002/0073167 A1 | 6/2002 | Powell et al. |
| 2002/0078174 A1 | 6/2002 | Sim et al. |
| 2002/0111972 A1 | 8/2002 | Lynch et al. |
| 2002/0112152 A1 | 8/2002 | VanHeyningen et al. |
| 2002/0138551 A1 | 9/2002 | Erickson |
| 2002/0150048 A1 | 10/2002 | Ha et al. |
| 2003/0004950 A1 | 1/2003 | Wils et al. |
| 2003/0014628 A1 | 1/2003 | Freed et al. |
| 2003/0023845 A1 | 1/2003 | VanHeyningen |
| 2003/0131079 A1 | 7/2003 | Neale et al. |
| 2003/0131100 A1 | 7/2003 | Godon et al. |
| 2003/0172138 A1 | 9/2003 | McCormack et al. |
| 2003/0182431 A1 | 9/2003 | Sturniolo et al. |
| 2003/0188001 A1 | 10/2003 | Eisenberg et al. |
| 2004/0015591 A1 | 1/2004 | Wang |
| 2004/0039594 A1 | 2/2004 | Narasimhan et al. |
| 2004/0073512 A1 | 4/2004 | Maung |
| 2004/0078772 A1 | 4/2004 | Balay et al. |
| 2004/0107342 A1 | 6/2004 | Pham et al. |
| 2004/0146053 A1 | 7/2004 | Nabhan et al. |
| 2004/0148292 A1 | 7/2004 | Clemens |
| 2004/0210320 A1 | 10/2004 | Pandya |
| 2004/0215746 A1 | 10/2004 | McCanne et al. |
| 2004/0215826 A1 | 10/2004 | Pfitzner |
| 2004/0250124 A1 | 12/2004 | Chesla et al. |
| 2004/0255048 A1 | 12/2004 | Lev Ran et al. |
| 2004/0267952 A1 | 12/2004 | He et al. |
| 2004/0268357 A1 | 12/2004 | Joy et al. |
| 2004/0268358 A1 | 12/2004 | Darling et al. |
| 2005/0025150 A1 | 2/2005 | Helmy et al. |
| 2005/0044108 A1 | 2/2005 | Shah et al. |
| 2005/0071652 A1 | 3/2005 | de Jong |
| 2005/0074126 A1 | 4/2005 | Stanko |
| 2005/0086206 A1 | 4/2005 | Balasubramanian et al. |
| 2005/0132030 A1 | 6/2005 | Hopen et al. |
| 2005/0144481 A1 | 6/2005 | Hopen et al. |
| 2005/0177866 A1 | 8/2005 | Kirsch |
| 2005/0198380 A1 | 9/2005 | Panasyuk et al. |
| 2005/0223114 A1 | 10/2005 | Hanson et al. |
| 2005/0223115 A1 | 10/2005 | Hanson et al. |

| | | | |
|---|---|---|---|
| 2005/0251573 A1 | 11/2005 | Merkow et al. | |
| 2005/0265315 A1 | 12/2005 | Edgar | |
| 2005/0286466 A1 | 12/2005 | Tagg et al. | |
| 2006/0031529 A1 | 2/2006 | Keith | |
| 2006/0031547 A1 | 2/2006 | Tsui et al. | |
| 2006/0037071 A1* | 2/2006 | Rao et al. | 726/13 |
| 2006/0039287 A1 | 2/2006 | Hasegawa et al. | |
| 2006/0074837 A1* | 4/2006 | Braddy et al. | 707/1 |
| 2006/0161970 A1 | 7/2006 | Hopen et al. | |
| 2006/0190455 A1* | 8/2006 | Braddy et al. | 707/9 |
| 2006/0274828 A1 | 12/2006 | Siemens et al. | |
| 2007/0097130 A1 | 5/2007 | Margulis | |
| 2007/0101418 A1 | 5/2007 | Wood et al. | |
| 2007/0130324 A1 | 6/2007 | Wang | |
| 2007/0192444 A1 | 8/2007 | Ackaouy et al. | |
| 2008/0016233 A1 | 1/2008 | Schneider | |
| 2008/0320151 A1 | 12/2008 | McCanne et al. | |

FOREIGN PATENT DOCUMENTS

| | | |
|---|---|---|
| WO | WO-0239221 A2 | 5/2002 |
| WO | WO-0239260 A2 | 5/2002 |
| WO | WO-0239261 A2 | 5/2002 |
| WO | WO-0239262 A2 | 5/2002 |
| WO | WO-0239263 A2 | 5/2002 |
| WO | WO-0239264 A2 | 5/2002 |
| WO | WO-0239275 A2 | 5/2002 |
| WO | WO-0239276 A2 | 5/2002 |
| WO | WO-0239301 A2 | 5/2002 |
| WO | WO-0239666 A2 | 5/2002 |
| WO | WO-0239693 A2 | 5/2002 |
| WO | WO-0239695 A2 | 5/2002 |
| WO | WO-0241575 A2 | 5/2002 |
| WO | WO-0242922 A2 | 5/2002 |
| WO | WO-0243320 A2 | 5/2002 |
| WO | WO-0243364 A2 | 5/2002 |
| WO | WO-0246925 A2 | 6/2002 |
| WO | WO-0246944 A2 | 6/2002 |
| WO | WO-0246945 A2 | 6/2002 |
| WO | WO-02069604 A2 | 9/2002 |
| WO | WO-03019876 | 3/2003 |
| WO | WO-2004114529 A2 | 12/2004 |
| WO | WO-2005013534 | 2/2005 |
| WO | WO-2005088476 | 9/2005 |
| WO | WO-2008051842 A2 | 5/2008 |
| WO | WO-2008/112691 A2 | 9/2008 |

OTHER PUBLICATIONS

International Search Report for PCT/US2007/066433. Mailing date Oct. 31, 2007. 3 pages.

Ranzau et al., "Softricity/Tacit, An Innovative Approach to Virtual Computing", http://www.dabcc.com/downloadnow.aspx?file=211&id=617, Oct. 20, 2005.

Cisco Systems, Cisco Products Quick Reference Guide, Nov. 2003.

Mitchell, Robert L. "Streaming the desktop: application streaming creates a virtualized desktop that can be managed centrally, yet offers the speed of local execution", Computer World, Nov. 21, 2005.

Greenfield, David, "Radware's APSolute", IT Architect, Jan. 1, 2006.

Office Action for U.S. Appl. No. 11/734,083 dated Jun. 18, 2010 (14 pgs).

Advisory Action for U.S. Appl. No. 11/734,083 dated Aug. 30, 2010. (2 pgs).

Mogul J C: "The Case for Persistent-Connection HTTP" Computer Communication Review, ACM, New York, NY, US, vol. 25, No. 4, Oct. 1, 1995, p. 299-313, XPO00541665, ISSN:0146-4833, Abstract, p. 301. (15 pgs).

Jennings C et al: "Managing Client Initiated Connections in the Session Initiated Protocol (SIP); Draft-IETF-SIP-Outbound-04. TXT" IETF Standardworking-Draft, Internet Engineering Task Force, IETF, CH. vol. SIP, No. 4, Jun. 25, 2006, XP015045103, ISSN:0000-0004, Abstract. (35 pgs).

International Search Report of PCT/US2007/075074, mailed Apr. 15, 2008. (5 pgs).

International Preliminary Report on Patentability for PCT/US07/75074, issued Feb. 3, 2009. (8 pgs).

Office Action for U.S. Appl. No. 11/734,083 dated Jan. 26, 2010. (12 pgs).

Office Action for U.S. Appl. No. 11/734,083 dated Nov. 10, 2009. (17 pgs).

Office Action for U.S. Appl. No. 11/734,083 dated Jul. 29, 2009. (16 pgs).

US69/34288-B2, Mar. 13, 2003, Jacobs et al.

* cited by examiner

PACKAGE

| Target 1 | |
|---|---|
| Application: | Foo |
| Target OS: | W2K PRO (All Service Packs) |
| | WXP PRO (All Service Packs) |
| | W2K3 (All Service Packs) |
| Target Language: | English |
| Master Drive: | C:\ |

| Target 1 | |
|---|---|
| Application: | Foo |
| Target OS: | W2K PRO (All Service Packs) |
| | WXP PRO (All Service Packs) |
| | W2K3 (All Service Packs) |
| Target Language: | German |
| Master Drive: | C:\ |

FIG. 19

SYSTEMS AND METHODS FOR PROVIDING LEVELS OF ACCESS AND ACTION CONTROL VIA AN SSL VPN APPLIANCE

RELATED APPLICATIONS

This present application is a non-provisional of and claims priority to U.S. Provisional Patent Application No. 60/744,720, entitled "System And Methods For Accelerating Delivery Of A Computing Environment To A Remote User", filed Apr. 12, 2006.

FIELD OF THE INVENTION

The present invention is directed towards systems and methods for an appliance controlling an action performed by a client on a resource accessed via a virtual private network connection provided by the appliance to a network.

BACKGROUND OF THE INVENTION

In an effort to reduce the time, money, and resources required to administer and manage corporate data and applications, many companies have consolidated and centralized servers, corporate data and applications. One benefit of consolidation is that valuable business information, such as confidential documents or intellectual property, is stored in a central location managed and controlled by the company. Although consolidation and centralization have reduced some costs and have produced some benefits, centralized data and applications introduce additional challenges in providing access to data and applications. One such challenge involves a remote user trying to access information, such as applications and data files, over a public network, a non-company device, or other security vulnerable user scenarios.

For example, a remote user in a vulnerable configuration may try to access a resource on a private or corporate network via a virtual private network connection. The user may be on a public network, such as a kiosk at an airport, or on a non-corporate computing device, such as a home computer. If the user was on a corporate controlled computing device within the corporate network, the company may desire the user to have full access to a document. But when the user is remote, the company may prevent access to the document as the company is concerned about the security of the document accessed under such user scenarios. For example, the company does not want the document to be stored or printed remotely. Preventing access reduces the productivity of the remote user. However, granting access to the remote user via the vulnerable configuration increases the security related vulnerabilities to the valuable business information and intellectual property.

Therefore, systems and methods are desired to improve the level of control of access of remote users to centralized applications and data files and to control the actions the user can perform on these centralized applications and data files.

SUMMARY OF THE INVENTION

The present invention relates to systems and methods to identify a level of access for a resource being accessed via a secure socket layer virtual private network (SSL VPN) connection to a network, and to control the action on the resource based on the identified level of access. The appliance described herein provides intelligent secure access and action control to resources based on a sense and respond mechanism. When a user requests access to a resource via the SSL VPN connection of the appliance, the appliance obtains information about the client to determine the user access scenario—the location, device, connection and identify of the user or client. Based on the collected information, the appliance responds to the detected user scenario by identifying a level of access to the resource for the user/client, such as rights to view, print, edit or save a document. Based on the identified level of access, the appliance controls the actions performs on the resource by various techniques described herein so that the user can only perform the allowed action n accordance with the level of access. As such, the present invention allows organization to control and provide the appropriate level of access to valuable, confidential or business critical information accessed remotely or via a pubic network while protecting such information by controlling the types of actions performed or allowed to be performed remotely on the information.

In one aspect, the present invention is related to a method of an appliance controlling an action performed by a client on a resource accessed via a virtual private network connection provided by the appliance to a network. The method includes receiving, by an appliance, a request from a client to access a resource on a network via a secure socket layer virtual private network (SSL VPN) connection provided by the appliance to the network. The appliance receives information about the client from a collection agent, and identifies via a policy engine, a level of access to the resource from a plurality of levels of access responsive to applying one or more policies to the received information. Based on the identified level of access, the method includes controlling, by the appliance, an action performed on the resource by the client via the SSL VPN connection.

In one embodiment, the method includes requesting, by a user of the client, access to a file on the network via the appliance, and controlling, by the appliance, the action the user of the client is allowed to perform on the file. In some embodiments, the method includes determining by the appliance the level of access to the resource allows one or more of the following actions to be performed on the resource: 1) view, 2) print, 3) edit and 4) save. In another embodiment, the appliance prevents a download of the resource to storage of the client.

In some embodiments, the method includes allowing or denying, by the appliance, a user of the client to view the resource. In other embodiments, the method includes allowing or denying, by the appliance, a user of the client to print the resource. In one embodiment, the method includes allowing or denying, by the appliance, a user of the client to edit the resource. In yet another embodiment, the method includes allowing or denying, by the appliance, a user of the client to save the resource.

In another aspect, the present invention is related to a system for controlling an action performed by a client on a resource accessed via a virtual private network connection provided by an appliance to a network. The system includes an appliance providing one or more clients a secure socket layer virtual private network (SSL VPN) connection to a network, and a client requesting access to a resource on a network via the appliance. The system also includes a collection agent providing the appliance information about the client, and a policy engine identifying a level of access to the resource responsive to applying one or more policies to the received information. The appliance controls an action performed on the resource by the client via the SSL VPN connection based on the identified level of access.

In one embodiment of the system, a user of the client requests access to a file on the network via the appliance, and the appliance controls the action the user of the client is allowed to perform on the file. In some embodiments, the policy engine determines the level of access to the resource allows one or more of the following actions to be performed on the resource: view, print, edit and save. In one system embodiment, the appliance prevents a download of the resource to storage of the client. In some embodiments, the appliance allows or denies a user of the client to view the resource. In other embodiments, the appliance allows or denies a user of the client to print the resource. In another embodiment, the appliance allows or denies a user of the client to edit the resource. In yet another embodiment, the appliance allows or denies a user of the client to save the resource.

BRIEF DESCRIPTION OF THE DRAWINGS

These and other aspects of this invention will be readily apparent from the detailed description below and the appended drawings, which are meant to illustrate and not to limit the invention, and in which:

FIG. 19 is a block diagram depicting an embodiment of a package including two targets, each target comprising a plurality of application files comprising an application;

FIG. 27E is a block diagram of one embodiment of a system for providing application output to devices having constrained system resources

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for controlling access to resources on a network;

Section D describes embodiments of systems and methods for accelerating communications between a client and a server;

Section E describes an example embodiment of accelerating the delivery of a computing environment to a remote user using the systems and methods described in Section B, C and D; and Section F describes an example embodiment of an appliance controlling an action performed by a client on a resource accessed via a virtual private network connection provided by the appliance to a network.

A. Network and Computing Environment

Figure 1A:
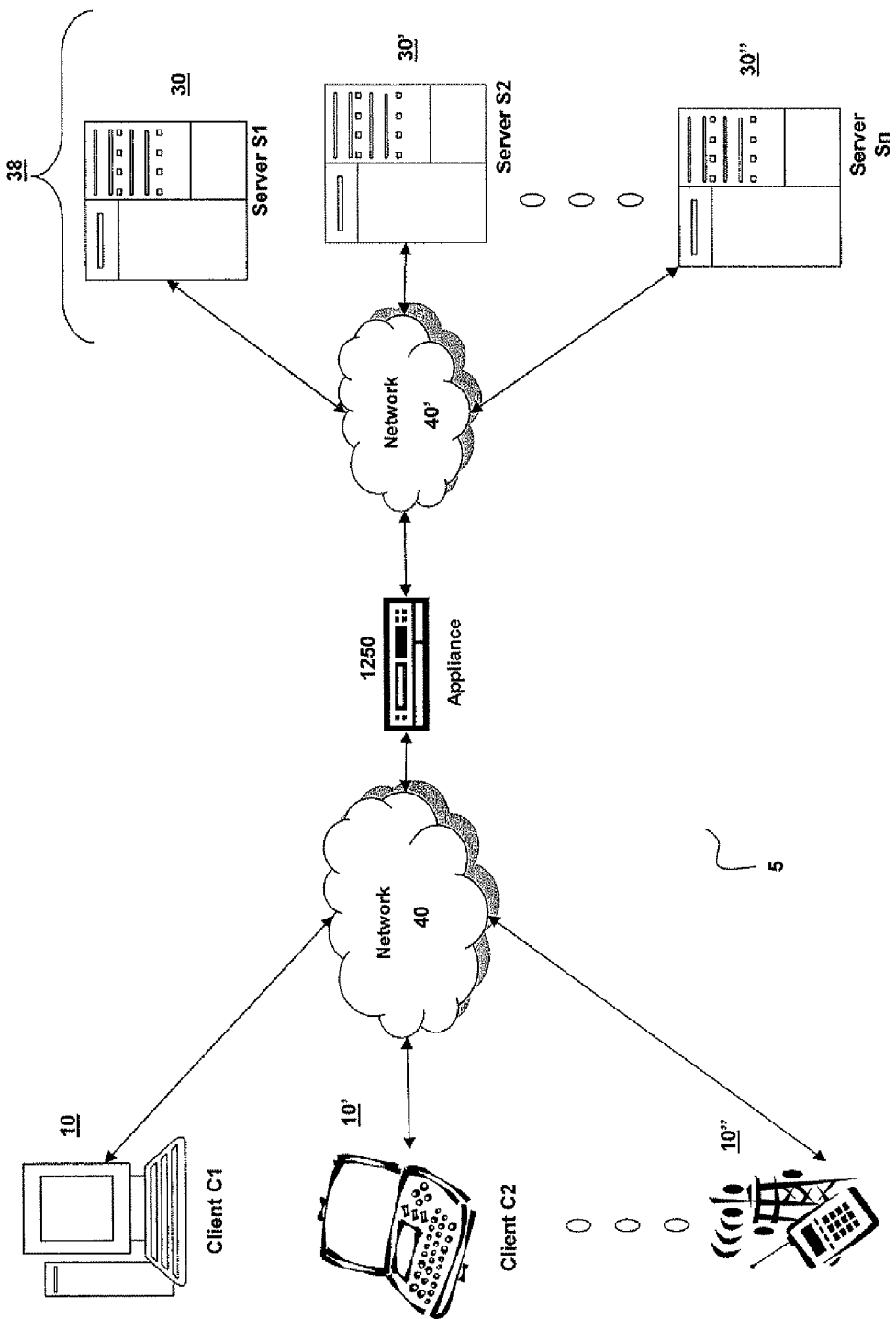
FIG. 1A is a block diagram depicting a network environment.

Prior to discussing the specifics of embodiments of the systems and methods, it may be helpful to discuss the network and computing environments in which embodiments may be deployed. Referring now to FIG. 1A, a network environment 5 is depicted. In brief overview, the network environment 5 comprises one or more clients 10-10" (also generally referred to as clients 10, or local machines 10) in communication with one or more servers 30-30" (also generally referred to as servers 30, or remote machines 30) via one or more networks 40, 40". In some embodiments, a client 10 communicates with a server 30 via an appliance 1250.

Although FIG. 1A shows a network 40 and a network 40' between the clients 10-10-10" and the servers 30-30", the clients 10-10' and the servers 30-30" may be on the same network 40. The networks 40 and 40' can be the same type of network or different types of networks. The network 40 and/or the network 40' can be a local-area network (LAN), such as a company Intranet, a metropolitan area network (MAN), or a wide area network (WAN), such as the Internet or the World Wide Web. In one embodiment, network 40' may be a private network and network 40 may be a public network. In some embodiments, network 40 may be a private network and network 40' a public network. In another embodiment, networks 40 and 40' may both be private networks. In some embodiments, clients 10-10" may be located at a branch office of a corporate enterprise communicating via a WAN connection over the network 40 to the servers 30-30" located at a corporate data center.

The network 40 and/or 40' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The topology of the network 40 and/or 40' may be a bus, star, or ring network topology. The network 40 and/or 40' and network topology may be of any such network or network topology as known to those ordinarily skilled in the art capable of supporting the operations described herein.

As shown in FIG. 1A, the appliance 1250 (also referred to herein as an interface unit 1250) is shown between the networks 40 and 40'. In some embodiments, the appliance 1250 may be located on network 40. For example, a branch office of a corporate enterprise may deploy an appliance 1250 at the branch office. In other embodiments, the appliance 1250 may be located on network 40'. For example, an appliance 1250 may be located at a corporate data center. In yet another embodiment, a plurality of appliances 1250 may be deployed on network 40. In some embodiments, a plurality of appliances 1250 may be deployed on network 40'. In one embodiment, a first appliance 1250 communicates with a second appliance 1250'. In other embodiments, the appliance 1250 could be a part of any client 10-10' or server 30-30" on the same or different network 40, 40' as the client 10-10". One or more appliances 1250 may be located at any point in the network or network communications path between a client 10-10" and a server 30-30".

In one embodiment, the system may include multiple, logically-grouped remote machines 30, one or more of which is available to execute applications on behalf of a local machine 10. In these embodiments, the logical group of remote machines may be referred to as a server farm 38 or a farm 38. In some of these embodiments, the remote machines 30 may be geographically dispersed. A farm 38 may be administered as a single entity.

The remote machines 30 within each farm 38 can be heterogeneous. That is, one or more of the remote machines 30 can operate according to one type of operating system platform (e.g., WINDOWS NT, manufactured by Microsoft Corp. of Redmond, Wash.), while one or more of the other remote machines 30 can operate on according to another type of operating system platform (e.g., Unix or Linux). The remote machines 30 comprising each farm 38 do not need to be physically proximate to each other remote machine 30 in its farm 38. Thus, the group of remote machines 30 logically grouped as a farm 38 may be interconnected using a wide-area network (WAN) connection or medium-area network (MAN) connection. For example, a farm 38 may include remote machines 30 physically located in different continents or different regions of a continent, country, state, city, campus, or room. Data transmission speeds between remote machines 30 in the farm 38 can be increased if the remote machines 30 are connected using a local-area network (LAN) connection or some form of direct connection.

Remote machines 30 may be referred to as servers, file servers, application servers, or remote machines. In some embodiments, remote machines 30 may have the capacity to function as either application servers or as a master application server. In one embodiment, a remote machine 30 may include an Active Directory. The local machines 10 may also be referred to as client nodes or endpoints. In some embodiments, the local machines 10 have the capacity to function as both client nodes seeking access to applications and as application servers providing access to hosted applications for other local machines 10.

In one embodiment, the local machine 10 communicates directly with one of the remote machines 30 in a farm 38. In another embodiment, the local machine 10 executes a program neighborhood application to communicate with the remote machine 30 in a farm 38. In still another embodiment, the remote machine 30 provides the functionality of a master node. In some embodiments, the local machine 10 communicates with the remote machine 30 in the farm 38 through a network 40. Over the network 40, the local machine 10 can, for example, request execution of various applications hosted by the remote machines 30, 30', 30", and 30'" in the farm 38 and receive output of the results of the application execution for display. The network 40 may comprise synchronous or asynchronous connections and may be a LAN, MAN (Medium-Area Network), or a WAN. Additionally, a network 40 may comprise a wireless link, such as an infrared channel or satellite band. In some embodiments, only the master node provides the functionality required to identify and provide address information associated with a remote machine 30' hosting a requested application.

In some embodiments, a local machine 10 communicates with a remote machine 30'". In one of these embodiments, the remote machine 30'" provides functionality of a web server. In another of these embodiments, the remote machine 30'" receives requests from the local machine 10, forwards the requests to a remote machine 30 and responds to the request by the local machine 10 with a response to the request from the remote machine 30. In still another of these embodiments, the remote machine 30 acquires an enumeration of applications available to the local machine 10 and address information associated with a remote machine 30' hosting an application identified by the enumeration of applications. In yet another of these embodiments, the remote machine 30'" presents the response to the request to the local machine 10 using a web interface. In one embodiment, the local machine 10 communicates directly with the remote machine 30' to access the identified application. In another embodiment, the local machine 10 receives application output data from the remote machine 30''', the application output data generated by an execution of the identified application on the remote machine 30'.

Figure 1B:
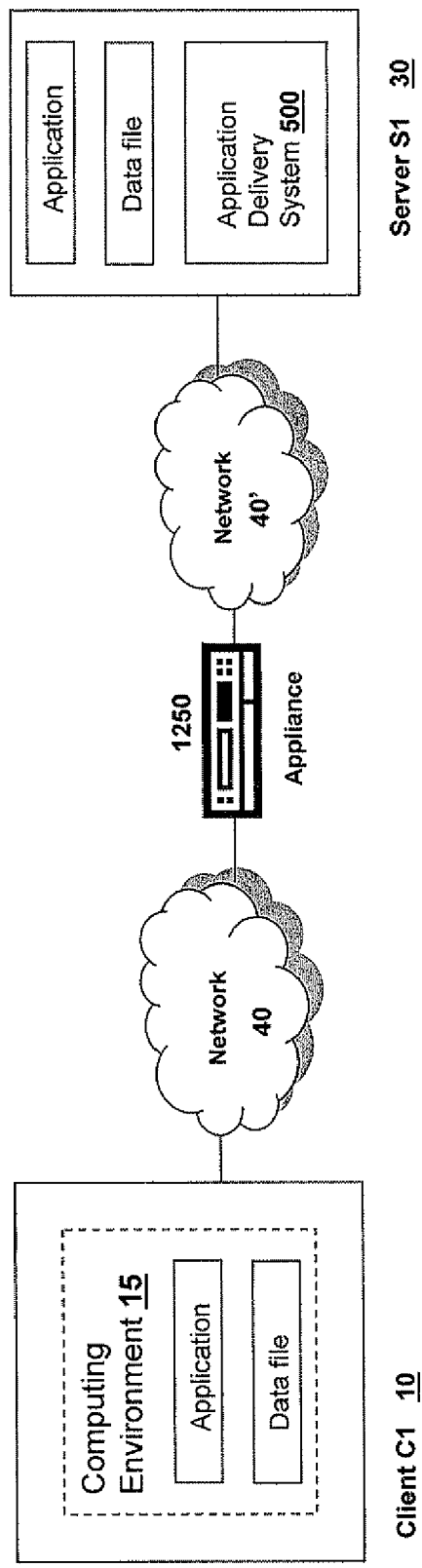
FIG. 1B is a block diagram depicting an embodiment of a computing environment of a remote in a network environment.

Referring now to FIG. 1B, a network environment for delivering and/or operating a computing environment on a client 10 is depicted. In brief overview, a server 30 includes an application delivery system 500 for delivering a computing environment or an application and data file to one or more clients. The client 10 may include a computing environment 15 for executing an application that uses or processes a data file. The client 10 in communication with the server 30 via networks 40, 40' and appliance 1250 may request an application and data file from the server 30, or appliance 1250 may forward a request from the client 10 to the server 30. For example, the client 10 may not have locally the application and data file stored or accessible locally. In response to the request, the server 30 may deliver the application and data file to the client 10. For example, in one embodiment, the server 30 may transmit the application as an application stream to operate in computing environment 15 on client 10.

Figure 1C:
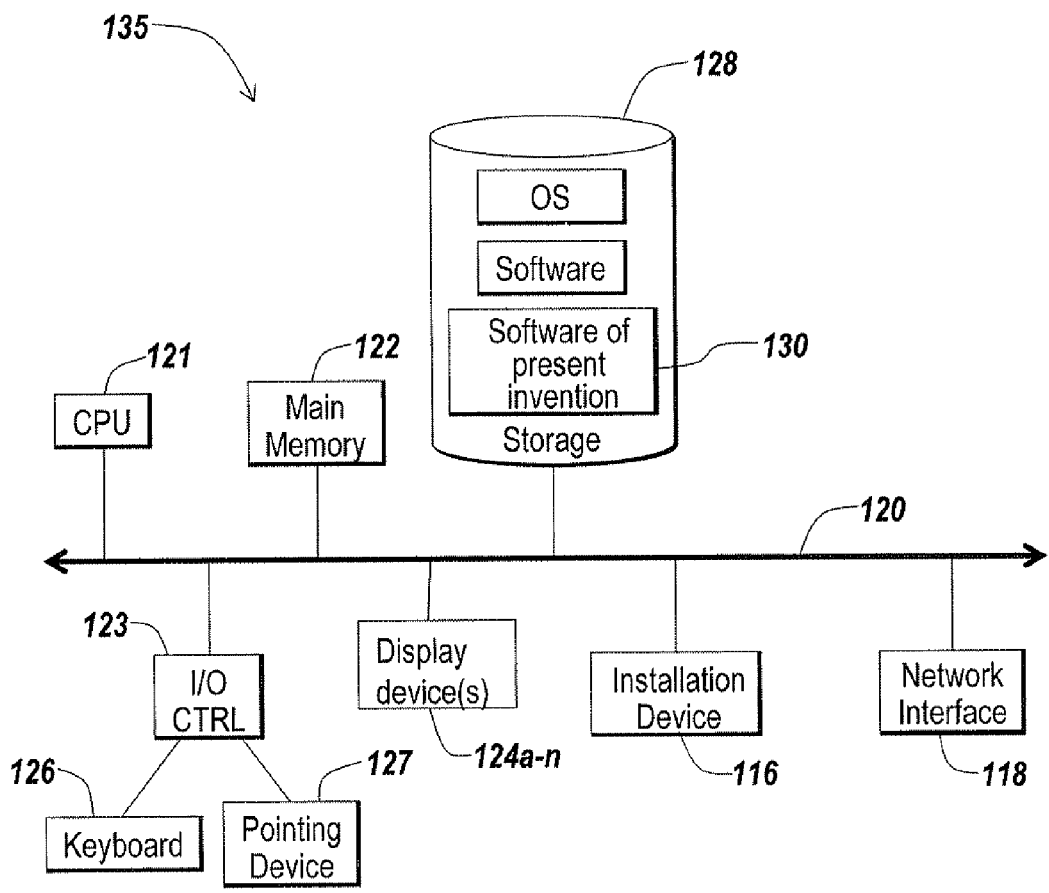
FIGS. 1C and 1D are block diagrams depicting embodiments of computers useful in connection with embodiments described.
Figure 1D:
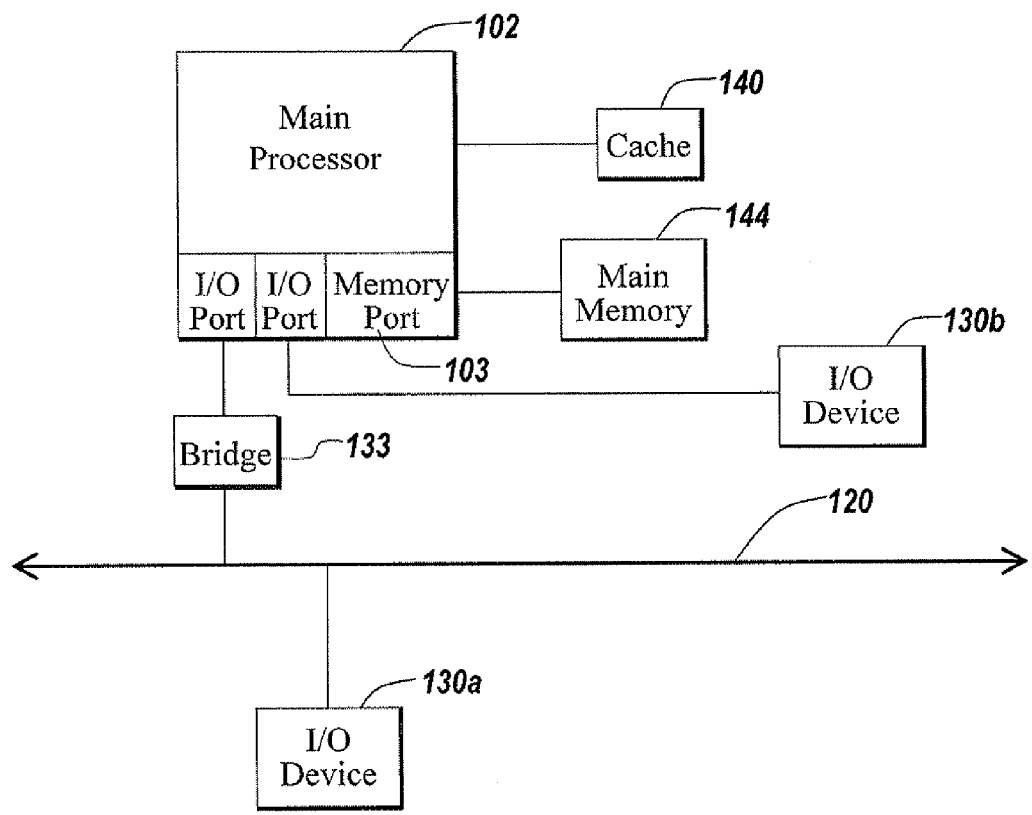

FIGS. 1C and 1D are block diagrams depicting embodiments of the architecture of a general purpose computer 135 useful as client computing devices 10 and server computing devices 30. As shown in FIGS. 1C and 1D, each computer 135 includes a central processing unit 102, and a main memory unit 122. Each computer 135 may also include other optional elements, such as one or more input/output devices 130a-130-b (generally referred to using reference numeral 130), and a cache memory 140 in communication with the central processing unit 102.

The central processing unit 102 is any logic circuitry that responds to and processes instructions fetched from the main memory unit 122. In many embodiments, the central processing unit is provided by a microprocessor unit, such as those manufactured by Intel Corporation of Mountain View, Calif.; those manufactured by Motorola Corporation of Schaumburg, Ill.; the Crusoe and Efficeon lines of processors manufactured by Transmeta Corporation of Santa Clara, Calif.; the lines of processors manufactured by International Business Machines of White Plains, N.Y.; or the lines of processors manufactured by Advanced Micro Devices of Sunnyvale, Calif.

Main memory unit 122 may be one or more memory chips capable of storing data and allowing any storage location to be directly accessed by the microprocessor 102, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In the embodiment shown in FIG. 1C, the processor 102 communicates with main memory 122 via a system bus 120 (described in more detail below). FIG. 1B depicts an embodiment of a computer system 135 in which the processor communicates directly with main memory 122 via a memory port. For example, in FIG. 1B the main memory 122 may be DRDRAM.

FIGS. 1C and 1D depict embodiments in which the main processor 102 communicates directly with cache memory 140 via a secondary bus, sometimes referred to as a "backside" bus. In other embodiments, the main processor 102 communicates with cache memory 140 using the system bus 120. Cache memory 140 typically has a faster response time than main memory 122 and is typically provided by SRAM, BSRAM, or EDRAM.

In the embodiment shown in FIG. 1C, the processor 102 communicates with various I/O devices 130 via a local system bus 120. Various busses may be used to connect the central processing unit 102 to the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 102 may use an Advanced Graphics Port (AGP) to communicate with the display. FIG. 1D depicts an embodiment of a computer system 135 in which the main processor 102 communicates directly with I/O device 130b via HyperTransport, Rapid I/O, or InfiniBand. FIG. 1D also depicts an embodiment in which local busses and direct communication are mixed: the processor 102 communicates with I/O device 130a using a local interconnect bus while communicating with I/O device 130b directly.

A wide variety of I/O devices 130 may be present in the computer system 135. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 135 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 130 may be a bridge between the system bus 120 and an external communication bus, such as a USB bus, an Apple Desktop Bus, an RS-132 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose computers of the sort depicted in FIG. 1C and FIG. 1D typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments in which a client machine 10 or a server 30 comprise a mobile device, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments comprising mobile devices, a mobile device may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client 113 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the mobile device is a combination PDA/telephone device such as the Treo 180, Treo 270, Treo 600, Treo 650, or the Treo 700w, all of which are manufactured by palmOne, Inc. of Milpitas, Calif. In still further embodiments, the mobile device is a cellular telephone that operates under control of the PocketPC operating system, such as the MPx200, manufactured by Motorola Corp. A typical mobile device may comprise many of the elements described above in FIGS. 1C and 1D, including the processor 102 and the main memory 104.

B. Systems and Methods for Delivering a Computing Environment

An embodiment is directed towards systems and methods for delivering a computing environment to a remote user at a client 10 located at a remote location from the server 30. While the methods and systems in this section generally speak of servers 30, the methods and systems below may utilize either servers 30, network appliances 1250, or any combination thereof.

Figure 1E:
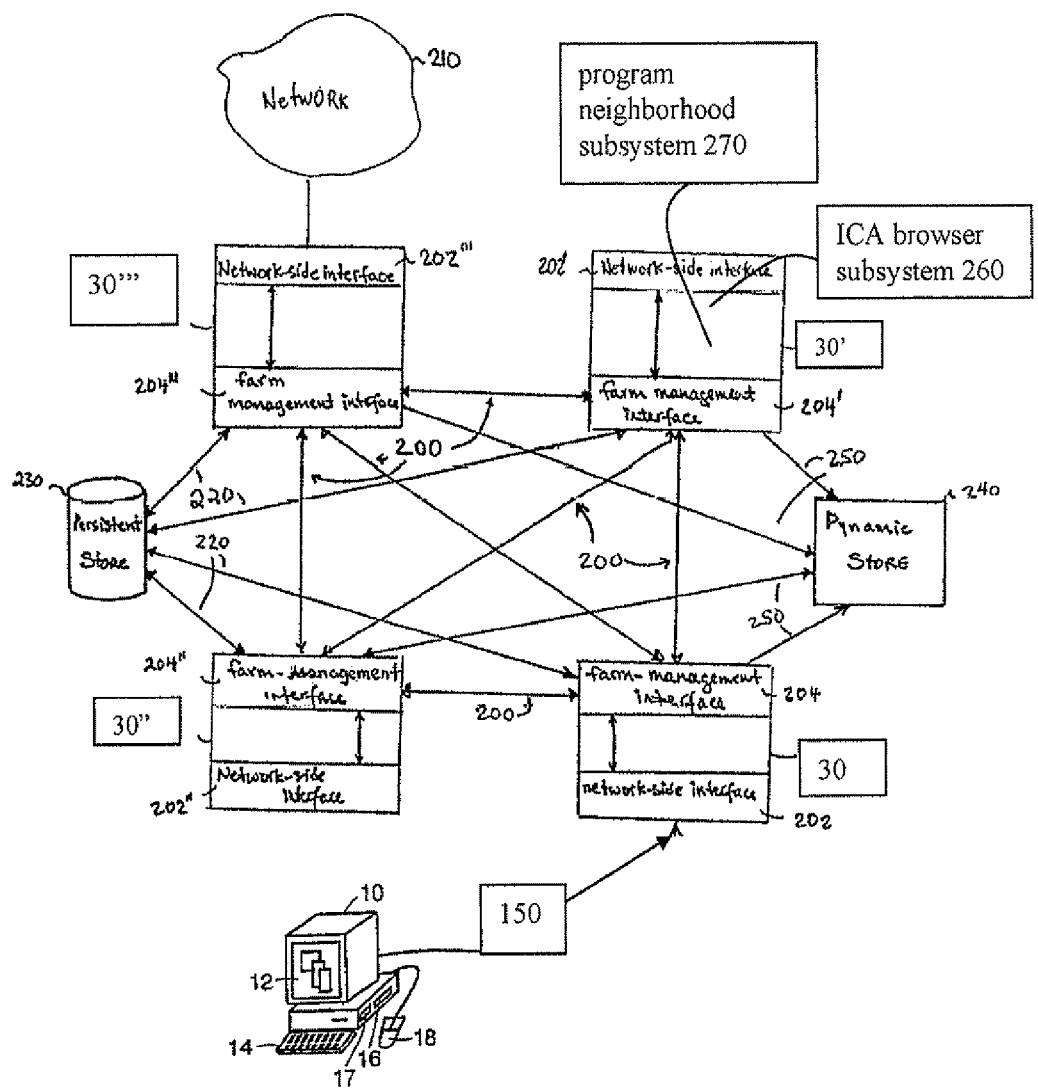
FIG. 1E is a block diagram depicting an environment suitable for delivering a computing environment to a client.

Referring now to FIG. 1E, one embodiment of a system in which remote machines 30 comprise a farm 38 as depicted in FIG. 1A is shown. Each remote machine 30 includes a network-side interface 202 and a farm-side interface 204. The network-side interface 202 of the remote machine 30 may be in communication with one or more local machines 10 or a network 210. The network 210 can be a WAN, LAN, or international network such as the Internet or the World Wide Web. Local machines 10 may establish connections with the remote machines 30 using the network 210.

The farm-side interfaces 204 of the remote machines 30 are interconnected with each over communication links 200 so that the remote machines 30 may communicate with one another. On each remote machine 30, the farm-side interface 204 communicates with the network-side interface 202. The farm-side interfaces 204 also communicate (designated by arrows 220) with a persistent store 230 and, in some embodiments, with a dynamic store 240. The combination of remote machines 30, the persistent store 230, and the dynamic store 240, when provided, are collectively referred to as a farm 38. In some embodiments, a remote machine 30 communicates with the persistent store 230 and other remote machines 30' communicate with the remote machine 30 to access information stored in the persistent store.

Persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one farm 38. The persistent store 230 maintains static data associated with each remote machine 30 in farm 38 and global data used by all remote machines 30 within the farm 38. In one embodiment, the persistent store 230 may maintain the remote machine data in a Lightweight Directory Access Protocol (LDAP) data model. In other embodiments, the persistent store 230 stores remote machine data in an ODBC-compliant database. For the purposes of this description, the term "static data" refers to data that do not change frequently, i.e., data that change only on an hourly, daily, or weekly basis, or data that never change. Each remote machine uses a persistent storage subsystem to read data from and write data to the persistent store 230.

The data stored by the persistent store 230 may be replicated for reliability purposes physically or logically. For example, physical redundancy may be provided using a set of redundant, mirrored disks, each providing a copy of the data. In other embodiments, the database itself may be replicated using standard database techniques to provide multiple copies of the database. In further embodiments, both physical and logical replication may be used concurrently.

The dynamic store 240 (i.e., the collection of all record tables) can be embodied in various ways. In one embodiment, the dynamic store 240 is centralized; that is, all runtime data are stored in the memory of one remote machine 30 in the farm 38. That remote machine operates as a master network node with which all other remote machines 30 in the farm 38 communicate when seeking access to that runtime data. In another embodiment, each remote machine 30 in the farm 38 keeps a full copy of the dynamic store 240. Here, each remote machine 30 communicates with every other remote machine 30 to keep its copy of the dynamic store 240 up to date.

In another embodiment, each remote machine 30 maintains its own runtime data and communicates with every other remote machine 30 when seeking to obtain runtime data from them. Thus, for example, a remote machine 30 attempting to find an application program requested by the local machine 10 may communicate directly with every other remote machine 30 in the farm 38 to find one or more remote machines hosting the requested application.

For farms 38 having a large number of remote machines 30, the network traffic produced by these embodiments can become heavy. One embodiment alleviates heavy network traffic by designating a subset of the remote machines 30 in a farm 38, typically two or more, as "collector points." Generally, a collector point is a remote machine that collects runtime data. Each collector point stores runtime data collected from certain other remote machines 30 in the farm 38. Each remote machine 30 in the farm 38 is capable of operating as, and consequently is capable of being designated as, a collector point. In one embodiment, each collector point stores a copy of the entire dynamic store 240. In another embodiment, each collector point stores a portion of the dynamic store 240, i.e., it maintains runtime data of a particular data type. The type of data stored by a remote machine 30 may be predetermined according to one or more criteria. For example, remote machines 30 may store different types of data based on their boot order. Alternatively, the type of data stored by a remote machine 30 may be configured by an administrator using administration tool 140. In these embodiments, the dynamic store 240 is distributed among two or more remote machines 30 in the farm 38. In another embodiment an appliance 1250 may alleviate heavy network traffic by accelerating data passed between the remote machines 30, the dynamic store 16240, and the persistent store 230. Such acceleration may be provided by any of the techniques discussed further herein in Section C. For example, the appliance 1250 may be used to alleviate heavy network traffic.

Remote machines 30 not designated as collector points know the remote machines 30 in a farm 38 that are designated as collector points. A remote machine 180 not designated as a collector point may communicate with a particular collector point when delivering and requesting runtime data. Consequently, collector points lighten network traffic because each remote machine 30 in the farm 38 communicates with a single collector point remote machine 30, rather than with every other remote machine 30, when seeking to access the runtime data.

Each remote machine 30 can operate as a collector point for more than one type of data. For example, remote machine 30''' can operate as a collector point for licensing information and for loading information. In these embodiments, each collector point may amass a different type of run-time data. For example, to illustrate this case, the remote machine 30''' can collect licensing information, while the remote machine 30'' collects loading information.

In some embodiments, each collector point stores data that is shared between all remote machines 30 in a farm 38. In these embodiments, each collector point of a particular type of data exchanges the data collected by that collector point with every other collector point for that type of data in the farm 38. Thus, upon completion of the exchange of such data, each collector point 30'' and 30 possesses the same data. Also in these embodiments, each collector point 30 and 30'' also keeps every other collector point abreast of any updates to the runtime data.

Browsing enables a local machine 10 to view farms 38, remote machines 30, and applications in the farms 38 and to access available information such as sessions throughout the farm 38. Each remote machine 30 includes an ICA browsing subsystem 260 to provide the local machine 10 with browsing capability. After the local machine 10 establishes a connection with the ICA browser subsystem 260 of any of the remote machines 30, that browser subsystem supports a variety of local machine requests. Such local machine requests include: (1) enumerating names of remote machines in the farm, (2) enumerating names of applications published in the farm, (3) resolving a remote machine name and/or application name to a remote machine address that is useful the local machine 10. The ICA browser subsystem 260 also supports requests made by local machines 10 running a program neighborhood application that provides the local machine 10, upon request, with a view of those applications within the farm 38 for which the user is authorized. The ICA browser subsystem 260 forwards all of the above-mentioned local machine requests to the appropriate subsystem in the remote machine 30.

In one embodiment, each remote machine 30 in the farm 38 that has a program neighborhood subsystem 270 can provide the user of a local machine 10 with a view of applications within the farm 38. The program neighborhood subsystem 270 may limit the view to those applications for which the user of the local machine 10 has authorization to access. Typically, this program neighborhood service presents the applications to the user as a list or a group of icons.

The functionality provided by the program neighborhood subsystem 270 is available to two types of local machines, (1) program neighborhood-enabled local machines that can access the functionality directly from a local machine desktop, and (2) non-program neighborhood-enabled local machines (e.g., legacy local machines) that can access the functionality by running a program neighborhood-enabled desktop on the remote machine.

Communication between a program neighborhood-enabled local machine and the program neighborhood subsystem 270 may occur over a dedicated virtual channel that is established on top of an ICA virtual channel. In other embodiments, the communication occurs using an XML service. In one of these embodiments, the program neighborhood-enabled local machine communicates with an XML subsystem, such as the XML service 516 described in connection with FIG. 6 below, providing program neighborhood functionality on a remote machine 30.

In one embodiment, the program neighborhood-enabled local machine does not have a connection with the remote machine with a program neighborhood subsystem 270. For this embodiment, the local machine 10 sends a request to the ICA browser subsystem 260 to establish an ICA connection to the remote machine 30 in order to identify applications available to the local machine 10. The local machine 10 then runs a client-side dialog that acquires the credentials of a user. The credentials are received by the ICA browser subsystem 260 and sent to the program neighborhood subsystem 270. In one embodiment, the program neighborhood subsystem 270 sends the credentials to a user management subsystem for authentication. The user management subsystem may return a set of distinguished names representing the list of accounts to which the user belongs. Upon authentication, the program neighborhood subsystem 270 establishes the program neighborhood virtual channel. This channel remains open until the application filtering is complete. In some embodiments, an acceleration program 6120 as described in section C may also be transmitted to the local machine 10 in response to a local machine 10 request.

The program neighborhood subsystem 270 then requests the program neighborhood information from the common application subsystem 524 associated with those accounts. The common application subsystem 524 obtains the program neighborhood information from the persistent store 230. On receiving the program neighborhood information, the program neighborhood subsystem 270 formats and returns the program neighborhood information to the local machine over the program neighborhood virtual channel. Then the partial ICA connection is closed.

For another example in which the program neighborhood-enabled local machine establishes a partial ICA connection with a remote machine, consider the user of the local machine 10 who selects a farm 38. The selection of the farm 38 sends a request from the local machine 10 to the ICA browser subsystem 260 to establish an ICA connection with one of the remote machines 30 in the selected farm 38. The ICA browser subsystem 260 sends the request to the program neighborhood subsystem 270, which selects a remote machine 30 in the farm 38. Address information associated with the remote machine 30 is identified and returned to the local machine 10 by way of the ICA browser subsystem 260. The local machine 10 can then subsequently connect to the remote machine 30 corresponding to the received address information.

In another embodiment, the program neighborhood-enabled local machine 10 an ICA connection upon which the program neighborhood-virtual channel is established and remains open for as long as the ICA connection persists. Over this program neighborhood virtual channel, the program neighborhood subsystem 270 pushes program neighborhood information updates to the local machine 10. This pushing of updates to a local machine 10 may be accelerated according to any of the accelerating techniques discussed herein. To obtain updates, the program neighborhood subsystem 270 subscribes to events from the common application subsystem 524 to allow the program neighborhood subsystem 270 to detect changes to published applications.

Figure 1F:
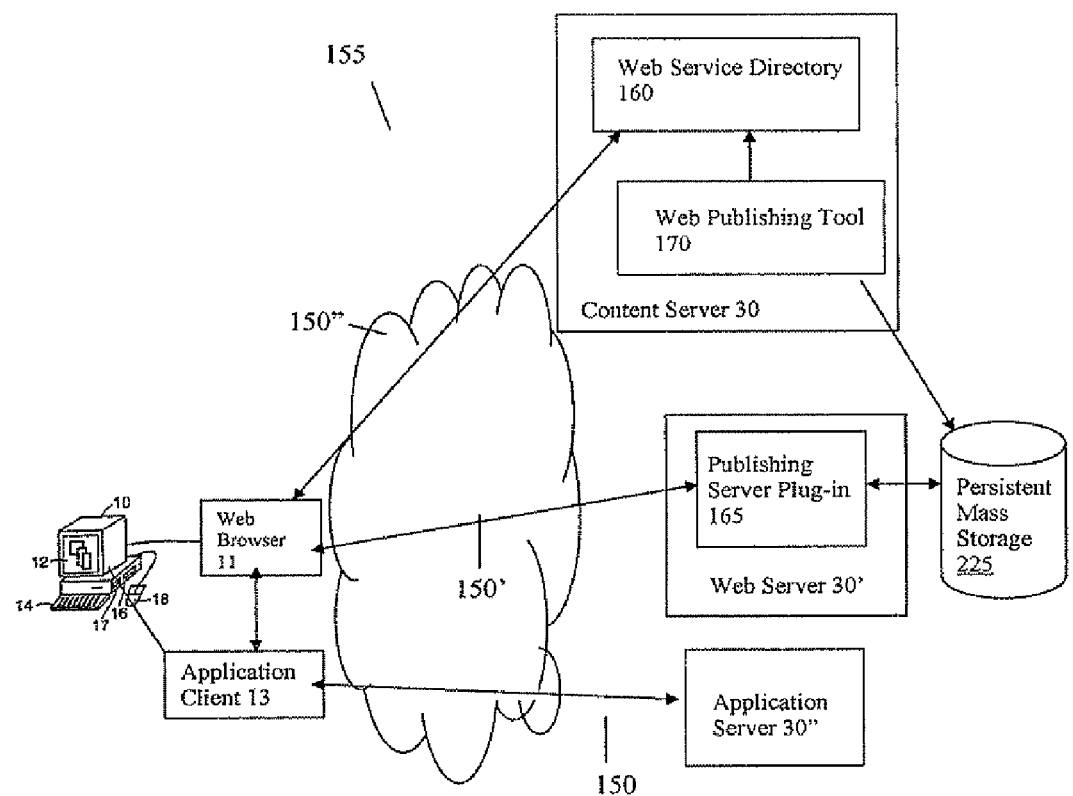
FIG. 1F is a block diagram depicting one embodiment of a system for providing a plurality of application programs available to the local machine via publishing of GUIs in a web service directory.

Referring to FIG. 1F, a block diagram depicts another embodiment of a system architecture for providing a plurality of application programs available to the local machine via publishing of GUIs in a web service directory. The system includes the local machine 10, and a plurality of remote machines 30. One remote machine 30 functions as a content server. A remote machine 30' provides web server functionality. A remote machine 30'' provides functionality for providing access to application files and acts as an application server or a file server. The local machine 10 can download content from the content server 30, the web server 30', and the application server 30" over the network 155. In one embodiment, the local machine 10 can download content (e.g., an application) from the application server 30" over the client-application server communication channel 1150.

In one embodiment, the web browser 11 on the local machine 10 uses Secure Socket Layer (SSL) support for communications to the content server 30 and/or the web server 30'. SSL is a secure protocol developed by Netscape Communication Corporation of Mountain View, Calif., and is now a standard promulgated by the Internet Engineering Task Force (IETF). The web browser 11 can alternatively connect to the content server 30 and/or the web server 30' using other security protocols, such as, but not limited to, Secure HyperText Transfer Protocol (SHTTP) developed by Terisa Systems of Los Altos, Calif., HTTP over SSL (HTTPS), Private Communication Technology (PCT) developed by Microsoft Corporation of Redmond, Wash., and the Transport Level Security (TLS) standard promulgated by the IETF. In other embodiments, the web browser 11 communicates with the servers 30 using a communications protocol without encryption, such as the HyperText Transfer Protocol (HTTP).

Additionally, the local machine 10 includes an application client 13 for establishing and exchanging communications with the application server 30" over the client-application server communication channel 1150. In one embodiment, the application client 13 is a GUI application. In some embodiments, the application client 13 is an Independent Computing Architecture (ICA) client, developed by Citrix Systems, Inc. of Fort Lauderdale, Fla., and is also referred to below as ICA client 13. Other embodiments of the application client 13 include a Remote Display Protocol (RDP) client, developed by Microsoft Corporation of Redmond, Wash., an X-Windows client 13, a client-side player, interpreter or simulator capable of executing multimedia applications, email, Java, or .NET code. Moreover, in one embodiment the output of an application executing on the application server 30" can be displayed at the local machine 10 via the ICA client 13. In some embodiments, the application client 13 is an application client such as the application streaming client 552, described in greater detail in connection with FIG. 5. In some embodiments, the application client 13 comprises an acceleration program in accordance with any of the embodiments described herein 6120 for accelerating communications between client 10 and server 30.

The local machine 10 searches the web service directory 160 for a web service. In one embodiment, the search is a manual search. Alternatively, the search is an automatic search. The web service directory 160 may also provide a service based view, such as white and yellow pages, to search for web services in the web service directory. In another embodiment, the web service directory 160 supports a hierarchical browsing based on a structured service name and service kind for GUI applications. In one embodiment, the web service directory 160 executes on a remote machine independent of the content server 30, such as a directory server. In other embodiments, the web service directory 160 executes on multiple servers.

In some embodiments, the content server 30 enables the local machine 10 to select web services based on additional analysis or information by providing this information or analysis in the web service directory 160. Examples of service information that the web service directory 160 can list includes, but is not limited to, the name of the business offering the service, the service type, a textual description of the service, one or more service access points (SAPs), the network type, the path to use (e.g., TCP or HTTPS), and quality of service (QoS) information. Moreover, service information can be client device type or user (e.g., role) specific. Thus, service selection can be based on one or more of the above attributes.

In one embodiment, the service type denotes a programming interface that the local machine 10 must use to access the web service. For instance, the service type can state that the service is encoded by an interface description language, such as Web Services Description Language (WSDL).

The service access point, or SAP, is a unique address for an application. The SAPs enable the computer system to support multiple applications at the local machine 10 and each remote machine 30. For example, the application server 30" may support an electronic mail (i.e., e-mail) application, a file transfer application, and/or a GUI application. In one embodiment, these applications would each have a SAP that is unique within the application server 30". In one embodiment, the SAP is a web or Internet address (e.g., Domain Name System (DNS) name, IP/port, or Uniform Resource Locator (URL)). Thus, in one embodiment the SAP identifies the address of the web server 30' as part of the address for an application stored on the web server 30'. In some embodiments, the SAP identifies the address of a publishing server plug-in 165 as part of the address for an application stored on the web server 30', as described below. In one embodiment, the SAP is an "accessPoint" from the UDDI registry.

To prepare an item for publishing in the web service directory 160, the content server 30 includes a web publishing tool 170. In one embodiment, the web publishing tool 170 is a software module. Alternatively, the web publishing tool 170 is another server that may be externally located from or internally located in the content server 30.

In one embodiment, the web server 30' delivers web pages to the local machine 10. The web server 30' can be any remote machine 30 capable of providing web pages to the local machine 10. In another embodiment, the web server 30' is an Enterprise Information Portal (e.g., corporate Intranet or secured business-to-business extranet). Enterprise portals are company web sites that aggregate, personalize and serve applications, data and content to users, while offering management tools for organizing and using information more efficiently. In some companies, portals have replaced traditional desktop software with browser-based access to a virtual workplace. In some embodiments, an appliance 1250 accelerates delivery of the provision of web pages is accelerated using any of the acceleration techniques discussed herein. In other embodiments an acceleration program 6120 accelerates delivery of the web pages.

The web server 30' also includes a publishing server plug-in 165 to enable the publishing of graphical user interface (GUI) applications. More specifically, the publishing server plug-in 165 translates a new web service entry URL into a GUI application service so that the GUI can be accessed via the web service directory 160. In one embodiment, the publishing server plug-in 165 is a Common Gateway Interface (CGI) script, which is a program designed to accept and return data that conforms to the CGI specification. The program can be written in any programming language, such as C, Perl, Java, or Visual Basic. In another embodiment, the publishing server plug-in 165 is a Java Server Page (JSP). Using the publishing server plug-in 165 to facilitate the publishing of remote GUI applications, the local machine 10 can thereby access the web service, not through a programming interface or a web page, but through a full GUI interface, such as with Citrix's ICA or Microsoft's RDP. In some embodiments, an appliance 1250 or acceleration program 6120 accelerates the delivery of said GUI to the client is accelerated using any of the acceleration techniques discussed herein in Section C.

The application server 30" hosts one or more applications that are available for the local machine 10. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, or application set managers.

In one embodiment, the web publishing tool 170 stores information about an application that the web publishing tool 170 is publishing in the web service directory 160 in a persistent mass storage 225. In one embodiment the information is a URL for the dynamic publishing server plug-in 165. The persistent mass storage 225 may be a magnetic disk or magneto-optical drive. In one embodiment, the persistent mass storage 225 is a database server, which stores data related to the published application in one or more local service databases. The persistent mass storage 225 may be a component internally located in or externally located from any or all of the remote machines 30.

In other embodiments, the content server 30 or the web server 30' communicate with a remote machine 30 in the farm 38 to retrieve the list of applications. In one of these embodiments, the content server 30 or the web server 30' communicate with the farm 38 instead of with the persistent mass storage 225.

Figure 2:
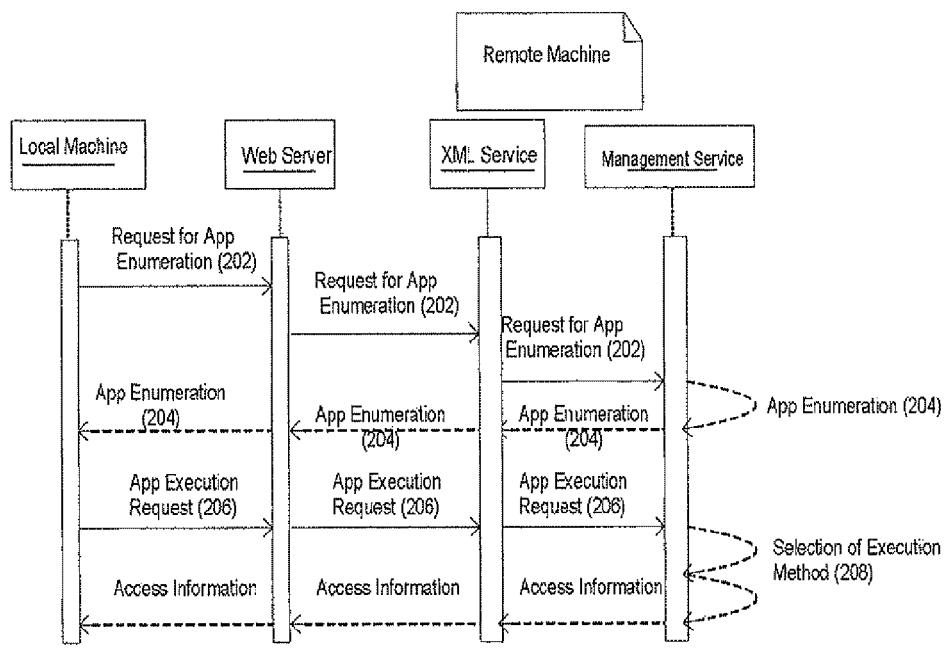
FIG. 2 is a flow diagram depicting one embodiment of the steps taken to select a method of execution of an application program.

Referring now to FIG. 2, a flow diagram depicts one embodiment of the steps taken to select a method of execution of an application program. In brief overview, credentials associated with the local machine or with a user of the local machine are received, with a request for an enumeration of applications available for execution by the local machine (step 202). An enumeration of a plurality of application programs available to the local machine is provided, responsive to the received credentials (step 204). A request is received to execute an enumerated application (step 206). One of a predetermined number of methods for executing the enumerated application is selected, responsive to a policy, the predetermined number of methods including a method for application streaming of the enumerated application (step 208).

Credentials associated with the local machine or with a user of the local machine are received, with a request for an enumeration of applications available for execution by the local machine (step 202). In one embodiment, the remote machine receives a request for enumeration of available applications from the local machine 10 with the credentials. In another embodiment, an XML service on the remote machine 30 receives the request and the credentials and transmits the request and credentials to a management service on the remote machine 30.

In some embodiments, a remote machine 30 functioning as a web server receives communications from the local machine 10 and forwards the communications to a remote machine 30'. In one of these embodiments, the web server forwards the communications to an XML service on the remote machine 30'. In another of these embodiments, the web server resides on the local machine. In other embodiments where communications from the local machine 10 are routed to a remote machine 30' by the web server, the remote machine 30' may be selected responsive to an Internet Protocol (IP) address of the local machine 10.

In some embodiments, a local machine 10 requests access to an application residing on a remote machine 30. In one of these embodiments, the local machine 10 requests execution by the remote machine 30 of the application residing on the remote machine 30. In another of these embodiments, the local machine 10 requests retrieval of a plurality of application files that comprise the application.

In some embodiments, the user provides credentials to the remote machine 30 via a graphical user interface presented to the local machine 10 by the remote machine 30. In other embodiments, a remote machine 30''' having the functionality of a web server provides the graphical user interface to the local machine 10. In still other embodiments, a collection agent transmitted to the local machine 10 by the remote machine 30 gathers the credentials from the local machine 10. In one embodiment, a credential refers to a username and password. In another embodiment, a credential is not limited to a username and password but includes, without limitation, a machine ID of the local machine 10, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the remote machine 30, date or time of access request including adjustments for varying time zones, and authorization credentials.

In some embodiments, a credential associated with a local machine is associated with a user of the local machine. In one of these embodiments, the credential is information possessed by the user. In another of these embodiments, the credential is user authentication information. In other embodiments, a credential associated with a local machine is associated with a network. In one of these embodiments, the credential is information associated with a network to which the local machine may connect. In another of these embodiments, the credential is information associated with a network collecting information about the local machine. In still other embodiments, a credential associated with a local machine is a characteristic of the local machine.

An enumeration of a plurality of application programs available to the local machine is provided, responsive to the received credentials (step 204). In one embodiment, a user of a local machine 10 may learn of the availability of application programs hosted by the remote machines 30 in the network 40 without knowing where to find such applications and without technical information necessary to link to such applications. These available application programs comprise the "program neighborhood" of the user. A system for determining a program neighborhood for a local machine includes an application program (hereafter referred to as the "Program Neighborhood" application), memory for storing components of the application program, and a processor for executing the application program. The Program Neighborhood (PN) application can be installed in memory of the local machine 10 and/or on a remote machine 30 as described below.

A remote machine 30 operating according to the Program Neighborhood application collects application-related information from each of the remote machines 30 in a farm 38. The application-related information for each hosted application can be a variety of information including, for example, an address of the remote machine hosting that application, the application name, the users or groups of users who are authorized to use that application, and the minimum capabilities required of the local machine 10 before establishing a connection to run the application. For example, the application may stream video data, and therefore a required minimum capability may be that the local machine supports video data. Other examples are requirements that the local machine support audio data or have the capacity to process encrypted data. The application-related information can be stored in a database.

When a local machine 10 connects to the network 40, the user of the local machine 10 provides user credentials. User credentials may include the username of a user of the local machine 10, the password of the user, and the domain name for which the user is authorized. Alternatively, the user credentials may be obtained from smart cards, time-based tokens, social security numbers, user passwords, personal identification (PIN) numbers, digital certificates based on symmetric key or elliptic curve cryptography, biometric characteristics of the user, or any other means by which the identification of the user of the local machine 10 can be obtained and submitted for authentication. The remote machine 30 responding to the local machine 10 can authenticate the user based on the user credentials. The user credentials can be stored wherever the Program Neighborhood application is executing. For embodiments in which the local machine 10 executes the Program Neighborhood application, the user credentials may be stored at the local machine 10. For embodiments in which a remote machine 30 executes the Program Neighborhood, the user credentials can be stored at that remote machine 30.

From the user credentials and the application-related information, the remote machine 30 can also determine which application programs hosted by remote machines 30 are available for use by the user of the local machine 10. The remote machine 30 transmits information representing the available application programs to the local machine 10. This process eliminates the need for a user of the local machine 10 to establish application connections. Additionally, an administrator of the remote machine 30 may control access to applications among multiple users of a local machine 10.

In some embodiments, the user authentication performed by the remote machine 30 may suffice to authorize the use of each hosted application program presented to the local machine 10, although such applications may reside at another remote machine 30'. Accordingly, when the local machine 10 launches (i.e., initiates execution of) one of the hosted applications, additional input of user credentials by the local machine 10 may be unnecessary to authenticate use of that application. Thus, a single entry of the user credentials may serve to determine the available applications and to authorize the launching of such applications without an additional, manual log-on authentication process by the user.

Either a local machine 10 or remote machine 30 can launch the Program Neighborhood application. The results are displayed on the display screen 12, 22 of the local machine 10, 20. In a graphical windows-based implementation, the results can be displayed in a Program Neighborhood graphical window and each authorized application program can be represented by a graphical icon in that window.

In one embodiment, the Program Neighborhood application filters out application programs that the local machine 10 is unauthorized to execute and displays only authorized (i.e., available) programs. In other embodiments, the Program Neighborhood application can display authorized and unauthorized applications. When unauthorized applications are not filtered from the display, a notice can be provided indicating that such applications are unavailable. Alternatively, the Program Neighborhood application can report all applications hosted by the remote machines 30 to the user of a local machine 10, without identifying which applications the local machine 10 is authorized or unauthorized to execute. Authorization can be subsequently determined when the local machine 10 attempts to run one of those applications.

The local machine 10 may request application enumeration from a remote machine 30. Application enumeration enables a user of the local machine 10 to view the names of every published application. In one embodiment, the user of the local machine 10 can view the application names regardless of whether the user has authorization to execute the application. In another embodiment, the user views only those application names that the user is authorized to execute.

Requests for application enumeration pass to the ICA browser subsystem 260, to the program neighborhood subsystem 270, or to a common application subsystem 524, depending upon the particular process being run by the local machine 10. For example, when the local machine 10 is running program neighborhood application, the requests for application enumeration are sent to the program neighborhood subsystem 270 on a remote machine 30. When the local machine 10 submits the enumeration request through a web page, the requests pass to the common access point subsystem 524. For these embodiments, the common application subsystem 524 serves as an initial access point for the program neighborhood subsystem 270, ICA browser subsystem 260, and common application subsystems when the local machine 10 wants to enumerate applications. In some embodiments, when the local machine 10 submits the enumeration request through a web page, an intermediate remote machine 30 hosting a web server receives the request and forwards the request to a remote machine 30'.

Upon receiving the enumeration requests, a common application subsystem 524 queries the persistent store 230 for a list of all applications. For requests received from the program neighborhood subsystem 270 and common access point 645 subsystems, this list of applications is filtered according to the credentials of the user of the local machine 10 (i.e., the user views only those applications for which the user is authorized).

The local machine 10 can also request remote machine enumeration. Remote machine enumeration enables a user of the local machine 10 to view a list of remote machines in the farm 38. In one embodiment, the list of remote machines can be filtered according to the type of remote machine, as determined by the specialized remote machine subsystem on that remote machine.

Requests for remote machine enumeration pass to the ICA browser subsystem 260 or to the common access point subsystem 645, depending upon the particular process being run by the local machine 120. For example, when the local machine 120 submits the remote machine enumeration request through a web page, the requests pass to the common access point subsystem 645. For these embodiments, the common remote machine subsystem 300 serves as an initial access point for the ICA browser subsystem 260 and common access point 645 subsystems. Upon receiving the remote machine enumeration requests, the common remote machine subsystem queries the persistent store 230 for a list of all remote machines. Optionally, the list of remote machines is filtered according to the remote machine type.

Figure 3A:
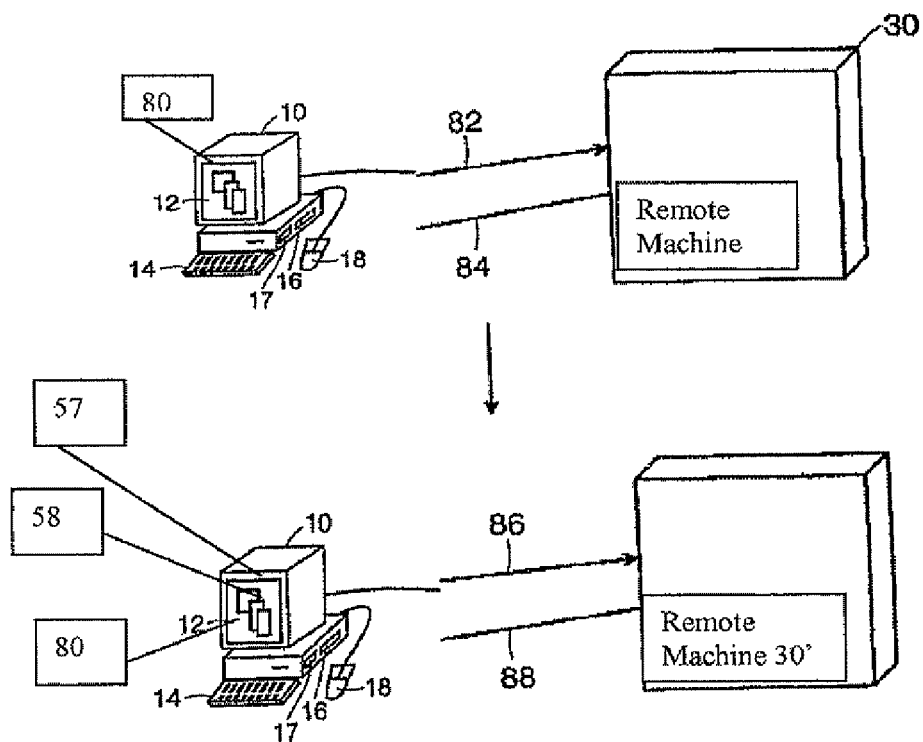
FIG. 3A is a block diagram depicting one embodiment of a local machine initiating execution of a Program Neighborhood application via the World Wide Web.

FIG. 3A is a block diagram depicting another embodiment of the process by which a local machine 10 initiates execution of the Program Neighborhood application, in this example via the World Wide Web. A local machine 10 executes a web browser application 80, such as NETSCAPE NAVIGATOR, manufactured by Netscape Communications, Inc. of Mountain View, Calif. or MICROSOFT INTERNET EXPLORER, manufactured by Microsoft Corporation of Redmond, Wash., or FIREFOX, manufactured by Mozilla Foundation of Mountain View, Calif., or OPERA, manufactured by Opera Software ASA, of Oslo, Norway, or SAFARI, manufactured by Apple Computer, Inc., of Cupertino, Calif.

The local machine 10, via the web browser 80, transmits a request 82 to access a Uniform Resource Locator (URL) address corresponding to an HTML page residing on remote machine 30. In some embodiments the first HTML page returned 84 to the local machine 10 by the remote machine 30 is an authentication page that seeks to identify the local machine 10.

Still referring to FIG. 3A, once the local machine 10 is authenticated by the remote machine 30, the remote machine 30 prepares and transmits to the local machine 10 an HTML page 88 that includes a Program Neighborhood window 58 in which appears graphical icons 57, 57' representing application programs to which the local machine 10 has access. A user of local machine 10 invokes execution of an application represented by icon 57 by clicking that icon 57.

In some embodiments, the remote machine 30 executes the Program Neighborhood application on behalf of a user of the local machine 10. In one of these embodiments, the remote machine 30 is an intermediate remote machine residing between the local machine 10 and a remote machine 30'.

Figure 3B:
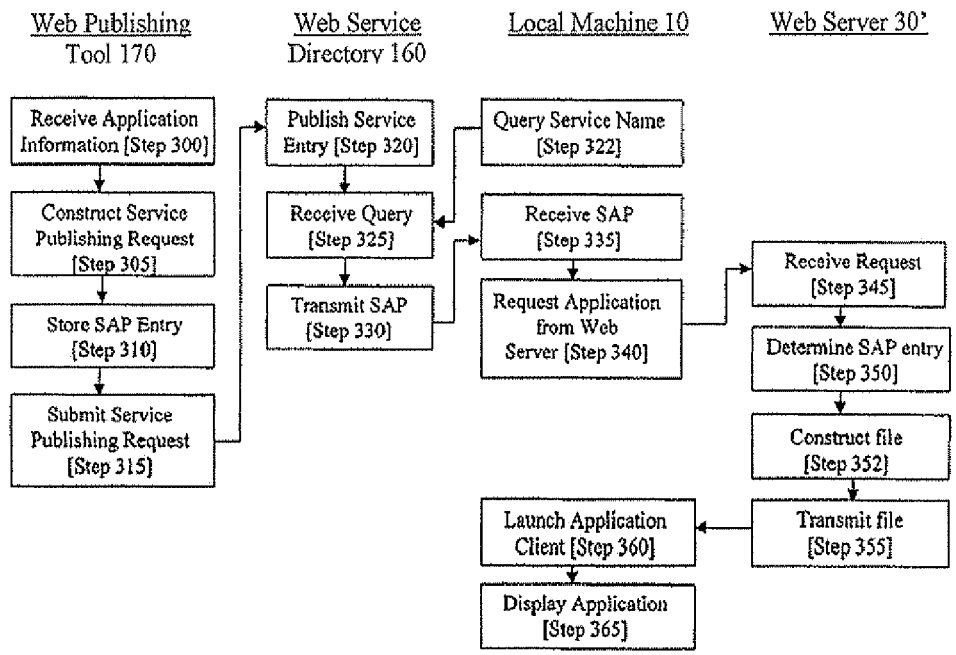
FIG. 3B is a flow diagram depicting one embodiment of the steps taken by a local machine to access an application program enumerated using a web service directory.

Referring to FIG. 3B, a flow diagram depicts one embodiment of the steps taken to provide a plurality of application programs available to the local machine via publishing of GUIs in a web service directory. The web publishing tool 170 receives a web service description and access information for an application (e.g., GUI application) for publishing (step 300). In one embodiment, the web service description includes the service information described above (e.g., the name of the business offering the web service, the service type, a textual description of the service, and a SAP). The access information may include, for example, a published application name, a Transmission Control Protocol (TCP) browsing server farm address, and a MetaFrame server IP address. In some embodiments, the access information specifies the address to use and a ticket to use to traverse network or security gateways or bridge devices.

The web publishing tool 170 then constructs a service-publishing request to request the publication of the web service (i.e., GUI application) (step 305). In one embodiment, the service-publishing request includes a SAP. In some embodiments, the SAP is a URL including the web address of the web server 30' and the publishing server plug-in 165. Further, the web address can be a Uniform Resource Identifier (URI), which is the generic term for the types of names and addresses that refer to objects on the web. A URL is one kind of URI. An example of the URI is the name of the web server 30' (e.g., "web-server") and the CGI script name (e.g., "dynamic-component") for the publishing server plug-in 165.

The web publishing tool 170 stores a SAP entry associated with the SAP in the persistent mass storage 225 (step 310). In some embodiments, the web publishing tool 170 also associates published application information (e.g., ICA-published-app-info) with the GUI application. In further embodiments, the web publishing tool 170 also includes a key in the service-publishing request to identify the SAP entry that the content server 30 stores in the persistent mass storage 225. For instance, the key can have the value of "123456677." An example of a SAP identifying the web server 30', the CGI script name of the publishing server plug-in 165, and the key described above is "http://web-server/dynamic-component/?app=123456677."

An example of the SAP entry associated with the SAP described above is "key=123456677, value=ICA-published-app-info." The key can be any length (e.g., 56 bit key, 128 bit key). In one embodiment, the key is a cryptographic random number. The key may also provides an access right to the key holder. Although illustrated with a key, any means can be used to provide a form of security to the SAP entry stored in the persistent mass storage 225.

The web publishing tool 170 provides the service-publishing request to the content server 30 for publishing in the web service directory 160 (step 315). Moreover, in one embodiment, the content server 30 transmits the key of the SAP to the local machine 10 requesting the particular web service for subsequent use in locating the SAP entry. In one embodiment, the publishing of the service-publishing request enables users of the local machine 10 to access the service. In one embodiment, GUI applications are published on the web service directory 160 using NFUSE developed by Citrix Systems, Inc. of Fort Lauderdale, Fla. In some embodiments, a publisher of a GUI application customizes the publication of the GUI application on the web service directory 160 using Application Launching And Embedding (ALE), also developed by Citrix Systems, Inc. ALE enables the launching of a GUI application from or the embedding of the application into an HTML page.

The local machine 10 then queries a service name from the web service directory 160 (step 320). The content server 30 receives the query from the local machine 10 (step 325) and finds the requested service name in the web service directory 160. In another embodiment, the user of the local machine 10 navigates the web service directory 160 until locating a particular service name that the user of the local machine 10 was attempting to find. Although illustrated with the local machine 10, any web service directory client (e.g., UDDI client or LDAP browser) can query or navigate the web service directory 160 to discover published web services.

Upon location of the SAP associated with the received query, the content server 30 transmits the SAP to the local machine 10 (step 330). The local machine 10 receives the SAP (step 335) and determines the address of the publishing server plug-in 165 from the SAP. The local machine 10 subsequently transmits a request for the GUI application to the web server 30' (step 340). In some embodiments, the request from the local machine 10 is an HTTP request transmitted from the web browser 11 to the web server 30'. In other embodiments, an application (e.g., general directory browser or HTML UI) executing on the local machine 10 receives the SAP from the content server 30 and provides the SAP as an argument to the web browser 11. The web browser 1 may then automatically transmit an HTTP request (for the GUI application) to the web server 30'. Following along the lines of the previous examples, a particular example of the application request to the web server 30' is http://web-server/dynamic-component/?app=123456677).

The web server 30', and, more particularly, the publishing server plug-in 165, receives the application request associated the SAP (step 345) and determines the SAP entry associated with the request (step 350). In one embodiment, the publishing server plug-in 165 receives the request from the local machine 10 and retrieves the published application information associated with the request that had been stored (as part of the SAP entry) in the persistent mass storage 225. In some embodiments, the publishing server plug-in 165 uses the SAP (or part of the SAP) that the local machine 10 received from the content server 30 as the key to access the proper service entry (e.g., the published application information) stored in the persistent mass storage 225.

The publishing server plug-in 165 then constructs a file or document having the published application information (e.g., HTTP address of the application server 30") (step 352) and transmits this document to the local machine 10 (step 355). The publishing server plug-in 165 constructs the file so that the file has a format compatible with the application client 13. In one embodiment, the document is a Multipurpose Internet Mail Extensions (MIME) or a secure MIME (S/MIME) document. In another embodiment, the document is an HTML document containing an ICA web client embedded object HTML tag. In still another embodiment, the document is an HTML document containing an application streaming client embedded object HTML tag.

The web browser 11 subsequently receives the document and attempts to open the document. In one embodiment, if the application client 13 is not installed on the local machine 10, the local machine 10 communicates with the application server 30" to download and install the application client 13. Upon installation of the application client 13 or, alternatively, if the application client 13 has already been installed on the local machine 10, the local machine 10 launches the application client 13 to view the document received from the web server 30' (step 360).

Once the application client 13 is installed and executing on the local machine 10, the application server 30" then executes the application and displays the application on the application client 13 (step 365). In an alternative embodiment, the application server 30" transmits a plurality of application files comprising the application to the application client 13 for execution on the local machine 10, as described in further detail below in connection with FIG. 7. In another embodiment, the local machine 10 views the document (even before launching the application client 13) and uses the information in the document to obtain the GUI application from the application server 30". In this embodiment, the display of the GUI application includes the installation and execution of the application client 30". Moreover, the viewing of the document may be transparent to the user of the local machine 10. For example, the local machine 10 may receive the document from the web server 30' and interpret the document before automatically requesting the GUI application from the application server 30".

Thus, the application client 13 provides service-based access to published applications, desktops, desktop documents, and any other application that is supported by the application client 13. Examples of applications that the application client 13 can provide access to include, but are not limited to, the WINDOWS desktops, WINDOWS documents such as MICROSOFT EXCEL, WORD, and POWERPOINT, all of which were developed by Microsoft Corporation of Redmond, Wash., Unix desktops such as SUN SOLARIS developed by Sun Microsystems of Palo Alto, Calif., and GNU/Linux distributed by Red Hat, Inc. of Durham, N.C., among others.

Figure 4A:
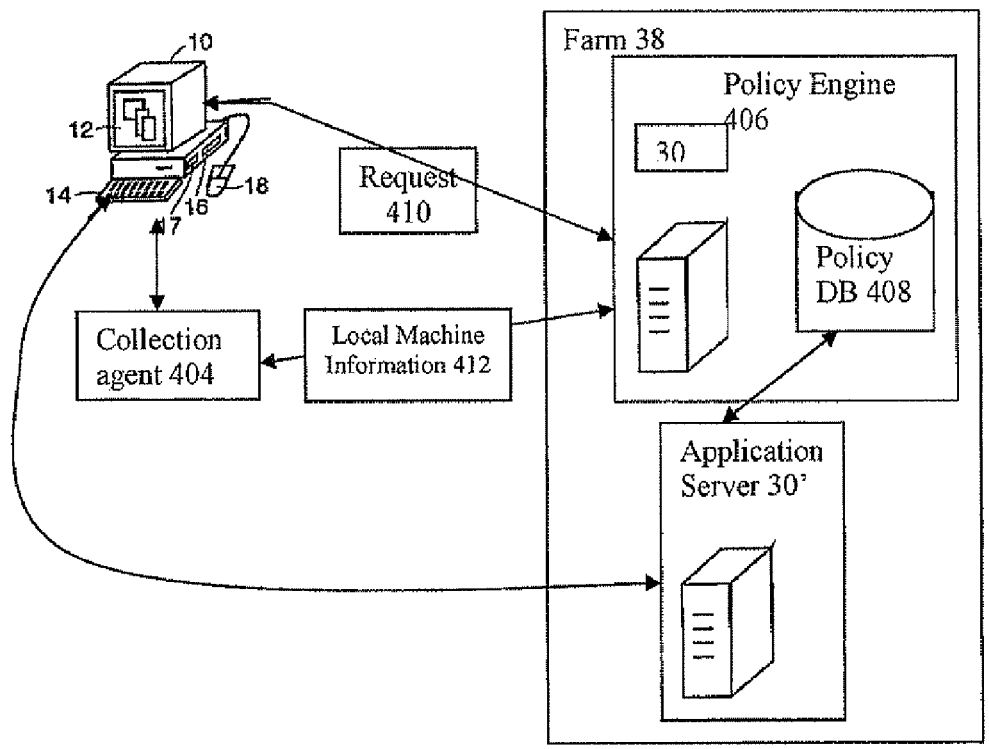
FIG. 4A is a block diagram of an embodiment of a network environment providing policy-based access to application programs for a local machine.

In some embodiments, an enumeration of a plurality of application programs available to the local machine 10 is provided (step 204) responsive to a determination by a policy engine regarding whether and how a local machine may access an application. The policy engine may collect information about the local machine prior to making the determination. Referring now to FIG. 4A, one embodiment of a computer network is depicted, which includes a local machine 10, a collection agent 404, a policy engine 406, a policy database 408, a farm 38, and an application server 30'. In one embodiment, the policy engine 406 is a remote machine 30. In another embodiment, the application server 30' is a remote machine 30'. Although only one local machine 10, collection agent 404, policy engine 406, farm 38, and application server 30' are depicted in the embodiment shown in FIG. 4A, it should be understood that the system may provide multiple ones of any or each of those components.

In brief overview, when the local machine 10 transmits a request 410 to the policy engine 406 for access to an application, the collection agent 404 communicates with local machine 10, retrieving information about the local machine 10, and transmits the local machine information 412 to the policy engine 406. The policy engine 406 makes an access control decision by applying a policy from the policy database 408 to the received information 412.

In more detail, the local machine 10 transmits a request 410 for a resource to the policy engine 406. In one embodiment, the policy engine 406 resides on an application server 30'. In another embodiment, the policy engine 406 is a remote machine 30. In still another embodiment, an application server 30' receives the request 410 from the local machine 10 and transmits the request 410 to the policy engine 406. In yet another embodiment, the local machine transmits a request 410 for a resource to a remote machine 30''', which transmits the request 410 to the policy engine 406.

Upon receiving the request, the policy engine 406 initiates information gathering by the collection agent 404. The collection agent 404 gathers information regarding the local machine 10 and transmits the information 412 to the policy engine 406.

In some embodiments, the collection agent 404 gathers and transmits the information 412 over a network connection. In some embodiments, the collection agent 404 comprises bytecode, such as an application written in the bytecode programming language JAVA. In some embodiments, the collection agent 404 comprises at least one script. In those embodiments, the collection agent 404 gathers information by running at least one script on the local machine 10. In some embodiments, the collection agent comprises an Active X control on the local machine 10. An Active X control is a specialized Component Object Model (COM) object that implements a set of interfaces that enable it to look and act like a control.

In one embodiment, the policy engine 406 transmits the collection agent 404 to the local machine 10. In another embodiment, an appliance 1250 may store or cache the collection agent. The appliance 1250 may then transmit the collection agent to a local machine 10. In other embodiments, an appliance 1250 may intercept the transmission of a collection agent 404. In still another embodiment, an appliance 1250 may accelerate the delivery of a collection agent. In one embodiment, the policy engine 406 requires a second execution of the collection agent 404 after the collection agent 404 has transmitted information 412 to the policy engine 406. In this embodiment, the policy engine 406 may have insufficient information 412 to determine whether the local machine 10 satisfies a particular condition. In other embodiments, the policy engine 406 requires a plurality of executions of the collection agent 404 in response to received information 412.

In some embodiments, the policy engine 406 transmits instructions to the collection agent 404 determining the type of information the collection agent 404 gathers. In those embodiments, a system administrator may configure the instructions transmitted to the collection agent 404 from the policy engine 406. This provides greater control over the type of information collected. This also expands the types of access control decisions that the policy engine 406 can make, due to the greater control over the type of information collected. The collection agent 404 gathers information 412 including, without limitation, machine ID of the local machine 10, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the remote machine 30, date or time of access request including adjustments for varying time zones, and authorization credentials. In some embodiments, a collection agent gathers information to determine whether an application can be accelerated on the client using an acceleration program 6120.

In some embodiments, the device type is a personal digital assistant. In other embodiments, the device type is a cellular telephone. In other embodiments, the device type is a laptop computer. In other embodiments, the device type is a desktop computer. In other embodiments, the device type is an Internet kiosk.

In some embodiments, the digital watermark includes data embedding. In some embodiments, the watermark comprises a pattern of data inserted into a file to provide source information about the file. In other embodiments, the watermark comprises data hashing files to provide tamper detection. In other embodiments, the watermark provides copyright information about the file.

In some embodiments, the network connection information pertains to bandwidth capabilities. In other embodiments, the network connection information pertains to Internet Protocol address. In still other embodiments, the network connection information consists of an Internet Protocol address. In one embodiment, the network connection information comprises a network zone identifying the logon agent to which the local machine provided authentication credentials.

In some embodiments, the authorization credentials include a number of types of authentication information, including without limitation, user names, client names, client addresses, passwords, PINs, voice samples, one-time passcodes, biometric data, digital certificates, tickets, etc. and combinations thereof. After receiving the gathered information 412, the policy engine 406 makes an access control decision based on the received information 412.

Figure 4B:
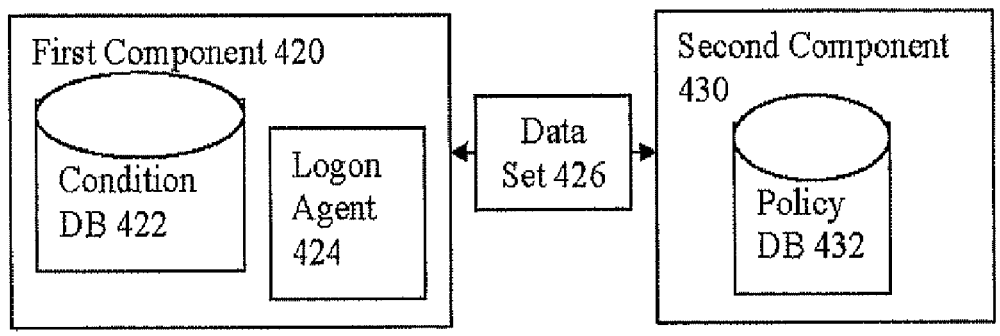
FIG. 4B is a block diagram depicting a more detailed embodiment of a policy engine.

Referring now to FIG. 4B, a block diagram depicts one embodiment of a policy engine 406, including a first component 420 comprising a condition database 422 and a logon agent 424, and including a second component 430 comprising a policy database 432. The first component 420 applies a condition from the condition database 422 to information received about local machine 10 and determines whether the received information satisfies the condition.

In some embodiments, a condition may require that the local machine 10 execute a particular operating system to satisfy the condition. In some embodiments, a condition may require that the local machine 10 execute a particular operating system patch to satisfy the condition. In still other embodiments, a condition may require that the local machine 10 provide a MAC address for each installed network card to satisfy the condition. In some embodiments, a condition may require that the local machine 10 indicate membership in a particular Active Directory to satisfy the condition. In another embodiment, a condition may require that the local machine 10 execute a virus scanner to satisfy the condition. In other embodiments, a condition may require that the local machine 10 execute a personal firewall to satisfy the condition. In some embodiments, a condition may require that the local machine 10 comprise a particular device type to satisfy the condition. In other embodiments, a condition may require that the local machine 10 establish a particular type of network connection to satisfy the condition.

If the received information satisfies a condition, the first component 420 stores an identifier for that condition in a data set 426. In one embodiment, the received information satisfies a condition if the information makes the condition true. For example, a condition may require that a particular operating system be installed. If the local machine 10 has that operating system, the condition is true and satisfied. In another embodiment, the received information satisfies a condition if the information makes the condition false. For example, a condition may address whether spyware exists on the local machine 10. If the local machine 10 does not contain spyware, the condition is false and satisfied.

In some embodiments, the logon agent 424 resides outside of the policy engine 406. In other embodiments, the logon agent 424 resides on the policy engine 406. In one embodiment, the first component 420 includes a logon agent 424, which initiates the information gathering about local machine 10. In some embodiments, the logon agent 424 further comprises a data store. In these embodiments, the data store includes the conditions for which the collection agent may gather information. This data store is distinct from the condition database 422.

In some embodiments, the logon agent 424 initiates information gathering by executing the collection agent 404. In other embodiments, the logon agent 424 initiates information gathering by transmitting the collection agent 404 to the local machine 10 for execution on the local machine 10. In still other embodiments, the logon agent 424 initiates additional information gathering after receiving information 412. In one embodiment, the logon agent 424 also receives the information 412. In this embodiment, the logon agent 424 generates the data set 426 based upon the received information 412. In some embodiments, the logon agent 424 generates the data set 426 by applying a condition from the database 422 to the information received from the collection agent 404.

In another embodiment, the first component 420 includes a plurality of logon agents 424. In this embodiment, at least one of the plurality of logon agents 424 resides on each network domain from which a local machine 10 may transmit a resource request. In this embodiment, the local machine 10 transmits the resource request to a particular logon agent 424. In some embodiments, the logon agent 424 transmits to the policy engine 406 the network domain from which the local machine 10 accessed the logon agent 424. In one embodiment, the network domain from which the local machine 10 accesses a logon agent 424 is referred to as the network zone of the local machine 10.

The condition database 422 stores the conditions that the first component 420 applies to received information. The policy database 432 stores the policies that the second component 430 applies to the received data set 426. In some embodiments, the condition database 422 and the policy database 432 store data in an ODBC-compliant database. For example, the condition database 422 and the policy database 432 may be provided as an ORACLE database, manufactured by Oracle Corporation of Redwood Shores, Calif. In other embodiments, the condition database 422 and the policy database 432 can be a Microsoft ACCESS database or a Microsoft SQL server database, manufactured by Microsoft Corporation of Redmond, Wash.

After the first component 420 applies the received information to each condition in the condition database 422, the first component transmits the data set 426 to second component 430. In one embodiment, the first component 420 transmits only the data set 426 to the second component 430. Therefore, in this embodiment, the second component 430 does not receive information 412, only identifiers for satisfied conditions. The second component 430 receives the data set 426 and makes an access control decision by applying a policy from the policy database 432 based upon the conditions identified within data set 426.

In one embodiment, policy database 432 stores the policies applied to the received information 412. In one embodiment, the policies stored in the policy database 432 are specified at least in part by the system administrator. In another embodiment, a user specifies at least some of the policies stored in the policy database 432. The user-specified policy or policies are stored as preferences. The policy database 432 can be stored in volatile or non-volatile memory or, for example, distributed through multiple servers.

In one embodiment, a policy allows access to a resource only if one or more conditions are satisfied. In another embodiment, a policy allows access to a resource but prohibits transmission of the resource to the local machine 10. Another policy might make connection contingent on the local machine 10 that requests access being within a secure network. In some embodiments, the resource is an application program and the local machine 10 has requested execution of the application program. In one of these embodiments, a policy may allow execution of the application program on the local machine 10. In another of these embodiments, a policy may enable the local machine 10 to receive a stream of files comprising the application program. In this embodiment, the stream of files may be stored and executed in an isolation environment. In still another of these embodiments, a policy may allow only execution of the application program on a remote machine, such as an application server, and require the remote machine to transmit application-output data to the local machine 10.

Figure 4C:
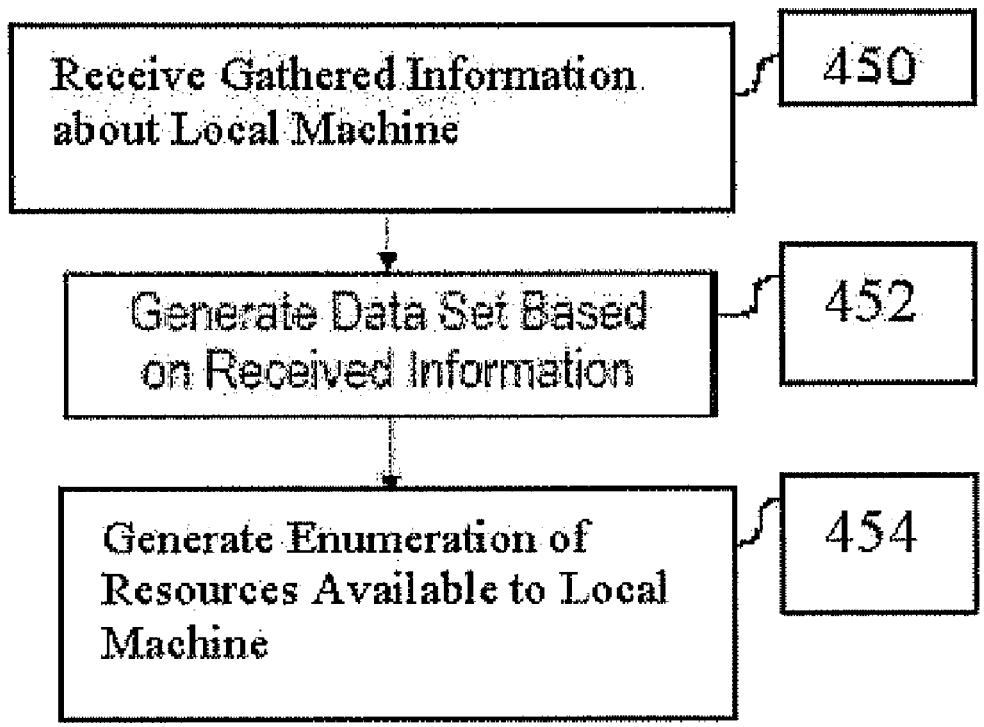
FIG. 4C a flow diagram depicting one embodiment of the steps taken by a policy engine to make an access control decision based upon information received about a local machine.

Referring now to FIG. 4C, a flow diagram depicts one embodiment of the steps taken by the policy engine 406 to make an access control decision based upon information received about a local machine 10. Upon receiving gathered information about the local machine 10 (Step 450), the policy engine 406 generates a data set based upon the information (Step 452). The data set 426 contains identifiers for each condition satisfied by the received information 412. The policy engine 406 applies a policy to each identified condition within the data set 426. That application yields an enumeration of resources which the local machine 10 may access (Step 454). The policy engine 406 then presents that enumeration to the local machine 10. In some embodiments, the policy engine 406 creates a Hypertext Markup Language (HTML) document used to present the enumeration to the local machine.

Figure 4D:
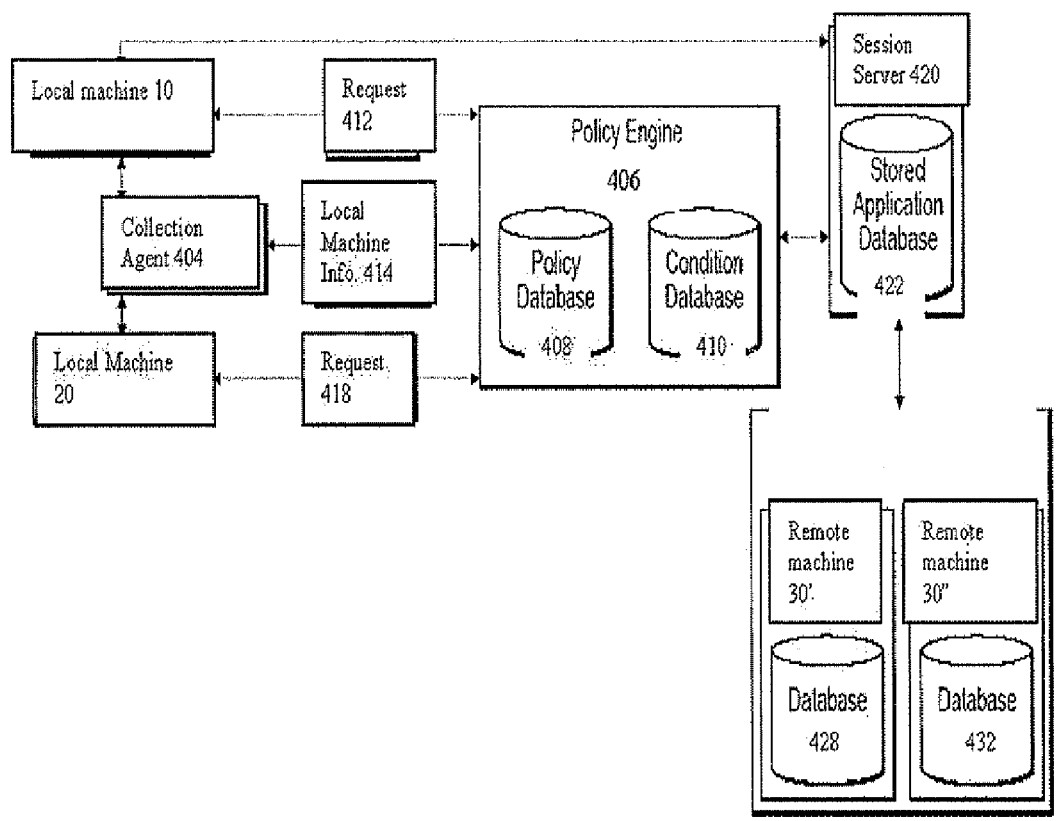
FIG. 4D is a block diagram depicting an embodiment of a computer network in which authorized remote access to a plurality of application sessions is provided.

Referring to FIG. 4D, one embodiment of a network is depicted, which includes a local machine 10, a collection agent 404, a policy engine 406, a policy database 408, a condition database 410, a local machine 20, a session server 420, a stored application database 422, a remote machine 30', a first database 428, a remote machine 30", and a second database 432. In brief overview, when the local machine 10 transmits to the access control server 406 a request 412 for access to an application program, the collection agent 404 communicates with local machine 10, retrieves information about local machine 10, and transmits local machine information 414 to the policy engine 406. The policy engine 406 makes an access control decision, as discussed above in FIG. 4A and FIG. 4B. The local machine 10 receives an enumeration of available applications associated with the local machine 10.

In some embodiments, the session server 420 establishes a connection between the local machine 10 and a plurality of application sessions associated with the local machine 10. In other embodiments, the policy engine 406 determines that the local machine 10 has authorization to retrieve a plurality of application files comprising the application and to execute the application program locally. In some embodiments the policy engine 406 determines whether to accelerate delivery of the application files by transmitting an acceleration program 6120 to the local machine 10. In one of these embodiments, the remote machine 30' stores application session data and a plurality of application files comprising the application program. In another of these embodiments, the local machine 10 establishes an application streaming session with a remote machine 30' storing the application session data and the plurality of application files comprising the application program. In some embodiments the policy engine 406 determines whether to accelerate delivery of the streaming session by transmitting an acceleration program 6120 to the local machine 10. In some embodiments the policy engine 406 determines whether to accelerate delivery of data files by transmitting an acceleration program 6120 to the local machine 10.

Figure 4E:
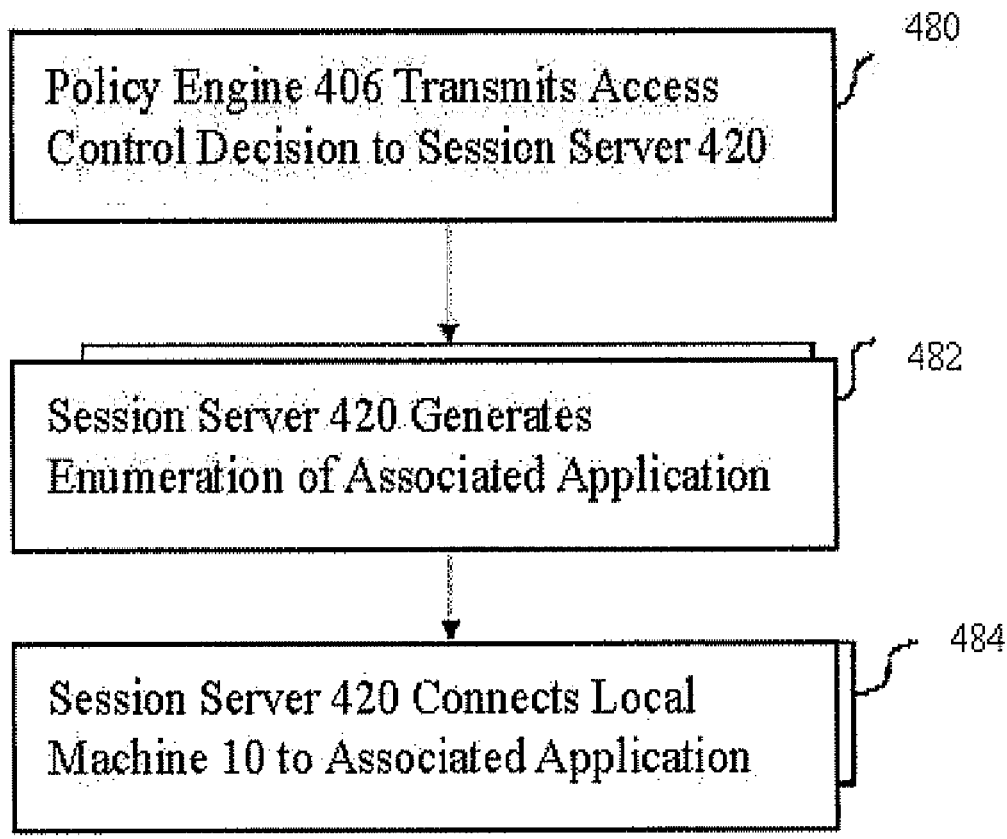
FIG. 4E is a flow diagram depicting one embodiment of the steps taken by a session server to connect a local machine with its associated application sessions.

Referring now to FIG. 4E, a flow diagram depicts one embodiment of the steps taken by the session server 420 to provide access for the local machine 10 to its associated application sessions. The session server 420 receives information about the local machine 10 from the policy engine 406 containing access control decision the policy engine 406 made (step 480). The session server 420 generates an enumeration of associated applications (step 482). The session server 420 may connect the local machine 10 to an associated application (step 484). In one embodiment, the information also includes the local machine information 414. In another embodiment, the information includes authorization to execute the application program locally.

The session server 420 generates an enumeration of associated applications (step 482). In some embodiments, the policy engine 406 identifies a plurality of application sessions already associated with the local machine 10. In other embodiments, the session server 420 identifies stored application sessions associated with the local machine 10. In some of these embodiments, the session server 420 automatically identifies the stored application sessions upon receiving the information from the policy engine 406. In one embodiment, the stored application database 422 resides on the session server 420. In another embodiment, the stored application database 422 resides on the policy engine 406.

The stored application database 422 contains data associated with a plurality of remote machines in the farm 38 executing application sessions or providing access to application session data and application files comprising application programs. In some embodiments, identifying the application sessions associated with the local machine 10 requires consulting stored data associated with one or more remote machines. In some of these embodiments, the session store 420 consults the stored data associated with one or more remote machines. In others of these embodiments, the policy engine 406 consults the stored data associated with one or more remote machines. In some embodiments, a first application session runs on a remote machine 30' and a second application session runs on a remote machine 30". In other embodiments, all application sessions run on a single remote machine 30 within the farm 38.

The session server 420 includes information related to application sessions initiated by users. The session server can be stored in volatile or non-volatile memory or, for example, distributed through multiple servers. Table 1 shows the data included in a portion of an illustrative session server 420:

TABLE 1

| | Application Session | | |
| --- | --- | --- | --- |
| | App Session 1 | App Session 2 | App Session 3 |
| User ID | User 1 | User 2 | User 1 |
| Client ID | First Client | | First Client |
| Client Address | 172.16.0.50 | | 172.16.0.50 |
| Status | Active | Disconnected | Active |
| Applications | Word Processor | Data Base | Spreadsheet |
| Process Number | 1 | 3 | 2 |
| Server | Server A | Server A | Server B |
| Server Address | 172.16.2.55 | 172.16.2.55 | 172.16.2.56 |

The illustrative session server 420 in Table 1 includes data associating each application session with the user that initiated the application session, an identification of the client computer 10 or 20, if any, from which the user is currently connected to the remote machine 30', and the IP address of that client computer 10 or 20. The illustrative session server 420 also includes the status of each application session. An application session status can be, for example, "active" (meaning a user is connected to the application session), or "disconnected" (meaning a user is not connected to the application session). In an alternative embodiment, an application session status can also be set to "executing-disconnected" (meaning the user has disconnected from the application session, but the applications in the application session are still executing), or "stalled-disconnected" (meaning the user is disconnected and the applications in the application session are not executing, but their operational state immediately prior to the disconnection has been stored). The session server 420 further stores information indicating the applications 116 that are executing within each application session and data indicating each application's process on the server. In embodiments in which the remote machine 30' is part of the farm 38, the session server 420 is at least a part of the dynamic store, and also includes the data in the last two rows of Table 1 that indicate on which remote machine 30 in the farm 38 each application is/was executing, and the IP address of that remote machine 30. In alternative embodiments, the session server 420 includes a status indicator for each application in each application session.

For example, in the example of Table 1, three application sessions exist, App Session 1, App Session 2, and App Session 3. App Session 1 is associated with User 1, who is currently using terminal 1. Terminal one's IP address is 152.16.2.50. The status of App Session 1 is active, and in App Session 1, a word processing program, is being executed. The word processing program is executing on Server A as process number 1. Server A's IP address is 152.16.2.55. App Session 2 in Table 1 is an example of a disconnected application session 118. App Session 2 is associated with User 2, but App Session 2 is not connected to a local machine 10 or 20. App Session 2 includes a database program that is executing on Server A, at IP address 152.16.2.55 as process number 3. App Session 3 is an example of how a user can interact with application sessions operating on different remote machines 30. App Session 3 is associated with User 1, as is App Session 1. App Session 3 includes a spreadsheet program that is executing on Server B at IP address 152.16.2.56 as process number 2, whereas the application session included in App Session 1 is executing on Server A.

In another example, a user may access a first application program through an application session executing on a remote machine 30', such as Server A, while communicating across an application streaming session with a second remote machine 30", such as Server B, to retrieve a second application program from the second remote machine 30" for local execution. The user of the local machine 10 may have acquired authorization to execute the second application program locally while failing to satisfy the execution pre-requisites of the first application program.

In one embodiment, the session server 420 is configured to receive a disconnect request to disconnect the application sessions associated with the local machine 10 and disconnects the application sessions in response to the request. The session server 420 continues to execute an application session after disconnecting the local machine 10 from the application session. In this embodiment, the session server 420 accesses the stored application database 422 and updates a data record associated with each disconnected application session so that the record indicates that the application session associated with the local machine 10 is disconnected.

After receiving authentication information associated with a local machine connecting to the network, the session server 420 consults the stored applications database 422 to identify any active application sessions that are associated with a user of the local machine, but that are connected to a different local machine, such as the local machine 10 if the authentication information is associated with local machine 20, for example. In one embodiment, if the session server 420 identifies any such active application sessions, the session server 420 automatically disconnects the application session(s) from the local machine 10 and connects the application session(s) to the current local machine 20. In some embodiments, the received authentication information will restrict the application sessions to which the local machine 10 may reconnect. In other embodiments, the received authentication information authorizes execution of an application program on the local machine 20, where the authorization may have been denied to local machine 10. In one of these embodiments, the session server 420 may provide the local machine access information for retrieving the application program for local execution.

A request is received to execute an enumerated application (step 206). In one embodiment, a user of the local machine 10 selects an application for execution from a received enumeration of available applications. In another embodiment, the user selects an application for execution independent of the received enumeration. In some embodiments, the user selects an application for execution by selecting a graphical representation of the application presented on the local machine 10 by a client agent. In other embodiments, the user selects an application for execution by selecting a graphical representation of the application presented to the user on a web server or other remote machine 30'''. In some embodiments, an appliance 1250 or acceleration program 6120 accelerates delivery of the graphical representation. In some embodiments, an appliance 1250 caches or stores the graphical representation. In some embodiments an appliance may cache or store any and all of the associated applications or portions of the associated applications.

In still other embodiments, the user requests access a file. In one of these embodiments, execution of an application is required to provide the user with access to the file. In another of these embodiments, the application is automatically selected for execution upon selection of the file for access. In still another of these embodiments, prior to the request for access to the file, the application is associated with a type of file, enabling automatic selection of the application upon identification of a type of file associated with the requested file. In some embodiments an appliance 1250 or an acceleration program 6120 may be used to accelerate delivery of one or more files. In some embodiments an appliance 1250 may cache or store some or all of a file.

In one embodiment, the enumerated application comprises a plurality of application files. In some embodiments, the plurality of application files reside on the remote machine 30'. In other embodiments, the plurality of application files reside on a separate file server or remote machine 30". In still other embodiments, the plurality of application files may be transmitted to a local machine 10. In yet other embodiments, a file in the plurality of application files may be executed prior to transmission of a second file in the plurality of application files to the local machine 10. In some embodiments an appliance 1250 or an acceleration program 6120 may be used to accelerate delivery of one or more application files.

In some embodiments, the remote machine 30 retrieves information about the enumerated application from a remote machine 30'. In one of these embodiments, the remote machine 30 receives an identification of a remote machine 30" hosting a plurality of application files. In another of these embodiments, the remote machine 30 receives identification of a location of a plurality of application files, the identification conforming to a Universal Naming Convention (UNC). In still another of these embodiments, the identification includes a network location and a socket for an application streaming protocol.

In one embodiment, the remote machine 30 retrieves a file containing information about the enumerated application. The file may include an identification of a location of a server hosting the enumerated application. The file may include an identification of a plurality of versions of the enumerated application. The file may include an enumeration of a plurality of application files comprising the enumerated application. The file may include an identification of a compressed file comprising a plurality of applications files comprising the enumerated application. The file may include an identification of pre-requisites to be satisfied by a machine executing the enumerated application. The file may include an enumeration of data files associated with the enumerated application. The file may include an enumeration of scripts to be executed on a machine executing the enumerated application. The file may include an enumeration of registry data associated with the enumerated application. The file may include an enumeration of rules for use in an embodiment where the enumerated application executes within an isolation environment. In one embodiment, the file may be referred to as a "manifest" file. The information that the file may contain is described in further detail in connection with FIG. 21 below.

In some embodiments, the remote machine 30 applies a policy to an identified characteristic of the local machine 10. In one of these embodiments, the remote machine 30 identifies a version of the enumerated application for execution responsive to the identified characteristic. In another of these embodiments, the remote machine makes a determination to execute a version of the enumerated application compatible with a characteristic of the local machine 10. In still another of these embodiments, the remote machine 30 makes a determination to execute a version of the enumerated application compatible with an operating system executing on the local machine 10. In yet another of these embodiments, the remote machine 30 makes a determination to execute a version of the enumerated application compatible with a revision level of an operating system on the local machine 10. In one of these embodiments, the remote machine 30 makes a determination to execute a version of the enumerated application compatible with a language specified by an operating system on the local machine 10.

One of a predetermined number of methods for executing the enumerated application is selected, responsive to a policy, the predetermined number of methods including a method for application streaming of the enumerated application (step 208). In one embodiment, the selection is made responsive to an application of a policy to the received credentials associated with the local machine 10. In some embodiments, the selection is made by a policy engine such as the policy engine 406 described above in FIG. 4A, FIG. 4B and FIG. 4C. In other embodiments, the remote machine 30 receiving the credentials and the request to execute the enumerated application further comprises such a policy engine 406.

In one embodiment, the predetermined number of methods includes a method for executing the enumerated application on a remote machine 30'. In another embodiment, the predetermined number of methods includes a method for executing the enumerated application on the local machine 10. In still another embodiment, the predetermined number of methods includes a method for executing the enumerated application on a second remote machine 30'.

In some embodiments, the predetermined number of methods includes a method for providing the enumerated application to the local machine 10 across an application streaming session. In one of these embodiments, the local machine 10 comprises a streaming service agent capable of initiating a connection with a remote machine 30' and receiving from the remote machine 30' a stream of transmitted data packets.

The stream of data packets may include application files comprising the enumerated application. In some embodiments, application files include data files associated with an application program. In other embodiments, application files include executable files required for execution of the application program. In still other embodiments, the application files include metadata including information about the files, such as location, compatibility requirements, configuration data, registry data, identification of execution scripts rules for use in isolation environments, or authorization requirements. In one embodiment, the stream of data packets are transmitted via a transport layer connection such as a payload of a TCP/IP packet.

In some embodiments, the streamed application executes prior to the transmission of each application file in a plurality of application files comprising the streamed application. In one of these embodiments, execution of the streamed application begins upon receipt by a local machine 10 of one application file in the plurality of applications. In another of these embodiments, execution of the streamed application begins upon receipt by a local machine 10 of an executable application file in the plurality of application files. In still another of these embodiments, the local machine 10 executes a first received application file in a plurality of application files and the first received application file requests access to a second application file in the plurality of application files.

In one embodiment, the streamed application executes on the local machine 10 without permanently residing on the local machine 10. In this embodiment, the streamed application may execute on the local machine 10 and be removed from the local machine 10 upon termination of the streamed application. In another embodiment, the streamed application executes on the local machine 10 after a pre-deployed copy of each application file is stored on the local machine 10. In still another embodiment, the streamed application executes on the local machine 10 after a copy of each application file is stored in an isolation environment on the local machine. In yet another embodiment, the streamed application executes on the local machine 10 after a copy of each application file is stored in a cache on the local machine 10.

In one embodiment, the method for streaming the application to the local machine 10 is selected from the predetermined number of methods responsive to a determination that the local machine 10 may receive the streamed application files. In another embodiment, the method for streaming the application to the local machine 10 is selected from the predetermined number of methods responsive to a determination that the local machine 10 has authority to execute the streamed application files locally.

In other embodiments, the predetermined number of methods includes a method for providing application-output data to the local machine 10, the application-output data generated from an execution of the enumerated application on a remote machine 30. In one of these embodiments, the remote machine 30 is the remote machine 30 receiving the request for execution of the enumerated application. In another of these embodiments, the remote machine 30 is a second remote machine 30', such as a file server or an application server. In some embodiments, the enumerated application resides on the remote machine 30' executing the enumerated application. In other embodiments, the remote machine 30' executing the enumerated application first receives the enumerated application from a second remote machine 30' across an application streaming session. In one of these embodiments, the remote machine 30' comprises a streaming service agent capable of initiating a connection with a second remote machine 30' and receiving from the second remote 30' machine a stream of transmitted data. In another of these embodiments, the second remote machine 30' may be identified using a load balancing technique. In still another of these embodiments, the second remote machine 30' may be identified based upon proximity to the remote machine 30'. These embodiments will be described in greater detail in connection with FIG. 9 below.

In some embodiments, the remote machine 30 selects from the predetermined number of methods for executing the enumerated application, a method for streaming the enumerated application to the remote machine 30, executing the enumerated application on the remote machine 30, and providing to the local machine 10 application-output data generated by the execution of the enumerated application. In one of these embodiments, the remote machine 30 selects the method responsive to an evaluation of the local machine 10. In another of these embodiments the determination is made responsive to an application of a policy to the evaluation of the local machine 10. In still another of these embodiments, the determination is made responsive to an evaluation of the received credentials. In one embodiment, the remote machine 30 receives a plurality of application files comprising the enumerated application. In another embodiment, the remote machine 30 provides the application-output data via a presentation level protocol, such as an ICA presentation level protocol or a Remote Desktop Windows presentation level protocol or an X-Windows presentation level protocol.

In some embodiments, the remote machine 30 also provides access information associated with the enumerated application, the access information generated responsive to the selected method. In one of these embodiments, the access information provides an indication to the local machine 10 of the selected method for execution of the enumerated application program. In another of these embodiments, the access information includes an identification of a location of the enumerated application, the identification conforming to a Universal Naming Convention (UNC). In still another of these embodiments, the access information includes an identification of a session management server.

In some embodiments, the access information includes a launch ticket comprising authentication information. In one of these embodiments, the local machine may use the launch ticket to authenticate the access information received from the remote machine 30. In another of these embodiments, the local machine 10 may use the launch ticket to authenticate itself to a second remote machine 30 hosting the enumerated application. In still another of these embodiments, the remote machine 30 includes the launch ticket in the access information responsive to a request from the local machine 10 for the launch ticket.

Figure 5:
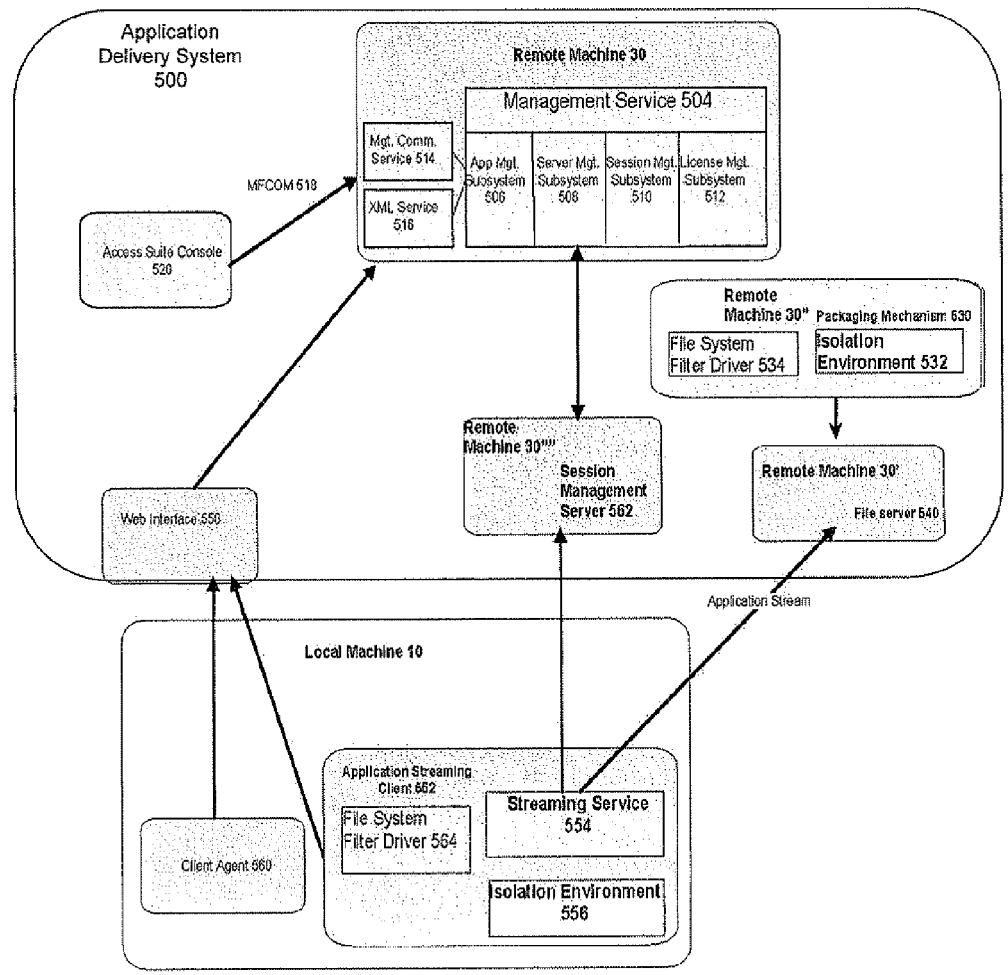
FIG. 5 is a flow diagram depicting one embodiment of the steps taken by a session server to connect a client node with its associated application sessions.

Referring now to FIG. 5, a block diagram depicts an embodiment in which a local machine 10 requests execution of an application program and an application delivery system 500 comprising a remote machine 30 selects a method of executing the application program. In one embodiment, the remote machine 30 receives credentials from the local machine 10. In another embodiment, the remote machine 30 receives a request for an enumeration of available applications from the local machine 10.

In some embodiments, multiple, redundant, remote machines 30, 30', 30", 30''', and 30'''' are provided. In one of these embodiments, there may be, for example, multiple file servers, multiple session management servers, multiple staging machines, multiple web interfaces, or multiple access suite consoles. In another of these embodiments, if a remote machine fails, a redundant remote machine 30 is selected to provide the functionality of the failed machine. In other embodiments, although the remote machines 30, 30', 30", 30''', and 30'''', and the web interface 558 and access suite console 520 are described as separate remote machines 30 having the separate functionalities of a management server, a session management server, a staging machine, a file server, a web server, and an access suite console, a single remote machine 30 may be provided having the functionality of all of these machines. In still other embodiments, a remote machine 30 may provide the functionality and services of one or more of the other remote machines.

Referring now to FIG. 5 in greater detail, a block diagram depicts one embodiment of an application delivery system 500 providing access to an application program. The application delivery system 500 may comprise one or more remote machines 30, an appliance 1250, or any combination thereof. In addition to the interfaces and subsystems described above in connection with FIG. 1D, the remote machine 30 may further include a management communication service 514, an XML service 516, and a management service 504. The management service 504 may comprise an application management subsystem 506, a server management subsystem 508, a session management subsystem 510, and a license management subsystem 512. The remote machine 30 may be in communication with an access suite console 520.

In one embodiment, the management service 504 further comprises a specialized remote procedure call subsystem, the MetaFrame Remote Procedure Call (MFRPC) subsystem 522. In some embodiments, the MFRPC subsystem 522 routes communications between subsystems on the remote machine 30, such as the XML service 516, and the management service 504. In other embodiments, the MFRPC subsystem 522 provides a remote procedure call (RPC) interface for calling management functions, delivers RPC calls to the management service 504, and returns the results to the subsystem making the call.

In some embodiments, the remote machine 30 is in communication with a protocol engine, such as the protocol engine 406 described above in FIG. 4B. In one of these embodiments, the remote machine 30 is in communication with a protocol engine 406 residing on a remote machine 30'. In other embodiments, the remote machine 30 further comprises a protocol engine 406.

The remote machine 30 may be in communication with an access suite console 520. The access suite console 520 may host management tools to an administrator of a remote machine 30 or of a farm 38. In some embodiments, the remote machine 30 communicates with the access suite console 520 using XML. In other embodiments, the remote machine 30 communicates with the access suite console 520 using the Simple Object Access Protocol (SOAP).

For embodiments such as those described in FIG. 1D and in FIG. 5 in which the remote machine 30 comprises a subset of subsystems, the management service 504 may comprise a plurality of subsystems. In one embodiment, each subsystem is either a single-threaded or a multi-threaded subsystem. A thread is an independent stream of execution running in a multi-tasking environment. A single-threaded subsystem is capable of executing only one thread at a time. A multi-threaded subsystem can support multiple concurrently executing threads, i.e., a multi-threaded subsystem can perform multiple tasks simultaneously.

The application management subsystem 506 manages information associated with a plurality of applications capable of being streamed. In one embodiment, the application management subsystem 506 handles requests from other components, such as requests for storing, deleting, updating, enumerating or resolving applications. In another embodiment, the application management subsystem 506 handles requests sent by components related to an application capable of being streamed. These events can be classified into three types of events: application publishing, application enumeration and application launching, each of which will be described in further detail below. In other embodiments, the application management subsystem 506 further comprises support for application resolution, application publication and application publishing. In other embodiments, the application management subsystem 506 uses a data store to store application properties and policies.

The server management subsystem 508 handles configurations specific to application streaming in server farm configurations. In some embodiments, the server management subsystem 508 also handles events that require retrieval of information associated with a configuration of a farm 38. In other embodiments, the server management subsystem 508 handles events sent by other components related to remote machines providing access to applications across application streams and properties of those remote machines. In one embodiment, the server management subsystem 508 stores remote machine properties and farm properties.

In some embodiments, the remote machine 30 further comprises one or more common application subsystems 524 providing services for one or more specialized application subsystems. These remote machines 30 may also have one or more common remote machine subsystem providing services for one or more specialized remote machine subsystems. In other embodiments, no common application subsystems 524 are provided, and each specialized application and remote machine subsystem implements all required functionality.

In one embodiment in which the remote machine 30 comprises a common application subsystem 524, the common application subsystem 524 manages common properties for published applications. In some embodiments, the common application subsystem 524 handles events that require retrieval of information associated with published applications or with common properties. In other embodiments, the common application subsystem 524 handles all events sent by other components related to common applications and their properties.

A common application subsystem 524 can "publish" applications to the farm 38, which makes each application available for enumeration and launching by a local machine 10. Generally, an application is installed on each remote machine 30 on which availability of that application is desired. In one embodiment, to publish an application, an administrator runs an administration tool specifying information such as the remote machines 30 hosting the application, the name of the executable file on each remote machine, the required capabilities of a local machine for executing the application (e.g., audio, video, encryption, etc.), and a list of users that can use the application. This specified information is categorized into application-specific information and common information. Examples of application-specific information are: the path name for accessing the application and the name of the executable file for running the application. Common information (i.e., common application data) includes, for example, the user-friendly name of the application (e.g., "Microsoft WORD 2000"), a unique identification of the application, and the users of the application.

The application-specific information and common information may be sent to a specialized application subsystem controlling the application on each remote machine 30 hosting the application. The specialized application subsystem may write the application-specific information and the common information into a persistent store 240.

When provided, a common application subsystem 524 also provides a facility for managing the published applications in the farm 38. Through a common application subsystem 524, an administrator can manage the applications of the farm 38 using an administration tool such as the access suite console 520 to configure application groups and produce an application tree hierarchy of those application groups. Each application group may be represented as a folder in the application tree hierarchy. Each application folder in the application tree hierarchy can include one or more other application folders and specific instances of remote machines. The common application subsystem 524 provides functions to create, move, rename, delete, and enumerate application folders.

In one embodiment, the common application subsystem 524 supports the application management subsystem 506 in handling application enumeration and application resolution requests. In some embodiments, the common application subsystem 524 provides functionality for identifying an application for execution responsive to a mapping between a type of data file and an application for processing the type of data file. In other embodiments, a second application subsystem provides the functionality for file type association.

In some embodiments, the remote machine 30 may further comprise a policy subsystem. A policy subsystem includes a policy rule for determining whether an application may be streamed to a local machine 10 upon a request by the local machine 10 for execution of the application. In some embodiments, the policy subsystem identifies a server access option associated with a streamed application published in the access suite console 520. In one of these embodiments, the policy subsystem uses the server access option as a policy in place of the policy rule.

The session monitoring subsystem 510 maintains and updates session status of an application streaming session associated with a local machine 10 and enforces license requirements for application streaming sessions. In one embodiment the session management subsystem 510 monitors sessions and logs events, such as the launching of an application or the termination of an application streaming session. In another embodiment, the session monitoring subsystem 510 receives communications, such as heartbeat messages, transmitted from the local machine 10 to the remote machine 30. In still another embodiment, the session management subsystem 510 responds to queries about sessions from management tools, such as tools within the access suite console 520. In some embodiments, the management service 504 further comprises a license management subsystem communicating with the session management subsystem to provide and maintain licenses to local machines for execution of applications.

In one embodiment, the management service 504 provides functionality for application enumeration and application resolution. In some embodiments, the management service 504 also provides functionality for application launching, session monitoring and tracking, application publishing, and license enforcement.

Figure 6:
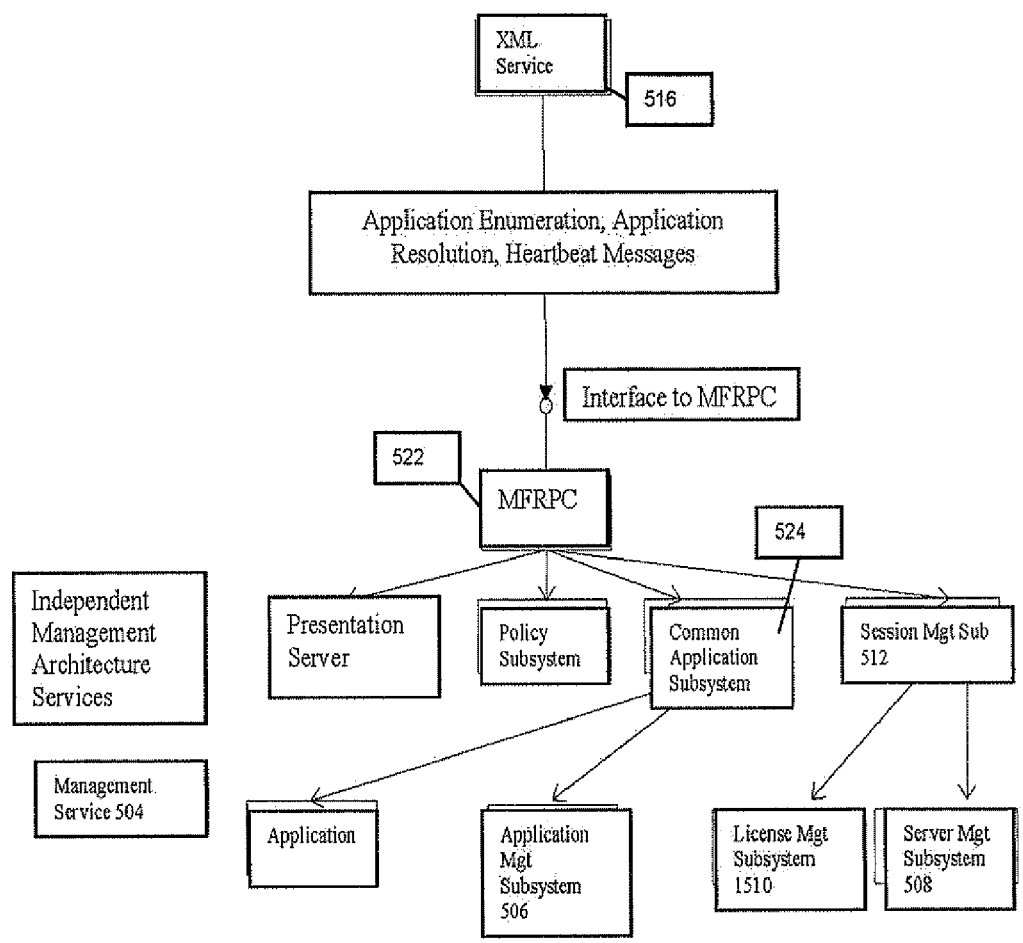
FIG. 6 is a block diagram depicting one embodiment of a remote machine including a management service providing an application enumeration.

Referring now to FIG. 6, a block diagram depicts one embodiment of a remote machine 30 comprising a management service providing an application enumeration. The management service 504 may provide application enumeration through the use of a web interface interacting with an XML service 516. In one embodiment, XML service 516 enumerates applications for a user of a local machine 10. In another embodiment, the XML service 516 implements the functionality of the ICA browser subsystem and the program neighborhood subsystem described above. The XML service 516 may interact with a management communications service 514. In one embodiment, the XML service 516 generates an application enumeration request using the management communications service 514. The application enumeration request may include a client type indicating a method of execution to be used when executing the enumerated application. The application enumeration request is sent to a common application subsystem 524. In one embodiment, the common application subsystem 524 returns an enumeration of applications associated with the client type of the application enumeration request. In another embodiment, the common application subsystem 524 returns an enumeration of applications available to the user of the local machine 10, the enumeration selected responsive to an application of a policy to a credential associated with the local machine 10. In this embodiment, a policy engine 406 may apply the policy to credentials gathered by a collection agent 404, as described in connection with FIG. 4B above. In still another embodiment, the enumeration of applications is returned and an application of a policy to the local machine 10 is deferred until an execution of an enumerated application is requested.

The management service 504 may provide application resolution service for identifying a second remote machine 30' hosting an application. In one embodiment, the second remote machine 30' is a file server or an application server. In some embodiments, the management service 504 consults a file including identifiers for a plurality of remote machines 30 hosting applications. In one embodiment, the management service 504 provides the application resolution service responsive to a request from a local machine 10 for execution of an application. In another embodiment, the management service 504 identifies a second remote machine 30' capable of implementing a different method of executing the application than a first remote machine 30. In some embodiments, the management service 504 identifies a first remote machine 30' capable of streaming an application program to a local machine 10 and a second remote machine 30' capable of executing the application program and providing application-output data generated responsive to the execution of the application program to the local machine 10.

In one embodiment, a web interface transmits an application resolution request to the XML service 516. In another embodiment, the XML service 516 receives a application resolution request and transmits the request to the MFRPC subsystem 522.

In one embodiment, the MFRPC subsystem 522 identifies a client type included with a received application resolution request. In another embodiment, the MFRPC subsystem applies a policy to the client type and determines to "stream" the application to the local machine 10. In this embodiment, the MFRPC subsystem 522 may forward the application resolution request to an application management subsystem 506. In one embodiment, upon receiving the application resolution request from the MFRPC subsystem 522, the application management subsystem 506 may identify a remote machine 30'''' functioning as a session management server 562 for the local machine 10. In some embodiments, the local machine transmits a heartbeat message to the session management server 562. In another embodiment, the application management subsystem 506 may identify a remote machine 30' hosting a plurality of application files comprising the application to be streamed to the local machine 10.

In some embodiments, the application management subsystem 506 use a file enumerating a plurality of remote machines hosting the plurality of application files to identify the remote machine 30'. In other embodiments, the application management subsystem 506 identifies a remote machine 30' having an IP address similar to an IP address of the local machine 10. In still other embodiments, the application management subsystem 506 identifies a remote machine 30' having an IP address in a range of IP addresses accessible to the local machine 10.

In still another embodiment, the MFRPC subsystem 522 applies a policy to the client type and determines that the application may be executed on a remote machine 30', the remote machine 30' transmitting application-output data generated by an execution of the application to the local machine 10. In this embodiment, the MFRPC subsystem 522 may forward the application resolution request to a common application subsystem 524 to retrieve an identifier of a host address for a remote machine 30'. In one embodiment, the identified remote machine 30' may transmit the application-output data to the local machine using a presentation level protocol such as ICA or RDP or X Windows. In some embodiments, the remote machine 30' receives the application from a second remote machine 30' across an application streaming session.

In one embodiment, upon completion of application enumeration and application resolution, access information is transmitted to the local machine 10 that includes an identification of a method of execution for an enumerated application and an identifier of a remote machine 30' hosting the enumerated application. In one embodiment where the management service 504 determines that the enumerated application will execute on the local machine 10, a web interface creates and transmits to the local machine 10 a file containing name-resolved information about the enumerated application. In some embodiments, the file may be identified using a ".rad" extension. The local machine 10 may execute the enumerated application responsive to the contents of the received file. Table 2 depicts one embodiment of information contained in the file:

TABLE 2

| Field | Description | Source |
|---|---|---|
| UNC path | Points to a Container master manifest file on the file server | XML service |
| Initial program | Program to launch from container | XML service |
| Command line | For launching documents using FTA | XML service |

TABLE 2-continued

| Field | Description | Source |
| --- | --- | --- |
| Web server URL | For messages from RADE client to WI | WI config |
| Farm ID | The farm the application belongs to - needed for heartbeat messages | WI config |
| LaunchTicket | Application streaming client uses LaunchTicket to acquire a license authorizing execution of the program | XML/IMA |
| ICA fallback launch info | Embedded ICA file for fallback, if fallback is to be allowed | XML Service |

The file may also contain a launch ticket for use by the local machine in executing the application, as shown in Table 2. In some embodiments, the launch ticket expires after a predetermined period of time. In one embodiment, the local machine provides the launch ticket to a remote machine hosting the enumerated application to be executed. Use of the launch ticket to authorize access to the enumerated application by a user of the local machine assists in preventing the user from reusing the file or generating an unauthorized version of the file to inappropriately access to applications. In one embodiment, the launch ticket comprises a large, randomly-generated number.

As described above in connection with FIG. 2, a method for selecting a method of execution of an application program begins when credentials associated with the local machine 10 or with a user of the local machine 10 are received (step 202) and an enumeration of a plurality of application programs available to the local machine 10 is provided, responsive to the received credentials (step 204). A request is received to execute an enumerated application (step 206) and one of a predetermined number of methods for executing the enumerated application is selected, responsive to a policy, the predetermined number of methods including a method for application streaming of the enumerated application (step 208).

Figure 7:
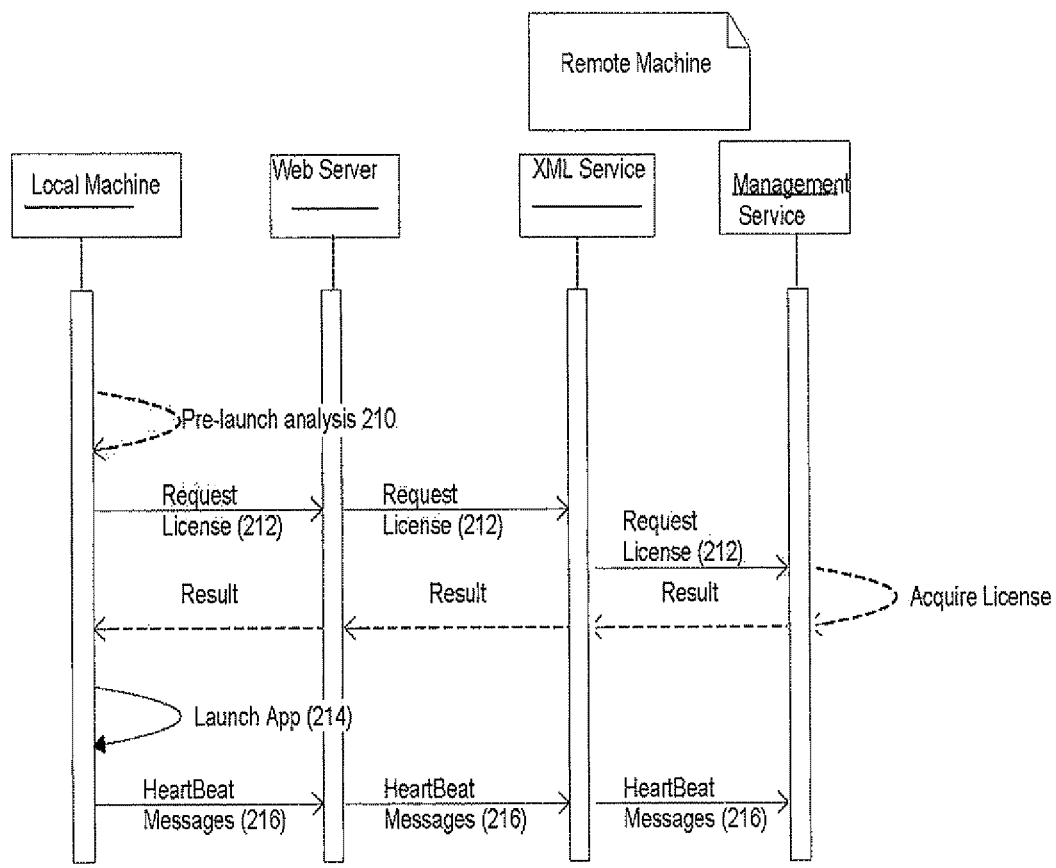
FIG. 7 is a flow diagram depicting one embodiment of the steps taken to access a plurality of files comprising an application program.

Referring now to FIG. 7, a flow diagram depicts one embodiment of the steps taken to access a plurality of files comprising an application program. A local machine performs a pre-launch analysis of the local machine (step 210). In one embodiment, the local machine 10 performs the pre-launch analysis prior to retrieving and executing a plurality of application files comprising an application program. In another embodiment, the local machine 10 performs the pre-launch analysis responsive to a received indication that the pre-launch analysis is a requirement for authorization to access the plurality of application files comprising an application program.

In some embodiments, the local machine 10 receives, from a remote machine 30, access information associated with the plurality of application files. In one of these embodiments, the access information includes an identification of a location of a remote machine 30' hosting the plurality of application files. In another of these embodiments, the local machine 10 receives an identification of a plurality of applications comprising one or more versions of the application program. In still another of these embodiments, the local machine 10 receives an identification of a plurality of application files comprising one or more application programs. In other embodiments, the local machine 10 receives an enumeration of application programs available to the local machine 10 for retrieval and execution. In one of these embodiments, the enumeration results from an evaluation of the local machine 10. In still other embodiments, the local machine 10 retrieves the at least one characteristic responsive to the retrieved identification of the plurality of application files comprising an application program.

In some embodiments, the access information includes a launch ticket capable of authorizing the local machine to access the plurality of application files. In one of these embodiments, the launch ticket is provided to the local machine 10 responsive to an evaluation of the local machine 10. In another of these embodiments, the launch ticket is provided to the local machine 10 subsequent to a pre-launch analysis of the local machine 10 by the local machine 10.

In other embodiments, the local machine 10 retrieves at least one characteristic required for execution of the plurality of application files. In one of these embodiments, the access information includes the at least one characteristic. In another of these embodiments, the access information indicates a location of a file for retrieval by the local machine 10, the file enumerating the at least one characteristic. In still another of these embodiments, the file enumerating the at least one characteristic further comprises an enumeration of the plurality of application files and an identification of a remote machine 30 hosting the plurality of application files.

The local machine 10 determines the existence of the at least one characteristic on the local machine. In one embodiment, the local machine 10 makes this determination as part of the pre-launch analysis. In another embodiment, the local machine 10 determines whether the local machine 10 has the at least one characteristic.

In one embodiment, determining the existence of the at least one characteristic on the local machine 10 includes determining whether a device driver is installed on the local machine. In another embodiment, determining the existence of the at least one characteristic on the local machine 10 includes determining whether an operating system is installed on the local machine 10. In still another embodiment, determining the existence of the at least one characteristic on the local machine 10 includes determining whether a particular operating system is installed on the local machine 10. In yet another embodiment, determining the existence of the at least one characteristic on the local machine 10 includes determining whether a particular revision level of an operating system is installed on the local machine 10.

In some embodiments, determining the existence of the at least one characteristic on the local machine 10 includes determining whether the local machine 10 has acquired authorization to execute an enumerated application. In one of these embodiments, a determination is made by the local machine 10 as to whether the local machine 10 has received a license to execute the enumerated application. In another of these embodiments, a determination is made by the local machine 10 as to whether the local machine 10 has received a license to receive across an application streaming session a plurality of application files comprising the enumerated application. In other embodiments, determining the existence of the at least one characteristic on the local machine 10 includes determining whether the local machine 10 has sufficient bandwidth available to retrieve and execute an enumerated application.

In some embodiments, determining the existence of the at least one characteristic on the local machine 10 includes execution of a script on the local machine 10. In other embodiments, determining the existence of the at least one characteristic on the local machine 10 includes installation of software on the local machine 10. In still other embodiments, determining the existence of the at least one characteristic on the local machine 10 includes modification of a registry on the local machine 10. In yet other embodiments, determining the existence of the at least one characteristic on the local machine 10 includes transmission of a collection agent 404 to the local machine 10 for execution on the local machine 10 to gather credentials associated with the local machine 10.

The local machine 10 requests, from a remote machine 30, authorization for execution of the plurality of application files, the request including a launch ticket (step 212). In some embodiments, the local machine 10 makes the request responsive to a determination that at least one characteristic exists on the local machine 10. In one of these embodiments, the local machine 10 determines that a plurality of characteristics exist on the local machine 10, the plurality of characteristics associated with an enumerated application and received responsive to a request to execute the enumerated application. In another of these embodiments, whether the local machine 10 receives an indication that authorization for execution of the enumerated application files depends upon existence of the at least one characteristic on the local machine 10. In one embodiment, the local machine 10 received an enumeration of application programs, requested execution of an enumerated application, and received access information including the at least one characteristic and a launch ticket authorizing the execution of the enumerated application upon the determination of the existence of the at least one characteristic on the local machine 10.

In one embodiment, the local machine 10 receives from the remote machine 30 a license authorizing execution of the plurality of application files. In some embodiments, the license authorizes execution for a specified time period. In one of these embodiments, the license requires transmission of a heart beat message to maintain authorization for execution of the plurality of application files.

In another embodiment, the local machine 10 receives from the remote machine 30 the license and an identifier associated with a remote machine 30 monitoring execution of the plurality of application files. In some embodiments, the remote machine is a session management server 562, as depicted above in FIG. 5. In one of these embodiments, the session management server 562 includes a session management subsystem 510 that monitors the session associated with the local machine 10. In other embodiments, a separate remote machine 30"" is the session management server 562.

The local machine 10 receives and executes the plurality of application files (step 214). In one embodiment, the local machine 10 receives the plurality of application files across an application streaming session. In another embodiment, the local machine 10 stores the plurality of application files in an isolation environment on the local machine 10. In still another embodiment, the local machine 10 executes one of the plurality of application files prior to receiving a second of the plurality of application files. In some embodiments, a remote machine transmits the plurality of application files to a plurality of local machines, each local machine in the plurality having established a separate application streaming session with the remote machine.

In some embodiments, the local machine 10 stores the plurality of application files in a cache and delays execution of the application files. In one of these embodiments, the local machine 10 receives authorization to execute the application files during a pre-defined period of time. In another of these embodiments, the local machine 10 receives authorization to execute the application files during the pre-defined period of time when the local machine 10 lacks access to a network. In other embodiments, the local machine stores the plurality of application files in a cache. In one of these embodiments, the application streaming client 552 establishes an internal application streaming session to retrieve the plurality of application files from the cache. In another of these embodiments, the local machine 10 receives authorization to execute the application files during a pre-defined period of time when the local machine 10 lacks access to a network.

The local machine 10 transmits at least one heartbeat message to a remote machine (step 216). In some embodiments, the local machine 10 transmits the at least one heartbeat message to retain authorization to execute the plurality of application files comprising the enumerated application. In other embodiments, the local machine 10 transmits the at least one heartbeat message to retain authorization retrieve an application file in the plurality of application files. In still other embodiments, the local machine 10 receives a license authorizing execution of the plurality of application files during a pre-determined period of time.

In some embodiments, the local machine 10 transmits the heartbeat message to a second remote machine 30"". In one of these embodiments, the second remote machine 30"" may comprise a session management server 562 monitoring the retrieval and execution of the plurality of application files. In another of these embodiments, the second remote machine 30"" may renew a license authorizing execution of the plurality of application files, responsive to the transmitted heartbeat message. In still another of these embodiments, the second remote machine 30"" may transmit to the local machine 10 a command, responsive to the transmitted heartbeat message.

Referring back to FIG. 5, the local machine 10 may include an application streaming client 552, a streaming service 554 and an isolation environment 556. The application streaming client 552 may be an executable program. In some embodiments, the application streaming client 552 may be able to launch another executable program. In other embodiments, the application streaming client 552 may initiate the streaming service 554. In one of these embodiments, the application streaming client 552 may provide the streaming service 554 with a parameter associated with executing an application program. In another of these embodiments, the application streaming client 552 may initiate the streaming service 554 using a remote procedure call.

In one embodiment, the local machine 10 requests execution of an application program and receives access information from a remote machine 30 regarding execution. In another embodiment, the application streaming client 552 receives the access information. In still another embodiment, the application streaming client 552 provides the access information to the streaming service 554. In yet another embodiment, the access information includes an identification of a location of a file associated with a plurality of application files comprising the application program.

In one embodiment, the streaming service 554 retrieves a file associated with a plurality of application files. In some embodiments, the retrieved file includes an identification of a location of the plurality of application files. In one of these embodiments, the streaming service 554 retrieves the plurality of application files. In another of these embodiments, the streaming service 554 executes the retrieved plurality of application files on the local machine 10. In other embodiments, the streaming service 554 transmits heartbeat messages to a remote machine to maintain authorization to retrieve and execute a plurality of application files.

In some embodiments, the retrieved file includes an identification of a location of more than one plurality of application files, each plurality of application files comprising a different application program. In one of these embodiments, the streaming service 554 retrieves the plurality of application files comprising the application program compatible with the local machine 10. In another of these embodiments, the streaming service 554 receives authorization to retrieve a particular plurality of application files, responsive to an evaluation of the local machine 10.

In some embodiments, the plurality of application files are compressed and stored on a file server within an archive file such as a CAB, ZIP, SIT, TAR, JAR or other archive file. In one embodiment, a plurality of application files stored in an archive file comprise an application program. In another embodiment, multiple pluralities of application files stored in an archive file each comprise different versions of an application program. In still another embodiment, multiple pluralities of application files stored in an archive file each comprise different application programs. In some embodiments, an archive file includes metadata associated with each file in the plurality of application files. In one of these embodiments, the streaming service 554 generates a directory structure responsive to the included metadata. As will be described in greater detail in connection with FIG. 12 below, the metadata may be used to satisfy requests by application programs for directory enumeration.

In one embodiment, the streaming service 554 decompresses an archive file to acquire the plurality of application files. In another embodiment, the streaming service 554 determines whether a local copy of a file within the plurality of application files exists in a cache on the local machine 10 prior to retrieving the file from the plurality of application files. In still another embodiment, the file system filter driver 564 determines whether the local copy exists in the cache. In some embodiments, the streaming service 554 modifies a registry entry prior to retrieving a file within the plurality of application files.

In some embodiments, the streaming service 554 stores a plurality of application files in a cache on the local machine 10. In one of these embodiments, the streaming service 554 may provide functionality for caching a plurality of application files upon receiving a request to cache the plurality of application files. In another of these embodiments, the streaming service 554 may provide functionality for securing a cache on the local machine 10. In another of these embodiments, the streaming service 554 may use an algorithm to adjust a size and a location of the cache.

In some embodiments, the streaming service 554 creates an isolation environment 556 on the local machine 10. In one of these embodiments, the streaming service 554 uses an isolation environment application programming interface to create the isolation environment 556. In another of these embodiments, the streaming service 554 stores the plurality of application files in the isolation environment 556. In still another of these embodiments, the streaming service 554 executes a file in the plurality of application files within the isolation environment. In yet another of these embodiments, the streaming service 554 executes the application program in the isolation environment.

For embodiments in which authorization is received to execute an application on the local machine 10, the execution of the application may occur within an isolation environment 556. In some embodiments, a plurality of application files comprising the application are stored on the local machine 10 prior to execution of the application. In other embodiments, a subset of the plurality of application files are stored on the local machine 10 prior to execution of the application. In still other embodiments, the plurality of application files do not reside in the isolation environment 556. In yet other embodiments, a subset of the plurality of applications files do not reside on the local machine 10. Regardless of whether a subset of the plurality of application files or each application file in the plurality of application files reside on the local machine 10 or in isolation environment 556, in some embodiments, an application file in the plurality of application files may be executed within an isolation environment 556.

The isolation environment 556 may consist of a core system able to provide File System Virtualization, Registry System Virtualization, and Named Object Virtualization to reduce application compatibility issues without requiring any change to the application source code. The isolation environment 556 may redirect application resource requests using hooking both in the user mode for registry and named object virtualization, and in the kernel using a file system filter driver for file system virtualization. The following is a description of some embodiments of an isolation environment 556.

Figure 8A:
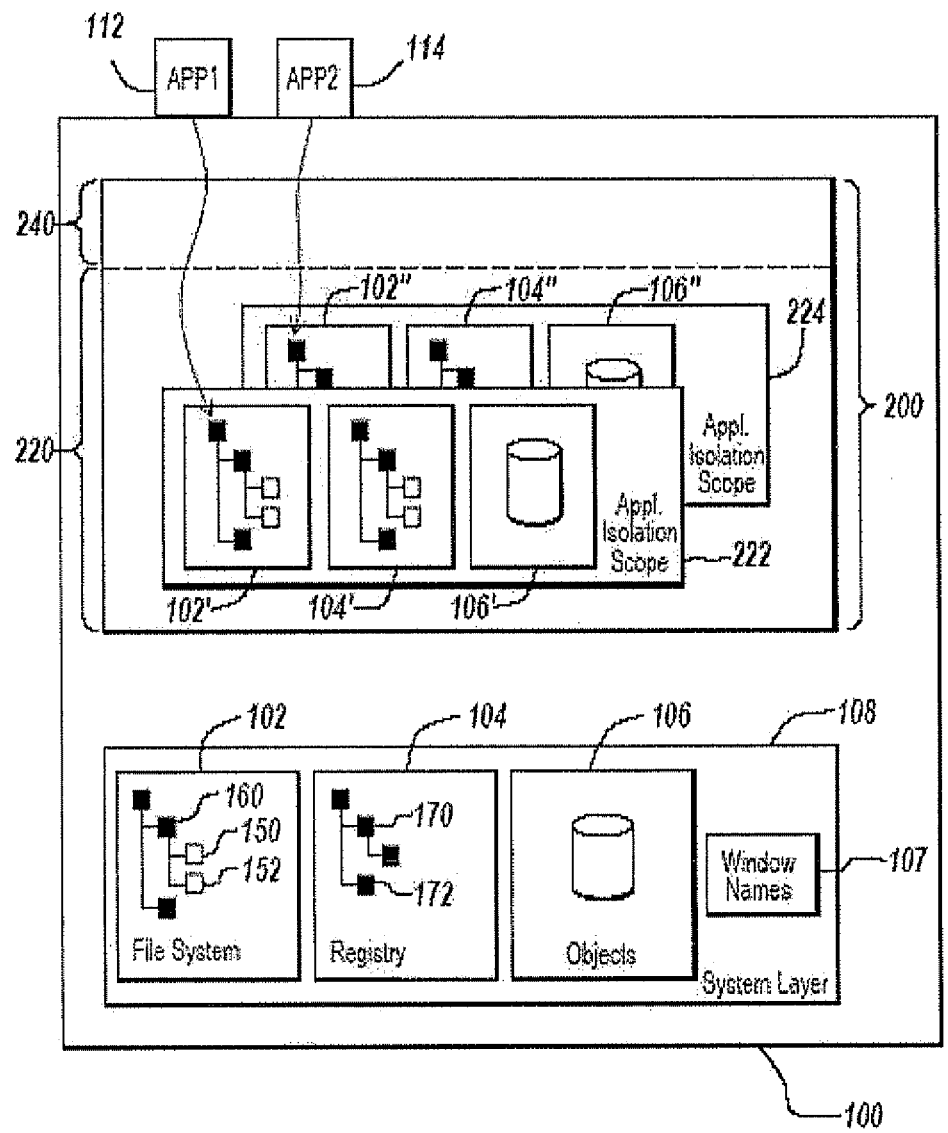
FIG. 8A is a block diagram depicting one embodiment of a computer running under control of an operating system that has reduced application compatibility and application sociability problems.

Referring now to FIG. 8A, one embodiment of a computer running under control of an operating system 100 that has reduced application compatibility and application sociability problems is shown. The operating system 100 makes available various native resources to application programs 112, 114 via its system layer 108. The view of resources embodied by the system layer 108 will be termed the "system scope". In order to avoid conflicting access to native resources 102, 104, 106, 107 by the application programs 112, 114, an isolation environment 200 is provided. As shown in FIG. 8A, the isolation environment 200 includes an application isolation layer 220 and a user isolation layer 240. Conceptually, the isolation environment 200 provides, via the application isolation layer 220, an application program 112, 114, with a unique view of native resources, such as the file system 102, the registry 104, objects 106, and window names 107. Each isolation layer modifies the view of native resources provided to an application. The modified view of native resources provided by a layer will be referred to as that layer's "isolation scope". As shown in FIG. 8A, the application isolation layer includes two application isolation scopes 222, 224. Scope 222 represents the view of native resources provided to application 112 and scope 224 represents the view of native resources provided to application 114. Thus, in the embodiment shown in FIG. 8A, APP1 112 is provided with a specific view of the file system 102', while APP2 114 is provided with another view of the file system 102" which is specific to it. In some embodiments, the application isolation layer 220 provides a specific view of native resources 102, 104, 106, 107 to each individual application program executing on top of the operating system 100. In other embodiments, application programs 112, 114 may be grouped into sets and, in these embodiments, the application isolation layer 220 provides a specific view of native resources for each set of application programs. Conflicting application programs may be put into separate groups to enhance the compatibility and sociability of applications. In still further embodiments, the applications belonging to a set may be configured by an administrator. In some embodiments, a "passthrough" isolation scope can be defined which corresponds exactly to the system scope. In other words, applications executing within a passthrough isolation scope operate directly on the system scope.

In some embodiments, the application isolation scope is further divided into layered sub-scopes. The main sub-scope contains the base application isolation scope, and additional sub-scopes contain various modifications to this scope that may be visible to multiple executing instances of the application. For example, a sub-scope may contain modifications to the scope that embody a change in the patch level of the application or the installation or removal of additional features. In some embodiments, the set of additional sub-scopes that are made visible to an instance of the executing application is configurable. In some embodiments, that set of visible sub-scopes is the same for all instances of the executing application, regardless of the user on behalf of which the application is executing. In others, the set of visible sub-scopes may vary for different users executing the application. In still other embodiments, various sets of sub-scopes may be defined and the user may have a choice as to which set to use. In some embodiments, sub-scopes may be discarded when no longer needed. In some embodiments, the modifications contained in a set of sub-scopes may be merged together to form a single sub-scope.

Figure 8B:
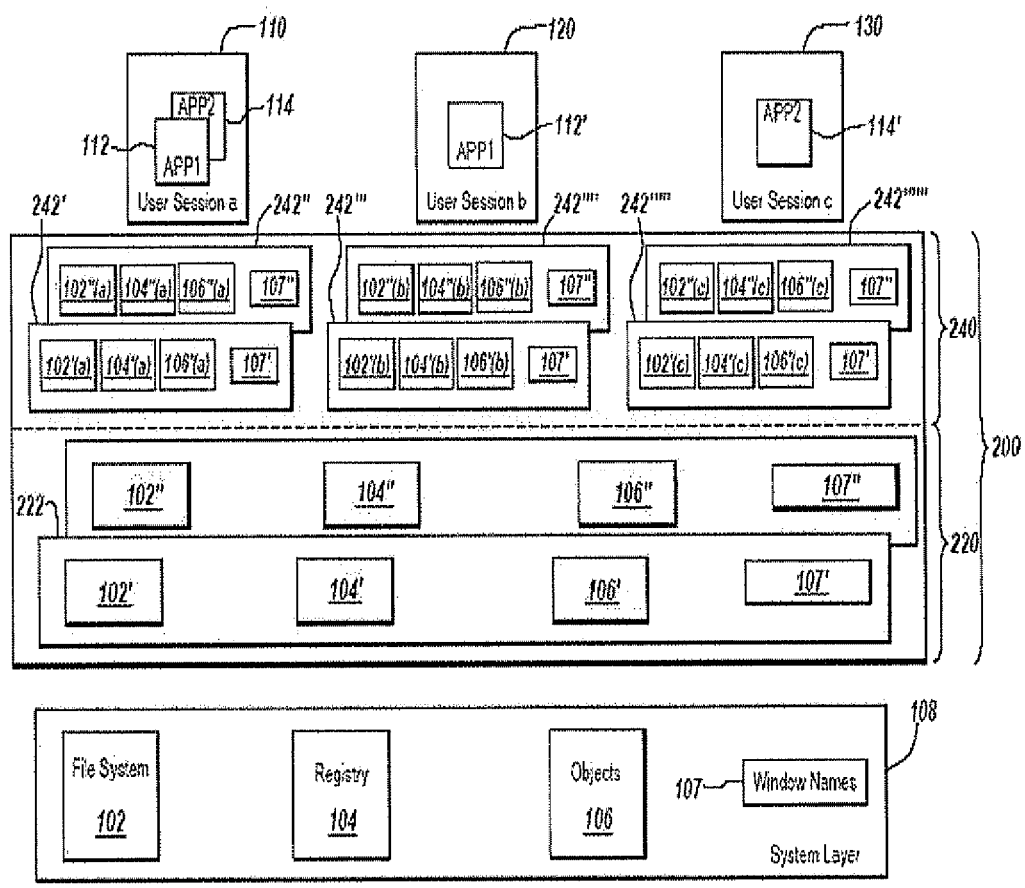
FIG. 8B is a block diagram depicting one embodiment of a multi-user computer having reduced application compatibility and application sociability problems.

Referring now to FIG. 8B, a multi-user computer having reduced application compatibility and application sociability problems is depicted. The multi-user computer includes native resources 102, 104, 106, 107 in the system layer 108, as well as the isolation environment 200 discussed immediately above. The application isolation layer 220 functions as discussed above, providing an application or group of applications with a modified view of native resources. The user isolation layer 240, conceptually, provides an application program 112, 114, with a view of native resources that is further altered based on user identity of the user on whose behalf the application is executed. As shown in FIG. 8B, the user isolation layer 240 may be considered to comprise a number of user isolation scopes 242', 242", 242''', 242'''', 242''''', 242'''''' (generally 242). A user isolation scope 242 provides a user-specific view of application-specific views of native resources. For example, APP1 112 executing in user session 110 on behalf of user "a" is provided with a file system view 102'(a) that is altered or modified by both the user isolation scope 242' and the application isolation scope 222.

Put another way, the user isolation layer 240 alters the view of native resources for each individual user by "layering" a user-specific view modification provided by a user isolation scope 242' "on top of" an application-specific view modification provided by an application isolation scope 222, which is in turn "layered on top of" the system-wide view of native resources provided by the system layer. For example, when the first instance of APP1 112 accesses an entry in the registry database 104, the view of the registry database specific to the first user session and the application 104'(a) is consulted. If the requested registry key is found in the user-specific view of the registry 104'(a), that registry key is returned to APP1 112. If not, the view of the registry database specific to the application 104' is consulted. If the requested registry key is found in the application-specific view of the registry 104', that registry key is returned to APP1 112. If not, then the registry key stored in the registry database 104 in the system layer 108 (i.e. the native registry key) is returned to APP1 112.

In some embodiments, the user isolation layer 240 provides an isolation scope for each individual user. In other embodiments, the user isolation layer 240 provides an isolation scope for a group of users, which may be defined by roles within the organization or may be predetermined by an administrator. In still other embodiments, no user isolation layer 240 is provided. In these embodiments, the view of native resources seen by an application program is that provided by the application isolation layer 220. The isolation environment 200, although described in relation to multi-user computers supporting concurrent execution of application programs by various users, may also be used on single-user computers to address application compatibility and sociability problems resulting from sequential execution of application programs on the same computer system by different users, and those problems resulting from installation and execution of incompatible programs by the same user.

In some embodiments, the user isolation scope is further divided into sub-scopes. The modifications by the user isolation scope to the view presented to an application executing in that scope is the aggregate of the modifications contained within each sub-scope in the scope. Sub-scopes are layered on top of each other, and in the aggregate view modifications to a resource in a higher sub-scope override modifications to the same resource in lower layers.

In some of these embodiments, one or more of these sub-scopes may contain modifications to the view that are specific to the user. In some of these embodiments, one or more sub-scopes may contain modifications to the view that are specific to sets of users, which may be defined by the system administrators or defined as a group of users in the operating system. In some of these embodiments, one of these sub-scopes may contain modifications to the view that are specific to the particular login session, and hence that are discarded when the session ends. In some of these embodiments, changes to native resources by application instances associated with the user isolation scope always affects one of these sub-scopes, and in other embodiments those changes may affect different sub-scopes depending on the particular resource changed.

The conceptual architecture described above allows an application executing on behalf of a user to be presented with an aggregate, or unified, virtualized view of native resources, specific to that combination of application and user. This aggregated view may be referred to as the "virtual scope". The application instance executing on behalf of a user is presented with a single view of native resources reflecting all operative virtualized instances of the native resources. Conceptually this aggregated view consists firstly of the set of native resources provided by the operating system in the system scope, overlaid with the modifications embodied in the application isolation scope applicable to the executing application, further overlaid with the modifications embodied in the user isolation scope applicable to the application executing on behalf of the user. The native resources in the system scope are characterized by being common to all users and applications on the system, except where operating system permissions deny access to specific users or applications. The modifications to the resource view embodied in an application isolation scope are characterized as being common to all instances of applications associated with that application isolation scope. The modifications to the resource view embodied in the user isolation scope are characterized as being common to all applications associated with the applicable application isolation scope that are executing on behalf of the user associated with the user isolation scope.

This concept can be extended to sub-scopes; the modifications to the resource view embodied in a user sub-scope are common to all applications associated with the applicable isolation sub-scope executing on behalf of a user, or group of users, associated with a user isolation sub-scope. Throughout this description it should be understood that whenever general reference is made to "scope," it is intended to also refer to sub-scopes, where those exist.

When an application requests enumeration of a native resource, such as a portion of the file system or registry database, a virtualized enumeration is constructed by first enumerating the "system-scoped" instance of the native resource, that is, the instance found in the system layer, if any. Next, the "application-scoped" instance of the requested resource, that is the instance found in the appropriate application isolation scope, if any, is enumerated. Any enumerated resources encountered in the application isolation scope are added to the view. If the enumerated resource already exists in the view (because it was present in the system scope, as well), it is replaced with the instance of the resource encountered in the application isolation scope. Similarly, the "user-scoped" instance of the requested resource, that is the instance found in the appropriate user isolation scope, if any, is enumerated. Again, any enumerated resources encountered in the user isolation scope are added to the view. If the native resource already exists in the view (because it was present in the system scope or in the appropriate application isolation scope), it is replaced with the instance of the resource encountered in the user isolation scope. In this manner, any enumeration of native resources will properly reflect virtualization of the enumerated native resources. Conceptually the same approach applies to enumerating an isolation scope that comprises multiple sub-scopes. The individual sub-scopes are enumerated, with resources from higher sub-scopes replacing matching instances from lower sub-scopes in the aggregate view.

In other embodiments, enumeration may be performed from the user isolation scope layer down to the system layer, rather than the reverse. In these embodiments, the user isolation scope is enumerated. Then the application isolation scope is enumerated and any resource instances appearing in the application isolation scope that were not enumerated in the user isolation scope are added to the aggregate view that is under construction. A similar process can be repeated for resources appearing only in the system scope.

In still other embodiments, all isolation scopes may be simultaneously enumerated and the respective enumerations combined.

If an application attempts to open an existing instance of a native resource with no intent to modify that resource, the specific instance that is returned to the application is the one that is found in the virtual scope, or equivalently the instance that would appear in the virtualized enumeration of the parent of the requested resource. From the point of view of the isolation environment, the application is said to be requesting to open a "virtual resource", and the particular instance of native resource used to satisfy that request is said to be the "literal resource" corresponding to the requested resource.

If an application executing on behalf of a user attempts to open a resource and indicates that it is doing so with the intent to modify that resource, that application instance is normally given a private copy of that resource to modify, as resources in the application isolation scope and system scope are common to applications executing on behalf of other users. Typically a user-scoped copy of the resource is made, unless the user-scoped instance already exists. The definition of the aggregate view provided by a virtual scope means that the act of copying an application-scoped or system-scoped resource to a user isolation scope does not change the aggregate view provided by the virtual scope for the user and application in question, nor for any other user, nor for any other application instance. Subsequent modifications to the copied resource by the application instance executing on behalf of the user do not affect the aggregate view of any other application instance that does not share the same user isolation scope. In other words, those modifications do not change the aggregate view of native resources for other users, or for application instances not associated with the same application isolation scope.

Applications may be installed into a particular isolation scope (described below in more detail). Applications that are installed into an isolation scope are always associated with that scope. Alternatively, applications may be launched into a particular isolation scope, or into a number of isolation scopes. In effect, an application is launched and associated with one or more isolation scopes. The associated isolation scope, or scopes, provide the process with a particular view of native resources. Applications may also be launched into the system scope, that is, they may be associated with no isolation scope. This allows for the selective execution of operating system applications such as Internet Explorer, as well as third party applications, within an isolation environment.

This ability to launch applications within an isolation scope regardless of where the application is installed mitigates application compatibility and sociability issues without requiring a separate installation of the application within the isolation scope. The ability to selectively launch installed applications in different isolation scopes provides the ability to have applications which need helper applications (such as Word, Notepad, etc.) to have those helper applications launched with the same rule sets.

Further, the ability to launch an application within multiple isolated environments allows for better integration between isolated applications and common applications.

Figure 8C:
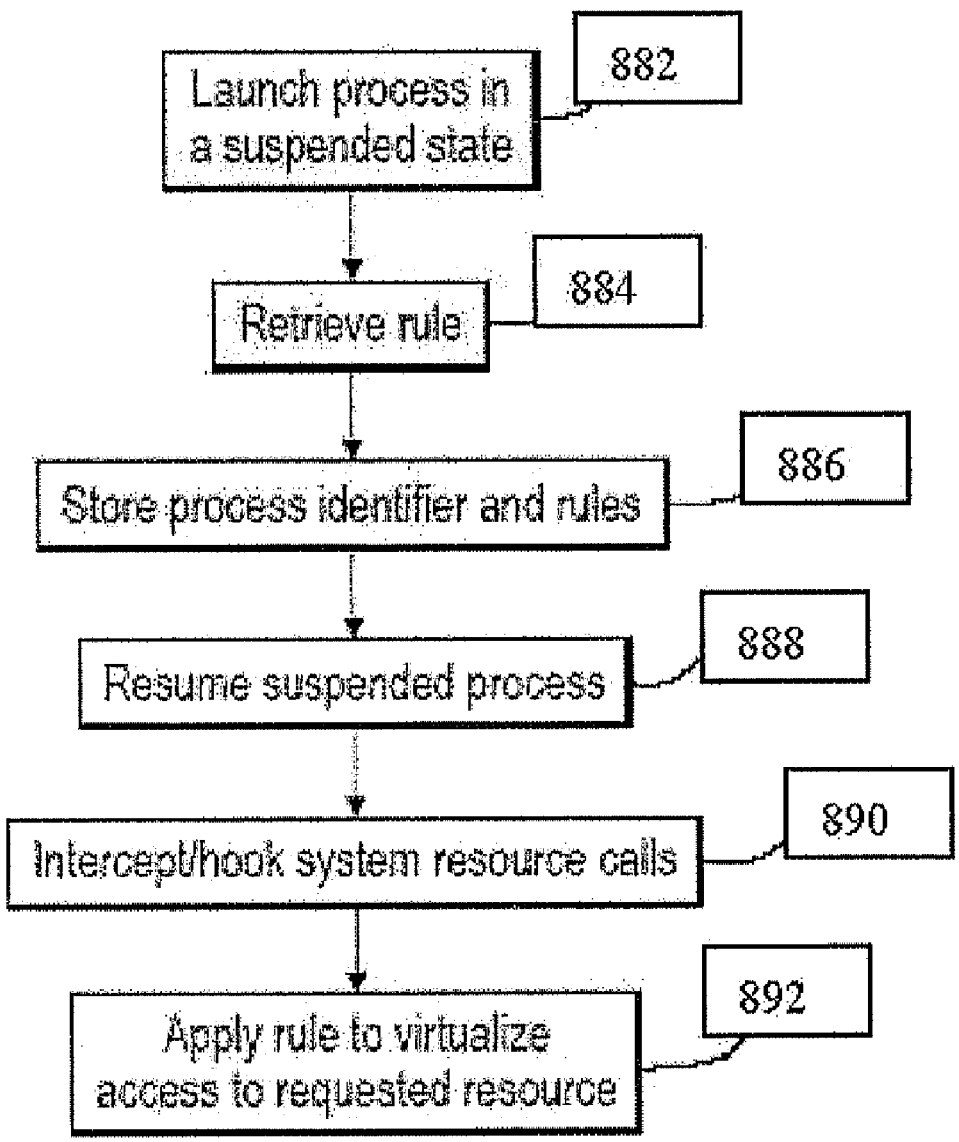
FIG. 8C is a flow diagram depicting one embodiment of the steps taken in a method for associating a process with an isolation scope.

Referring now to FIG. 8C, and in brief overview, a method for associating a process with an isolation scope includes the steps of launching the process in a suspended state (step 882). The rules associated with the desired isolation scope are retrieved (step 884) and an identifier for the process and the retrieved rules are stored in a memory element (step 886) and the suspended process is resumed (step 888). Subsequent calls to access native resources made by the process are intercepted or hooked (step 890) and the rules associated with the process identifier, if any, are used to virtualize access to the requested resource (step 892).

Still referring to FIG. 8C, and in more detail, a process is launched in a suspended state (step 882). In some embodiments, a custom launcher program is used to accomplish this task. In some of these embodiments, the launcher is specifically designed to launch a process into a selected isolation scope. In other embodiments, the launcher accepts as input a specification of the desired isolation scope, for example, by a command line option.

The rules associated with the desired isolation scope are retrieved (step 884). In some embodiments, the rules are retrieved from a persistent storage element, such as a hard disk drive or other solid state memory element. The rules may be stored as a relational database, flat file database, tree-structured database, binary tree structure, or other persistent data structure. In other embodiments, the rules may be stored in a data structure specifically configured to store them.

An identifier for the process, such as a process id (PID), and the retrieved rules are stored in a memory element (step 886). In some embodiments, a kernel mode driver is provided that receives operating system messages concerning new process creation. In these embodiments, the PID and the retrieved rules may be stored in the context of the driver. In other embodiments, a file system filter driver, or mini-filter, is provided that intercepts native resource requests. In these embodiments, the PID and the retrieved rules may be stored in the filter. In other embodiments still, all interception is performed by user-mode hooking and no PID is stored at all. The rules are loaded by the user-mode hooking apparatus during the process initialization, and no other component needs to know the rules that apply to the PID because rule association is performed entirely in-process.

The suspended process is resumed (step 888) and subsequent calls to access native resources made by the process are intercepted or hooked (step 890) and the rules associated with the process identifier, if any, are used to virtualize access to the requested resource (step 892). In some embodiments, a file system filter driver, or mini-filter, or file system driver, intercepts requests to access native resources and determines if the process identifier associated with the intercepted request has been associated with a set of rules. If so, the rules associated with the stored process identifier are used to virtualize the request to access native resources. If not, the request to access native resources is passed through unmodified. In other embodiments, a dynamically-linked library is loaded into the newly-created process and the library loads the isolation rules. In still other embodiments, both kernel mode techniques (hooking, filter driver, mini-filter) and user-mode techniques are used to intercept calls to access native resources. For embodiments in which a file system filter driver stores the rules, the library may load the rules from the file system filter driver.

Processes that are "children" of processes associated with isolation scopes are associated with the isolation scopes of their "parent" process. In some embodiments, this is accomplished by a kernel mode driver notifying the file system filter driver when a child process is created. In these embodiments, the file system filter driver determines if the process identifier of the parent process is associated with an isolation scope. If so, file system filter driver stores an association between the process identifier for the newly-created child process and the isolation scope of the parent process. In other embodiments, the file system filter driver can be called directly from the system without use of a kernel mode driver. In other embodiments, in processes that are associated with isolation scopes, operating system functions that create new processes are hooked or intercepted. When request to create a new process are received from such a process, the association between the new child process and the isolation scope of the parent is stored.

In some embodiments, a scope or sub-scope may be associated with an individual thread instead of an entire process, allowing isolation to be performed on a per-thread basis. In some embodiments, per-thread isolation may be used for Services and COM+ servers.

In some embodiments, isolation environments are used to provide additional functionality to the application streaming client 552. In one of these embodiments, an application program is executed within an isolation environment. In another of these embodiments, a retrieved plurality of application files resides within the isolation environment. In still another of these embodiments, changes to a registry on the local machine 10 are made within the isolation environment.

In one embodiment, the application streaming client 552 includes an isolation environment 556. In some embodiments, the application streaming client 552 includes a file system filter driver 564 intercepting application requests for files. In one of these embodiments, the file system filter driver 564 intercepts an application request to open an existing file and determines that the file does not reside in the isolation environment 556. In another of these embodiments, the file system filter driver 564 redirects the request to the streaming service 554 responsive to a determination that the file does not reside in the isolation environment 556. The streaming service 554 may extract the file from the plurality of application files and store the file in the isolation environment 556. The file system filter driver 564 may then respond to the request for the file with the stored copy of the file. In some embodiments, the file system filter driver 564 may redirect the request for the file to a file server 540, responsive to an indication that the streaming service 554 has not retrieved the file or the plurality of application files and a determination the file does not reside in the isolation environment 556. In some embodiments, the streaming service 554 may include an acceleration program 6120 to perform some or all of the acceleration techniques discussed below to accelerate the storage or delivery of files and applications.

In some embodiments, the file system filter driver 564 uses a strict isolation rule to prevent conflicting or inconsistent data from appearing in the isolation environment 556. In one of these embodiments, the file system filter driver 564 intercepting a request for a resource in a user isolation environment may redirect the request to an application isolation environment. In another of these embodiments, the file system filter driver 564 does not redirect the request to a system scope.

In one embodiment, the streaming service 554 uses IOCTL commands to communicate with the filter driver. In another embodiment, communications to the file server 540 are received with the Microsoft SMB streaming protocol.

In some embodiments, the packaging mechanism 530 stores in a manifest file a list of file types published as available applications and makes this information available to application publishing software. In one of these embodiments, the packaging mechanism 530 receives this information from monitoring an installation of an application program into the isolation environment on the staging machine. In another of these embodiments, a user of the packaging mechanism 530 provides this information to the packaging mechanism 530. In other embodiments, application publishing software within the access suite console 520 consults the manifest file to present to a user of the access suite console 520 the possible file types that can be associated with the requested application being published. The user selects a file type to associate with a particular published application. The file type is presented to the local machine 10 at the time of application enumeration.

The local machine 10 may include a client agent 560. The client agent 560 provides functionality for associating a file type with an application program and selecting a method of execution of the application program responsive to the association. In one embodiment, the client agent 560 is a program neighborhood application.

When an application program is selected for execution, the local machine 10 makes a determination as to a method of execution associated with a file type of the application program. In one embodiment, the local machine 10 determines that the file type is associated with a method of execution requiring an application streaming session for retrieval of the application files and execution within an isolation environment. In this embodiment, the local machine 10 may redirect the request to the application streaming client 552 instead of launching a local version of the application program. In another embodiment, the client agent 560 makes the determination. In still another embodiment, the client agent 560 redirects the request to the application streaming client 552.

In one embodiment, the application streaming client 552 requests access information associated with the application program from the remote machine 30. In some embodiments, the application streaming client 552 receives an executable program containing the access information. In one of these embodiments, the application streaming client 552 receives an executable program capable of displaying on the local machine 10 application-output data generated from an execution of the application program on a remote machine. In another of these embodiments, the application streaming client 552 receives an executable program capable of retrieving the application program across an application streaming session and executing the application program in an isolation environment on the local machine 10. In this embodiment, the application streaming client 552 may execute the received executable program. In still another of these embodiments, the remote machine 30 selects an executable program to provide to the local machine 10 responsive to performing an application resolution as described above.

Figure 9:
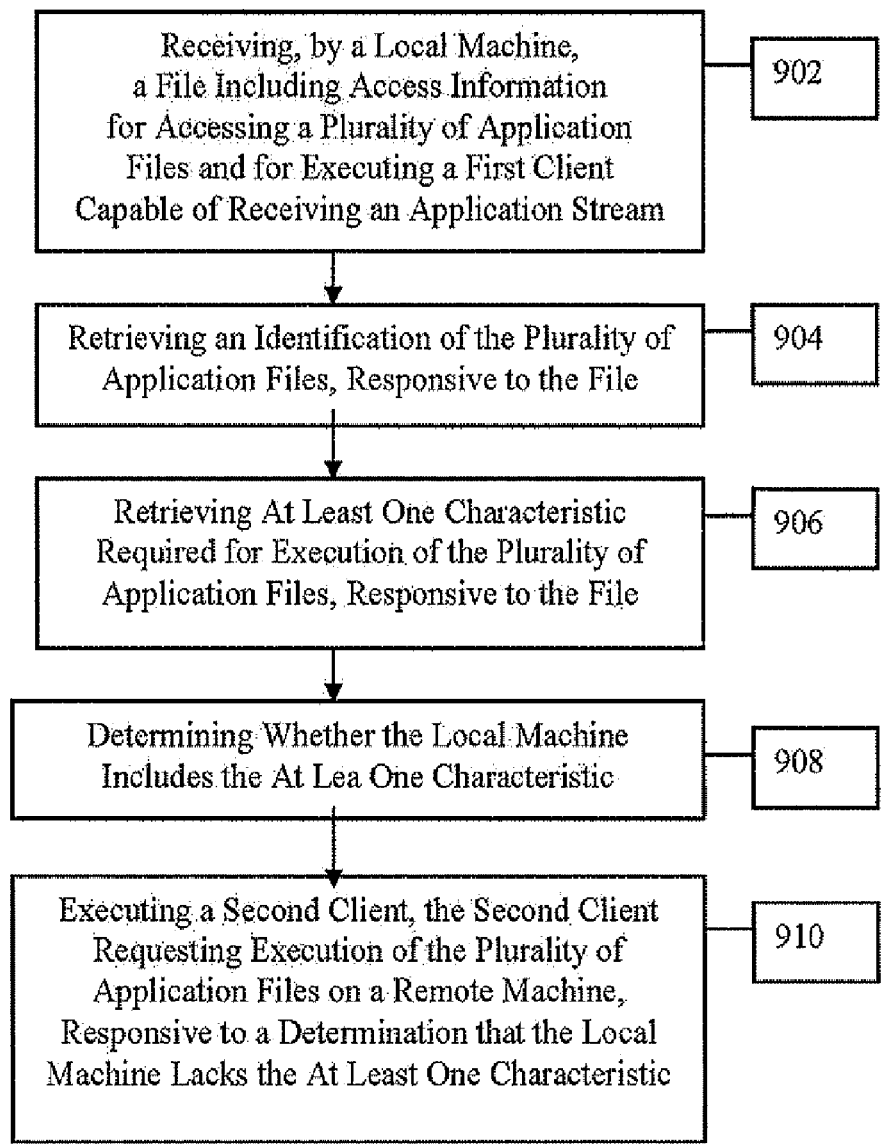
FIG. 9 is a flow diagram depicting one embodiment of steps taken in a method for executing an application program.

Referring now to FIG. 9, a flow diagram depicts one embodiment of steps taken in a method for executing an application. As described above in FIG. 7, regarding step 214, a local machine 10 receives and executes the plurality of application files. In brief overview, the local machine 10 receives a file including access information for accessing a plurality of application files and for executing a first client capable of receiving an application stream (step 902). The local machine 10 retrieves an identification of the plurality of application files, responsive to the file (step 904). The local machine 10 retrieves at least one characteristic required for execution of the plurality of application files, responsive to the file (step 906). The local machine 10 determines whether the local machine 10 includes the at least one characteristic (step 908). The local machine 10 executes a second client, the second client requesting execution of the plurality of application files on a remote machine, responsive to a determination that the local machine 10 lacks the at least one characteristic (step 910).

Referring to FIG. 9, and in greater detail, the local machine 10 receives a file including access information for accessing a plurality of application files and for executing a first client capable of receiving an application stream (step 902). In one embodiment, the local machine 10 receives access information including an identification of a location of a plurality of application files comprising an application program. In another embodiment, the local machine 10 receives the file responsive to requesting execution of the application program. In still another embodiment, the access information includes an indication that the plurality of application files reside on a remote machine 30' such as an application server or a file server. In yet another embodiment, the access information indicates that the local machine 10 may retrieve the plurality of application files from the remote machine 30 over an application streaming session.

The local machine 10 retrieves an identification of the plurality of application files, responsive to the file (step 904). In one embodiment, the local machine 10 identifies a remote machine on which the plurality of application files reside, responsive to the file including access information. In another embodiment, the local machine 10 retrieves from the remote machine 30 a file identifying the plurality of application files. In some embodiments, the plurality of application files comprise an application program. In other embodiments, the plurality of application files comprise multiple application programs. In still other embodiments, the plurality of application files comprise multiple versions of a single application program.

Figure 10:
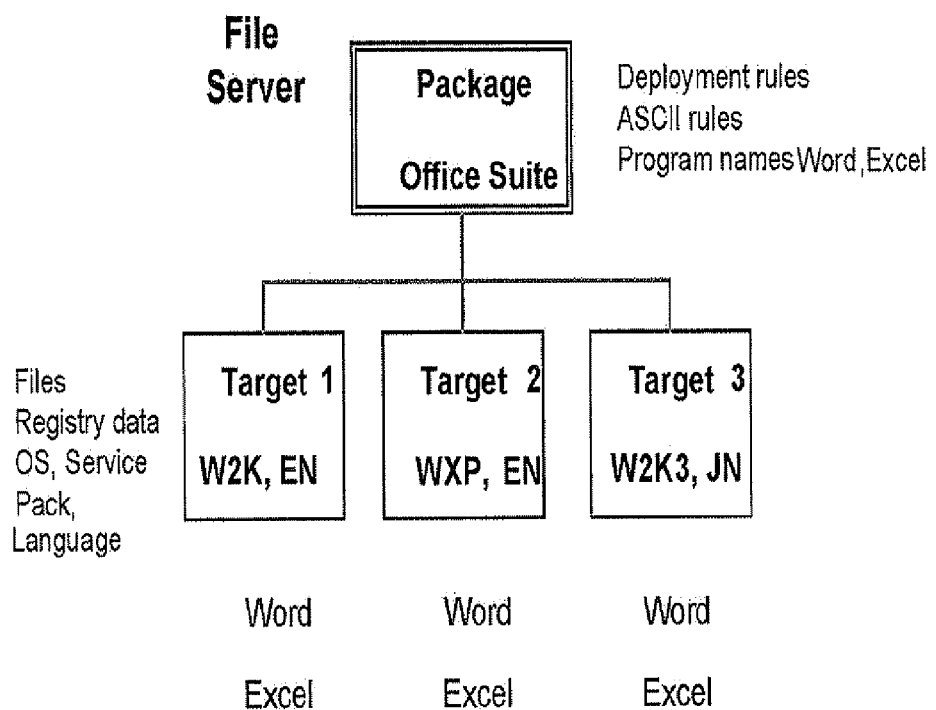
FIG. 10 is a flow diagram depicting one embodiment of a plurality of application files residing on a remote machine.

Referring ahead to FIG. 10, a flow diagram depicts one embodiment of a plurality of application files residing on a remote machine 30', such as file server 540. In FIG. 10, a plurality of application files, referred to as a package, includes application files comprising three different versions of one or more application programs.

In one embodiment, each subset of application files comprising a version of one or more application programs and stored within the package is referred to as a target. Target 1, for example, includes a version of a word processing application program and of a spreadsheet program, the version compatible with the English language version of the Microsoft Windows 2000 operating system. Target 2 includes a version of a word processing application program and of a spreadsheet program, the version compatible with the English language version of the Microsoft XP operating system. Target 3 a version of a word processing application program and of a spreadsheet program, the version compatible with the Japanese language version of the Microsoft Windows 2000 operating system with service pack 3.

Returning now to FIG. 9, in some embodiments, the file retrieved from the remote machine 30 hosting the plurality of application files includes a description of the package and the targets included in the plurality of application files. In other embodiments, the file retrieved from the remote machine 30 identifies the plurality of application files comprising an application program requested for execution by the local machine 10.

The local machine 10 retrieves at least one characteristic required for execution of the plurality of application files, responsive to the file (step 906). In some embodiments, the local machine 10 may not execute an application program unless the local machine includes certain characteristics. In one of these embodiments, different application programs require local machines 10 to include different characteristics from the characteristics required by other application programs. In another of these embodiments, the local machine 10 receives an identification of the at least one characteristic required for execution of the plurality of application files comprising the application program requested by the local machine 10.

The local machine determines whether the local machine 10 includes the at least one characteristic (step 908). In one embodiment, the local machine 10 evaluates an operating system on the local machine 10 to determine whether the local machine 10 includes the at least one characteristic. In another embodiment, the local machine 10 identifies a language used by an operating system on the local machine 10 to determine whether the local machine 10 includes the at least one characteristic. In still another embodiment, the local machine 10 identifies a revision level of an operating system on the local machine 10 to determine whether the local machine 10 includes the at least one characteristic. In yet another embodiment, the local machine 10 identifies an application version of an application program residing on the local machine 10 to determine whether the local machine 10 includes the at least one characteristic. In some embodiments, the local machine 10 determines whether the local machine 10 includes a device driver to determine whether the local machine 10 includes the at least one characteristic. In other embodiments, the local machine 10 determines whether the local machine 10 includes an operating system to determine whether the local machine 10 includes the at least one characteristic. In still other embodiments, the local machine 10 determines whether the local machine 10 includes a license to execute the plurality of application files to determine whether the local machine 10 includes the at least one characteristic.

The local machine 10 executes a second client, the second client requesting execution of the plurality of application files on a remote machine 30, responsive to a determination that the local machine 10 lacks the at least one characteristic (step 910). In one embodiment, when the local machine 10 determines that the local machine 10 lacks the at least one characteristic, the local machine 10 does not execute the first client capable of receiving an application stream. In another embodiment, a policy prohibits the local machine 10 from receiving the plurality of application files over an application stream when the local machine 10 lacks the at least one characteristic. In some embodiments, the local machine 10 determines that the local machine 10 does include the at least one characteristic. In one of these embodiments, the local machine 10 executes the first client, the first client receiving an application stream comprising the plurality of application files from a remote machine 30 for execution on the local machine.

In some embodiments, the local machine 10 executes the second client requesting execution of the plurality of application files on a remote machine upon determining that the local machine 10 lacks the at least one characteristic. In one of these embodiments, the second client transmits the request to a remote machine 30 hosting the plurality of application files. In another of these embodiments, the remote machine 30 executes the plurality of application files comprising the application program and generates application-output data. In still another of these embodiments, the second client receives application-output data generated by execution of the plurality of application files on the remote machine. In some embodiments, the second client receives the application-output data via an Independent Computing Architecture presentation level protocol or a Remote Desktop Windows presentation level protocol or an X-Windows presentation level protocol. In yet another of these embodiments, the second client displays the application-output on the local machine 10.

In some embodiments, the second client transmits the request to a remote machine 30 that does not host the plurality of application files. In one of these embodiments, the remote machine 30 may request the plurality of application files from a second remote machine 30 hosting the plurality of application files. In another of these embodiments, the remote machine 30 may receive the plurality of application files from the second remote machine 30 across an application streaming session. In still another of these embodiments, the remote machine 30 stores the received plurality of application files in an isolation environment and executes the application program within the isolation environment. In yet another of these embodiments, the remote machine transmits the generated application-output data to the second client on the local machine.

Referring back to FIG. 5, in one embodiment, the first client, capable of receiving the application stream, is an application streaming client 552. The application streaming client 552 receiving the file, retrieving an identification of a plurality of application files and at least one characteristic required for execution of the plurality of application files, responsive to the file, and determining whether the local machine 10 includes the at least one characteristic. In another embodiment, the second client is a client agent 560. In some embodiments, the client agent 560 receives the file from the application streaming client 552 responsive to a determination, by the application streaming client 552, that the local machine 10 lacks the at least one characteristic.

In some embodiments, an application 566 executing on the local machine 10 enumerates files associated with the application 566 using the Win32 FindFirstFile( ) and FindNextFile( ) API calls. In one of these embodiments, a plurality of application files comprise the application 566. In another of these embodiments, not all files in the plurality of application files reside on the local machine 10. In still another of these embodiments, the streaming service 554 retrieved the plurality of application file in an archived files but extracted only a subset of the plurality of application files. In yet another of these embodiments, the streaming service 554 and the file system filter driver 564 provide functionality for satisfying the enumeration request, even when the requested file does not reside on the local machine 10.

In one embodiment, the functionality is provided by intercepting the enumeration requests and providing the data as if all files in the plurality of application files reside on the local machine 10. In another embodiment, the functionality is provided by intercepting, by the file system filter driver 564, an enumeration request transmitted as an IOCTL command, such as IRP_MJ_DIRECTORY_CONTROL IOCTL. When the file system filter driver 564 intercepts the call, the file system filter driver 564 redirects the request to the streaming service 554. In one embodiment, the file system filter driver 564 determines that the requested enumeration resides in an isolation environment on the local machine 10 prior to redirecting the request to the streaming service 554. In another embodiment, the streaming service 554 fulfills the request using a file in the plurality of application files, the file including an enumeration of a directory structure associated with the plurality of application files. In still another embodiment, the streaming service 554 provides the response to the request to the file system filter driver 564 for satisfaction of the enumeration request.

Figure 11:
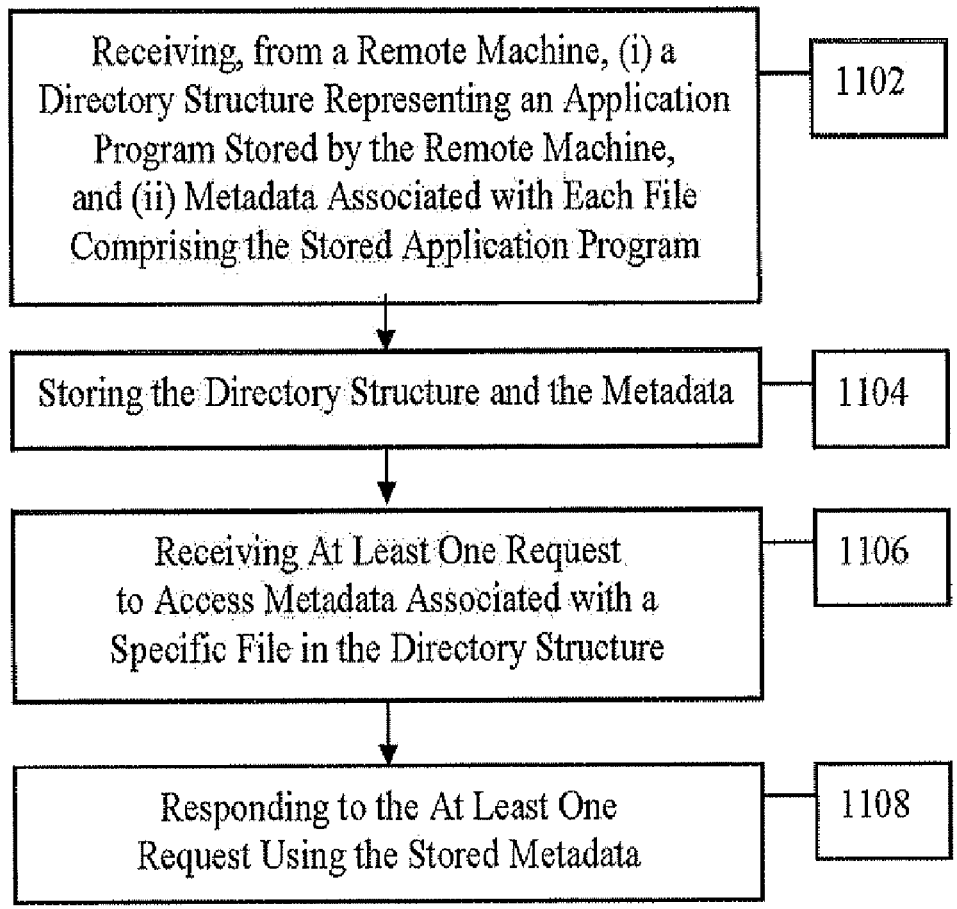
FIG. 11 is a flow diagram depicting one embodiment of the steps taken in a method for responding locally to requests for file metadata associated with files stored remotely.

Referring now to FIG. 11, a flow diagram depicts one embodiment of the steps taken in a method for responding locally to requests for file metadata associated with files stored remotely. In brief overview, (i) a directory structure representing an application program stored by the remote machine, and (ii) metadata associated with each file comprising the stored application program, are received from a remote machine (step 1102). The directory structure and the metadata are stored (step 1104). At least one request to access metadata associated with a specific file in the directory structure is received (step 1106). The at least one request is responded to using the stored metadata (step 1108).

Referring to FIG. 11 in greater detail, a directory structure representing an application program stored by the remote machine, and metadata associated with each file comprising the stored application program, are received from a remote machine (step 1102). In one embodiment, the streaming service 554 receives the directory structure and the metadata. In another embodiment, the streaming service 554 receives the directory structure and the metadata when the streaming service 554 retrieves a plurality of application files comprising the stored application program. In still another embodiment, the directory structure and the metadata are stored in a file in the plurality of application files.

In one embodiment, the metadata associated with each file comprises an alternate name for the at least one file. In another embodiment, the metadata associated with each file includes a short name for the at least one file, the name having a length of eight characters, a dot, and a three-character extension. In still another embodiment, the metadata associated with each file includes a mapping between the alternate name for the at least one file and the short name for the at least one file. In some embodiments, a file in the plurality of application files has an alternate filename. In one of these embodiments, when the file is retrieved by a streaming service 554 to a local machine, the file is associated with a short name, responsive to the mapping between the alternate name for the file and the short name for the at least one file.

The directory structure and the metadata are stored (step 1104). In one embodiment, the directory structure and the metadata are stored in an isolation environment 556. In another embodiment, the directory structure and the metadata are stored in a cache memory element. In still another embodiment, the directory structure representing an application program stored by the remote machine is used to generate an enumeration of a directory structure representing an application program executing on the local machine.

At least one request to access metadata associated with a specific file in the directory structure is received (step 1106). In one embodiment, the request is a request for enumeration of the file. In another embodiment, the request is a request to determine whether a copy of the file comprising the stored application program resides locally.

In one embodiment, the request is made by an application 566 executing in an isolation environment on a local machine.

In another embodiment, the request is made by the application streaming client 552. In still another embodiment, the request is made on behalf of the application 566.

In one embodiment, the request is intercepted by a file system filter driver 564. In another embodiment, the request is forwarded to the application streaming client 552 by the file system filter driver 564. In still another embodiment, the request is forwarded to the streaming service 554 by the file system filter driver 564.

In some embodiments, the request is hooked by a function that replaces the operating system function or functions for enumerating a directory. In another embodiment, a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system resource that is used in dispatching requests for file operations. For embodiments in which a separate operating system function is provided for each type of file operation, each function may be hooked separately. Alternatively, a single hooking function may be provided which intercepts create or open calls for several types of file operations.

The at least one request is responded to using the stored metadata (step 1108). In one embodiment, the file system filter driver 564 responds to the request. In another embodiment, the application streaming client 552 responds to the request. In still another embodiment, the streaming service 554 responds to the request. In one embodiment, the stored metadata is accessed to respond to the at least one request. In another embodiment, the request is responded to with a false indication that a remote copy of the file resides locally.

In one embodiment, a Windows Operating System FindFirst operation is satisfied responsive to the received metadata. In another embodiment, a Windows Operating System FindNext operation is satisfied responsive to the received metadata. In still another embodiment, an operation for identifying a root node in a directory structure is satisfied responsive to the received metadata. In some embodiments, an application layer API such as WIN32_FIND_DATA API is used to respond to the operation. In other embodiments, a kernel layer API such as FILE_BOTH_DIR_INFORMATION is used to respond to the operation.

In one embodiment, the metadata satisfies an operation for identifying a time of access associated with a node in a directory structure. In another embodiment, the metadata satisfies an operation for identifying a time of modification associated with a node in a directory structure. In still another embodiment, the metadata satisfies an operation for identifying a modified node in a directory structure.

Figure 12:
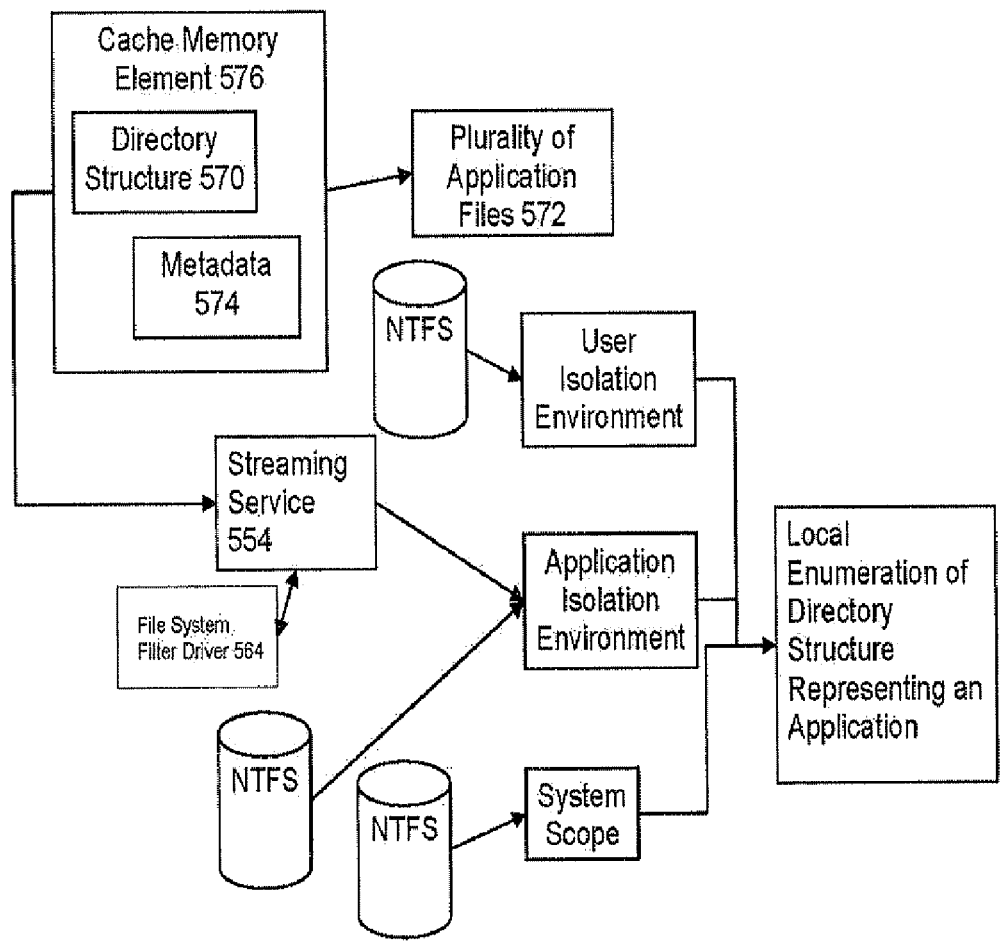
FIG. 12 is a block diagram depicting one embodiment of a system for responding locally to requests for file metadata associated with files stored remotely.

Referring now to FIG. 12, a block diagram depicts one embodiment of a system for responding locally to requests for file metadata associated with files stored remotely, including a streaming service 554, a file system filter driver 564, a directory structure 570, a plurality of application files 572, metadata 574, and a cache memory element 576. In brief overview, the directory structure 570 identifies a plurality of files associated with at least one application program. The metadata 574 is associated with at least one of the plurality of files, at least one of the plurality of files residing on a remote machine. In one embodiment, the directory structure 570 includes the metadata 574. The cache memory element 576 stores the directory structure 570. The file system filter driver 564 intercepts a request to access metadata associated with the at least one remotely stored file, accesses the cache memory element, and responds to the at least one request using the stored directory structure.

In some embodiments, the streaming service 554 receives the directory structure 570 and metadata 574. In one of these embodiments, the directory structure 570 represents a plurality of application files 572 associated with an application program, the plurality of application files 572 residing on a remote machine, such as the remote machine 30. In another of these embodiments, the metadata 574 comprises information for responding to a Windows Operating System FindFirst request. In still another of these embodiments, the metadata 574 comprises information for responding to a Windows Operating System FindNext request. In yet another of these embodiments, the metadata 574 comprises information for responding to a request for identification of a root node in a directory structure. In another of these embodiments, the metadata 574 comprises information for responding to a request for identification of a node in a directory structure. In some embodiments, an application layer API such as WIN32_FIND_DATA API is used to respond to the operation. In other embodiments, a kernel layer API such as FILE_BOTH_DIR_INFORMATION is used to respond to the operation.

In some embodiments, small amounts of metadata 574 about a file may be stored directly in the literal filename, such as by suffixing the virtual name with a metadata indicator, where a metadata indicator is a string uniquely associated with a particular metadata state. The metadata indicator may indicate or encode one or several bits of metadata. Requests to access the file by virtual filename check for possible variations of the literal filename due to the presence of a metadata indicator, and requests to retrieve the name of the file itself are hooked or intercepted in order to respond with the literal name. In other embodiments, one or more alternate names for the file may be formed from the virtual file name and a metadata indicator, and may be created using hard link or soft link facilities provided by the file system. The existence of these links may be hidden from applications by the isolation environment by indicating that the file is not found if a request is given to access a file using the name of a link. A particular link's presence or absence may indicate one bit of metadata for each metadata indicator, or there may be a link with a metadata indicator that can take on multiple states to indicate several bits of metadata. In still other embodiments, where the file system supports alternate file streams, an alternate file stream may be created to embody metadata, with the size of the stream indicating several bits of metadata. In still other embodiments, a file system may directly provide the ability to store some 3rd party metadata for each file in the file system. In yet other embodiment, a separate sub-scope may be used to record deleted files, and existence of a file (not marked as a placeholder) in that sub-scope is taken to mean that the file is deleted.

In one embodiment, data in a user isolation environment, an application isolation environment, and a system scope is combined to form a local enumeration of a directory structure representing an application. In another embodiment, the streaming service 554 accesses metadata 574 and the directory structure 570 to populate the application isolation environment. In still another embodiment, the file system filter driver 564 generates the local enumeration of the directory structure. In yet another embodiment, the local enumeration of the directory structure identifies at least one file in the plurality of application files 572, the at least one file residing on a remote machine and not on the local machine. In some embodiments, the local enumeration of the directory structure is stored on the cache memory element 576. In other embodiments, the streaming service 554 generates the application isolation environment and the local enumeration of the directory structure.

In one embodiment, the file system filter driver 564 intercepts a request transmitted to a system scope for access to the local enumeration of the directory structure. In another embodiment, file system filter driver 564 generates the local enumeration after intercepting the request. In still another embodiment, the file system filter driver 564 redirects the request for the local enumeration to the user isolation environment. In yet another embodiment, the file system filter driver 564 redirects the request for the local enumeration to the application isolation environment.

In some embodiments, the file system filter driver 564 intercepts a request for access to a file identifies in the local enumeration of the directory, the file residing on a remote machine. In one of these embodiments, the file system filter driver 564 requests retrieval of the file by the streaming service 554, as described in greater detail in connection with FIG. 13 below.

As applications running in an isolation environment make requests for files, a filter driver intercepts these requests. If the request is to open a file, the filter driver will first redirect the request to an isolation environment, to determine whether the request may be satisfied by the isolation environment. If the call is successful, the filter driver will respond to the request with the instance of the file located in the isolation environment.

However if the requested file does not reside in the isolation environment, the filter driver sends a request to streaming service 554 to retrieve the file from the plurality of application files, blocks until the request is complete, and then retries the original open. In some embodiments, the functionality of the streaming service 554 for retrieving files from the plurality of application files upon receipt of a request from the filter driver is referred to as "on-demand caching."

Figure 13:
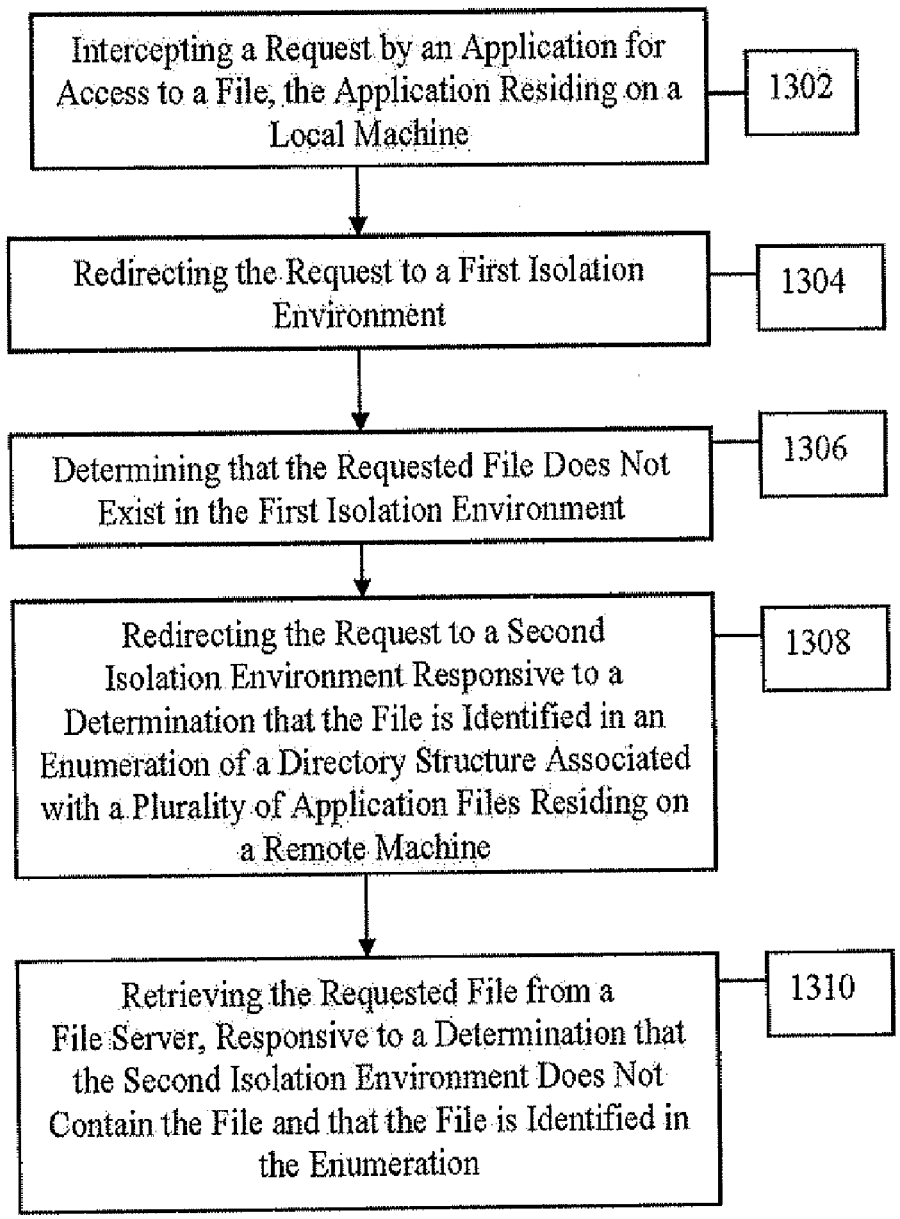
FIG. 13 is a flow diagram depicting one embodiment of the steps taken in a method for accessing a remote file in a directory structure associated with an application program executing locally.

Referring now to FIG. 13, a flow diagram depicts one embodiment of the steps taken in a method for accessing a remote file in a directory structure associated with an application program executing locally. In brief overview, a request by an application for access to a file is intercepted (step 1302). The request is redirected to a first isolation environment (step 1304). A determination is made that the requested file does not exist in the first isolation environment (step 1306). The request is redirected to a second isolation environment responsive to a determination that the file is identified in an enumeration of a directory structure associated with a plurality of application files residing on a remote machine (step 1308). The requested file is retrieved from the remote machine, responsive to a determination that the second isolation environment does not contain the file and that the file is identified in the enumeration (step 1310).

Referring to FIG. 13, and in greater detail, a request by an application for access to a file is intercepted (step 1302). In one embodiment, the request is intercepted by a file system filter driver. In another embodiment, the file system filter driver intercepts all requests for access to files. In still another embodiment, an application streaming client 552 intercepts the request. In some embodiments, a request by an application for access to an executable file is intercepted. In other embodiments, a request by an application for access to a file, a portion of the application executing on a local machine 10 is intercepted.

The request is redirected to a first isolation environment (step 1304). In one embodiment, the application executes within the first isolation environment. In one embodiment, the application is an application program such as a word processing program or spreadsheet program. In another embodiment, the application is the application streaming client 552. In still another embodiment, the application is a component within the application streaming client 552 attempting to launch an application program on behalf of a user of the local machine 10. In another embodiment, the file system filter driver redirects the request to the first isolation environment.

A determination is made that the requested file does not exist in the first isolation environment (step 1306). In one embodiment, the file system filter driver receives an indication that the requested file does not exist in the first isolation environment.

The request is redirected to a second isolation environment responsive to a determination that the file is identified in an enumeration of a directory structure associated with a plurality of application files residing on a remote machine (step 1308). In one embodiment, the enumeration of the directory structure is received with access information regarding execution of the first application. In another embodiment, the enumeration identifies a plurality of application files comprising a second application. In this embodiment, the first application is a local copy of the second application.

The requested file is retrieved from the remote machine, responsive to a determination that the second isolation environment does not contain the file and that the file is identified in the enumeration (step 1310). In one embodiment, the requested file is retrieved from a second remote machine. In another embodiment, the requested file is retrieved from a file server. In some embodiments, the enumeration of the directory structure identifies a plurality of application files residing on the local machine. In other embodiments, the enumeration of the directory structure indicates that the plurality of application files resides on the local machine. In one of these embodiments, when the application requests access to the file in the plurality of application files which the enumeration of the directory structure has indicated resides on the local machine, the file is acquired from the file server upon interception of the access request. In another of these embodiments, the file server streams the requested file to the local machine. In still another of these embodiments, upon receiving the requested file, the requested file is stored in the second isolation environment. In still other embodiments, when the application requests access to the file in the plurality of application files which the enumeration of the directory structure has indicated resides on the local machine, a copy of the file is provided to the application from a local cache.

In some embodiments, the requested file is encrypted. In other embodiments, the requested file is stored in an encrypted form. In still other embodiments, the application requesting the file may be prevented from decrypting the requested file if the application lacks authorization to access the requested file.

In one embodiment, a determination is made that the enumeration of the directory structure does not identify the file. In this embodiment, the request to access the file may be redirected to an environment outside the first isolation environment and outside the second isolation environment.

In some embodiments, a second request to access the file is intercepted. In one of these embodiments, the request to access the file is made by a second application. In another of these embodiments, the second application executes in a third isolation environment. In still another of these embodiments, the request is redirected to the second isolation environment, responsive to a determination that the file is enumerated in the enumeration and that the second isolation environment does contain the file. The determination may be made that the local machine stored the file in the second isolation environment upon receipt of the file from the file server. In yet another embodiment, the file is stored in the third isolation environment.

Figure 14:
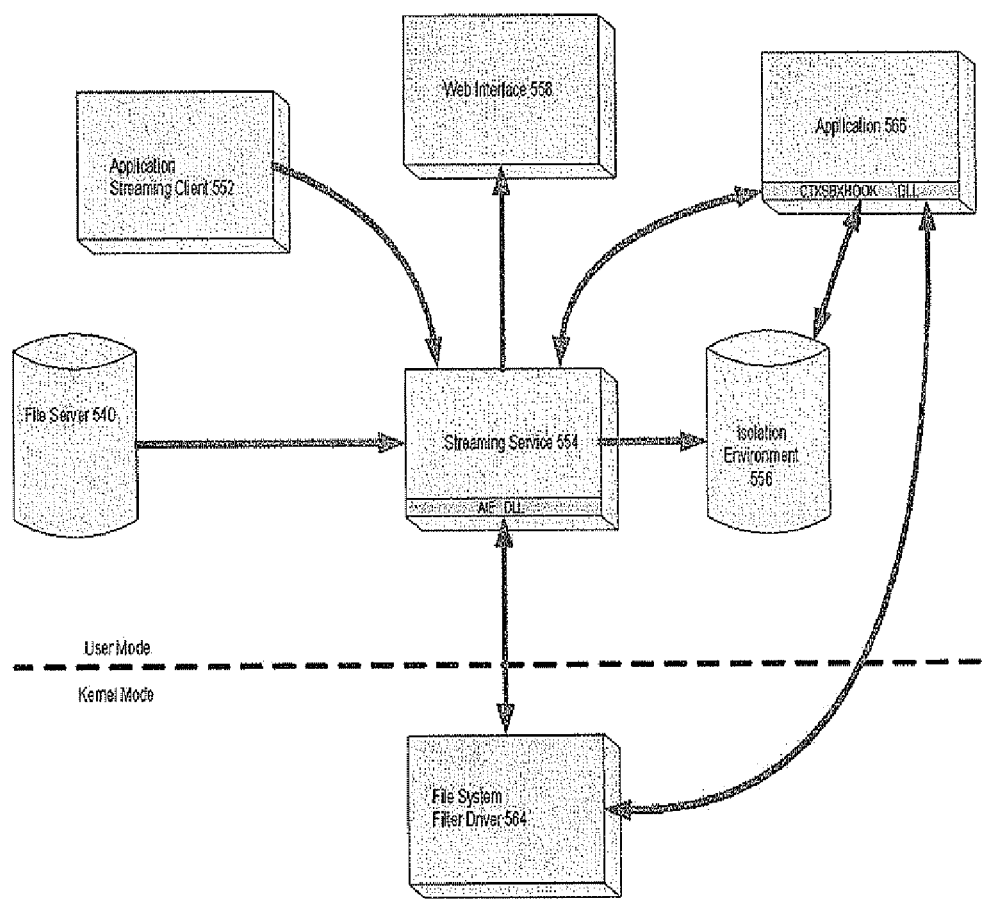
FIG. 14 is a block diagram depicting one embodiment of a system for accessing a file in a directory structure associated with an application.

Referring now to FIG. 14, a block diagram depicts one embodiment of a system for accessing a file in a directory structure associated with an application. In brief overview, a local machine 10 includes an application streaming client 552, a streaming service 554, an isolation environment 556, a file system filter driver 564, and a first application 566. The local machine 10 may interact with a file server 540, a remote machine 30, a web interface 558, and a second application 566'.

The local machine 10 initializes the application streaming client 552 to execute the first application 566. In one embodiment, the application streaming client 552 initializes a streaming service 554 to retrieve and execute the first application 566. In some embodiments a plurality of application files comprise the first application 566 in one of these embodiments, the streaming service 554 retrieves the plurality of application files and stores them in the isolation environment 566. In another of these embodiments, the streaming service 554 identifies a location of a remote machine on which the plurality of application files resides but does not retrieve the plurality of application files. In still another of these embodiments, the streaming service 554 retrieves a subset of the files in the plurality of application files. In yet another of these embodiments, the streaming service 554 retrieves an archive file containing the plurality of application files.

In one embodiment, the first application 566 comprises a local copy of a second application 566' residing on a remote machine 30. In another embodiment, the plurality of application files reside on the remote machine 30 and comprise the second application 566' residing on a remote machine 30. In still another embodiment, to execute the second application 566', the local machine 10 retrieves the plurality of application files, creating the first application 566 on the local machine, and executes the first application 566. In some embodiments, the applications 566 and 566' are user applications such as word processing applications or spreadsheet applications or presentation applications.

In some embodiments, the plurality of application files include a file identifying a directory structure associated with the plurality of application files on the remote machine 30. In one of these embodiments, the file includes metadata about each application file in the plurality of application files. In another of these embodiments, the streaming service 554 retrieves the metadata from the file to generate an enumeration of the directory structure associated with the plurality of application files, as described in connection with FIG. 12 above. In still another of these embodiments, the streaming service 554 stores the enumeration of the directory structure associated with the plurality of application files comprising the second application 566'. In some embodiments, the streaming service 554 stores the enumeration in a second isolation environment.

In one embodiment, the streaming service 554 retrieves an initial executable file associated with the first application 566. In another embodiment, the streaming service 554 executes the first application 566 on the local machine 10 upon retrieval of the initial executable file. In still another embodiment, the first application 566 requests access to other files in the plurality of application files as the files are needed for continued execution of the first application 566. In some embodiments, the first application 566 executes in the isolation environment 556.

The file system filter driver 564 intercepts requests by the first application 566 executing within the isolation environment 556 for access to a file in the plurality of application files. The file system filter driver 564 redirects the request to the isolation environment 556. If the requested file resides in the isolation environment 556, access to the requested file is provided to the first application 566.

If the requested file does not reside in the isolation environment 556, the file system filter driver 564 redirects the request to a second isolation environment. In one embodiment, the second isolation environment includes the enumeration of the directory structure generated by the streaming service 554 and associated with the plurality of application files comprising the second application 566'. In another embodiment, a determination is made that the requested file is identified in the enumeration of the directory structure.

In some embodiments, the streaming service 554 provides a semaphore to the isolation environment 556. In one of these embodiments, the file system filter driver 564, using the semaphore, indicates to the streaming service 554 that access to a file in the plurality of application files is required. In other embodiments, the file system filter driver 564 uses a thread to indicate to the streaming service 554 that access to the file is required.

Upon receiving the notification from the file system filter driver 564, the streaming service 554 retrieves the requested file from the plurality of application files. In still another of these embodiments, the streaming service 554 stores the requested file in the second application isolation environment. In one embodiment, the request for access to the file is satisfied with the instance of the file retrieved from the plurality of application files and stored in the second isolation environment. In another embodiment, the requested file is also stored in the first isolation environment.

In some embodiments, a determination is made that the second isolation environment does not contain the file and that the file is identified in the enumeration. In one of these embodiments, the file is identified in the enumeration of the directory structure associated with the plurality of application files comprising the second application 566' and the file is a file in the plurality of application files. In another of these embodiments, the streaming service 554 did not retrieve the file from the remote machine. In still another of these embodiments, the streaming service 554 did not retrieve a plurality of application files including the requested file. In yet another of these embodiments, the streaming service 554 retrieved the plurality of application files in an archived file but did not retrieve the requested file from the archive file.

In one embodiment, the streaming service 554 includes a transceiver, in communication with the file system filter driver. In another embodiment, the transceiver receives the redirected request from the file system filter driver. In still another embodiment, the transceiver forwards the request for the file to a remote machine hosting the requested file. In one embodiment, the remote machine is a file server 540. In another embodiment, the request is forwarded to a remote machine 30 which routes the request to a file server 540. In some embodiments, the file server 540 streams the requested file to the transceiver on the local machine 10. In other embodiments, the remote machine 30 streams the requested file to the transceiver on the local machine 10. In still other embodiments, upon receiving the requested file from the file server 540, the transceiver stores the received file in the second isolation environment.

In one embodiment, the file system filter driver 564 intercepts a second request for access to the file made by a third application 566", executing on the local machine 10, in a third isolation environment. In another embodiment, the file system filter driver 564 redirects the request for access to the file to the second isolation environment. In still another embodiment, the file system filter driver 564 determines that the streaming service 554 stored the received file in the second isolation environment prior to the interception of the request for access by the third application 566".

In some embodiments, upon initialization, the streaming service 554 may populate a cache in an isolation environment prior to execution of an application program. In one of these embodiments, the streaming service 554 installs a registry file into the isolation environment. In another of these embodiments, the streaming service 554 stores a mapping between a long name of a file and a short file name.

In one embodiment, to save space on the local machine, the size of the cache may be limited. In some embodiments, when the cache nears its size limit, the oldest files in the cache will automatically be purged to make room for new files. In one of these embodiments, the age of a file is determined by a timestamp maintained by the operating system indicating a time of 'last access' timestamp. In addition to the age of a file, the file type may be taken into account—binary executable files (.EXE, .DLL, etc) may be kept longer than similarly aged files of other types.

Upon initialization, the streaming service 554 may enumerate files currently in a cache, and determine the total size of the cache. After a file is added to the cache, either by an isolation environment 556 or by the streaming service 554, the streaming service 554 calls a function to inform the cache system of the new file, its location and its size. The size of each newly cached file is added to the running total of the current cache size. This new total is then compared against the cache size limit, and if the limit has been exceeded the code fires off a thread to age the cache. There can only ever be one instance of this thread running at any given time.

The thread generates a list of all files currently in the cache, sorts this list by last-access timestamp, and then starts walking down the list deleting files until we have freed enough disk space to satisfy the exit criteria for the thread. The exit criteria is based on dropping to cache size down to a level below the limit that is determined as a percentage of the limit (the default value is 10%). Deleting more than is needed to prevent exceeding the limit prevents the cache from thrashing each time a new file is added.

In some embodiments, the streaming service 554 provides the ability to copy every file in a plurality of application files comprising an application program, in a compressed file format, to the local machine 10. This ability may be referred to as "pre-caching." In one of these embodiments, when the application program is subsequently executed, all the package requests go to the local copy rather than traversing the network. These embodiments may enable a user of the local machine 10 to execute the application program at a time when the user has no access to the network.

A remote machine 30 includes functionality for monitoring application usage by a local machine 10. The remote machine 30 may monitor the status of each application used by the local machine 10, for example when execution or termination of an application. In one embodiment, the remote machine 30 requires the local machine 10 to transmit messages about the status of an application executed by the local machine 10. In another embodiment, when a local machine 10 connects to a network on which the remote machine 30 resides, the local machine 10 transmits a message indicating that the local machine 10 has connected to the network.

In one embodiment, the local machine 10 is said to have a session when the local machine 10 interacts with the remote machine 30 and executes one or more applications. In another embodiment, the remote machine 30 requires the local machine to maintain, for the duration of a session, a license authorizing execution of applications received from a remote machine. In still another embodiment, sessions have unique session identifiers assigned by the remote machine.

In one embodiment, the local machine 10 transmits the messages to the remote machine 30 with which is interacted to receive and execute the application program. In another embodiment, the local machine 10 receives from the remote machine 30 an identifier of a second remote machine, such as a session management server 562, the second remote machine receiving and storing all transmitted messages associated with the session on the local machine 10.

In some embodiments, the session management server 562 is a remote machine 30 providing license management and session monitoring services. In one of these embodiments, the session management server 562 includes a server management subsystem 508 providing these services.

In one embodiment, the local machine 10 transmits messages directly to the session management server 562. In another embodiment, the local machine 10 transmits messages to a remote machine 30, the remote machine 30 forwarding the messages to the session management server 562 with an identification of the local machine 10.

A local machine 10 may transmit a heartbeat message to the remote machine 30. In one embodiment, the heartbeat message includes a request for a license. In this embodiment, the local machine 10 may transmit the heartbeat message after receiving access information associated with an application program which the local machine 10 requested authorization to execute. The local machine 10 may transmit the heartbeat message prior to executing the application. In one embodiment, the local machine 10 includes with the heartbeat message a launch ticket received with the access information. In this embodiment, the remote machine 30 may grant the local machine 552 a license upon successful verification of the launch ticket.

In another embodiment, the heartbeat message includes an indication that the local machine has initiated execution of an application. In still another embodiment, the heartbeat message includes an indication that the local machine has terminated execution of an application. In yet another embodiment, the heartbeat message includes an indication of a failure to execute an application.

In one embodiment, the heartbeat message includes a request for an identification of a second session management server, such as a session management server 562. In another embodiment, the heartbeat message includes an indication that the local machine 10 has connected to a network on which the remote machine 30 resides.

In some embodiments, the heartbeat message includes a request to reset an application streaming session. In one of these embodiments, the local machine 10 transmits this heartbeat message when an error has occurred and a connection is terminated between a network on which the remote machine 30 resides and the local machine 10. In another of these embodiments, the local machine 10 transmits with the heartbeat message information associated with the session. In still another of these embodiments, the remote machine 30 may transmit to the local machine 10 session-related data if the session has not expired.

In another of these embodiments, if a remote machine 30 disconnects from a network on which it replies, the local machine 10 may not receive a reply to a heartbeat message transmitted to the remote machine 30. In one embodiment, the local machine 10 may re-establish a session by transmitting a message requesting a session reset to the remote machine 30. In another embodiment, the local machine 10 may re-establish a session by transmitting a message requesting a session reset to a second remote machine 30. In some embodiments, when the remote machine 30 reconnects to the network, it will create a new session for each session reset request received while the remote machine 30 was disconnected. In one of these embodiments, the new session will be associated with the reconnected and unlicensed state. In another of these embodiments, no new license will be acquired for the new session. In still another of these embodiments, when the local machine 10 executes an application, a new license will be acquired and all sessions associated with the local machine 10 will be associated with an active and licensed state.

In some embodiments, an application streaming client 552 on the local machine 10 generates the heartbeat message. In one of these embodiments, the application streaming client 552 forwards the heartbeat message to a web interface 558 for transmission to the local machine 10 for transmission to the remote machine 30. In other embodiments, the management service 504 on the remote machine 30 receives the heartbeat message from the local machine 10 via the web interface 558. In still other embodiments, a remote machine 30 comprising a collector point 240 (described above in connection with FIG. 1D) receives and stores the heartbeat messages.

In some embodiments, the application streaming client 552 requests a license from the remote machine 30. In one of these embodiments, the license authorizes execution of an application program on the local machine 552. In another of these embodiments, the remote machine 30 may access a second remote machine to provide the license. In still another of these embodiments, the remote machine 30 may provide the license to the local machine. In yet another of these embodiments, the remote machine 30 may provide a license acceptable for authorization purposes to a second remote machine. In some embodiments, the license is revoked upon termination of execution of an application program.

In some embodiments, a remote machine 30 in the farm 38 includes a license management subsystem for configuring and maintaining licenses for those subsystems that require a license to operate and for controlling the number of connections to such subsystems. In other embodiments, the remote machine 30 incorporates functionality of a license management subsystem within other subsystems, such as the application management subsystem and the session management subsystem. In one embodiment, each remote machine 30 includes a license management subsystem or the functionality associated with a license management subsystem. The license management subsystem manages two types of licenses (1) feature licenses, and (2) connection licenses. In brief overview, the license management subsystem uses feature licenses to control access to "features" of licensed software products, such as load management, and connection licenses to control the number of user connections allowed by those licensed software products. A feature can be some aspect or particular functionality of the software product, or the feature can be the entire product that will not work without a feature license.

Figure 15:
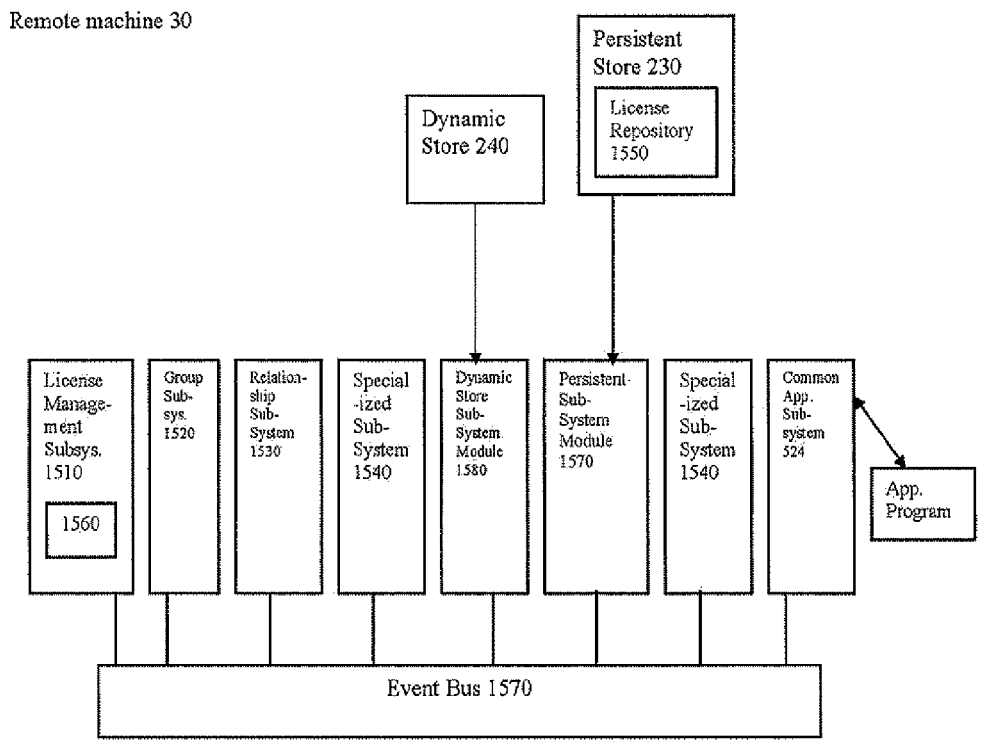
FIG. 15 is a block diagram of one embodiment of a remote machine including a license management subsystem.

FIG. 15 shows one embodiment of the remote machine 30 in the farm 38 in which the remote machine 30 includes a license management subsystem 1510, a group subsystem 1520, a persistent store system service module 1570, a dynamic store system service module 1580, a relationship subsystem 1530, a specialized remote machine subsystem 1540, and a common access point subsystem 524 in communication with an event bus 1570. Those subsystems shown in FIG. 15 are for purposes of describing the behavior of the license management subsystem 1510. The remote machine 30 can include other types of subsystems.

The license management subsystem 1510 communicates with the group subsystem 1520 over an event bus to form and maintain a logical grouping of licenses (hereafter, "license groups") to facilitate license pools, assignments, and groups. A license group includes a collection of license strings, described below, and/or other license groups. License groups collect licenses of similar features and consequently enable pooling of licenses. A pooled license is a license that is available for use by any remote machine 30 in the farm 38. Each license group holds the collective capabilities of the licenses in the license group and the other license subgroups (i.e. other license groups within a license group). Information relating to license pools is, in one embodiment, maintained in the dynamic store 240. In this embodiment, each license management subsystem 1610 stores locally the total number of licenses and the number of license assigned to a remote machine 30 in the farm 38. Upon granting a pooled license, the granting license management subsystem 1510 makes an entry in the dynamic store 240 indicating that a pooled license is "in use." Every other license management subsystem 1510 recognizes that such pooled license is unavailable for granting. In one particular embodiment, the dynamic store 240 store remote machine ID/client ID pairs associated with each license group to identify pooled licenses that are in use.

The relationship subsystem 1530 maintains associations between licenses and remote machines 30 and between license groups and remote machines 30. The associations define the number of licenses for each license and license group that only the associated remote machine 30 may obtain (i.e., "local licenses"). A local license is a license that is assigned to one remote machine in the farm 38 and is not shared by other remote machines 38. The license management subsystem 1510 communicates with the relationship subsystem 1530 to create, delete, query, and update such associations. The common access point subsystem 524 provides remote procedure calls (RPCs) for use by software products residing on the remote machine 30. These RPC interfaces enable such software products to communicate through the common access subsystem 524 to access licensing information.

Still referring to FIG. 15, the specialized remote machine subsystem 1540 communicates with the license management subsystem 1510 to obtain a feature license for each capability of the specialized remote machine subsystem 1540 for which a license is required. This occurs at initialization of specialized remote machine subsystem 1540 and after any license event. If unable to obtain the feature license, the specialized remote machine subsystem 1540 restricts the functionality that the subsystem would provide with a license. Also, the specialized remote machine subsystem 1540 uses the license management subsystem 1510 to obtain client connection licenses whenever a client session is initiated with the remote machine 30.

The license management subsystem 1510 communicates with the persistent store system service module 352 to store feature and connection licenses in a license repository 1550 as license strings formed in accordance with a naming convention. The license repository 1550 resides in the persistent store 230. Cyclical redundancy checks (CRC) prevent tampering of the licenses while such licenses are stored in the license repository 1550. The license management subsystem 1510 also stores information related to the license strings in the license repository 1550. For example, the information may indicate which licenses are assigned to which remote machines 30 of the farm 38 and, in some embodiments, the activation status of each license. In one embodiment, a connection license table 1560 stores identifiers of those local machines that have obtained a connection license.

In one embodiment, the license management subsystem 1510 supports events from subsystems requesting use of a licensed capability, such as a request for an available pooled license. The event includes the UID of the subsystem requesting the license and the UID of the remote machine 30 upon which that subsystem resides. The event also contains the license type requested (i.e., feature or connection license) in the form of a license group ID. The actual license group ID stored in the persistent store 230 is arbitrary, but adherence to the naming convention provides flexibility for the future addition of new software products (i.e., subsystems) to the remote machine 30.

The event sent by a requesting subsystem seeking a license includes (1) an indication of the license group type, the identity of the local machine and remote machine requesting the license, and a "force acquire" flag. An indication of license group type may include identification of a feature license, such as a load management, or a connection type license, such as a software application product. The field identifying the local machine and remote machine seeking the license may include the unique identifier associated with the remote machine and the local machine. The force acquire flag may be used, for example, to reacquire connection licenses after a license change event. A license change event indicates that licensing information in the persistent store 230 has changed; for example, a license has been deleted, added, or assigned. Upon a license change event, each remote machine 30 attempts to reacquire all connection licenses that it possessed before the license change event because the particular cause of the license change event is unknown to that remote machine. This flag, if set, indicates that a connection license must be acquired even if doing so increases the number of connections to the remote machine 30 in excess of the predetermined maximum number of allowable connections. No new connection licenses are subsequently granted until the number of connection licenses in use drops below this predetermined maximum number. In this manner, a local machine connection will not be terminated in mid-session due to a license change event.

Figure 16:
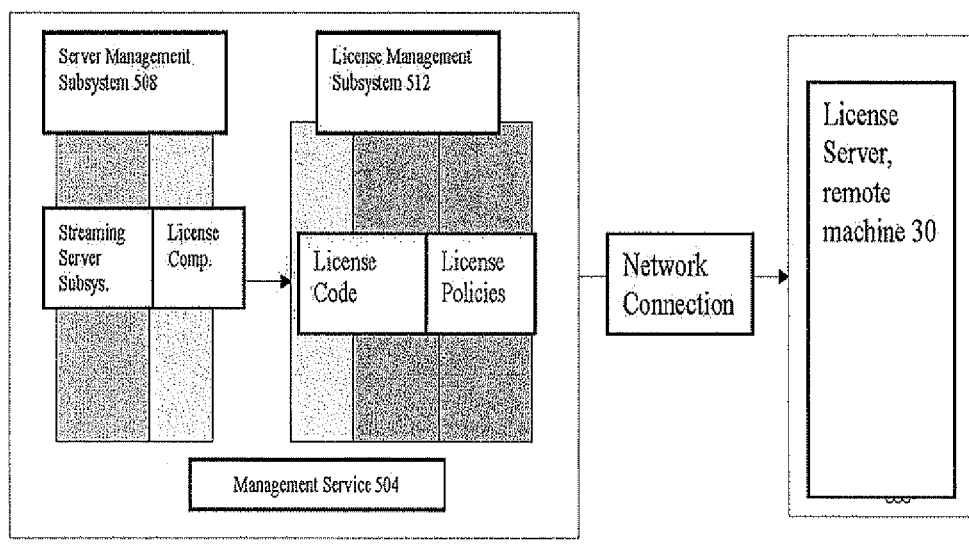
FIG. 16 is a block diagram depicting one embodiment of components in a management service on a remote machine.

Referring now to FIG. 16, a block diagram depicts one embodiment of the components involved in licensing enforcement. A remote machine 30 includes a server management subsystem 508 and a license management subsystem 512. In some embodiments, the server management subsystem 508 and the license management subsystem 512 provide the functionality of the license management subsystem 1510 described above. In other embodiments, an application management subsystem 506 and a session management subsystem 510 provide the functionality of the license management subsystem 1510 described above. In still other embodiments, other subsystems provide the functionality of the license management subsystem 1510 described above.

In one embodiment, the server management subsystem 508 may include a licensing component used to request issuance and revocation of licenses. In another embodiment, the license management subsystem 512 may apply a policy to a request for issuance or revocation of a license received from the server management subsystem 508. In still another embodiment, the license management subsystem 512 may transmit the request to a remote machine 30 providing license enforcement functionality. In some embodiments, the management service 504 may maintain a connection with a second remote machine 30 providing license enforcement functionality. In other embodiments, the remote machine 30 provides the license enforcement functionality.

In some embodiments, a license expires and ceases to be valid upon a failure of the local machine 10 to transmit a predetermined number of heartbeat messages to the remote machine. In one of these embodiments, expiration of the license revokes authorization for execution of an application program by the local machine 10.

In other embodiments, a session times out upon the expiration of a predetermined period of time. In one embodiment, the management service 504 maintains session-related data after the expiration of a license until an expiration of a session. In some embodiments, the session-related data may include information such as session name, session id, client id, client name, session start time, server name (UNC Path of File Server), application name (Unique name generated by local machine, based on browser name), alias name, session state (active/licensed, active/unlicensed, reconnected/unlicensed). In another embodiment, the local machine 10 ceases transmission of heartbeat messages and restarts transmission of heartbeat messages at a later point in time. In still another embodiment, the management service 504 may reissue a license and make the maintained session-related data available to the local machine 10 if the local machine 10 restarts transmission of heartbeat messages prior to the expiration of the session.

Figure 17:
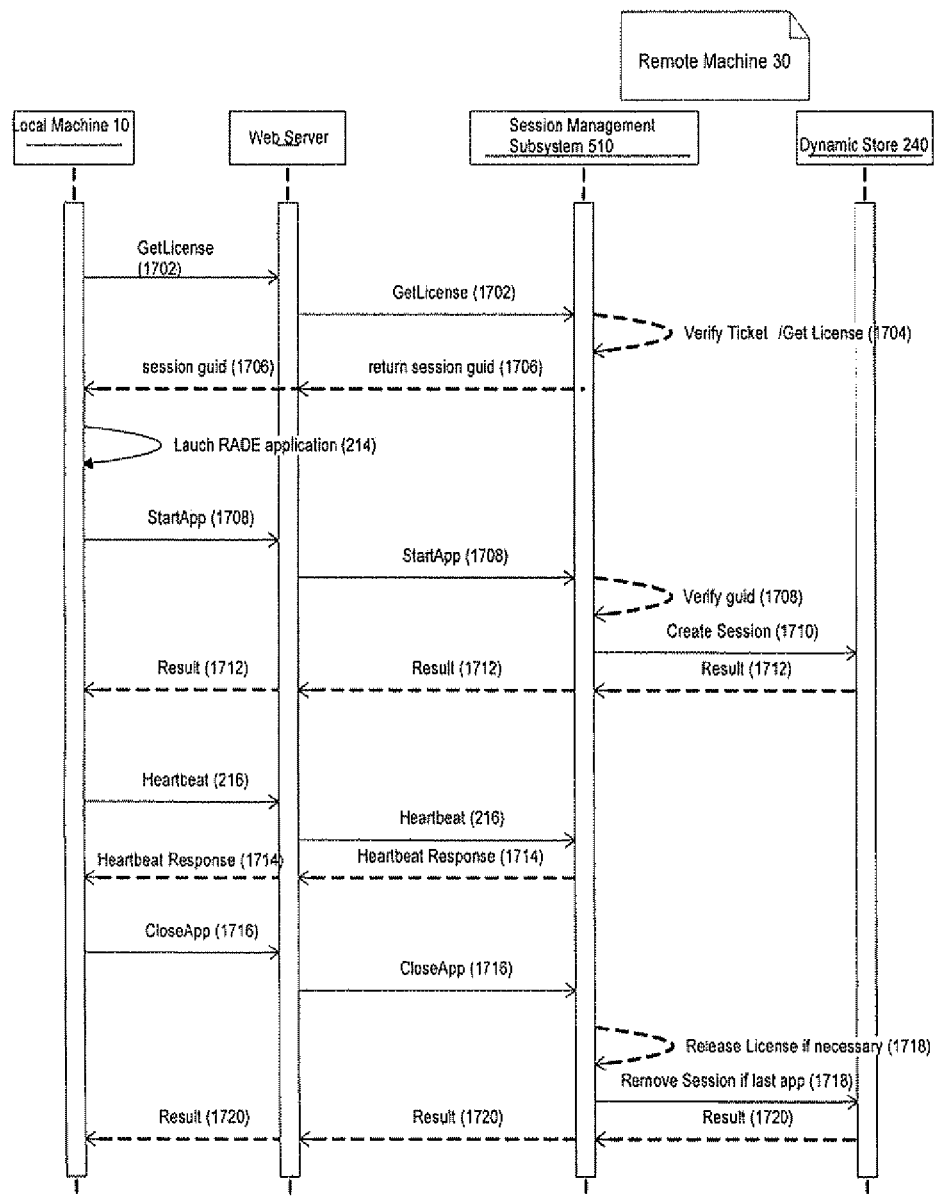
FIG. 17 is a flow diagram depicting one embodiment of the steps taken to request and maintain a license from a remote machine.

Referring now to FIG. 17, a flow diagram depicts one embodiment of the steps taken to request and maintain a license from a remote machine 30 for the duration of a session on a local machine 10. In brief overview, an application streaming client requests a license (step 1702). A remote machine 30 receives the request for the license, verifies a ticket associated with the request, and generates a license (step 1704). The remote machine 30 provides the license and information associated with the license to the local machine 10 (step 1706). The local machine 10 executes the application as described above in connection to step 214 in FIG. 7. The local machine transmits a heartbeat message indicating that the local machine has executed an application (step 1708). The remote machine 30 receives the heartbeat message and verifies identifying information transmitted with the heartbeat message (step 1708). The remote machine 30 creates a session associated with the executed application and with the local machine 10 (step 1710). A result of creating the session is transmitted to the local machine 10 (step 1712). The local machine transmits heartbeat messages throughout the execution of the application, as described above in connection with step 216 of FIG. 7. The local machine receives a response to a transmitted heartbeat message (step 1714). The local machine transmits a heartbeat message indicating a termination of an execution of the application (step 1716). The remote machine 30 receives the heartbeat message and determines whether to remove session related data and whether to release the license associated with the local machine 10 and the terminated application (step 1718). A result of the determination made by the remote machine 30 is transmitted to the local machine 10 (step 1720).

Referring now to FIG. 17, and in greater detail, an application streaming client on a local machine 10 requests a license (step 1702). In some embodiments, the local machine 10 requests the license upon receiving access information associated with an application program. In one of these embodiments, the local machine requests a license from the remote machine 30 granting authorization for execution of the application program by the local machine 10. In some embodiments, the request for the license includes a launch ticket received from the remote machine 30 with the access information. In other embodiments, an application streaming client 552 on the local machine 10 transmits the request to a web interface 558 and the web interface 558 transmits the request to the remote machine 30. In still other embodiments, a session management subsystem 510 on the remote machine receives and processes the request for the license.

A remote machine 30 receives the request for the license, verifies a ticket associated with the request, and generates a license (step 1704). In one embodiment, the remote machine 30 verifies that the local machine 10 is authorized to execute the application. In another embodiment, the remote machine 30 determines whether the local machine 10 is already associated with an existing license. In still another embodiment, the remote machine 30 determines that the local machine 10 is associated with an existing license and provides the local machine 10 with an identifier for a session management server 562 managing the existing license. In yet another embodiment, the remote machine 30 generates and provides to the local machine 10 a new license, a session identifier, and an identification of a session management server 562 managing the new license.

In some embodiments, the remote machine 30 uses a license management subsystem 1510 to respond to a license request in an embodiment in which. The license management subsystem 1510 receives a license request. The request can be for a feature license or for a connection license. The license management subsystem 1510 determines if the license has already been granted, i.e., the feature has already been started or a connection for a local machine already exists. If the license is already granted, the license management subsystem 1510 sends a "grant" event to the license requestor. If the license has not been previously granted, the license management subsystem 1510 determines if a local license, i.e., a license that has been permanently assigned to the remote machine 30, is available. In some embodiments, the license management subsystem 1510 performs this determination by checking local memory. If a local license is available, i.e., the remote machine 30 has more licenses permanently assigned than currently granted, the license management subsystem 1510 sends a "grant" event to the license requestor.

The remote machine 30 provides the license and information associated with the license to the local machine 10 (step 1706). In one embodiment, upon receiving the license, the session identifier, and the identification of the session management server 562 from the remote machine 30, the local machine 10 executes the application. The local machine 10 may execute the application as described above in connection to step 214 in FIG. 7. The local machine transmits a heartbeat message indicating that the local machine has executed an application (step 1708). In one embodiment, the local machine transmits the heartbeat message to the remote machine 30 for transmission of the heartbeat message to a session management server 562. In another embodiment, the local machine 10 transmits a heartbeat message directly to a session management server 562, responsive to an identifier of the session management server 562 received from the remote machine 30.

The remote machine 30 receives the heartbeat message and verifies identifying information transmitted with the heartbeat message (step 1708). In one embodiment, a remote machine 30' is the session management server 562. In another embodiment, the session management server 562 verifies a server identifier provided with the heartbeat message by the local machine 10. In still another embodiment, the server identifier is the identifier provided to the local machine 10 by a remote machine 30.

The remote machine 30 creates a session associated with the executed application and with the local machine 10 (step 1710). In one embodiment, the session management server 562 creates a new session associated with the executing application upon receiving the heartbeat message. In another embodiment, a third remote machine 30 creates the new session. In some embodiments, the session management server 562 stores session-related information upon the creation of the new session.

A result of creating the session is transmitted to the local machine 10 (step 1712). In some embodiments, the result confirms the creation of the session. In other embodiments, the result identifies the application or applications associated with the session. The local machine transmits heartbeat messages throughout the execution of the application, as described above in connection with step 216 of FIG. 7. In one embodiment, the local machine 10 continues to transmit heartbeat messages at regular intervals to the session management server 562 at periodic intervals throughout the execution of the application program. The local machine receives a response to a transmitted heartbeat message (step 1714). In one embodiment, the local machine 10 receives a confirmation of receipt of the heartbeat messages from the session management server 562. In another embodiment, the local machine 10 receives a command for execution from the session management server 562, responsive to the receipt of a heartbeat message by the session management server 562.

The local machine transmits a heartbeat message indicating a termination of an execution of the application (step 1716). The remote machine 30 receives the heartbeat message and determines whether to remove session related data and whether to release the license associated with the local machine 10 and the terminated application (step 1718). A result of the determination made by the remote machine 30 is transmitted to the local machine 10 (step 1720).

Figure 18:
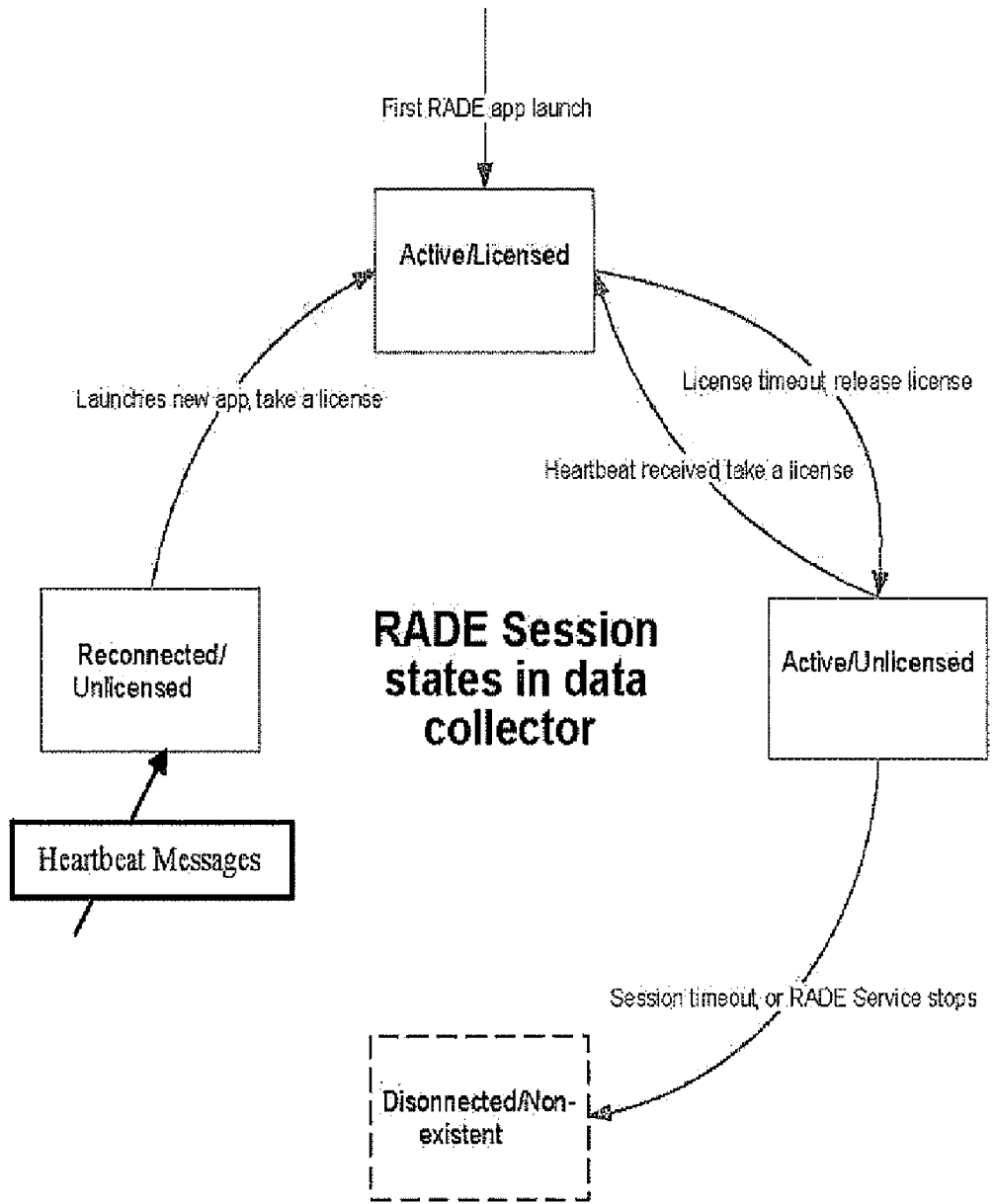
FIG. 18 is a block diagram depicting one embodiment of states that may be associated with a session monitored by a management service.

Referring now to FIG. 18, a block diagram depicts one embodiment of states that may be associated with a session monitored by a management service 504. In one embodiment, a session maintenance subsystem 510 on the management service 504 monitors a session of a local machine 10 and assigns a state to the session. In another embodiment, the session maintenance subsystem 510 maintains a list of license-related data, which may include an identifier associated with the local machine, an identifier associated with the session, a session state, and a timestamp indicating the last time the remote machine 30 received a message from the local machine 10. In some embodiments, the session maintenance subsystem 510 includes a session monitoring thread. In one of these embodiments, the session monitoring thread awakens at a periodic license timeout interval to scan the list of license-related data and update the session status of a session.

A first state that a session may be in is an active and licensed state. In one embodiment, when in this state, the local machine 10 has maintained a valid license authorizing execution of an application. In another embodiment, a session management server 562 maintains session-related data. In some embodiments, the session management server 562 stores the session-related data on a second remote machine. In one embodiment, when a local machine 10 initially executes an application, the session for the local machine is in the active and licensed state.

A second state that a session may be in is an active and unlicensed state. In one embodiment, a session is in this state when the local machine 10 fails to transmit heartbeat messages and a license to the local machine 10 has expired. In another embodiment, if a session is in this state then, while the license has expired, insufficient time has elapsed for the session to expire, and the session is considered active. In some embodiments, while a session is in this state, a remote machine 30 or a session management server 562 may store session-related data on behalf of the local machine 10. In other embodiments, if a local machine 10 transmits a heartbeat message prior to the expiration of the session, session-related data is transmitted to the local machine 10 with a new license and the session returns to the active and licensed state. In one embodiment, a remote machine 30 uses session identifiers and identifiers associated with the local machine to verify that the session has not expired and to provide the local machine with the appropriate session-related data.

A third state that a session may be in is a disconnected and non-existent state. When a session expires, session-related data is deleted.

A fourth state that a session may be in is a reconnected and unlicensed state. In one embodiment, when a session on a local machine 10 expires, session-related data is deleted. In another embodiment, when the local machine 10 transmits a new heartbeat message, a new session identifier and local machine identifier are generated for the local machine 10. In some embodiments, the local machine 10 re-authenticates to the remote machine 30, receives a new license, and enters the active and licensed state.

Table 3 summarizes the states that may be associated with a session.

TABLE 3

| Session Status | Description |
| --- | --- |
| Active\Licensed | Normal mode of operation |
| Active\Unlicensed | Duration of missing heartbeats > License Timeout AND Duration of missing heartbeats < Session Timeout |
| Reconnected\Unlicensed | Duration of missing heartbeats > Session Timeout OR CPS/RADE hosting the session is down and back online |

In some embodiments, a packaging mechanism enables creation of a plurality of application files associated with an application program. In one of these embodiments, the packaging mechanism enables identification of a plurality of application files. In another of these embodiments, the packaging mechanism enables grouping of individual application files into the plurality of application files. In still another of these embodiments, the packaging mechanism enables hosting of the plurality of application files on a remote machine, such as a file server or application server.

In one embodiment, the packaging mechanism executes on a remote machine described as a "staging machine." In another embodiment, the packaging mechanism executes on a "clean machine." A clean machine may be a remote machine having only an operating system installed on it, without additional software, drivers, registry entries, or other files. In still another embodiment, the packaging machine executes on a remote machine, the remote machine resembling a local machine on which an application program may execute. In some embodiments, the remote machine on which the packaging mechanism executes includes an isolation environment providing a clean machine environment into which an application may be installed, even where the remote machine is not itself a clean machine.

In one embodiment, the plurality of application files is referred to as a "package." In another embodiment, the package may be an archive file storing the plurality of application files. In still another embodiment, the package may be an archive file storing the plurality of application files and a file including metadata associated with at least one file in the plurality of application files. In some embodiments, a package includes a plurality of application files comprising an application program. In other embodiments, a package includes a plurality of application files comprising a suite of application programs. In yet other embodiments, a package includes a plurality of application files comprising an application program and a prerequisite required for execution of the application program.

In one embodiment, the packaging mechanism initiates execution of an installation program in an isolation environment. In another embodiment, the packaging mechanism monitors a change to the isolation environment generated by the installation program. In still another embodiment, the packaging mechanism monitors a creation by the installation program of a file in the isolation environment. In yet another embodiment, the packaging mechanism monitors a modification by the installation program of a file in the isolation environment. In some embodiments, the plurality of application files includes a file created or modified by the installation program. In other embodiments, the packaging mechanism implements a file system filter driver 564 to monitor the isolation environment.

In some embodiments, a packaging mechanism may generate multiple pluralities of application files, each comprising a different version of an application program configured for execution in a different target environment. In one of these embodiments, a plurality of application files is configured to execute on a local machine having a particular operating system, revision level, language configurations and master drive (e.g., one plurality of application files may be configured to execute on a local machine having the Windows XP Professional operating system with revision level SP2 and above, using English and having a master Drive C:\). In another of these embodiments, more than one plurality of application files may be combined in a single archive file. In still another of these embodiments, each plurality of application files may be referred to as a "target." In yet another of these embodiments, an archive file containing one or more pluralities of application files may be referred to as a "package."

Referring now to FIG. 19, a block diagram depicts a package including two targets, each target comprising a plurality of application files comprising an application. In FIG. 19, the application program 'Foo' is packaged in two targets. The difference between the two targets is 'Target Language'. Specifically, target 1 supports 'English' and target 2 supports 'German'. In one embodiment, an enumeration of available application programs may list the application program 'Foo.' In another embodiment, the appropriate plurality of files is transmitted to a local machine requesting access to the application program. In still another embodiment, a determination is made to transmit a particular target to a local machine, responsive to an evaluation of the local machine. In yet another embodiment, a file associated with the package identifies at least one characteristic associated with a target in the package and required for execution on a local machine.

In some embodiments, the packaging mechanism 530 prepares an application program for streaming by executing an installation program associated with the application program. In one of these embodiments, the packaging mechanism generates an isolation environment on the remote machine 30 on which the packaging mechanism executes. In another of these embodiments, the packaging mechanism executes the application program in the isolation environment. In still another of these embodiment, the packaging mechanism identifies a plurality of application files generated or modified by the installation program. In yet another of these embodiment, the packaging mechanism creates an archive file including the plurality of application files. In one of these embodiments, the packaging mechanism creates a .CAB file including the plurality of application files. In another of these embodiments, the packaging mechanism creates a directory and stores the plurality of application files in the directory. In some embodiments, the packaging mechanism stores the plurality of application files on a file server or other remote machine 30. In other embodiments, the packaging mechanism stores the plurality of application files on multiple remote machines.

Figure 20:
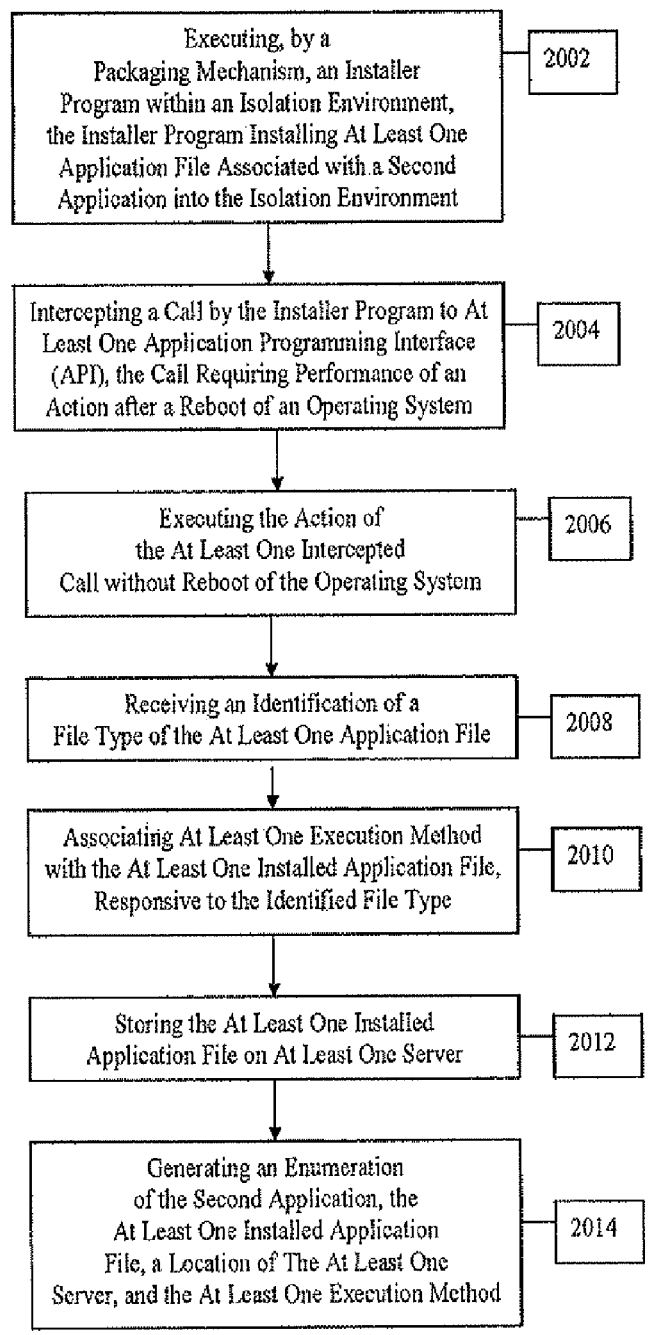
FIG. 20 is a flow diagram depicting one embodiment of the steps taken in a policy-based method for installing an application program without rebooting an operating system.

Referring now to FIG. 20, a flow diagram depicts one embodiment of the steps taken in a policy-based method for effectively installing an application program without rebooting an operating system. In brief overview, a packaging mechanism executes an installer program within an isolation environment, the installer program installing at least one application file associated with a second application into the isolation environment (step 2002). A call by the installer program to at least one application programming interface (API) is intercepted, the call requiring performance of an action after a reboot of an operating system (step 2004). The action of the at least one intercepted call is executed without reboot of the operating system (step 2006). An identification of a file type of the at least one application file is received (step 2008). At least one execution method is associated with the at least one installed application file, responsive to the identified file type (step 2010). The at least one installed application file is stored on at least one server (step 2012). An enumeration is generated of the second application, the at least one installed application file, a location of the at least one server, and the at least one execution method (step 2014).

Referring now to FIG. 20, and in greater detail, a packaging mechanism executes an installer program within an isolation environment, the installer program installing at least one application file associated with a second application into the isolation environment (step 2002). In one embodiment, executing the installer program within the isolation environment enables the packaging mechanism to isolate changes made by the installer program to a file or registry on the local machine. In another embodiment, the packaging mechanism intercepts a change requested by the installer program and redirects the change to the isolation environment to prevent the change from occurring on the local machine. In still another embodiments, the packaging mechanism executes a second installer program within the isolation environment, the second application installing at least one application file associated with a third application into the isolation environment.

In some embodiments, the packaging mechanism executes the installer program within the isolation environment, the installer program executing at least one executable application associated with an application inside the isolation environment. In one embodiment in which the installer executes an application, execution of the application enables installation of a second application.

In another of these embodiments, installation of an application requires execution of the at least one executable application, in addition to the execution of the installer program. In still another of these embodiments, installation of an application requires execution of an Internet browser application, in addition to the execution of the installer program. In some embodiments, an installer program is executed to install a program and execution of the installer program includes execution of a second program required to install the program. In one of these embodiments, the program is a plug-in. In another of these embodiments, the program is an Active X component. In still another of these embodiments, the program is a Flash component. In yet another of these embodiments, the program is a customized toolbar, such as a Yahoo! or Google toolbar. In other embodiments, the program is a component installed into the second program and not executable independent of the second program.

A call by the installer program to at least one application programming interface (API) is intercepted, the call requiring performance of an action after a reboot of an operating system (step 2004). The action of the at least one intercepted call is executed without reboot of the operating system (step 2006). In some embodiments, execution of the action comprises executing an action of a registry entry modified during installation. Further details regarding the execution of the at least one intercepted call without reboot of the operating system are provided in connection with FIG. 25 below.

An identification of a file type of the at least one application file is received (step 2008). At least one execution method is associated with the at least one installed application file, responsive to the identified file type (step 2010). In one embodiment, the at least one execution method enables streaming of the at least one application file to a client. In another embodiment, the at least one execution method enables execution of the at least one installed application file on a client. In still another embodiment, the at least one execution method enables execution of the at least one installed application file on a server. In yet another embodiment, the at least one execution method enables streaming of the at least one application file to a server.

The at least one installed application file is stored on at least one server (step 2012). In some embodiments, the installed application program is executed within the isolation environment prior to storing the at least one installed application file on at least one server. In one of these embodiments, an additional application file is generated responsive to the execution of the installed application program. In another of these embodiments, a data file is generated. In still another of these embodiments, the installed application program requires information to complete installation, the information being required after an initial installation process. In yet another of these embodiments, information such as software product identifiers, license identifiers, or other credentials is required.

In some embodiments, an identifier is provided identifying a location of the at least one installed application file on the at least one server. In one of these embodiments, the identifier conforms to a Universal Naming Convention (UNC). In other embodiments, the at least one installed application file is placed in an archive file, such as a .CAB file. In one of these embodiments, a plurality of application files are stored in an archive file and the archive file is stored on the at least one server. In still another of these embodiments, the at least one installed application file is stored on multiple servers. In still other embodiments, the at least one application file is placed in a directory storing application files.

An enumeration is generated of the second application, the at least one installed application file, a location of the at least one server, and the at least one execution method (step 2014). In some embodiments, the enumeration is stored in a file. In other embodiments, the enumeration is stored in a manifest file. In still other embodiments, the enumeration is stored in an XML file.

In one embodiment, an enumeration is generated of multiple applications, a plurality of installed application files associated with each of the multiple application, and a location of at least one server storing the plurality of installed application files. In another embodiment, a enumeration is generated including an association between the second application and a plurality of installed application files. In still another embodiment, an enumeration is generated including an association between the second application and a compressed file containing the at least one installed application file Referring now to FIG. 21, a flow diagram depicts one embodiment of the steps taken in a policy-based method for installing an application program without rebooting an operating system. In brief overview, a packaging mechanism executes an installer program within an isolation environment, the installer program installing at least one application file associated with a second application into the isolation environment (step 2102). A call by the installer program to at least one application programming interface (API) is intercepted, the call requiring performance of an action after a reboot of an operating system (step 2104). The action of the at least one intercepted call is executed without reboot of the operating system (step 2106). An identification of a characteristic of the at least one application file is received (step 2108). At least one execution pre-requisite is associated with the at least one installed application file, responsive to the identified characteristic (step 2110). The at least one installed application file is stored on at least one server (step 2112). An enumeration is generated of the second application, the at least one installed application file, a location of the at least one server, and the at least one execution pre-requisite (step 2114).

Figure 21:
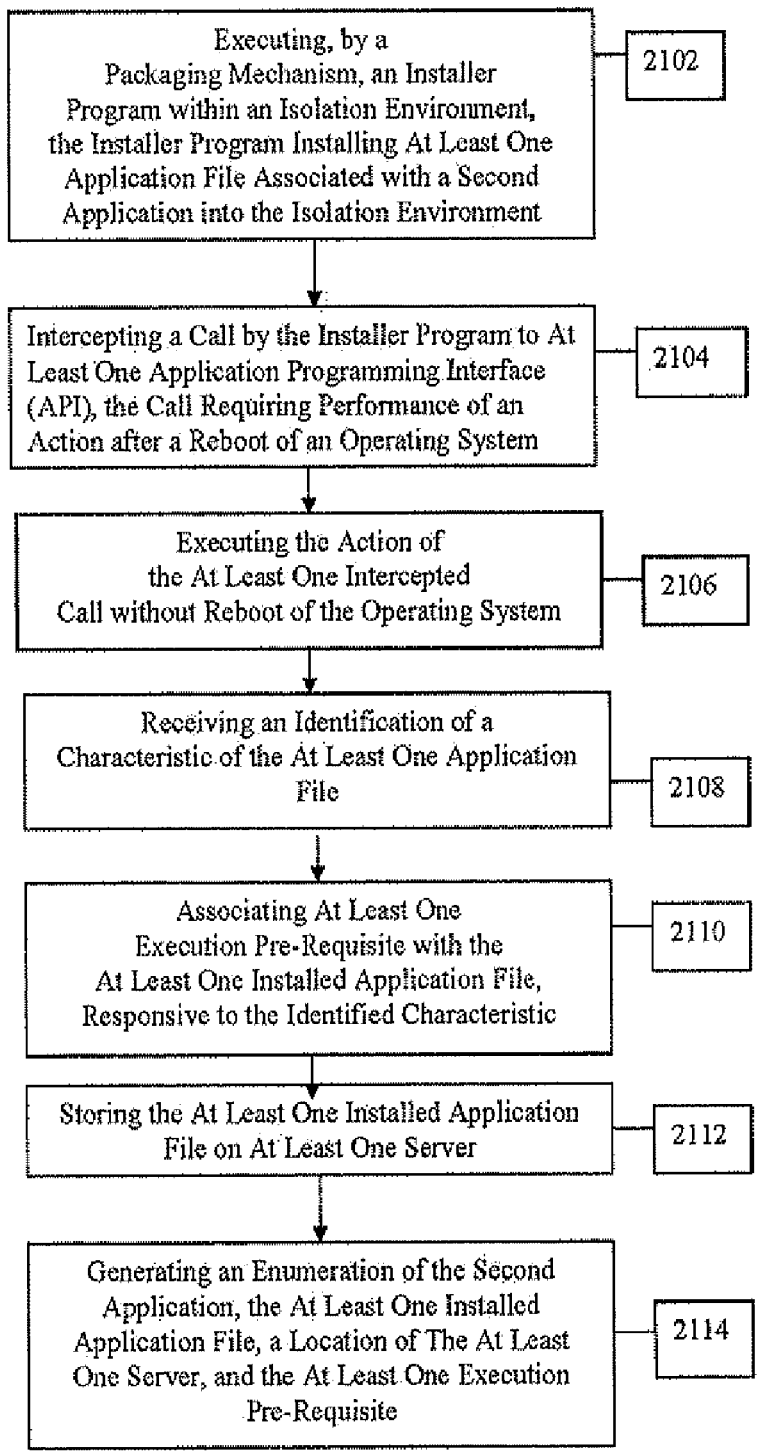
FIG. 21 is a flow diagram depicting one embodiment of the steps taken in a policy-based method for installing an application program without rebooting an operating system.

Referring now to FIG. 21, and in greater detail, a packaging mechanism executes an installer program within an isolation environment, the installer program installing at least one application file associated with a second application into the isolation environment (step 2102). In one embodiment, executing the installer program within the isolation environment enables the packaging mechanism to isolate changes made by the installer program to a file or registry on the local machine. In another embodiment, the packaging mechanism intercepts a change requested by the installer program and redirects the change to the isolation environment to prevent the change from occurring on the local machine. In still another embodiments, the packaging mechanism executes a second installer program within the isolation environment, the second application installing at least one application file associated with a third application into the isolation environment.

In some embodiments, the packaging mechanism executes the installer program within the isolation environment, the installer program executing at least one executable application associated with an application inside the isolation environment. In one embodiment in which the installer executes an application, execution of the application enables installation of a second application. In another of these embodiments, installation of an application requires execution of the at least one executable application, in addition to the execution of the installer program. In still another of these embodiments, installation of an application requires execution of an Internet browser application, in addition to the execution of the installer program.

Figure 23:
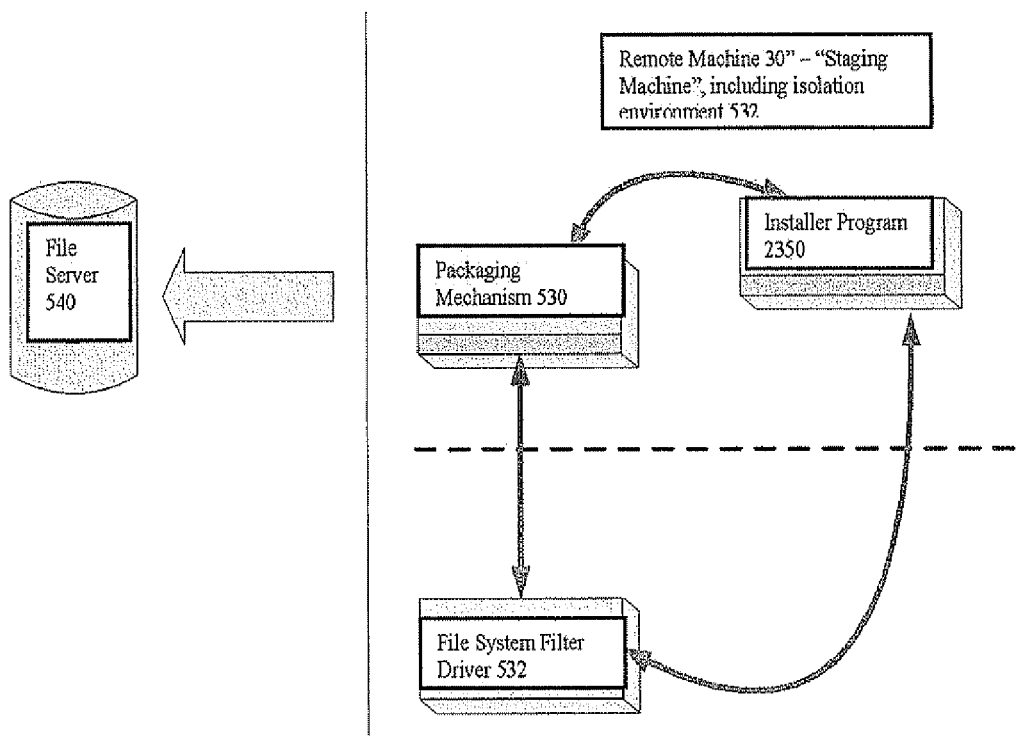
FIG. 23 is a block diagram depicts an embodiment of a system including a packaging mechanism executing an installer program into an isolation environment.

Referring ahead to FIG. 23, a block diagram depicts one embodiment of a system including a packaging mechanism 530 executing an installer program 2350 into an isolation environment 532 and a file system filter driver 534 in communication with the packaging mechanism 530 and the isolation environment 532.

In one embodiment, the packaging mechanism 530 generates a package (as described above in connection with FIG. 21) by installing an application program into an isolation environment 532. In another embodiment, the packaging mechanism 530 installs the application program into the isolation environment 532 by executing the installer program 2350. In some embodiments, the packaging mechanism 530 includes a graphical user interface. In one of these embodiments, the graphical user interface enables a user of the packaging mechanism 530 to customize the generation of a package by the packaging mechanism 530. In another of these embodiments the packaging mechanism 530 is in communication with a graphical user interface on the access control suite 520, enabling a user of the access control suite 520 to customize the generation of a package by the packaging mechanism 530.

In some embodiments, the file system filter driver 532 enables the installation of the application program in an isolation environment 532. In one of these embodiments, the file system filter driver 532 intercepts a request by the installer program 2350. In another of these embodiments, the file system filter driver 532 redirects the request by the installer program 2350 to the isolation environment 532. In still another of these embodiments, the file system filter driver 532 stores a record of the request made by the installer program 2350. In yet another of these embodiments, the file system filter driver 532 stores a copy of a file created or modified by the installer program 2350. In some embodiments, the stored records generated by the file system filter driver 532 are stored together as a plurality of application files comprising an application program. In other embodiments, the plurality of application files is stored on a file server 540.

Referring back to FIG. 21, a call by the installer program to at least one application programming interface (API) is intercepted, the call requiring performance of an action after a reboot of an operating system (step 2104). The action of the at least one intercepted call is executed without reboot of the operating system (step 2106). In some embodiments, execution of the action comprises installation of a driver configured to be started upon the boot of the computer system. In other embodiments, execution of the action comprises executing an action of a registry entry modified during installation.

An identification of a characteristic of the at least one application file is received (step 2108). In some embodiments, an identification of an operating system type is received. In other embodiments, an identification of a language used by operating system is received. In still other embodiments, an identification of a version of the second application is received.

Figure 22:
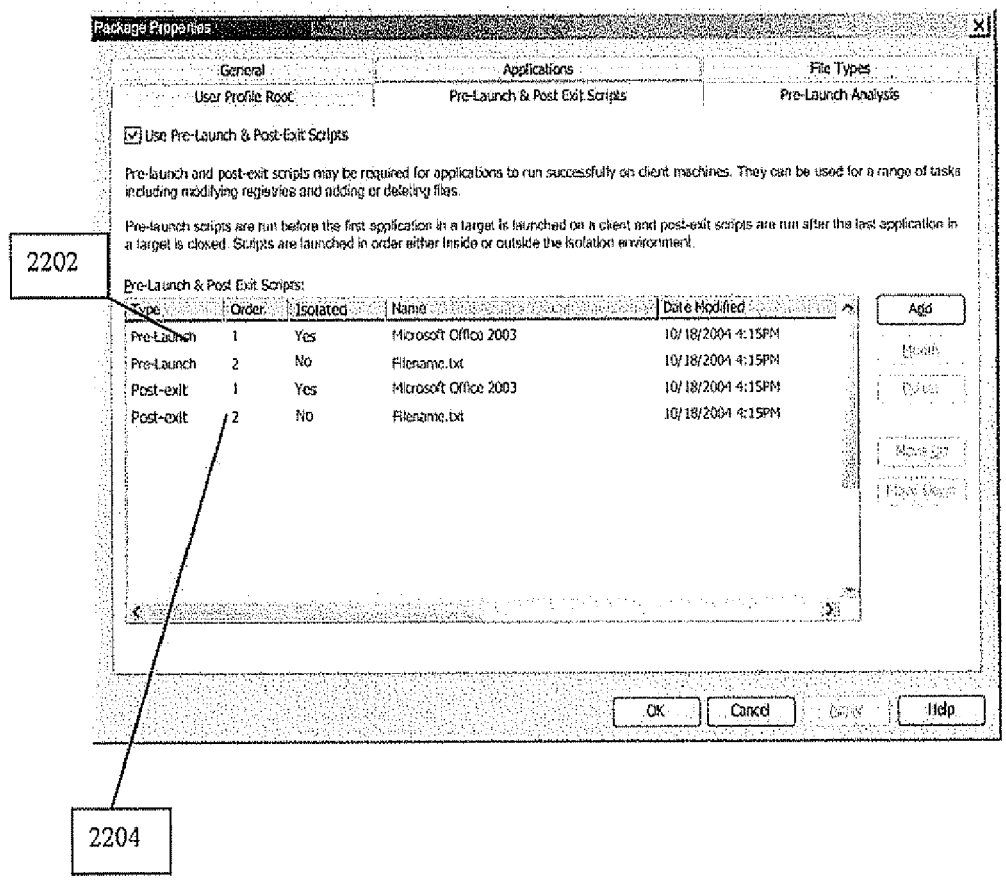
FIG. 22 is a screen shot depicting one embodiment of an enumeration of scripts to be executed on the local machine.

At least one execution pre-requisite is associated with the at least one installed application file, responsive to the identified characteristic (step 2110). In one embodiment, the at least one execution pre-requisite is associated with the at least one installed application file responsive to an application of a policy to the characteristic. In another embodiment, a script is associated with the at least one installed application file, the script comprising an executable program determining the existence of the at least one execution pre-requisite on a client. Referring ahead to FIG. 22, a screen shot depicts one embodiment of an enumeration of scripts to be executed on the local machine. A type of script 2202 indicates when the script should be executed, for example, either before the execution of the application, or after termination of execution of the application. An isolation indicator 24 indicates whether the script should be executed in an isolation environment on the local machine 10. As shown in FIG. 22, in some embodiments, the script was associated with the application program at the time the plurality of application files were packaged together and stored on the remote machine 30' hosting the plurality of application files.

In some embodiments, the at least one execution pre-requisite requires installation of a version of an operating system on a system executing the at least one installed application file. In other embodiments, the at least one execution pre-requisite requires installation of a version of the second application on a system executing the at least one installed application file. In still other embodiments, an instruction is associated with the at least one installed application file, the instruction indicating a second installed application file for use by a client failing to satisfy the at least one execution pre-requisite. In yet other embodiments, an instruction is associated with the at least one installed application file, the instruction indicating a second execution method for execution of the at least one installed application file on a client failing to satisfy the at least one execution pre-requisite. In one of these embodiments, an execution method is associated with the at least one installed application file, the execution method authorizing streaming of a plurality of application files comprising the second application to a local machine for execution on the local machine. In another of these embodiments, an evaluation of a local machine identifies at least one characteristic associated with the at least one installed application file not included on the local machine. In still another of these embodiments, authorization for execution of the plurality of application files is revoked. In yet another of these embodiments, a second execution method is provided for executing the plurality of application files, the second execution method enabling execution of the plurality of application files on a remote machine and transmission of application output data from the remote machine to the local machine.

The at least one installed application file is stored on at least one server (step 2112). In some embodiments, the installed application program is executed within the isolation environment prior to storing the at least one installed application file on at least one server. In one of these embodiments, an additional application file is generated responsive to the execution of the installed application program. In another of these embodiments, a data file is generated. In still another of these embodiments, the installed application program requires information to complete installation, the information being required after an initial installation process. In yet another of these embodiments, information such as software product identifiers, license identifiers, or other credentials is required.

In some embodiments, an identifier is provided identifying a location of the at least one installed application file on the at least one server. In one of these embodiments, the identifier conforms to a Universal Naming Convention (UNC). In other embodiments, the at least one installed application file is placed in an archive file, such as a .CAB file. In one of these embodiments, a plurality of application files are stored in an archive file and the archive file is stored on the at least one server. In still another of these embodiments, the at least one installed application file is stored on multiple servers. In still other embodiments, the at least one installed application file is placed in a directory storing application files.

An enumeration is generated of the second application, the at least one installed application file, a location of the at least one server, and the at least one execution pre-requisite (step 2114). In some embodiments, the enumeration is stored in a file. In other embodiments, the enumeration is stored in a manifest file. In still other embodiments, the enumeration is stored in an XML file.

In one embodiment, an enumeration is generated of multiple applications, a plurality of installed application files associated with each of the multiple application, and a location of at least one server storing the plurality of installed application files. In another embodiment, a enumeration is generated including an association between the second application and a plurality of installed application files. In still another embodiment, an enumeration is generated including an association between the second application and a compressed file containing the at least one installed application file Referring back to step 2106, where an action of the at least one intercepted call is executed without reboot of the operating system, in some embodiments, a virtualized installation and execution environment is provided that removes the requirement of rebooting the system before executing an installed application.

Figure 24:
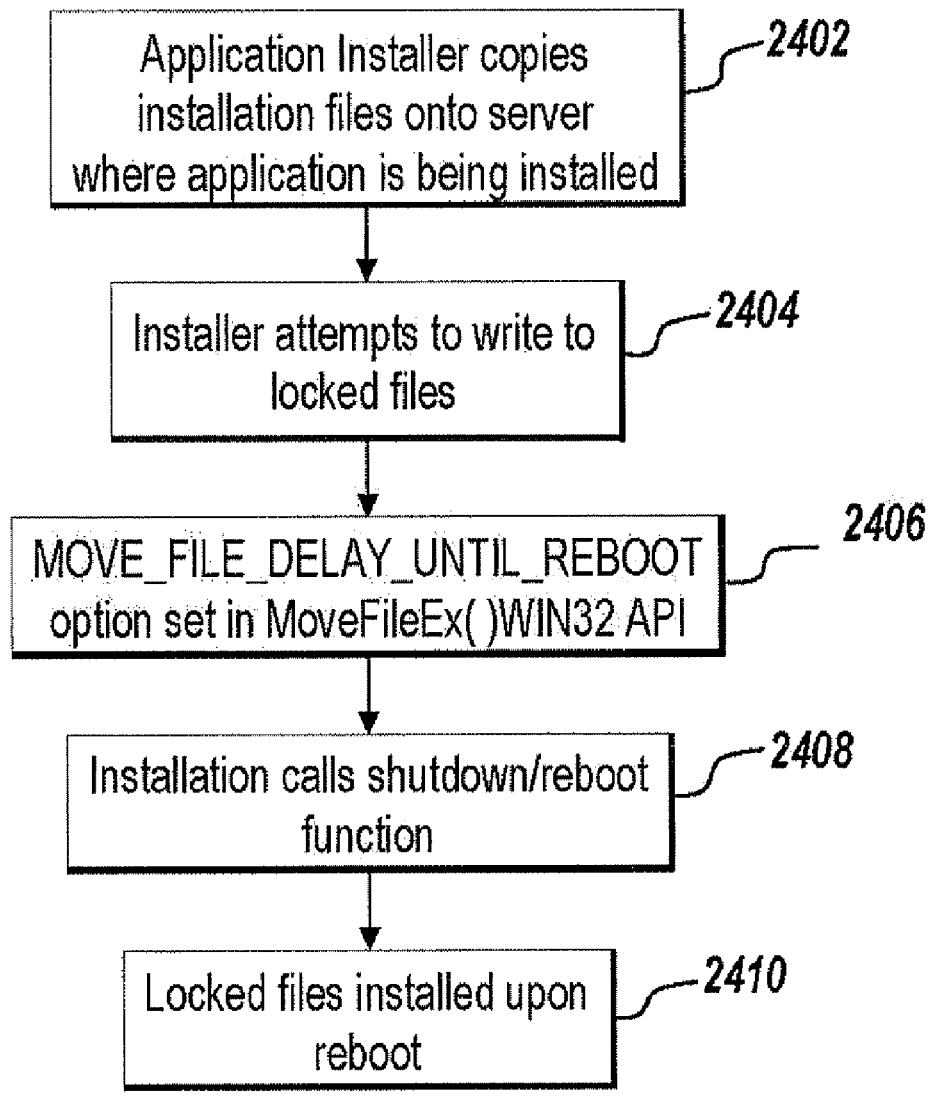
FIG. 24 is a flow chart depicting one embodiment of the steps taken in an environment in which execution of an installer program requires rebooting an operating system.

Referring now to FIG. 24, a flow chart depicts an embodiment in which execution of an installer program requires rebooting of an operating system on a local machine on which the installer program executes. A conventional application installer copies files onto a remote machine where the application is being installed (step 2402). In some embodiments, copying the files may cause a reboot of the remote machine. The application installer attempts to copy at least one of the files to locked files (step 2404). In one embodiment, a locked file may only be written to when an operating system is executed (or "rebooted"). The MOVE_FILE_DELAY_UN-TIL_REBOOT option is set in the MoveFileEx( )Win32 API (step 2406), and the application installer calls system shut-down/reboot function (step 2408). Following a reboot, the originally locked files are then installed upon reboot (step 2410).

Figure 25:
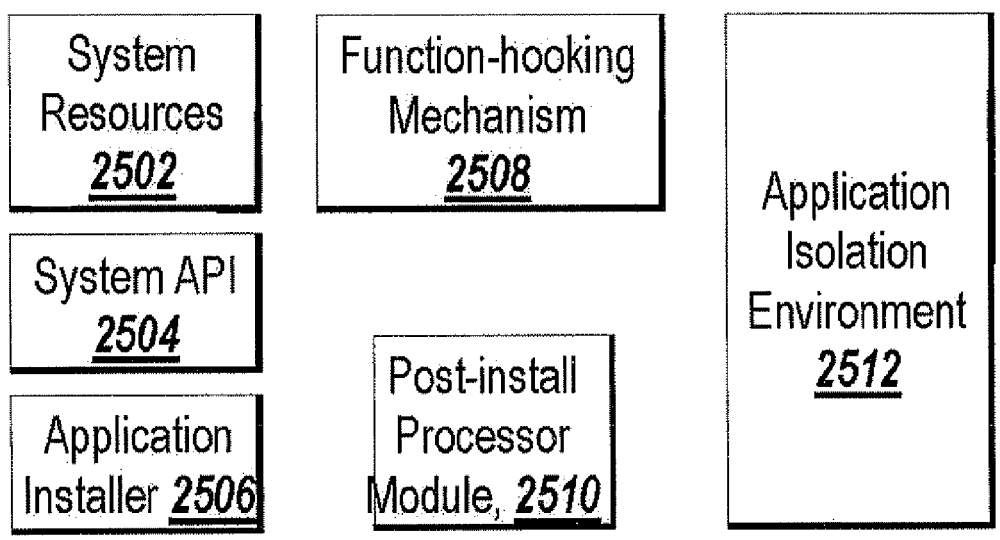
FIG. 25 is a block diagram depicting one embodiment of a remote machine onto which a packaging mechanism installs an application program.

Referring now to FIG. 25, a block diagram depicts one embodiment of a remote machine 30 onto which a packaging mechanism installs an application program. The remote machine 30 includes system resources 2502, system APIs 2504 and an application installer 2506 used to install an application. The remote machine 30 also includes a function-hooking mechanism 2508, a post-install processor module 2510 and an application isolation environment 2512. In some embodiments, installing an application program into an isolation environment 2512 enables installation without reboot of the remote machine 30. In one of these embodiments, a change made to a system resource 2502 virtualized in an isolation environment 2512 does not change a corresponding system resource 2502 on the remote machine 30. Since the system resource on the remote machine 30 is not changed, rebooting the machine to protect the system resource from inappropriate changes is not required.

Referring now to FIG. 25, and in greater detail, the system resources 2502 may include registry entries, system DLLs, and other locked files that the operating system prevents from being written to while the remote machine 30 is executing. The system APIs 2504 include APIs used to reboot the system that are called by the application installer 2506 and hooked by the function-hooking mechanism 2508 to prevent the rebooting of the remote machine 30.

The application isolation environment 2512 provides an environment with a view of operating system resources to an application installer 2506. In one embodiment, the application isolation environment 2512 is an isolation environment 556. In some embodiments, the application isolation environment 2512 provides virtualization of operating system resources such as the file system, registry and named objects. In one embodiment, the application installer 2506 executes within the application isolation environment 2512. In another embodiment, the application installer 2506 installs the application program into the application isolation environment

2512. In still another embodiment, the application installer 2506 executes outside the application isolation environment 2512 and installs the application program inside the application isolation environment 2512.

In some embodiments, the application isolation environment 2512 circumvents the requirement for rebooting the remote machine 30 when the application installer 2506 installs an application into the application isolation environment 2512. In one embodiment, the application isolation environment 2512 intercepts a request to copy an application file to a locked file. In another embodiment, the application isolation environment 2512 redirects the request to copy the application file to an unlocked file. In still another embodiment, the application isolation environment 2512 redirects the request to copy the application file to a virtualized file. In yet another embodiment, redirecting the request to copy the application file enables installation of application files without requiring a reboot of the remote machine 30. As an example, if an application installer 2506 attempts to write to a locked file, such as c:\windows\system32\mfc40.dll, the application isolation environment 2512 intercepts the request and redirect the file to another, unlocked, location. This ability to avoid locked files means the file can be installed without having to make use of the MoveFileEx( ) API and MOVE_FILE_DELAY_UNTIL_REBOOT flag. This ability in removes the need for a reboot of the remote machine 30.

In one embodiment, the function-hooking mechanism 2508 is a file system filter driver 564. In another embodiment, a file system filter driver 564 includes the function-hooking mechanism 2508. In still another embodiment, the function-hooking mechanism 2508 intercepts requests from the application installer 2506 to restart the remote machine 30. In some embodiments, the application isolation environment 2512 provides for copying of application files to unlocked files. However, the application isolation environment 2512 does not address a request by the application installer 2506 for reboot of the remote machine 30. The function-hooking mechanism 2508 intercepts the request for reboot and responds to the application installer 2506.

The application isolation environment 2512 enables copying of application files to unlocked files. However, in some embodiments, other actions are required for installation of an application, and these actions may occur upon the reboot. Preventing the reboot does not prevent the need to complete these actions in the installation process. The function-hooking mechanism 2508 may provide functionality for carrying out an action associated with an installation of an application For example, during the installation of an application, registry entries such as HKLM\SYSTEM\CurrentControlSet\Control\Session_Manager\Pending-FileRenameOperations may be written. Other applications may install services or drivers which need to be started upon boot of a machine. The Post Install Processor Module 2510 identifies application files that have been modified during installation, and carries out the actions associated with the application files.

Figure 26:
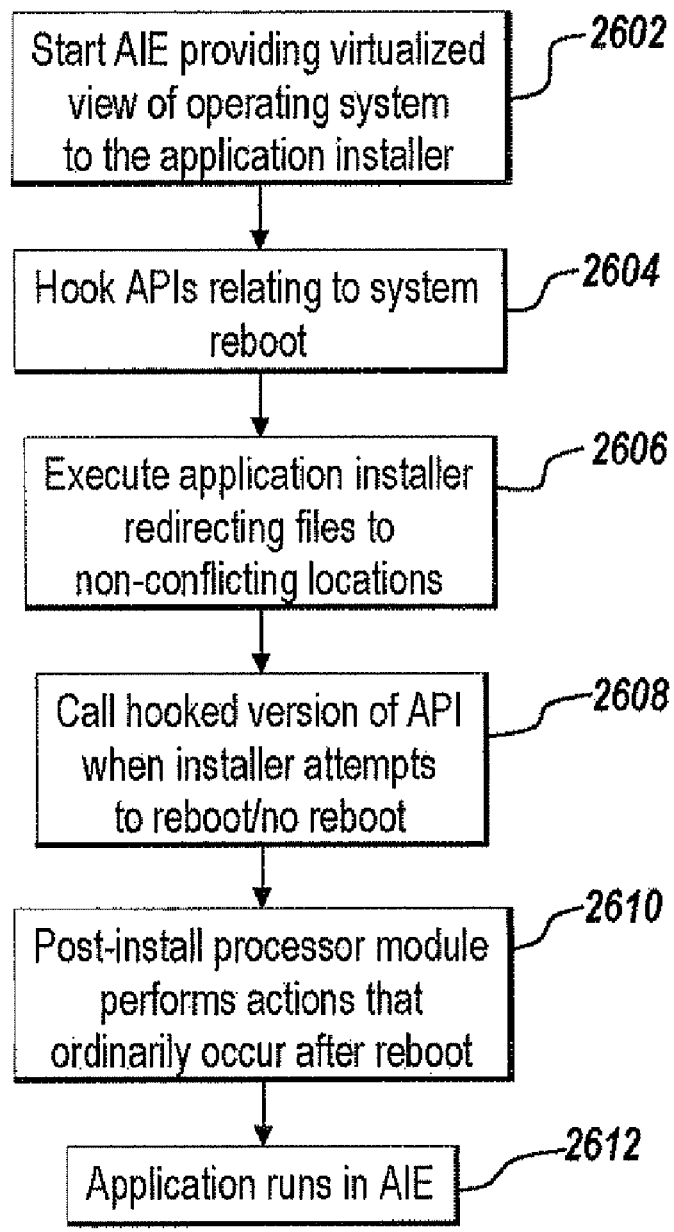
FIG. 26 is a flow diagram depicting one embodiment of the steps taken to install an application in an application isolation environment.

Referring now to FIG. 26, a flow diagram depicts one embodiment of the steps followed to install an application in an application isolation environment 2512. The application isolation environment 2512 provides a virtualized view of the server operating system to the application installer (step 2602). The APIs on the server relating to system reboots and shutdowns are hooked (step 2604) to prevent the application installer 2506 from causing a reboot. The application installer 2506 requests file-copying operations to locked files, the request being intercepted and redirected to non-conflicting locations (step 2606). When the application installer 2506 attempts to reboot by calling a system API, the request is intercepted and the reboot is prevented (step 2608). The post-install processor module 2510 performs actions that ordinarily occur after reboot (step 2610) and the application may then be executed in the application isolation environment 2512 without reboot of a remote machine 30 (step 2612).

In some embodiments, following installation of the application program into the application isolation environment 2512, a packaging mechanism identifies a plurality of application files created or modified during installation of an application program. In one of these embodiments, the plurality of application files are stored on a remote machine. In another of these embodiments, a local machine retrieving the plurality of application files may execute the application program.

In some embodiments, the packaging mechanism 530 executes on a remote machine including an isolation environment 532 and a file system filter driver 534 and installs an application program into the isolation environment 532. In one of these embodiments, the remote machine is referred to as a "clean machine" or a "staging machine." In another of these embodiments, the isolation environment 532 includes an application isolation scope providing a modifiable, virtualized instance of a native resource provided by an operating system on the clean machine. In still another of these embodiments, the isolation environment 532 includes a system isolation scope providing a read-only view of the native resource. In yet another of these embodiments, the read-only view of the native resource comprises a snapshot of a file system and registry residing on the clean machine.

In one embodiment, a redirector intercepts a request for a change to the native resource. In some embodiments, the redirector is a file system filter driver 534. In another embodiment, an installer program executed by the packaging mechanism 530 makes the request for the change. In still another embodiment, the change to the native resource is required to install an application program on to the clean machine. In yet another embodiment, the redirector redirects the request to the isolation environment 532.

In some embodiments, redirecting requests to change native resources to the isolation environment 532 results in isolation of changes associated with installation of an application program. In other embodiments, the requests to change native resources are recorded and stored in a storage element. In one of these embodiments, all changes associated with installation of an application program reside in the storage element. In another of these embodiments, a local machine 552 retrieving the contents of the storage element and implementing the changes to native resources residing in an isolation environment 556 on the local machine 552 result in installation of the application program on the local machine 552.

In some embodiments, a pre-launch analysis of the local machine 10 may be required. In one of these embodiments, the local machine 10 verifies that at least one characteristic is included in the local machine 10. In another of these embodiments, the at least one characteristic is added to the local machine 10 after the pre-launch analysis determines that the local machine 10 lacks the at least one characteristic. In still another of these embodiments, the at least one characteristic is included in a remote machine hosting an application program and failure of the local machine to include the at least one characteristic will prevent execution of the application program. In yet another embodiment, the application program requires existence of the at least one characteristic on the local machine for execution.

In some embodiments, the packaging mechanism enables identification of at least one characteristic for use in a pre-launch analysis on the local machine. In other embodiments, the packaging mechanism enables association of at least one characteristic with an application program available for execution on the local machine. In still other embodiments, the packaging mechanism enables association of an executable script with an application program, the local machine executing the executable script to complete the pre-launch analysis. In yet other embodiments, the at least one characteristic is required to exist on the local machine after the execution of the application program.

The packaging mechanism may provide functionality for signing a plurality of application files. In one embodiment, signing the plurality of application files enables a local machine to verify integrity of the plurality of application files. In another embodiment, signing the plurality of application files prevents a local machine from executing a corrupted application program. In some embodiments, a cryptographic checksum, such as an MD4 hash, an MD5 hash, or a SHA-1 hash, of a file in the plurality of application files is computed.

In other embodiments, a cryptographic checksum of every file in the plurality of application files is computed. In one of these embodiments, the cryptographic checksum is stored in a second file. In another of these embodiments, the second file is associated with the plurality of application files. In some embodiments, the second file is added to the plurality of application files. In other embodiments, the second file is signed using a certificate, such as an X.509 certificate. In still other embodiments, a local machine retrieving the plurality of application files verifies the signature using a public portion of the certificate. In yet other embodiments, the local machine receives the public portion of the certificate and an identification of a certificate trust list for verification of the signature. In one of these embodiments, local machine receives a registry key containing the identification of a certificate trust list.

In one embodiment, the packaging mechanism provides functionality for customizing an isolation environment. In another embodiment, the packaging mechanism provides functionality for generating a file storing a definition of an isolation environment. In still another embodiment, the packaging mechanism includes the file with the plurality of application files comprising an application program. In yet another embodiment, a local machine receives the file with access information from a remote machine.

In some embodiments, a plurality of application files are stored in an archive file. In one of these embodiments, the archive file is in a CAB file format. In another of these embodiments, the archive file format does not provide support for specification by an application program of a short file names of a file. In still another of these embodiments, an operating system, such as WINDOWS 2000 may not provide support for specification by an application program of a short file names of a file. In other embodiments, an operating system, such as WINDOWS XP, provides support for specification by an application program of a short file name of a file. In one of these embodiments, a request to execute the file must include the correct short file name of the file.

In one embodiment, a mapping may be generated to associate a long file name of a file in the plurality of application files with a short name of the file. In another embodiment, the mapping is stored in a file in the plurality of application files. In still another embodiment, a file has a short file name only if the long file name of the file is longer than twelve characters. In some embodiments, the short file name is a virtual file name associated with the file. In one of these embodiments, the file is transmitted to a local machine 10 for execution where it is stored with a long file name. In another of these embodiments, an application file on the local machine 10 requests execution of the file using the short file name. In still another of these embodiments, the mapping enables execution of the file although the request for execution of the file did not use the name of the file on the local machine (the long file name).

In some embodiments, the packager mechanism 530 generates the mapping. In one of these embodiments, the packager mechanism 530 selects a short file name for a file having a long file name. In another of these embodiments, an operating system on the remote machine 30' on which the packager mechanism 530 is executing selects a short file name for a file having a long file name. In still another of these embodiments, a unique short file name is selected that does not conflict with a second short file name on the remote machine 30'. In yet another of these embodiments, the installer program executed by the packager mechanism 530 generates a file including a mapping between a long file name with a short file name. In other embodiments, the mapping is transmitted to a local machine 10 retrieving the file. In one of these embodiments, the local machine 10 refers to the file when executing the file.

The following illustrative examples show how the methods and systems discussed above can be used for selecting, streaming to a local machine, and executing on the local machine a plurality of files comprising an application program. These examples are meant to illustrate and not to limit.

Example 1

In one embodiment, a user of a local machine 10 requests access to an application program, such as a word processing program, a web browsing application, or a spreadsheet program, identified in an enumeration of application programs. In one example of this embodiment, the local machine 10 executes a program neighborhood application that receives from a remote machine 30 an enumeration of applications available to the local machine 10. In another example of this embodiment, the local machine 10 communicates with a web server, such as remote machine 30''', to receive the enumeration of applications. The user of the local machine 10 may request access to an enumerated application program by selecting a graphical depiction representing the enumerated application program. The user of the local machine 10 may request access to an application program not previously installed on the local machine 10.

The local machine 10 transmits the request to access the application program to a remote machine 30. The local machine 10 receives an identification of a remote machine 30" providing access to a plurality of application files comprising the application program. The local machine 10 identifies at least one characteristic required for execution of the application program. In one example of this embodiment, the local machine 10 receives the at least one characteristic with the identification of the remote machine 30" transmitted to the local machine 10 by the remote machine 30. In another example of this embodiment, the local machine 10 retrieves the at least one characteristic from the remote machine 30" after receiving the identification of the remote machine 30". The local machine 10 may be required to comprise the at least one characteristic prior to receiving authorization to retrieve the plurality of application files. Alternatively, the local machine 10 may be required to comprise the at least one characteristic prior to executing the plurality of application files. In one example of this embodiment, the local machine 10 may be required to comprise the at least one characteristic throughout the execution of the plurality of application files.

Upon verification by the local machine 10 that the local machine 10 includes the at least one characteristic, the local machine 10 retrieves a least one application file in the plurality of application files and executes the retrieved application file to execute the application program.

Example 2

A remote machine 30 receives a request to access an application program from a local machine 10. The remote machine 30 authenticates the local machine 10. In one example of this embodiment, the remote machine 30 requests credentials, such as a user name and password, from the local machine 10. In another example of this embodiment, the remote machine 30 transmits a collection agent 404 to the local machine 10. The collection agent 404 gathers information about the local machine 10 and transmits the information to the remote machine 30 for use in authenticating the local machine 10. In still another example of this embodiment, the remote machine 30 provides information about the local machine 10 to a policy engine 406 for authentication of the local machine 10. The remote machine 30 may comprise the policy engine 406. Alternatively, the remote machine 30 may be in communication with a remote machine 30' comprising the policy engine 406.

The remote machine 30 selects a method of execution of the application program. The remote machine 30 may make the selection responsive to the authentication of the local machine 10. In one example of this embodiment, the remote machine 30 applies a policy to information gathered about the local machine 10. In another example of this embodiment, the remote machine 30 makes the selection responsive to a policy applied to the application program. In still another example of this embodiment, the remote machine 30 makes the selection responsive to a policy applied to a file type associated with the application program. The remote machine 30 may consult a file to make the selection of the method of execution of the application program.

The remote machine 30 may select a method of execution of the application program enabling the local machine 10 to receive application-output data generated by execution of the application program on a remote machine 30'. The remote machine 30 may select a method of execution of the application program enabling the local machine 10 to execute the application program locally after retrieving a plurality of application files comprising the application program.

In one embodiment, the remote machine 30 selects a method of execution of the application program enabling the local machine 10 to execute the application program locally while retrieving a plurality of application files comprising the application program across an application streaming session. In one example of this embodiment, the local machine 10 establishes an application streaming session with a remote machine hosting a plurality of application files, the local machine 10 initiates retrieval of the plurality of application files across the application streaming session, and the local machine 10 executes a retrieved first application file in the plurality of application files while retrieving a second application file in the plurality of application files. In another example of this embodiment, the local machine 10 executes a first application file in the plurality of application files and retrieves a second application file in the plurality of applications upon receiving a request from the first application file for access to the second application file.

For embodiments in which the selected method of execution enables the local machine 10 to retrieve at least one application file in a plurality of application files comprising an application program, the remote machine 30 identifies a remote machine 30" hosting the application program available for access by the local machine 10. The remote machine 30" hosts a plurality of application files comprising the application program. The remote machine 30" may host multiple pluralities of application files comprising various application programs. In one example of this embodiment, the remote machine 30" hosts a plurality of application files for each of several different versions of an application program.

The remote machine 30" hosts a file associating a plurality of application files comprising a particular application program with a description of the application program. The file may also identify one or more execution pre-requisites to be identified on a machine prior to the transmission of the plurality of application files to the machine. The file may further include an identification of a location on a network of the remote machine 30". In one example of this embodiment, the remote machine 30 consults the file to identify the location on the network of the remote machine 30".

The remote machine 30 selects a remote machine 30". The remote machine 30 may select a remote machine 30" having a location on a network accessible to the local machine 10. The remote machine 30 may select a remote machine 30" hosting a version of the application program compatible with the local machine 10. The remote machine 30 transmits an identification of the selected method of execution of the application program and an identification of the remote machine 30" to the local machine 10 in response to receiving the request for access to the application program. The remote machine 30 may also transmit the file to the local machine 10.

Example 3

In one embodiment, the local machine 10 receives an identification of a selected method of execution of an application program and an identification of a remote machine 30" providing access to a plurality of application files comprising the application program. The local machine 10 verifies authorization of access to the application program. In one example of this embodiment, the local machine 10 performs a pre-launch analysis of itself. The local machine 10 identifies at least one characteristic and verifies the existence of the at least one characteristic on the local machine 10. The at least one characteristic may be a pre-requisite to maintaining authorization to access and execute the application program. Verifying the existence of the at least one characteristic on the local machine 10 may ensure compatibility between characteristics of the local machine 10 and the system requirements of the application program, and may additionally ensure compliance with security policies or licensing agreements.

Upon successful completion of a pre-launch analysis, the local machine 10 establishes an application streaming session with the remote machine 30" providing access to the plurality of application files. The application streaming session may be any connection over which the local machine 10 may request and receive a file in the plurality of application files. Establishment of the application streaming session may enable the local machine 10 to execute a first application file in the plurality of application files prior to retrieval of all files in the plurality of application files. The local machine 10 may initiate execution of the application program while continuing retrieval of additional application files in the plurality of application files. Alternatively, the local machine 10 may retrieve the plurality of application files in an archive file and execute a first extracted application file while extracting a second application file from the archive file.

Example 4

In one embodiment, an application streaming client 552 on a local machine 10 retrieves a plurality of application files from a remote machine 30. The application streaming client includes a streaming service 554, an isolation environment 556, and a file system filter driver 564. The streaming service 554 establishes an application streaming session with the remote machine 30 for requesting and retrieving the plurality of application files. The streaming service 554 executes the application files within the isolation environment 556. The file system filter driver 564 enables execution of application files within the isolation environment 556 by intercepting requests from the execution application files and redirecting the requests to the isolation environment 556.

In one example of this embodiment, the streaming service 554 retrieves an archive file including the plurality of application files comprising an application program. The streaming service 554 extracts from the archive file a first application file from the plurality of application files. The first application file may be an executable file. The streaming service 554 may execute the first application file within the isolation environment 556. Execution of the first application file may initiate execution of the application program.

In another embodiment, a first application file executing within the isolation environment 556 requests from the local machine 10 an enumeration of the plurality of application files. The file system filter driver 564 intercepts the request for the enumeration and redirects the request to the streaming service 554. In embodiments where the streaming service 554 retrieved the plurality of application files, the streaming service 554 may generate an enumeration of the plurality of application files. In embodiments where the streaming service 554 retrieved an archive file including the plurality of application files, the streaming service 554 may generate the enumeration of the plurality of application files responsive to an enumeration included in the retrieved archive file. In other embodiments, the streaming service 554 retrieves only the enumeration of the plurality of application files while at least one application file in the plurality of application files resides on a remote machine 30 and has not yet been retrieved to the local machine 10 by the streaming service 554. In these embodiments, the streaming service 554 may generate an enumeration of the plurality of application files responsive to the retrieved enumeration. In one example of these embodiments, the streaming service 554 indicates to the first application file that the plurality of application files resides on the local machine 10, although only the enumeration resides on the local machine 10.

Example 5

In one embodiment, a first application file executing within the isolation environment 556 requests from the local machine 10 access to a file identified by the enumeration of the plurality of application files. If the requested file resides in a user scope within the isolation environment 556 accessible to the first application file, the first application file accesses the requested file.

If the requested file does not reside in the user scope or in the isolation environment 556, the file system filter driver 564 intercepts the request and redirects the request to the streaming service 554. If the requested file is a file within the archive file containing the plurality of application files, the streaming service 554 extracts the requested file and stores the requested file on the local machine 10. The streaming service 554 may store the file within the isolation environment 556. The request for the file is satisfied when the file is stored in the isolation environment 556.

If the requested file does not reside in the isolation environment 556 or in the archive file including the plurality of application files, the streaming service 554 requests the file from the remote machine 30. The streaming service 554 may receive the file from the remote machine 30 across an application streaming session. The streaming service 554 stores the received file in the isolation environment 556. The request for the file is satisfied when the file is stored in the isolation environment 556.

In one example of this embodiment, a second application file executes in a second user scope in the isolation environment 556. The second application file requests access to the file originally requested by the first application file. If a copy of the requested file does not reside in the second user scope, the copy of the requested file stored in the isolation environment 556 is used to satisfy the request for the application file.

Example 6

In one embodiment, a local machine 10 receives from a remote machine 30 an identification of a selected method of execution of an application program and an identification of a remote machine 30' providing access to a plurality of application files comprising the application program. The local machine 10 successfully completes a pre-launch analysis of the local machine 10. The local machine 10 receives a license from the remote machine 30 authorizing execution of the application program. In one example of this embodiment, the license requires the local machine 10 to transmit heartbeat messages to a session management server 562 to maintain authorization to execute the application program. Heartbeat messages may include messages indicating initiation of execution of an application program, termination of execution of an application program, and messages sent on a periodic basis throughout the execution of the application program. Heartbeat messages may also include messages about the status of the local machine 10, such as when the local machine 10 connects to a network or when the local machine 10 terminates a connection to a network. In another example of this embodiment, the license specifies a pre-determined period of time during which the local machine 10 has authorization to execute the application program.

The local machine 10 establishes an application streaming session with the remote machine 30' and retrieves at least one of the application files in the plurality of application files. During execution of the at least one application file, in embodiments where the received license requires transmission of heartbeat messages, the local machine 10 sends heartbeat messages to the session management server 562 to maintain authorization to execute the at least one application file.

Example 7

In one embodiment, the local machine 10 receives an identification of a selected method of execution of an application program and an identification of a remote machine 30' providing access to a plurality of application files comprising the application program. The local machine 10 successfully completes a pre-launch analysis of the local machine 10. The local machine 10 receives a license specifying a pre-determined period of time during which the local machine 10 has authorization to execute the application program.

The local machine 10 establishes an application streaming session with the remote machine 30' and retrieves at least one of the application files in the plurality of application files. In one example of this embodiment, the local machine 10 retrieves a subset of the plurality of application files, the subset comprising each file necessary to execute the application program when the local machine 10 is not connected to a network. The local machine 10 stores the subset in a cache on the local machine 10.

At a point in time within the pre-determined period of time, the local machine 10 is disconnected from a network and receives from a user of the local machine 10 a request for access to the application program. In one example of this embodiment, the local machine 10 is a device such as a laptop and the user of the local machine 10 is in an environment prohibiting connections to networks, such as an airplane. Upon receiving the request from the user, the local machine 10 may retrieve from the cache an application file from the plurality of application files and execute the application program.

Example 8

In another embodiment, the local machine 10 receives an identification of a selected method of execution of an application program and an identification of a remote machine 30' providing access to a plurality of application files comprising the application program. The local machine 10 may receive an identification of a first client agent residing on the local machine 10 to execute to retrieve the plurality of application files, such as an application streaming client.

In one example of this embodiment, the local machine 10 fails to successfully complete a pre-launch analysis of itself. The local machine 10 may lack a characteristic required for compatibility with a requirement of the application program, such as a particular device driver or operating system. The local machine 10 may lack a characteristic required for compliance with a security policy, for example, membership in a particular Active Directory or authorization for access to a private network. The local machine 10 may be a type of machine incompatible with a requirement of the application program, such as a personal digital assistant attempting to access a computationally intensive application program, or a public machine at a kiosk attempting to execute a secure application hosted by a remote machine on a private network. The local machine 10 makes a determination not to retrieve the plurality of application files across the application streaming session, responsive to the determination that the local machine 10 lacks the at least one characteristic required for access to the application program. The local machine 10 executes a second client agent residing on the local machine 10 instead of executing the identified first client agent. In one example of this embodiment, the local machine 10 receives an identification of the second client agent to execute in the event of failure to successfully complete the pre-launch analysis. The local machine 10 requests execution of the application program on a remote machine 30". The second client agent receives application-output data generated by the execution of the application program on the remote machine 30". The second client agent displays the application-output data on the local machine 10.

Example 9

In one embodiment, an administrator of a network provides access to an application program for users of local machines 10. The administrator executes an application on a remote machine 30' to generate a plurality of application files comprising the application program. The application may include a graphical user interface. The administrator may use the graphical user interface to identify the application program and an installer program associated with the application program, define policies to be applied in authorizing access to the application program, and specify characteristics about the type of access provided, including requirements to be satisfied by a local machine 10 attempting to access or execute the application program. The administrator may identify an installer program installing an entire application program, or a portion of an application program, such as an upgrade or patch.

In one example of this embodiment, a remote machine 30 includes a packaging mechanism 530. The packaging mechanism 530 executes the installer program within an isolation environment 532 on the remote machine 30. Execution of the installer program results in installation, into the isolation environment 532, of at least one application file associated with the application program. The remote machine 30 may include a file system filter driver 534, which ensures the installation of the application file into the isolation environment 532 by intercepting a request by the installer program to install the application file on the local machine 10, and redirecting the request to the isolation environment 532. The packaging mechanism 530 may use the file system filter driver 534 to maintain a record of each application file installed into the isolation environment 532.

The installer program may install a plurality of application files into the isolation environment 532. The packaging mechanism 530 generates a file including an enumeration of application files in the plurality of application files. The file may include information associated with the plurality of application files, such as the type of application program the plurality of application files comprise, the version of the application program, execution pre-requisites associated with the application program, and policy requirements, such as a method of execution required for a particular application program. The packaging mechanism 530 stores on a remote machine 30' the plurality of application files and the file.

In one embodiment, the administrator of the network identifies an application program comprising an updated version of an existing application program or application file in a plurality of application files comprising an application program.

C. Systems and Methods for Controlling Access to Resources by a Client

In another embodiment, the systems and methods described herein provide for containing and controlling the distribution of a computing environment from a server, such as data files and applications having valuable or confidential information or otherwise information embodying intellectual property. By creating a mechanism to control the viewing, editing and storing of content files at the client device, secure online access to documents is enabled that helps prevent unwanted disclosure of confidential information. This technique may also be referred to as a "Live Edit" capability. Rule-based policies may be implemented to prevent the storage of content files on the client device thereby preventing copies of stored content files from being accidentally left on the client device. The rule-based policies may also be used to prevent or modify the type of content accessible to the user in addition to limiting the manipulation of the content at the client device. These systems and methods also allow the tailoring of an appropriate level of output from a server to a requesting client.

Also, the embodiments of the systems and methods described herein provides for securely accessing at a client device content from a server without using the non-volatile memory of the client device. Bypassing non-volatile memory lessens the security risk of unauthorized viewing, editing or acquisition of the server-originated content. A transport mechanism is initiated on a client device and creates a document container on the client device. Documents from the server are mapped into the document container and saved in volatile memory allocated to the document container. Substitute menus are generated within the container to replace the usual menus of the applications used to access and/or edit the content files. User documents are saved directly to the originating server via the substitute menus. The downloaded content in volatile memory automatically delete when the document container is destroyed thereby reducing security concerns regarding unauthorized viewing of the content at the client device.

An embodiment of these systems and methods allows the distribution of content files from a server to a client for viewing or editing locally that controls the ability of a user at the client to edit and save the content locally. By bypassing non-volatile memory on the client device in favor of volatile memory assigned to an instantiated document container object, the risk of extra copies of the content being saved on the client device is greatly lessened. Additionally, the ability to perform menu substitution for the client-side applications executing within the instantiated document container allows control over the editing process. To increase security, the content distribution system can also employ a filtering process at a proxy server or appliance to apply a rules-based filter to content requests prior to delivering the content to the document container on the client device.

Figure 27A:
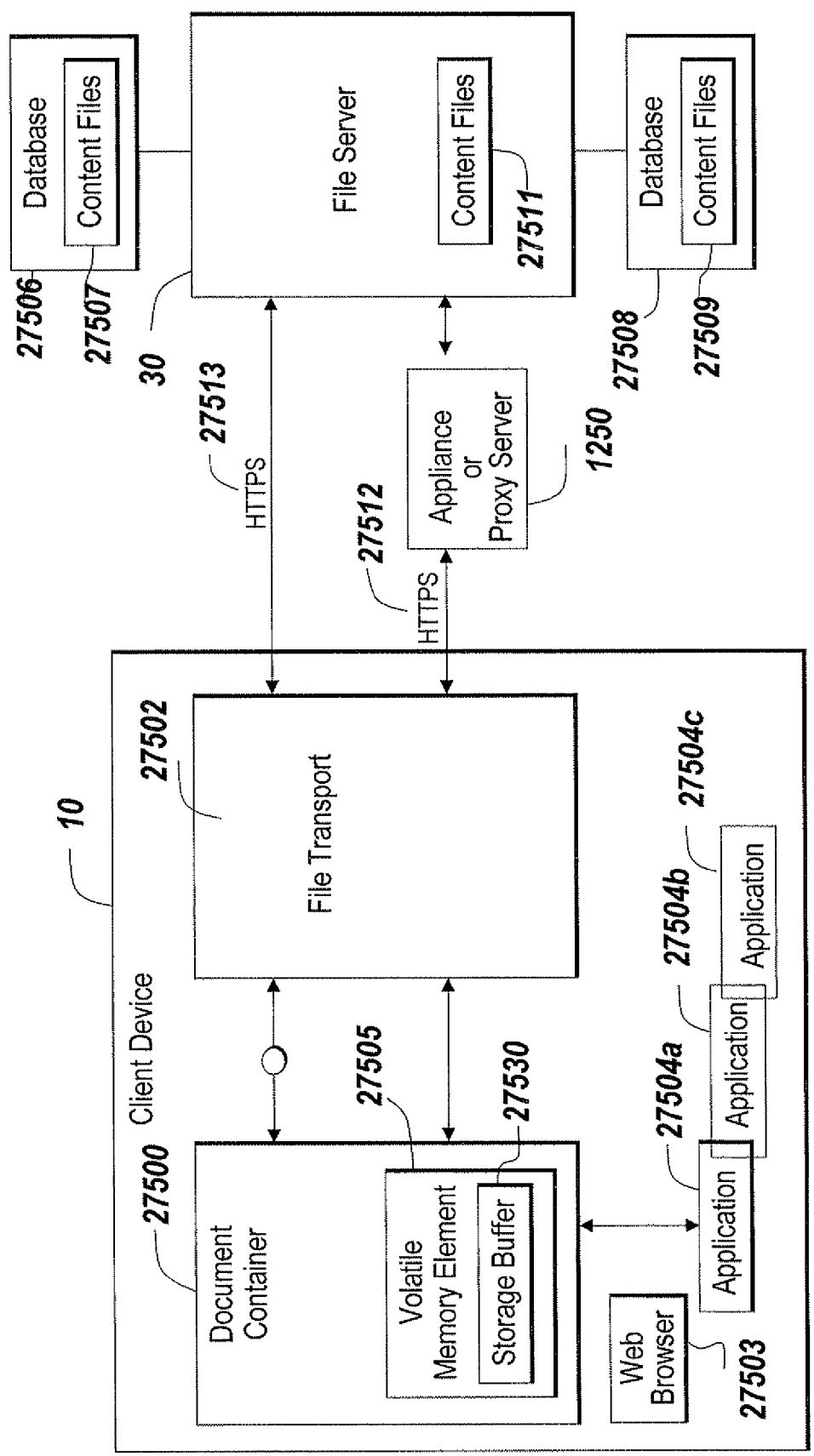
FIG. 27A is a block diagram of an embodiment of an environment suitable for practicing controlling access to a resource.

Referring now to FIG. 27A, a block diagram of an environment suitable for practicing these techniques is depicted. A client device 10 includes a web browser 27503 and application programs 27504a, 27504b . . . 27504n. A file server 30 includes content files 27511 and may be connected to databases 27506 and 27508 holding additional content files 27507 and 27509 respectively. Those skilled in the art will recognize that other network storage devices or document repositories holding content files may also be networked to the file server 27510 without departing from the scope of the present invention. A user of the client device 10 may request content from the file server 30 using the web browser 27503 to send a request such as the depicted Hypertext Transport Protocol Secure (HTTPS) request 27513, or an HTTP (Hypertext Transport Protocol) or FTP (File Transport Protocol) request. The selection of the resource causes the creation of a transport mechanism such as an Active X transport control 27502 on the client device 10. In one embodiment, an Active X control is a specialized COM (Component Object Model) object that implements a set of interfaces that enable it to look and act like a control. In another embodiment, the transport mechanism may be a dynamically linked library (.dll).

The transport control 502 creates an instance of a document container 27500 on the client device such as an Active X document container. The Active X document container 27500 is a window hosting the Active X transport control 27502 which is used to retrieve the requested content 27507, 27509, and 27511 from the file server 27510. Those skilled in the art will recognize that other types of containers, such as a JAVA-based container may also be used to create the document container. The Active X document container 27500 is associated with a storage buffer 27530 created in a volatile memory element 27505. The storage buffer 27530 is used to hold content files 27507, 27509 and 27511 requested from the file server. As set forth further below, the storage buffer 27530 may be a Win32 mapping object. Since the content files 27507, 27509 and 27511 are stored in the storage buffer 27530 in the volatile memory element 27505, once the memory holding the content file in the volatile storage element is released, the content file ceases to exist on the client device. The client device 10 may also send the request for a content file via an appliance 1250 or a proxy server (such as via the depicted HTTPS connection 27512). The appliance 120 may filter the request based on pre-determined rules prior to delivering any content to the client device 10. Those skilled in the art will recognize that the requested content may be stored on the file server 30 such as file content 27511 or may be located at another location accessible to the file server such as database 27506 and 27508. The creation of the document container 27500 and the mapping of the content file to the document container is discussed further below in relation to FIG. 27B.

Figure 27B:
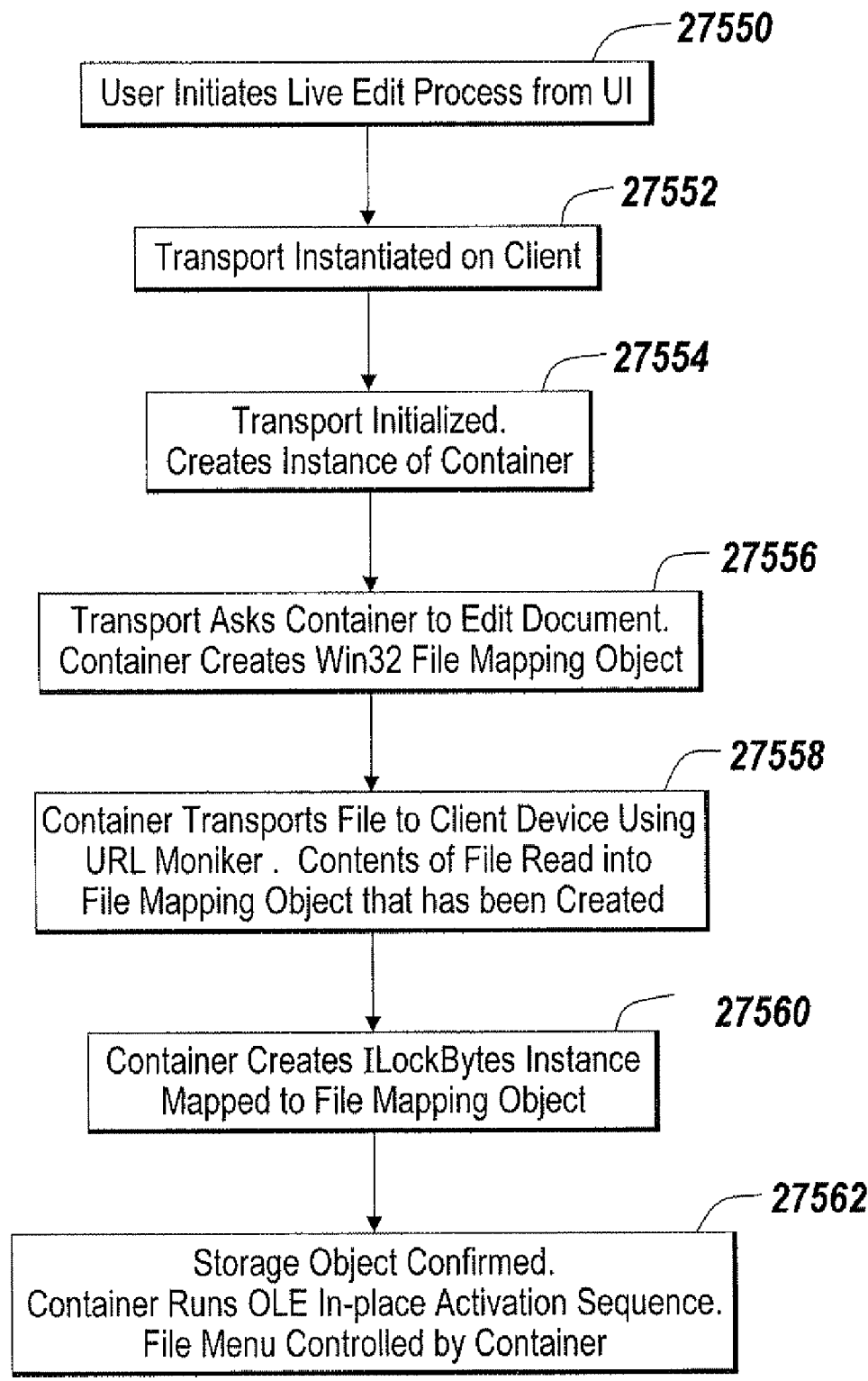
FIG. 27B is a flowchart of one embodiment of a method to securely edit downloaded content at a client device without using non-volatile memory.

FIG. 27B is a flowchart of one embodiment of a method to securely access content at a client device without using non-volatile memory. In one embodiment, the method begins when a user at the client device initiates a specialized editing process from the user interface (step 27550). This may occur automatically when the user requests any content from a specialized server or may occur through an affirmative user selection of particular content on a server. Following the selection, the transport mechanism 27502 is then instantiated on the client device. In one embodiment, this transport mechanism 502 is an Active X control object. In other embodiments, the transport mechanism may be a JAVA-based object or some other type of transport mechanism other than an Active X control object. In some embodiments, the Active X control object is invoked by a JAVA script which passes the control parameters for the transport mechanism to the Active X control object. The transport mechanism is initialized and then creates an instance of the document container 27500 on the client device 10 that will eventually receive the requested content 27507, 27509, 27511. In some embodiments, the request content comprises computing environment 15 depicted in FIG. 1B or any portion thereof. The document container may be an Active X/OLE (Object Linking and Embedding) container or some other type of container such as a JAVA-based container hosting a transport mechanism. The transport mechanism 27502 requests the container 27500 access a document and in response, the container creates a WIN32 Mapping object (step 27556).

The document container 27500 uses an URL moniker to transport the requested content file 27507, 27509, 27511 to the client device. An URL moniker is a system-provided moniker class that supports binding objects such as files, items and pointers to an URL. The use of the URL moniker restricts the transferred data to the current HTTPS session by binding the content file to the current session. The data from the content file is read into the newly created mapping object/global memory associated with the document container 27500 (step 27558). The document container then creates an interface to the mapping object, such as an IlockBytes instance mapped to the file mapping object (step 27560). After the document container confirms the presence of a storage object, the document container runs an OLE in-place Activation sequence to embed an OLE-enabled application into the container where it will be used to access the content file. Examples of OLE-enabled applications include WORD, EXCEL and POWERPOINT, all from Microsoft Corporation of Redmond, Wash. (step 27562). The In-Place Activation Sequence is examined in more detail during the discussion regarding FIG. 27C below. As a result of the In-Place Activation sequence, the file menu ends up being controlled by the container 27500.

Figure 27C:
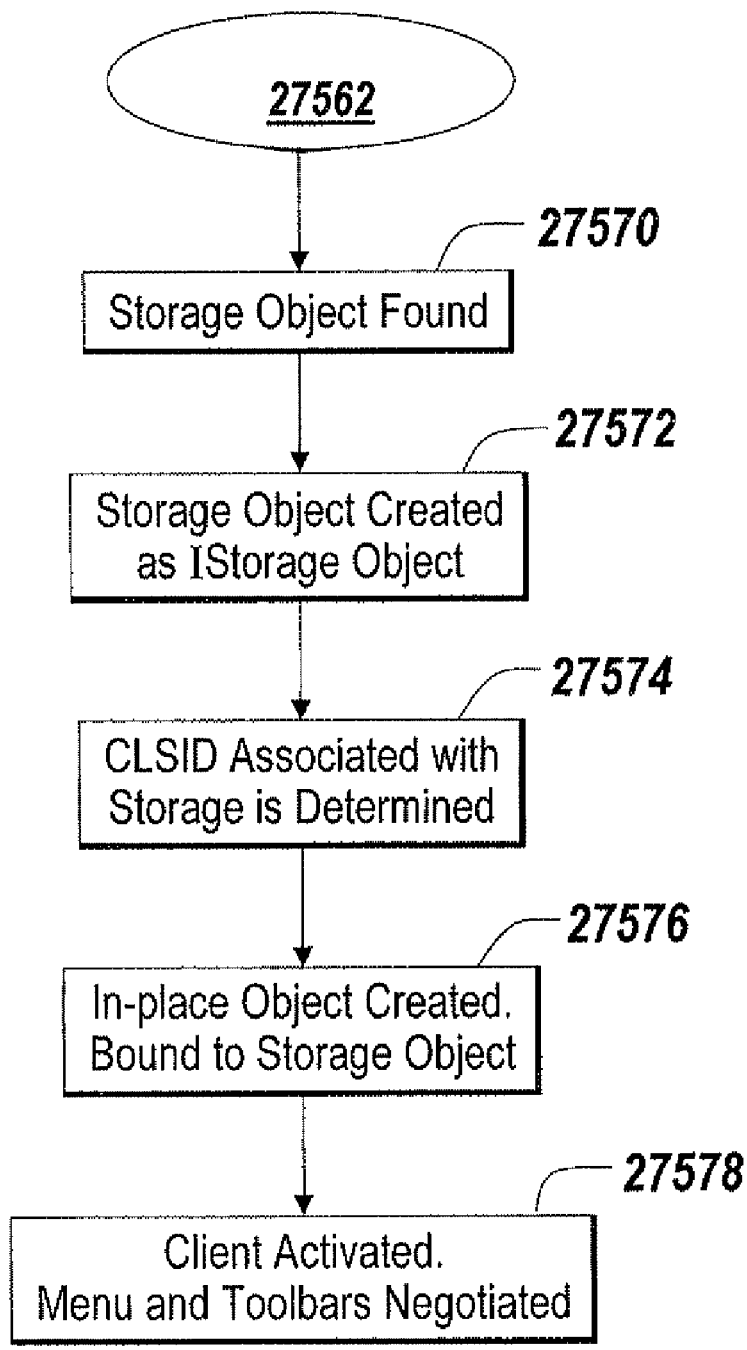
FIG. 27C is a flowchart of one embodiment of a method to perform OLE in-place activation in a document container.

FIG. 27C is a flowchart of one embodiment of a method to perform OLE in-place activation in the document container 27500. The In-Place Activation sequence begins once the storage object is found (step 27570). The storage object is then created as an IStorage object (step 27572) which allows a stream to be managed within the storage object. The CLSID (class ID) associated with the storage is then determined (step 27574). An In-Place Object is created and bound to the storage object (step 27576). Once the client is activated, the menus and toolbars are negotiated to give control to the document container rather than the editing application (step 27578). As a result of the In-Place Activation sequence the container 27500 controls the file menu instead of the native application controlling the file menu.

The menu substitution performed in the container 27500 may take many forms. Copy and paste functions in the application may be controlled by disabling the clipboard. Similarly, the printer functionality may be disabled. Save options may be limited to locations on the server by disabling any local save options. Client drive mapping may also be disabled. For an application such as a web browser, the cache function may be altered or turned off for certain types or all documents. Those skilled in the art will recognize that many additional forms of menu substitution and/or application function alterations may take place within the scope of the present invention.

Figure 27D:
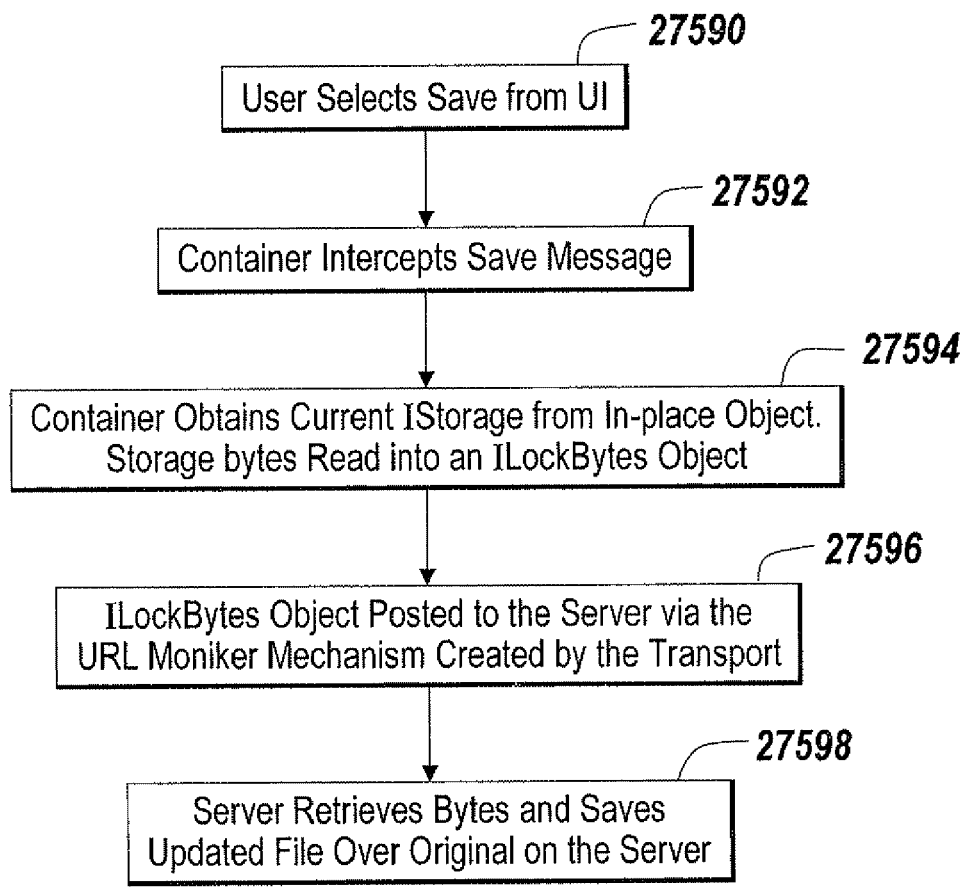
FIG. 27D is a flowchart of one embodiment of a method to save documents being edited in the document container.

FIG. 27D is a flowchart of one embodiment of a method to save documents being edited in the document container. The save method in some embodiments begins when the user selects "save" from the UI (step 27590). To the user at the client device 10, the save operation appears to be a normal save operation. However, the document container 27500 intercepts the save message (step 27592). The document container 27500 obtains the current IStorage from the In-Place object and the storage bytes are read into the ILockBytes Object (step 27594). The ILockBytes Object is then posted to the server via the URL moniker mechanism created by the transport 27502 (step 27596). The server retrieves the bytes and saves the updated file over the original on the server (step 27598).

Figure 27E:
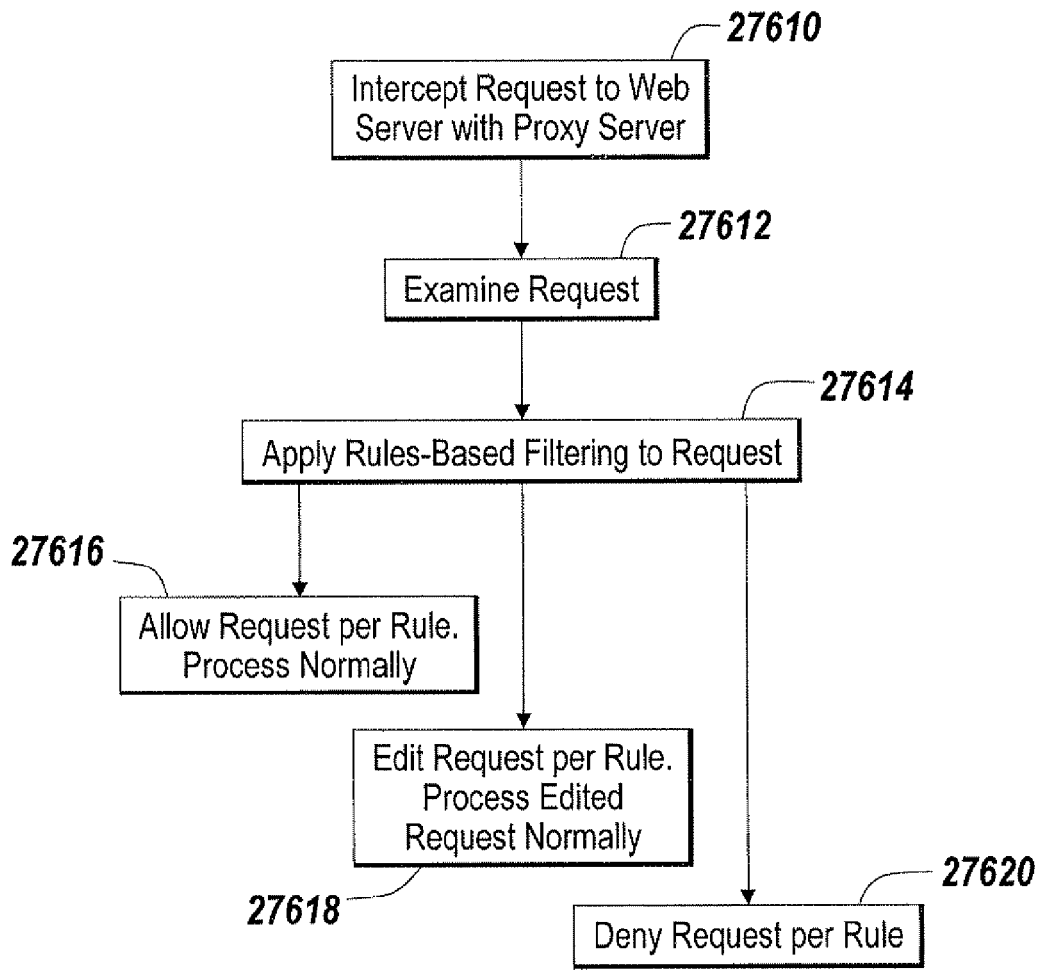
FIG. 27E is a flowchart of one embodiment of a method to filter document requests coming from the client device.

As noted above, a filtering mechanism may also be deployed to further restrict the content accessible to the document container. FIG. 27E is a flowchart of an embodiment of a method to filter document requests coming from the client 10. In some embodiments, the method begins with interception of a content request to the web server by a process running on a proxy server 27520 (step 27610). The request is examined (step 27612) and previously determined rules are applied to the request (step 27614). Following the application of the rules, the request may be processed normally with no alteration (step 27616), the request may be modified based on a rule and then processed normally (step 27618), or the request may be denied based upon the application of a rule (step 27620). The filtering of the request may be done at the proxy server when the request is inbound or may be done by examining the responsive content being sent by the file server in an outbound direction.

The rules may filter the request for a content file based on a user profile leveraging information collected from a user at login. For example, the rules may filter the request for a content file based upon the type or amount of content requested and the job title of the requesting user. A program developer may have access to content files that a data entry clerk will not. The content files may be categorized and the availability of the content files may be restricted by the rules based on category. The rules may filter content based upon the type of connection established by the client with the user. For example, the display capabilities and the processing resources available to the client device may be considered in determining whether the requested content is transmitted without alteration to the client device, modified prior to transmission, or not transmitted. Similarly, the location of the requesting client may also impact whether the requested content is delivered and the form in which it is delivered. URL rewriting may be employed to redirect all of the content file requests to a specified server where the rules are applied to the request.

Technologies for providing remote access to networked resources include a variety of client/server software combinations. One of these combinations is often referred to as a "thin-client" or a "distributed application processing" system, such as the application delivery system 500 described herein. The illustrative embodiment of the present invention may also be practiced in a thin-client environment. Similar to other distributed environments, practicing an embodiment of the system in a thin-client environment allows control over the distribution of the content file to the client. In these systems, an application program is executed by a server computing device, usually referred to as the "application server," on behalf of one or more client computing devices, usually referred to as the "thin-client" or the "thin-client application." Only input to the application received from the user at the thin-client and output produced by an application executing on the application server are transmitted between the thin-client and the application server.

Because a client in a thin-client computing architecture does not execute the application program and is required to transmit only user input to the application server and display only output of the application executing on the application server, the client device may offer limited amounts of memory, slower communication subsystems, and limited system resources without degradation in performance that is noticeable to the user. A personal computer, workstation, or other similar computing device typically provides ample system resources to execute the thin-client application and communicate with the application server.

However, more users requiring remote connectivity are using computing devices as thin-clients that do not provide sufficient memory, network resources, or proper operating system environments to function as thin-clients, such as cell phones and personal digital assistants. For example, many current cell phones provide less than 1 Megabyte of random access memory, which is generally not sufficient for execution of the thin-client application. Further, it is often useful for an embedded system to access an application server for application output. Typically, these systems are also limited in resources such as memory.

In one embodiment, the document container and transport mechanism are created on a client device 10 with constrained resources. In such a case, the applications used to access the content file are executed from a remote location rather being executed on the client device. The output from the remotely executing application may then be downloaded to the document container on the client device so that it is not permanently stored on the client device. Those skilled in the art will recognize that remote applications may be executed on the server providing the content or may be executed from a different location.

Figure 27F:
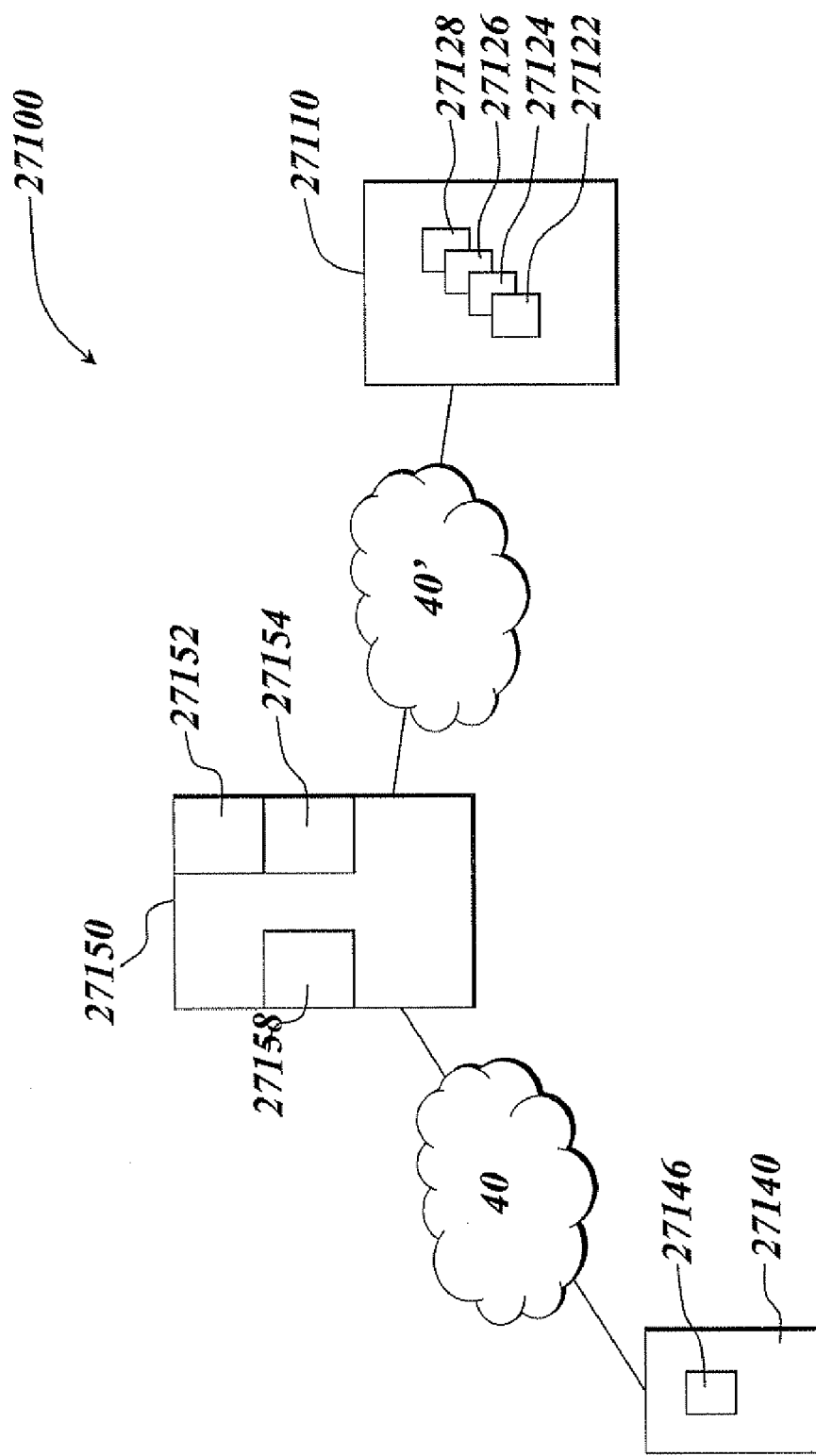

Referring now to FIG. 27F, a system 27100 for securely providing application output to a client device having constrained system resources includes an application server 27110, a proxy server 27150, and a client 140. In some embodiment, the proxy server 27150 comprises appliance 1250. Although only one application server 27110, proxy server 27150, and client 10 is depicted in the embodiment shown in FIG. 27F, it should be understood that the system may provide multiple ones of any or each of those components. For example, in one embodiment, the system 27100 includes multiple, logically-grouped application servers 27110, each of which are available to execute applications on behalf of a client 10. In these embodiments, the logical group of servers may be referred to as a "server farm." In other embodiments, multiple proxy servers 27150 may be provided. In some of these embodiments, the proxy servers may be geographically dispersed.

The proxy server 27150 executes one or more thin-client applications 27152, 27154 such as a Remote Display Protocol client, manufactured by Microsoft Corporation or an ICA client, manufactured by Citrix Systems, Inc. of Fort Lauderdale, Fla. The application server 27110 communicates the output of the application programs 27122, 27124, 27126, 27128 to thin-client applications 27152, 27154 executing on the proxy server 27150 and receives user input directed to the application programs 27122, 27124, 27126, 27128 from the thin-client application 27152, 27154. The application server 27110 communicates with the thin-client applications 27152, 27154 over network 40. 40' using a presentation-layer protocol such as the Independent Computing Architecture (ICA) protocol, available from Citrix Systems, Inc. of Fort Lauderdale, Fla. or the Remote Display Protocol (RDP), available from Microsoft Corporation. Although only two thin-client applications are depicted in the embodiment shown in FIG. 27F, the proxy server 27150 may host any number of thin-client applications 27152, 27154.

The proxy server 27150 also executes a proxy server application 27158. The proxy server application 27158 may be an application program, a subsystem or a service. The proxy server application 27158 manages the thin-client applications 27152, 27154 hosted by the proxy server 27150. The proxy server application also transmits application output received by the thin-client applications 27152, 27154 to the client device 10 and transmits user input received from the client device 10 to the appropriate thin-client application 27152, 27154 executing on the proxy server 27150. In some embodiments, the proxy server application 27158 executing on the proxy server 27150 communicates with the client 10 over a second network 40, 40'

In other embodiments, the client device 10 is a mobile device, such as a cellular telephone or a personal digital assistant. In these embodiments, the client 10 and the proxy server application 27158 connect to the second network using any one of a number of well-known protocols from the GSM or CDMA families, such as W-CDMA. These protocols support commercial wireless communication services and W-CDMA, in particular, is the underlying protocol supporting i-Mode and mMode services, offered by NTT DoCoMo.

The client device 10 executes a client application 27146. The client application transmits and receives http or https requests to and from the proxy server application 27158. The client application 27148 transmits user input directed to an executing application program 27122, 27124, 27126, 27128 to the proxy server application 27158 over the second network 40, 40'. In some embodiments, the client application 27148 is also responsible for rendering graphical output on the screen of the client device corresponding to the output of the application program 27122, 27124, 27126, 27128 executing on the application server 27110.

Any of the above-described techniques for controlling access to a resource may be practiced via one or more embodiments of the appliance 1250 as will be described below via the example of section F.

D. Systems and Methods for Accelerating Client-Server Communications

An embodiment of the present invention is directed towards systems and methods for accelerating client-server communications. These systems and methods may be used alone or in concert, and may be used in conjunction with any of the systems and methods for delivering a computing environment discussed above. In particular, four general categories of acceleration techniques will be discussed.

1. Caching of Dynamically Generated Objects: In some embodiments, client-server communications are accelerated by an appliance 1250 performing caching of dynamically generated objects in a data communication network.

2. Connection Pooling: In some embodiments, client-server communications are accelerated by an appliance 1250 performing connection pooling techniques.

3. Integrated Caching: In another embodiment, client-server communications are accelerated by an appliance 1250 performing caching integrated with a plurality of acceleration techniques.

4. Client-side Acceleration: In yet another embodiment, client-server communications are accelerated by a program executing on a client 10 performing one or more acceleration techniques.

1. Caching of Dynamically Generated Objects

As will be described in more detail herein, in one embodiment, an appliance 1250 may integrate caching functionality at the kernel level of the operating system with one or more other processing tasks, including but not limited to decryption, decompression, or authentication and/or authorization. Such an example architecture is described herein in accordance with FIG. 28A, but other architectures may be used in practicing the operations described herein.

Figure 28A:
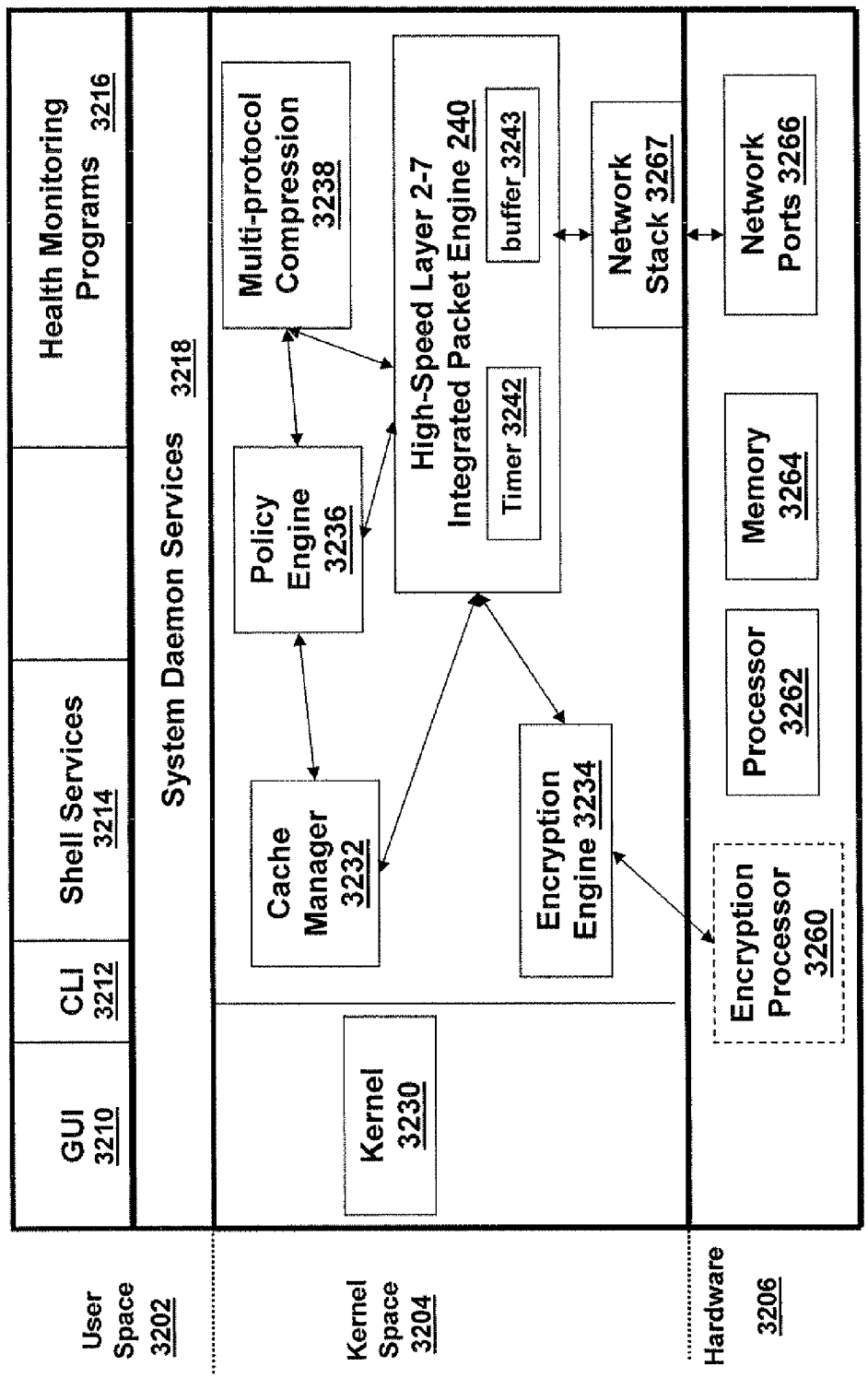
FIG. 28A is a block diagram illustrating one embodiment of an architecture of an appliance that performs integrated caching.

FIG. 28A illustrates an example architecture 3200 of an appliance 1250. As noted above, architecture 3200 is provided by way of illustration only and is not intended to be limiting. As shown in FIG. 2, example architecture 3200 consists of a hardware layer 3206 and a software layer divided into a user space 3202 and a kernel space 3204.

Hardware layer 3206 provides the hardware elements upon which programs and services within kernel space 3204 and user space 3202 are executed. Hardware layer 3206 also provides the structures and elements which allow programs and services within kernel space 3204 and user space 3202 to communicate data both internally and externally with respect to appliance 1250. As shown in FIG. 28A, the hardware layer 3206 includes a processing unit 3262 for executing software programs and services, a memory 3264 for storing software and data, network ports 3266 for transmitting and receiving data over a network, and an encryption processor 3260 for performing functions related to Secure Sockets Layer processing of data transmitted and received over the network. In some embodiments, the central processing unit 3262 may perform the functions of the encryption processor 3260 in a single processor. Additionally, the hardware layer 3206 may comprise multiple processors for each of the processing unit 3262 and the encryption processor 3260. Although the hardware layer 3206 of appliance 1250 is generally illustrated with an encryption processor 3260, processor 3260 may be a processor for performing functions related to any encryption protocol, such as the Secure Socket Layer (SSL) or Transport Layer Security (TLS) protocol. In some embodiments, the processor 3260 may be a general purpose processor (GPP), and in further embodiments, may be have executable instructions for performing processing of any security related protocol.

Although the hardware layer 3206 of appliance 1250 is illustrated with certain elements in FIG. 28A, the hardware portions or components of appliance 1250 may comprise any type and form of elements, hardware or software, of a computing device, such as the computing device 135 illustrated and discussed in conjunction with FIGS. 1C and 1D herein. In some embodiments, the appliance 1250 may comprise a server, gateway, router, switch, bridge or other type of computing or network device, and have any hardware and/or software elements associated therewith.

The operating system of appliance 1250 allocates, manages, or otherwise segregates the available system memory into kernel space 3204 and user space 3204. In example software architecture 3200, the operating system may be any type and/or form of Unix operating system. As such, the appliance 1250 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 1250 and performing the operations described herein.

The kernel space 3204 is reserved for running the kernel 3230, including any device drivers, kernel extensions or other kernel related software. As known to those skilled in the art, the kernel 3230 is the core of the operating system, and provides access, control, and management of resources and hardware-related elements of the appliance 1250. In accordance with an embodiment, the kernel space 3204 also includes a number of network services or processes working in conjunction with a cache manager 3232 sometimes also referred to as the integrated cache, the benefits of which are described in detail further herein. Additionally, the embodiment of the kernel 3230 will depend on the embodiment of the operating system installed, configured, or otherwise used by the device 1250.

In one embodiment, the device 1250 comprises one network stack 3267, such as a TCP/IP based stack, for communicating with the client 10 and/or the server 30. In one embodiment, the network stack 3267 is used to communicate with a first network, such as network 40, and a second network 40. In some embodiments, the device 1250 terminates a first transport layer connection, such as a TCP connection of a client 10, and establishes a second transport layer connection to a server 30 for use by the client 10, e.g., the second transport layer connection is terminated at the appliance 1250 and the server 30. The first and second transport layer connections may be established via a single network stack 3267. In other embodiments, the device 1250 may comprise multiple network stacks, for example 3267 and 3267', and the first transport layer connection may be established or terminated at one network stack 3267, and the second transport layer connection on the second network stack 3267'. For example, one network stack may be for receiving and transmitting network packet on a first network, and another network stack for receiving and transmitting network packets on a second network. In one embodiment, the network stack 3267 comprises a buffer 3243 for queuing one or more network packets for transmission by the appliance 1250.

As shown in FIG. 28A, the kernel space 3204 includes the cache manager 3232, a high-speed layer 2-7 integrated packet engine 3240, an encryption engine 3234, a policy engine 3236 and multi-protocol compression logic 3238. Running these components or processes 3232, 3240, 3234, 3236 and 3238 in kernel space 3204 or kernel mode instead of the user space 3202 improves the performance of each of these components, alone and in combination. Kernel operation means that these components or processes 3232, 3240, 3234, 3236 and 3238 run in the core address space of the operating system of the device 1250. For example, running the encryption engine 3234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 3232, 3240, 3235, 3236 and 3238 can be performed more efficiently in the kernel space 3204.

In some embodiments, any portion of the components 3232, 3240, 3234, 3236 and 3238 may run or operate in the kernel space 3204, while other portions of these components 3232, 3240, 3234, 3236 and 3238 may run or operate in user space 3202. In one embodiment, a kernel-level data structure is used to provide access to any portion of one or more network packets, for example, a network packet comprising a request from a client 10 or a response from a server 30. In some embodiments, the kernel-level data structure may be obtained by the packet engine 3240 via a transport layer driver interface or filter to the network stack 3267. The kernel-level data structure may comprise any interface and/or data accessible via the kernel space 3204 related to the network stack 3267, network traffic or packets received or transmitted by the network stack 3267. In other embodiments, the kernel-level data structure may be used by any of the components or processes 3232, 3240, 3234, 3236 and 3238 to perform the desired operation of the component or process. In one embodiment, a component 3232, 3240, 3234, 3236 and 3238 is running in kernel mode 3204 when using the kernel-level data structure, while in another embodiment, the component 3232, 3240, 3234, 3236 and 3238 is running in user mode when using the kernel-level data structure. In some embodiments, the kernel-level data structure may be copied or passed to a second kernel-level data structure, or any desired user-level data structure.

The cache manager 3232 may comprise software, hardware or any combination of software and hardware to provide cache access, control and management of any type and form of content, such as objects or dynamically generated objects served by the originating servers 30. The data, objects or content processed and stored by the cache manager 3232 may comprise data in any format, such as a markup language, or communicated via any protocol. In some embodiments, the cache manager 3232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element nat comprise a data object in memory

3264 of device 1250. In other embodiments, the cache memory element may comprise memory having a faster access time than memory 3264. In another embodiment, the cache memory element may comprise any type and form of storage element of the device 1250, such as a portion of a hard disk. In some embodiments, the processing unit 3262 may provide cache memory for use by the cache manager 3232. In yet further embodiments, the cache manager 3232 may use any portion and combination of memory, storage, or the processing unit for caching data, objects, and other content.

Furthermore, the cache manager 3232 includes any logic, functions, rules, or operations to perform any embodiments of the techniques described herein. For example, the cache manager 3232 includes logic or functionality to invalidate objects based on the expiration of an invalidation time period or upon receipt of an invalidation command from a client 10 or server 30. In some embodiments, the cache manager 3232 may operate as a program, service, process or task executing in the kernel space 3204, and in other embodiments, in the user space 3202. In one embodiment, a first portion of the cache manager 3232 executes in the user space 3202 while a second portion executes in the kernel space 3204. In some embodiments, the cache manager 3232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 3236 may include, for example, an intelligent statistical engine or other programmable application(s). In one embodiment, the policy engine 3236 provides a configuration mechanism to allow a user to identifying, specify, define or configure a caching policy. Policy engine 3236, in some embodiments, also has access to memory to support data structures such as lookup tables or hash tables to enable user-selected caching policy decisions. In other embodiments, the policy engine 3236 may comprise any logic, rules, functions or operations to determine and provide access, control and management of objects, data or content being cached by the appliance 1250 in addition to access, control and management of security, network traffic, network access, compression or any other function or operation performed by the appliance 1250. In some embodiments, the policy engine 3236 may be integrated with functionality of the policy engine 406. In one embodiment, the policy engine 3236 may determine caching policy decisions based on information provided by a collection agent 404. In some embodiments, the policy engine 3236 may determine caching policy decisions based on a type of application execution. In one embodiment, the policy engine may determine caching policy decisions based on whether an application is being streamed to a client 10. Further examples of specific caching policies are further described herein.

The encryption engine 3234 comprises any logic, business rules, functions or operations for handling the processing of any security related protocol, such as SSL or TLS, or any function related thereto. For example, the encryption engine 3234 encrypts and decrypts network packets, or any portion thereof, communicated via the appliance 1250. The encryption engine 3234 may also setup or establish SSL or TLS connections on behalf of the client 10, server 30, or appliance 1250. As such, the encryption engine 3234 provides offloading and acceleration of SSL processing. In one embodiment, the encryption engine 3234 uses a tunneling protocol to provide a virtual private network between a client 10 and a server 30. In some embodiments, the encryption engine 3234 is in communication with the Encryption processor 3260. In other embodiments, the encryption engine 3234 comprises executable instructions running on the Encryption processor 3260.

The multi-protocol compression engine 3238 comprises any logic, business rules, function or operations for compressing one or more protocols of a network packet, such as any of the protocols used by the network stack 3267 of the device 1250. In one embodiment, multi-protocol compression engine 3238 compresses bi-directionally between clients 10 and servers 30 any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 3238 provides compression of Hypertext Markup Language (HTML) based protocols and in some embodiments, provides compression of any markup languages, such as the Extensible Markup Language (XML). In one embodiment, the multi-protocol compression engine 3238 provides compression of any high-performance protocol, such as any protocol designed for appliance 1250 to appliance 1250 communications. In another embodiment, the multi-protocol compression engine 3238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 3238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 3238 by executing in the kernel mode 3204 and integrating with packet processing engine 3240 accessing the network stack 3267 is able to compress any of the protocols carried by the TCP/IP protocol, such as any application layer protocol.

High speed layer 2-7 integrated packet engine 3240, also generally referred to as a packet processing engine or packet engine, is responsible for managing the kernel-level processing of packets received and transmitted by appliance 1250 via network ports 3266. The high speed layer 2-7 integrated packet engine 3240 may comprise a buffer for queuing one or more network packets during processing, such as for receipt of a network packet or transmission of a network packer. Additionally, the high speed layer 2-7 integrated packet engine 3240 is in communication with one or more network stacks 3267 to send and receive network packets via network ports 3266. The high speed layer 2-7 integrated packet engine 3240 works in conjunction with encryption engine 3234, cache manager 3232, policy engine 3236 and multi-protocol compression logic 3238. In particular, encryption engine 3234 is configured to perform SSL processing of packets, policy engine 3236 is configured to perform functions related to traffic management such as request-level content switching and request-level cache redirection, and multi-protocol compression logic 3238 is configured to perform functions related to compression and decompression of data.

The high speed layer 2-7 integrated packet engine 240 includes a packet processing timer 3242. In one embodiment, the packet processing timer 3242 provides one or more time intervals to trigger the processing of incoming, i.e., received, or outgoing, i.e., transmitted, network packets. In some embodiments, the high speed layer 2-7 integrated packet engine 3240 processes network packets responsive to the timer 3242. The packet processing timer 3242 provides any type and form of signal to the packet engine 3240 to notify, trigger, or communicate a time related event, interval or occurrence. In many embodiments, the packet processing timer 3242 operates in the order of milliseconds, such as for example 100 ms, 50 ms or 25 ms. For example, in some embodiments, the packet processing timer 3242 provides time intervals or otherwise causes a network packet to be processed by the high speed layer 2-7 integrated packet engine 3240 at a 10 ms time interval, while in other embodiments, at a 5 ms time interval, and still yet in further embodiments, as short as a 3, 2, or 1 ms time interval. The high speed layer 2-7 integrated packet engine 3240 may be interfaced, integrated or in communication with the encryption engine 3234, cache manager 3232, policy engine 3236 and multi-protocol compression engine 3238 during operation. As such, any of the logic, functions, or operations of the encryption engine 3234, cache manager 3232, policy engine 3236 and multi-protocol compression logic 3238 may be performed responsive to the packet processing timer 3242 and/or the packet engine 3240. Therefore, any of the logic, functions, or operations of the encryption engine 3234, cache manager 3232, policy engine 3236 and multi-protocol compression logic 3238 may be performed at the granularity of time intervals provided via the packet processing timer 3242, for example, at a time interval of less than or equal to 10 ms. For example, in one embodiment, the cache manager 3232 may perform invalidation of any cached objects responsive to the high speed layer 2-7 integrated packet engine 3240 and/or the packet processing timer 3242. In another embodiment, the expiry or invalidation time of a cached object can be set to the same order of granularity as the time interval of the packet processing timer 3242, such as at every 10 ms In contrast to kernel space 3204, user space 3202 is the memory area or portion of the operating system used by user mode applications or programs otherwise running in user mode. A user mode application may not access kernel space 3204 directly and uses service calls in order to access kernel services. As shown in FIG. 28A, user space 3202 of appliance 1250 includes a graphical user interface (GUI) 3210, a command line interface (CLI) 3212, shell services 3214, health monitoring program 3216, and daemon services 3218. GUI 210 and CLI 3212 provide a means by which a system administrator or other user can interact with and control the operation of appliance 1250, such as via the operating system of the appliance 1250 and either is user space 3202 or kernel space 3204. The GUI 3210 may be any type and form of graphical user interface and may be presented via text, graphical or otherwise, by any type of program or application, such as a browser. The CLI 3212 may be any type and form of command line or text-based interface, such as a command line provided by the operating system. For example, the CLI 3212 may comprise a shell, which is a tool to enable users to interact with the operating system. In some embodiments, the CLI 3212 may be provided via a bash, csh, tcsh, or ksh type shell. The shell services 3214 comprises the programs, services, tasks, processes or executable instructions to support interaction with the appliance 1250 or operating system by a user via the GUI 3210 and/or CLI 3212.

Health monitoring program 3216 is used to monitor, check, report and ensure that network systems are functioning properly and that users are receiving requested content over a network. Health monitoring program 3216 comprises one or more programs, services, tasks, processes or executable instructions to provide logic, rules, functions or operations for monitoring any activity of the appliance 1250. In some embodiments, the health monitoring program 3216 intercepts and inspects any network traffic passed via the appliance 1250. In other embodiments, the health monitoring program 3216 interfaces by any suitable means and/or mechanisms with one or more of the following: the encryption engine 3234, cache manager 3232, policy engine 3236, multi-protocol compression logic 3238, packet engine 3240, daemon services 3218, and shell services 3214. As such, the health monitoring program 3216 may call any application programming interface (API) to determine a state, status, or health of any portion of the appliance 1250. For example, the health monitoring program 3216 may ping or send a status inquiry on a periodic basis to check if a program, process, service or task is active and currently running. In another example, the health monitoring program 3216 may check any status, error or history logs provided by any program, process, service or task to determine any condition, status or error with any portion of the appliance 1250.

Daemon services 3218 are programs that run continuously or in the background and handle periodic service requests received by appliance 1250. In some embodiments, a daemon service may forward the requests to other programs or processes, such as another daemon service 3218 as appropriate. As known to those skilled in the art, a daemon service 3218 may run unattended to perform continuous or periodic system wide functions, such as network control, or to perform any desired task. In some embodiments, one or more daemon services 3218 run in the user space 3202, while in other embodiments, one or more daemon services 3218 run in the kernel space.

Dynamic content, such as one or more dynamically generated objects, may be generated by servers, referred to as application or originating servers 30 and/or back-end databases that process object requests from one or more clients 10, local or remote, as depicted in FIG. 1A. As those applications or databases process data, including data related to inputs received from clients, the response objects served by these databases and applications may change. Prior objects generated by those applications or databases in an originating server will no longer be fresh and therefore should no longer be stored by a cache. For example, given the same set of inputs a dynamically generated object of a first instance may be different than a dynamically generated object of a second instance. In another example, the same object may be dynamically generated with a different set of inputs such that a first instance of the object is generated differently from a second instance of the object.

In order to achieve improved network performance, the appliance 1250 is designed and configured to addresses the problems that arise in caching dynamically generated content through a variety of methods, as described in detail below. In some embodiments described herein, the appliance 1250 incorporates a set of one or more techniques for making the invalidation of dynamically generated content stored in the cache more efficient and effective. Furthermore, the appliance may incorporate techniques for performing control and caching for flash crowds. Cache memories typically store every response to a request for an object as long as such response is not marked as non-cacheable. As described herein, efficient caching of dynamically generated contents requires techniques that enable the timely invalidation of objects in the cache memory that have undergone a change at the originating server. Timely invalidation allows the cache to avoid serving stale content—a task of particular concern with dynamically generated content, especially where changes to the content occur irregularly. Set forth below are a number of techniques to ensure timely invalidation of dynamically generated content.

a. Integrated Functionality

In one aspect, caching of dynamically generated objects is related to techniques of integrating functions, logic, or operations of the cache manager 3232, policy engine 3236, encryption engine 3234, and/or the multi-protocol compression engine 3238 with packet processing operations of the high-speed layer 2-7 integrated packet engine 3240 responsive to the packet processing timer 3242. For example, the operations of the cache manager 3232 can be performed within the time intervals of the packet processing timer 3242 used for packet processing operations, such as on a receipt or transmit of a network packet. In one embodiment, by integrating with the packet processing operations and/or using the packet processing timer, the cache manager 3232 can cache objects with expiry times down to very small intervals of time, as will be described in further detail below. In other embodiments, the cache manager 3232 responsive to the packet processing timer 3242 can also receive an invalidation command to invalidate an object within a very short time period of caching the object.

Figure 28B:
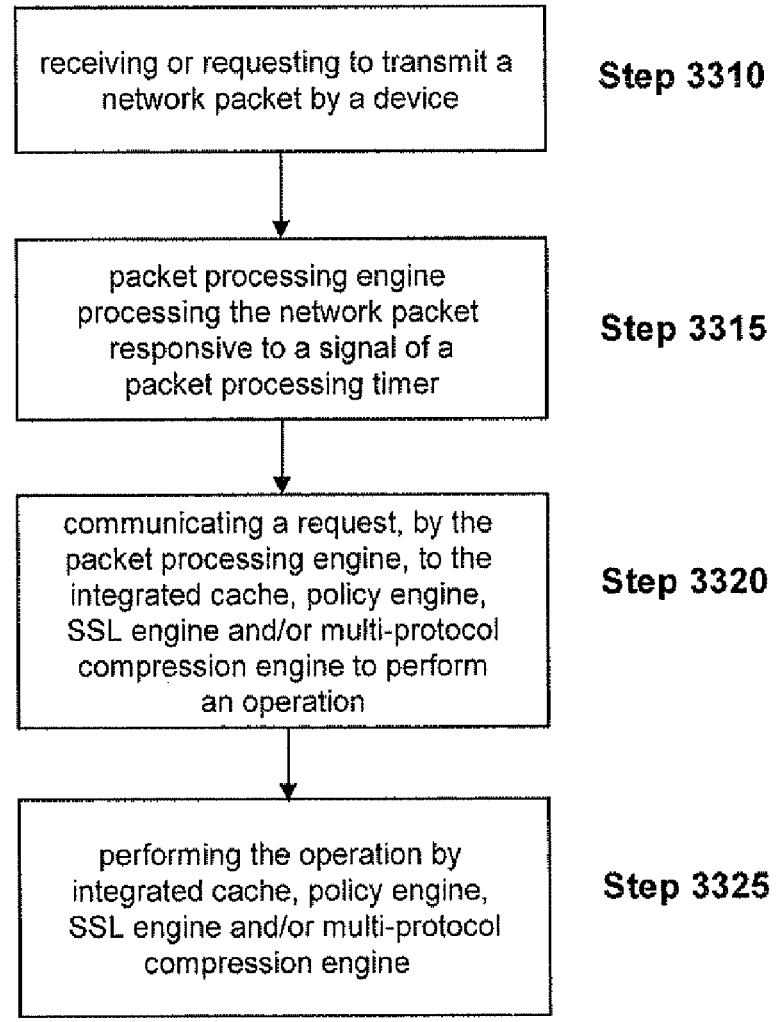
FIG. 28B is a flow diagram of steps taken in an embodiment of a method for integrating device operations with packet processing and the packet processing timer.

The method 3300 depicted in FIG. 28B illustrates one embodiment of a technique for requesting the cache manager 3232, policy engine 3236, encryption engine 3234, and/or the multi-protocol compression engine 3238 to perform an operation during processing or in association with the time intervals for processing a network packet by the high-speed layer 2-7 integrated packet engine or packet processing engine 3240. In brief overview, at step 3310 of method 3300, the device 1250 receives a network packet or is requested to transmit a network packet. At step 3315, the device 31250 requests the packet processing engine 3240 to process the network packet responsive to the packet processing timer 3242. As part of, or associated with, packet processing operations, at step 3320, the packet processing engine 240 requests the cache manager 3232, policy engine 3236, encryption engine 234, and/or the multi-protocol compression engine 3238 to perform an operation on a cached object. At step 3325, the cache manager 3232, policy engine 3236, encryption engine 234, and/or the multi-protocol compression engine 3238 performs the requested operation, which may include any one or combination of the techniques described herein. In one embodiment, the cache manager 3232 determines invalidation of a cached object, and marks the cached object invalid. In some embodiments, the cache manager 3232 flushes the invalid object in response to a request by the packet processing engine 3240. As the cache manager 3232 is performing these operations responsive to the packet processing timer 3242, invalidation of objects can occur within time periods in the order of milliseconds and with objects having an expiry in the order of the time intervals provided by the packet processing timer 3242, such as 10 ms.

In further detail of method 3300, at step 3310, the appliance 1250 receives one or more network packets, and/or transmits one or more network packets. In some embodiments, the appliance 1250 requests to transmit one or more network packets over the network 40 or network 40'. In another embodiment, the appliance 1250 receives a network packet on one port 3266 and transmits a network packet on the same port 3266 or a different port 3266'. In some embodiments, the packet engine 3240 of the appliance 1250 transmits or requests to transmit one or more network packets. In one embodiment, the appliance 1250 receives or transmits a packet on a first network 40, while in another embodiment, the appliance 1250 receives or transmits a packet on a second network 40'. In other embodiments, the appliance 1250 receives and transmits packets on the same network 40. In some embodiments, the appliance 1250 receives and/or transmits networks packets to one or more clients 10. In other embodiments, the appliance 1250 receives and/or transmits networks packets to one or more servers 30.

At step 3315, the device 1250 may request or trigger packet processing operations of the packet processing engine 3240 upon receipt of a network packet at the network port 3266 of the device 1250 or upon request to transmit a network packet from the device 1250, or upon any combination of receipt and/or transmit of one or more network packets. In some embodiments, the packet processing operations of the packet processing engine 3240 are triggered via a signal provided by a packet processing timer 3242. In one embodiment, the packet processing timer 3242 may provide interrupt-driven or event-driven timer functionality related to the receipt and/or transmission of one or more network packets. In some embodiments, the packet processing timer 3242 is driven by a rate of receipt and/or transmit of network packets via the device 1250, or by the rate by which each packet or a batch of packets are processed. As such, the packet processing timer 3242 may be triggered and reset after each set of one or more packet processing operations. In another embodiment, the packet processing timer 3242 provides time intervals, either equal or variable time intervals, to trigger, wake-up, or signal the packet processing engine 3240 to perform a function or operation, such as handling a received packet or transmitting a submitted packet. As discussed above in connection with the device 1250 of FIG. 28A, the packet processing timer 3242 may operate in the order of milliseconds, such as causing time intervals or triggering of packet processing operations at intervals of 10 ms or less. The granular timer functionality of the packet processing timer may be provided in various ways and used in operations of the packet processing operations of the packet processing engine 3240.

At step 3320 of method 3300, the packet processing engine 3240 requests one or more of the cache manager 3232, policy engine 3236, encryption engine 3234, and/or the multi-protocol compression engine 3238 to perform an operation. In one embodiment, the packet processing engine 3240 or packet processing timer 3242 generates a signal or signals to one or more of the cache manager 3232, policy engine 3236, encryption engine 3234, and/or the multi-protocol compression engine 3238. The packet processing engine 3240 may request or signal the operation at any point before, during, or after a packet processing operation of a network packet, or one or more packets. In one embodiment, the packet processing engine 240 makes the request upon trigger of the packet processing timer 3242 or expiration of a time interval provided by the packet processing timer 3242, and before performing a packet processing operation on a network packet. In another embodiment, during the course of performing one or more packet processing operations, the packet processing engine 3240 makes the request. For example, during execution of an operation, such as within a function call, the packet processing engine 240 may make an application programming interface (API) call to one of the cache manager 3232, policy engine 3236, encryption engine 3234, and/or the multi-protocol compression engine 238. In other embodiments, the packet processing engine 3240 makes the request upon completion of a network packet processing operation.

At step 3325, the requested operation is performed by one or more of the cache manager 3232, policy engine 3236, encryption engine 3234, and/or the multi-protocol compression engine 3238. In some embodiments, any functionality or operation provided via the kernel 3204 may be requested to be executed, such as via a kernel application programming interface (API). As such, any of the functions of the device 1250 may be performed in conjunction with the timing or timing intervals of packet processing via the packet processing timer 3232. In some embodiments, the requested operation is performed synchronously and in conjunction with the packet processing operations of the packet processing engine 3240. For example, the packet processing operations wait and continue upon a completion of, or response from, the requested operation. In other embodiments, the requested operation is performed asynchronously with the packet processing operations. For example, the packet processing engine 3240 sends a request to perform the operation but does not block or wait to receive a response from the operation. As will be discussed in further detail in conjunction with method 3350 depicted in FIG. 28C, the packet processing engine 3240 may request the cache manager 3232 to perform any cache management function, such as checking for expiry or invalidation of objects, marking objects as invalid, or flushing invalid or expired objects.

In some embodiments, the packet processing engine 3240 at step 3320 sends multiple requests, such as a first request to the cache manager 232 and a second request to the encryption engine 3234. In other embodiments, the packet processing engine 3240, at step 3320, sends a single request comprising multiple requests to be distributed by the device 1250, such as via the kernel 3230 to the intended component of the device 1250. In one embodiment, the requests are communicated subsequent to each other. In another embodiment, requests may be dependent on the status, result, success, or completion of a previous request. For example a first request to the policy engine 3236 may be used to determine a policy for processing a network packet from another device or a user associated with the network packet. Based on a policy of the policy engine 3236, a second request to the cache may be made or not made depending on a result of the first request. With the cache manager 3232, policy engine 3236, encryption engine 3234, and/or the multi-protocol compression engine 3238 integrated in the kernel space 204 of the device 1250 with the packet processing engine 3240, there are various operations of the device 1250 as described herein that may be triggered by and integrated with packet processing operations.

b. Invalidation Granularity

In another aspect, caching of dynamically generated objects is related to and incorporates the ability to configure the expiration time of objects stored by the cache to fine granular time intervals, such as the granularity of time intervals provided by the packet processing timer. This characteristic is referred to as "invalidation granularity." As such, in one embodiment, objects with expiry times down to very small intervals of time can be cached. In other embodiments, the cache manager responsive to a packet processing timer can also receive an invalidation command to invalidate an object within a very short time period of caching the object. By providing this fine granularity in expiry time, the cache can cache and serve objects that frequently change, sometimes even many times within a second. One technique is to leverage the packet processing timer used by the device in one embodiment that is able operate at time increments on the order of milliseconds to permit invalidation or expiry granularity down to 10 ms or less. Traditional caches, by contrast, typically do not set expiry or invalidation granularity of less than one second.

Figure 28C:
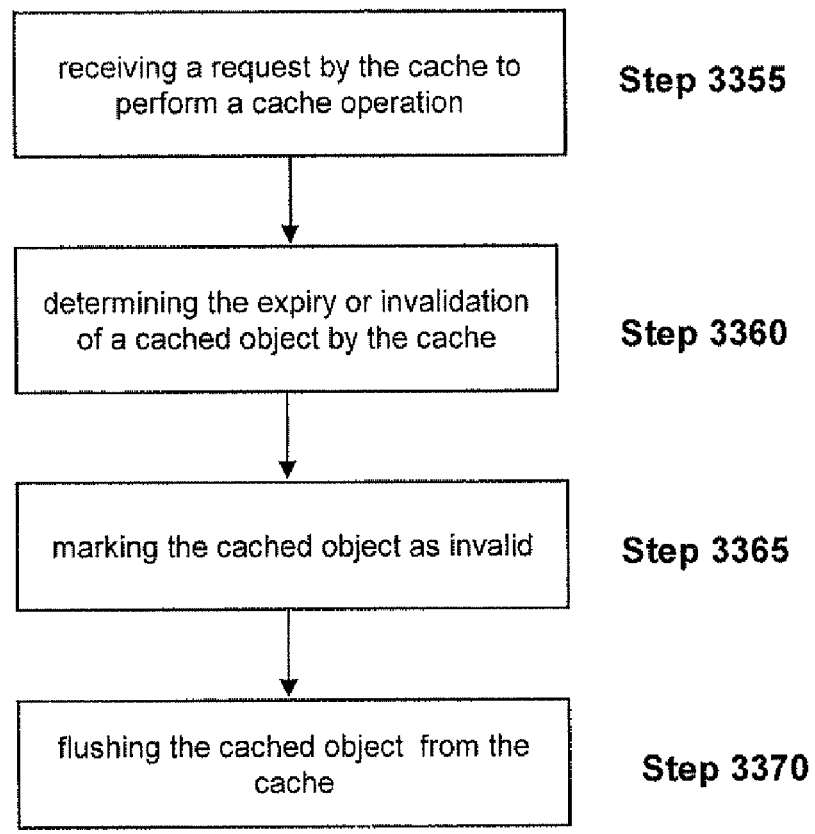
FIG. 28C is a flow diagram of steps taken in an embodiment of a method for practicing invalidation granularity techniques in view of FIG. 3A.

Referring now to FIG. 28C, an embodiment of a method 3350 is depicted for invalidating or expiring a cached object responsive to the packet processing timer 3242 and/or packet processing engine 3240. As such, in some embodiments, cached objects can be invalidated or expired in the order of milliseconds, such as 10 ms or less. In overview, at step 3355 of method 3350, the cache manager 3232 receives a signal or request to perform an operation via the packet processing engine 3240 in response to the packet processing timer 3242. At step 3360, the cache manager 3232 determines if a cached object, such as a dynamically generated object, is invalid or expired. At step 3365, if the object is invalid, the cache manager 3232 marks the object as invalid, and at step 3370, flushes the invalid object from the cache manager 3232.

In further detail of step 3355, in some embodiments, the cache manager 3232 may be signaled or requested to perform a cache related operation at any point of time during network packet processing. In one embodiment, at step 3355, the cache manager 3232 receives an operation request prior to the processing of a network packet received or to be transmitted by the device 1250. In another embodiment, the cache manager 3232 receives an operation request upon the completion of processing of a network packet. For example, the packet processing engine 3240 completes processing of a network packet, and before either waiting for the next time interval of the timer 3242 or before processing the next packet, requests the cache to perform an operation. In other embodiments, during an operation of packet processing, the packet processing engine 3240 communicates an operation request to the cache manager 3232. In another embodiment, the cache manager 3232 receives a signal, such as from the packet processing engine 3240 or packet processing timer 3242 to trigger the cache manager 3232 to perform an operation. In some embodiments, the signal indicates to invalidate a cached object or to expire an expiry of a cached object.

In some embodiments, the cache manager 3232 may receive a request to perform a cache operation from an entity external to the cache manager 3232, such as a request to invalidate an object communicated by a server 30, and processed by the packet processing engine 3240. In one embodiment, the cache manager 3232 may receive an invalidation request within 10 ms or less of caching the object, while in another embodiment, as short as 5 ms, 2 ms or 1 ms. In other embodiments, the cache manager 3232 may perform a cache operation responsive to the operations or functionality of the cache manager 3232, such as the expiration of a timer to cause an object to be invalidated or during the processing of any cache command. In other embodiments, the cache manager 3232 uses the packet processing timer 3242 of the device 1250 to trigger cache operations. For example, the timer 2342 may trigger or signal the cache to check for invalidation or expiry of a cached object at any time interval capable of being set by the timer 3242. In one embodiment, the timer 3242 may be set to trigger or signal the cache within 10 ms or less of being set, or in another embodiment, as short as 5 ms, 2 ms, or 1 ms of being set. In some embodiments, the originating server 30 may set the expiry time of the object. In other embodiments, the appliance 1250 or client 10 may set the expiry time of the object.

At step 3360, the cache manager 3232 determines the invalidation or expiry of an object stored in cache. In some embodiments, an object in cache is invalidated based on the expiration of a timer. In one embodiment, the cache manager 3232 may issue an invalidation command on an object based on the expiration of a timer. In another embodiment, the object stored in cache is automatically invalidated by the cache manager 3232 responsive to the expiration of a timer, such as a timer set with the packet processing timer 3242. In some embodiments, responsive to the packet processing timer 3242, the cache manager 3232 checks for the expiration of any timers for cached objects. In one embodiment, the cache manager 3232 determines an object timer has expired, while in another embodiment, the cache manager 3232 determines the object timer has not expired. In a further embodiment, the cache manager 3232 responsive to a second trigger or second timer interval of the packer processing timer 3242 will check a second time if a previously checked object timer has expired.

In some embodiments, the cache manager 3232 parses, interprets, accesses, reads or otherwise processes an invalidation command or request to identify the object to invalidate in the cache. In one embodiment, an entity external to the cache manager 3232 issues an invalidation command to the cache manager 3232 to invalidate the object. In another embodiment, the external entity may issue the invalidation command responsive to a packet processing timer 3242. If the object is valid and/or has not been invalidated, the cache manager 3232 invalidates the object responsive to the request. In some embodiments, the invalidation request processed by the cache manager 3232 is responsive to the packet processing operations of the packet processing engine 3240 processing the request, which in turn may also be responsive to the packet processing timer 3242.

At step 3365, the cache manager 3232 marks the object as invalid. The cache manager 3232 may mark each object as invalid in any suitable or desired manner. In one embodiment, an object is marked as invalid by setting a flag, attribute, or property of the stored object. For example, a flag may be set to any value identifying to the cache manager 3232 the object is invalid. In another embodiment, an object may be marked as invalid by moving the object to an area or portion of the cache for storing invalid objects. In other embodiments, the cache manager 3232 may identify or track the invalid and/or valid state of a stored object by a database or a linked list or any type and form of data structure. In some embodiments, the cache manager 3232 uses one or more objects to identify or track the validity or invalidity of one or more objects stored in cache. In another embodiment, the object is marked as invalid by changing, modifying or altering the stored object, for example deleting or removing a portion of the object so that is may not be used, or by changing or mangling the name of the object.

At step 3370, the cache manager 3232, in some embodiments, flushes from the cache those objects marked as invalid. In another embodiment, the cache manager 3232 flushes the invalid object from cache upon request for the object, such as by a client 10. In some embodiments, the cache manager 3232 overwrites the invalid object with an updated copy or version of the object received after invalidation or expiration of the object. In another embodiment, the cache manager 3232 reuses the cache memory occupied by the invalid object by storing another to the same portion of cache memory. In yet another embodiment, the cache manager 3232 does not flush the object marked as invalid but keeps the object stored in memory or storage of the cache.

Although method 3350 describes invalidation and flushing of cached objects responsive to a packet processing timer and/or in conjunction with packet processing operations to provide invalidation granularity, any operation of the cache and any techniques of cache management as well as any other operation of the device 1250 described herein may be executed at fine granular time intervals provided by the packet processing timer. In some embodiments, the invalidation or expiration of cached objects can occur as short as a 100 ms time interval, while in another embodiment, as short as a 50 ms time interval. In some embodiments, the invalidation or expiration of cached objects can occur as short as 25 ms time interval, and in other embodiments, as short as a 10 ms time interval. While in other embodiments, the invalidation or expiration of cached objects can occur as short as a 5 ms time interval, and still yet in further embodiments, as short as a 3, 2, or 1 ms time interval.

By incorporating the capacity to invalidate objects after the elapse of very small increments of time as described in methods 3300 and 3350 in conjunction with FIGS. 28A and 28B above, improved caching of dynamically generated content is enabled. Some dynamic content is in fact amenable to being stored and served from a cache for very short periods of time. To successfully cache such content, however, an approach in accordance with one embodiment provides caching objects for very short periods of time before the object is invalidated and flushed from the cache memory. For example, certain dynamically generated objects may be cacheable for as long as 1 second but anything longer is frequently unacceptable for content that is constantly changing. In an embodiment, the approach included invalidating or expiring cached content after small fractions of a second. As an example, if an application takes 100 milliseconds to generate a dynamic response, then the cache can store and serve that response for a duration of less than or equal to the period of 100 milliseconds, without compromising the freshness of the data. There will not be a new object generated during that 100 millisecond period because it is shorter than the time it takes to generate a new object. The appliance 1250 can thus be set up to serve the prior object during that duration. The ability of the appliance 1250 to invalidate down to very small increments of time is frequently very useful for application environments where the database transaction isolation level is set to allow Repeatable Reads or Serialized Reads.

c. Invalidation Commands

Traditional caching technology invalidates stored content based on a pre-defined expiry time for the content, which is typically configured either by the administrator or is received from the server that served the object. Described below is another technique for invalidating content in order to more efficiently cache dynamically generated content. A technique includes the ability to receive at the appliance 1250 an invalidation command that identifies one or more of the previously stored objects in the cache as invalid in real time. For example, the invalidation command may be communicated via a network packet transmitted to the client or an application programming interface (API) call made by a server to the appliance. This differs from the traditional approach by which the server simply sets a cache expiry time that it includes in the object header at the time the object is served.

Figure 29A:
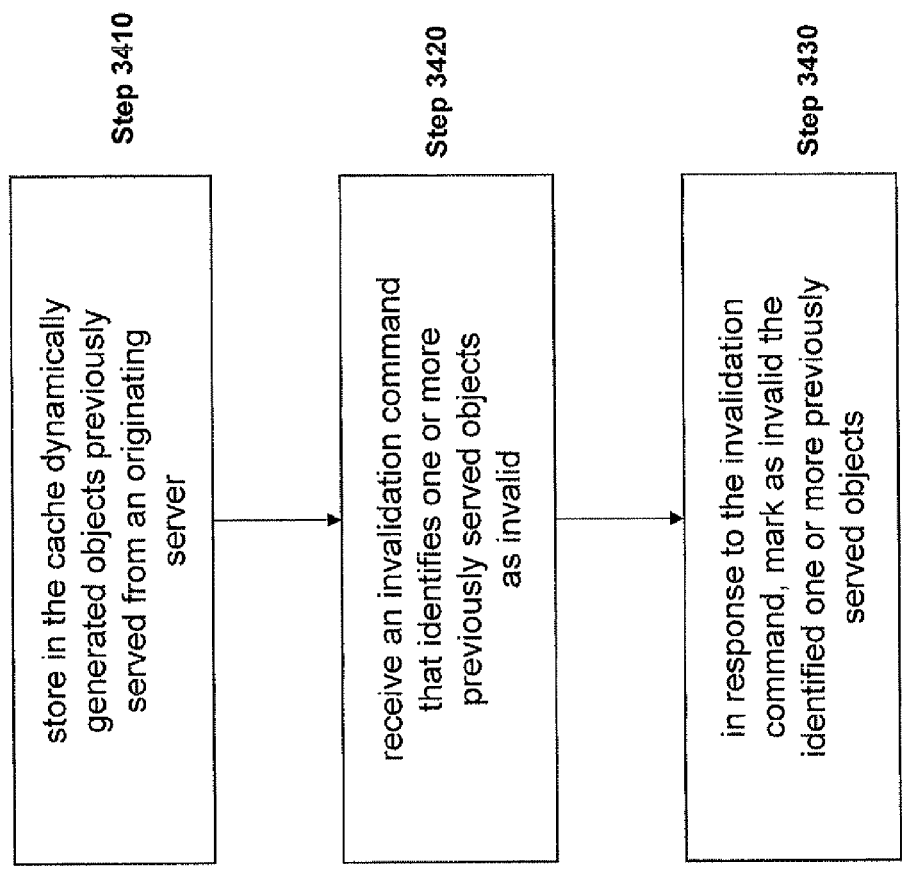
FIG. 29A is a flow diagram of steps taken in an embodiment of a method using invalidation commands to invalidate stale objects.
Figure 29B:
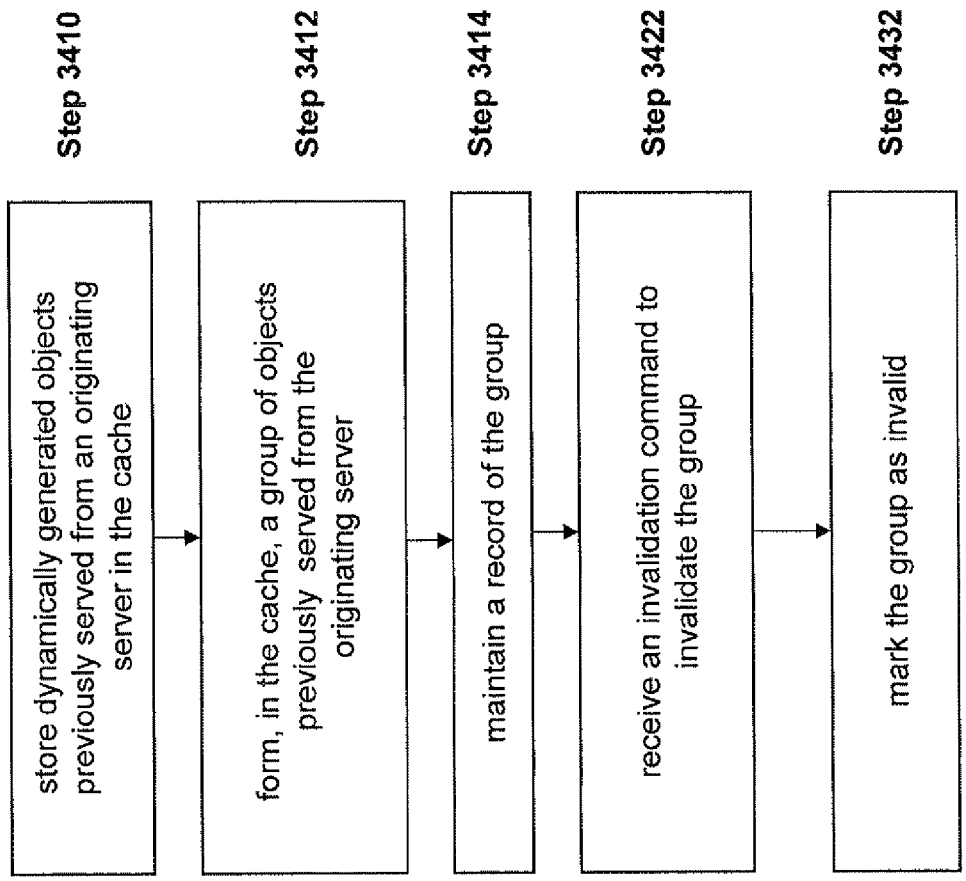
FIG. 29B is a flow diagram of steps taken in an embodiment of a method incorporating invalidation of groups of objects.

A technique is more specifically illustrated in FIGS. 29A and 29B. FIG. 29A is a flow chart illustrating a method for maintaining a cache, such as a computer memory cache. In brief overview and according to step 3410, dynamically generated objects previously served from an originating server 30 are stored in the cache. For example, the dynamically generated object may not be identified as cacheable or otherwise include any cache or cache control information. At step 3420, an invalidation command is received at the cache or cache manager 3232. The invalidation command identifies one or more previously served objects as invalid. As step 3430, in response to the invalidation command, the cache or cache manager 3232 marks the identified object as invalid.

In further detail at step 3410, the cache manager 3232 stores in a cache memory element a dynamically generated object received, obtained or communicate from any source. In some embodiments, the dynamically generated object may be generated and served from a server 30. In other embodiments, the dynamically generated object may be generated and communicated by a client 10. In some embodiments, another portion, component or process of the appliance 1250 generates the object and stores the object in the cache. In further embodiments, the dynamically generated object may be generated by another appliance 1250 or another computing device on the network and transmitted or communicated to the appliance 1250. In some embodiments, the dynamically generated object is not identified as cacheable or identified as non-cacheable. In other embodiments, the dynamically generated object is identified as cacheable or is under cache control.

At step 3420, the cache manager 3232 receives an invalidation command identifying an object to invalidate, such a dynamically generated object stored in the cache. In one embodiment, the invalidation command may comprise any type of directive or instruction indicating to the cache that an object in invalid or otherwise may be stale. In some embodiments, the invalidation command identifies the object and may also identify the time at which the object is invalid as well as what portions of the object may be invalid. In one embodiment, the cache manager 3232 provides an application programming interface (API) that may be called remotely by an originating server 30. In some embodiments, the cache manager 3232 may provide any type and form of protocol for receiving commands and replying to commands via one or more network packets. In one embodiment, the cache manager 3232 or device 1250 provides an Extensible Markup Language (XML) API interface for receiving and processing invalidation commands. For example, the cache manager 3232 may provide a web service interface. In some embodiments, the cache manager 3232 replies to the invalidation command by sending an acknowledgement, status or other response to the originating server 30. In other embodiments, the cache manager 3232 does not reply to the invalidation command. In one embodiment, an object is marked as invalid if an application running in an originating server 30 performed an action that made the stored object stale, such as by generated a new or updated version of the object. This could occur, for example, when news editors make changes to a fast developing news story and therefore want to be assured the most recent version of the story is being served to clients.

Invalidation commands may be issued from an originating server by the application that generated the object, by another server 30 or another appliance 1250. In one embodiment, the originating server 30 issues or communicates an invalidation command to the cache 3232 automatically in response to a change to the dynamically generated object on the originating server 30. The invalidation command can also be generated by an administrative control outside or external to the server 30 and the appliance 1250. For example, the administrative control may be any type and form of program or application running on the network and in communication with the appliance 1250, such as administrator console. Furthermore, a client 10 could issue or communicate an invalidation command to the appliance 1250 or cache manager 3232. For example if the client were to take action that the client 10 recognizes would cause a change to the requested objects at the originating server, the client may communicate the invalidation command. Any object stored in the cache can be invalidated by the transmission to the cache of a user command executed locally at the cache or invoked remotely using the XML API infrastructure.

According to step 3430, an object stored in cache, e.g., a previously served dynamically generated object, that has been identified as invalid is marked as such in response to the invalidation command. An invalid object will not be provided to a requesting client from the cache, but instead would be served directly from the originating server. The cache manager 3232 may mark each object as invalid in any suitable or desired manner. In one embodiment, an object is marked as invalid by setting a flag, attribute, or property of the stored object. For example, a flag may be set to any value identifying to the cache manager 3232 the object is invalid. In another embodiment, an object may be marked as invalid by moving the object to an area or portion of the cache for storing invalid objects. In other embodiments, the cache manager 3232 may identify or track the invalid and/or valid state of a stored object by a database or a linked list or any type and form of data structure. In some embodiments, the cache manager 3232 uses one or more objects to identify or track the validity or invalidity of one or more objects stored in cache. In another embodiment, the object is marked as invalid by changing, modifying or altering the stored object, for example deleting or removing a portion of the object so that is may not be used, or by changing or mangling the name of the object.

In some embodiments, the appliance 1250 subsequently flushes from the cache those objects marked as invalid. In another embodiment, the appliance 1250 flushes the invalid object from cache upon request for the object, such as by a client 10. In some embodiments, the appliance 1250 overwrites the invalid object with an updated copy or version of the object. In another embodiment, the appliance 1250 reuses the cache memory occupied by the invalid object by storing another dynamically generated object to the same portion of cache memory.

With the command invalidation API of the cache manager 3232, any computing device or user in communication with the appliance 1250 may request to invalidate an object, such as a dynamically generated object, stored in the cache. As such, the invalidation of objects stored in cache can be controlled real-time instead of using pre-determined configuration expiry or invalidation time periods. Thus, using these techniques the longevity of the cached objects can be controlled from external application processing nodes such as databases or originating application servers. For example, the appliance 1250 can be configured to work with a database such that a change to the database automatically triggers an invalidation command from the database (or application) to the appliance 1250 to flush a particular object or objects.

d. Invalidation of Groups Using Invalidation Command

In a further embodiment, the appliance 1250 identifies and invalidates at the same time a group of objects stored by the cache. Objects stored in a traditional cache memory are each treated individually and separately by the cache in determining whether the object is stale. As each object reaches its specified expiry time (generally as set by the server and stored by the cache in a table) that item is flushed from cache memory. This traditional approach is inefficient and ultimately insufficient, however, to successfully handle the challenges that arise in attempting to cache dynamically generated content.

FIG. 29B illustrates another embodiment of a method for maintaining a cache, such as a computer memory cache, wherein the appliance 1250 has the ability to create, store, and invalidate groups of related objects that have been previously served from an originating server 30. In brief overview, at step 3410, an object, such as a dynamically generated object served from an originating server 30 is stored in the cache. At step 3412, the cache manager 3232 forms a group of previously served objects stored in the cache. In one embodiment, the group may be associated with or identified by one or more object determinants as will be described in further detail below. At step 3414, the cache manager 3232 maintains a record of the group of objects. At step 3422, the cache manager 3232 receives an invalidation command to invalidate the group of objects. At step 3432, the cache manager 3232 marks the group of objects as invalid in response to the invalidation command.

Step 3410 is the same as in FIG. 29A, wherein an object is stored in the cache of the appliance 1250, such as dynamically generated objects previously served from an originating server 30. In some embodiments, one or more of the objects may not be identified as cacheable, or otherwise may not have any cache or cache control information. For example, the server 30 may assume the dynamically generated objects will not be cached.

According to step 3412, the appliance 1250 forms a group out of a set of the objects previously served from the originating server 30 and stored in the cache. Any suitable or desired set of objects may be associated with each other to form a group. For example, any dynamically generated objects generated for, or associated with, serving a web page may form a group. In some embodiments, an object may be associated with multiple groups. In other embodiments, one group of objects may form a subset of another groups of objects. In some embodiments, the formed group of objects have objects served from the same server 30, while in other embodiments, the formed group of objects have objects served from different servers 30. In further embodiments, the formed group of objects may comprise objects from a client 10, objects from a server 30, or objects generated by or served from both clients 10 and servers 30. In one embodiment, one object in the group is static while another object in the group is dynamically generated. In some cases, one object in the group is not identified as cacheable while another object in the group is identified as cacheable. In other cases, the objects in the group may be logically related in accordance with functionality or application provided by a server 30. In another case, the objects in the group may be related as associated with the same client 10 or the same user.

In step 3414, a record of the group of objects is maintained. Various techniques for recording and maintaining a record of a group of objects, or otherwise associating objects, may be used in practicing some embodiments of the operations described herein. In one embodiment, the record may be maintained directly in, for example, a look-up table. In another embodiments, the records could be represented in a hash-table format. In some embodiments, the cache manager 3232 maintains the association of objects in a database, or a data structure or object in memory. In further embodiments, a flag, property or attribute of each object in the group is assigned or set to a value identifying the group, such as a value equal to, identifying, or referencing the name or identifier of the group, such as a group's object determinant that will be described in more detail below. In some embodiments, a group of objects is arranged, placed or located in a portion of cache memory identified as holding the group In step 3422, an invalidation command is received at the appliance 1250 or cache manager 3232. According to the embodiment described in FIG. 29B, the invalidation command identifies that one or more objects are invalid, or otherwise are stale. In some embodiments, the invalidation command references, identifies or specifies a name or identifier of the group of objects. In one embodiment, the invalidation command comprises a single invalidation request to invalidate all the objects in the group. In another embodiment, the invalidation command identifies one object in the group to invalidate. In other embodiments, the invalidation command comprises a plurality of invalidation request to invalidate a plurality of objects in the group According to step 3432, the group of previously served objects is marked as invalid if the invalidation command references, identifies, or specifies an object of the group as invalid, each object in the group as invalid, or the group as invalid. In some embodiments, if the invalidation command identifies an object in the group as invalid, the cache manager 3232 marks the object as invalid. In other embodiments, if the invalidation command identifies an object in the group as invalid, the cache manager 3232 marks the group of objects as invalid or each object in the group as invalid. In yet further embodiments, the cache manager 3232 may only invalidate the group of objects when a plurality of objects are identified as invalid via one or more invalidation commands. In another embodiment, the invalidation command may specify a name or identifier of the group, and the cache manager 3232 marks the group as invalid, or each object in the group as invalid.

In one embodiment, the appliance 1250 or cache manager 3232 flushes from the cache memory a group of objects that has been marked as invalid. In some embodiments, the objects in the group may be flushed from cache memory only when each object in the group is marked as invalid. In other embodiments, if one object of the group has been marked as invalid then the entire group is flushed. In another embodiment, the group of objects, or any object in the group, marked as invalid may be flushed upon receipt of a request for the group of objects, or any object in group, by a client 10. In other embodiments, the group of objects, or any object in the group, marked as invalid may be flushed upon receipt of a response from a server 30 provide one or more new objects in the group.

An example of the above described embodiments follows. Customer resource management ("CRM") applications are used by many businesses to track and evaluate all aspects of resource management. Often, CRM applications are implemented and accessed over private and public networks including the Internet. These applications, which provide access to large amounts of data that is frequently being accessed, thus benefit from caching the data generated by such applications. For example, sales reports are frequently generated and served to remotely connected users. These sales reports are built by the relevant application through compiling data from sales information that is posted to such application servers and/or their underlying databases. As many users request the same document (i.e., a certain sales report), without caching, the application server must re-generate the object for each request. If, however, such objects can be stored in the cache, then application and database processing is conserved, including potentially valuable bandwidth, as the cache is placed closer to the requesting clients.

The challenge for caching such objects arises because each time a new sale is posted to the application running at the originating server (or to its underlying database), the information in the sales report needs to be updated. As a result, all sales reports that may have been stored in any caches supporting these application servers must be invalidated and the content flushed out of cache memory. The traditional approach to caching, however, has no way of accurately determining when the change to the underlying database or application is going to occur and therefore cannot reasonably evaluate the freshness of dynamic content. Every time a change occurs in database or application or originating server, the cache has to be able to identify that the change has been made, and which group of objects should be invalidated as a consequence of such change. Generation of invalidation commands that contain object determinants linked to groups of previously served objects, as described above, can meet this need.

Multiple groups of related objects may be formed at a single hierarchical level. Alternatively, sub-groups of objects may be formed to create multiple hierarchical levels. In an embodiment, the groups or sub-groups of objects may be pre-designated by a user. In another embodiment, a user may establish rules by which the appliance 1250 automatically forms groups of related objects, and associates object determinants therewith.

e. Identification of Object Determinants in a Client Request or Response

An embodiment also addresses the need to be able to identify all objects affected by a state change at the originating application server 30 (and/or underlying database) by generating groupings of objects and implementing parameterized invalidation. In this embodiment, any object or pre-defined group of objects can be invalidated by an intercepted HTTP request, for example from a client that the cache parses in order to identify an object determinant. The term "object determinant" refers to any information, data, data structure, parameter, value, data pattern, request, reply, or command that references, identifies or specifies one object or a set of objects, uniquely or otherwise. In some embodiments, an object determination is a pattern of bytes or characters in a communication that may be associated with an object or used to uniquely identify that the communication is associated with, or referencing, the object. In one embodiment, an object determinant indicates whether change has occurred or will occur, in the originating server, to a group of previously served objects stored in the cache manager 3232 with which the object determinant is associated. In some embodiments, the objects in a group of objects are related in that they are associated with at least one object determinant. Specific, non-limiting examples of object determinants and further illustrations of their use are described more fully below.

In some embodiments of the present embodiment, object determinants are certain pre-defined parameters or data structures included or embedded in a client request or response. In other embodiments, the client 10, server 30 or appliance 1250 embeds in a communication one or more object determinants, such as pre-defined strings or sets of characters representing the object determinant. The object determinants indicate whether such request will have the effect of causing a change in the state of objects stored in the originating server 30 or databases linked thereto. In one embodiment, the existence of the object determinant in a request indicates a change has or will occur to an object. In another embodiment, the syntax, structure, parameter, or value of the object determinant indicates a change has or will occur to an object. In an embodiment, the cache receives an object request from a client 10. The request may include certain parameters or values (object determinants) that the cache recognizes will change the state of the originating server or application server which will, as a consequence, make stale certain related objects stored by the cache manager 3232 that had been previously generated by such originating server or application server 30. Depending on the invalidation policy set by the user, the parameters (object determinants) may require invalidation of one or more previously served objects or group of objects, by the originating server, that have been stored by the cache. The cache is configured to identify the relevant objects that will be effected by this state change (i.e., those objects or groups of objects linked to the object determinant), and invalidate these objects via the method marking each of the objects as invalid and/or flushing such objects from the cache memory.

Figure 29C:
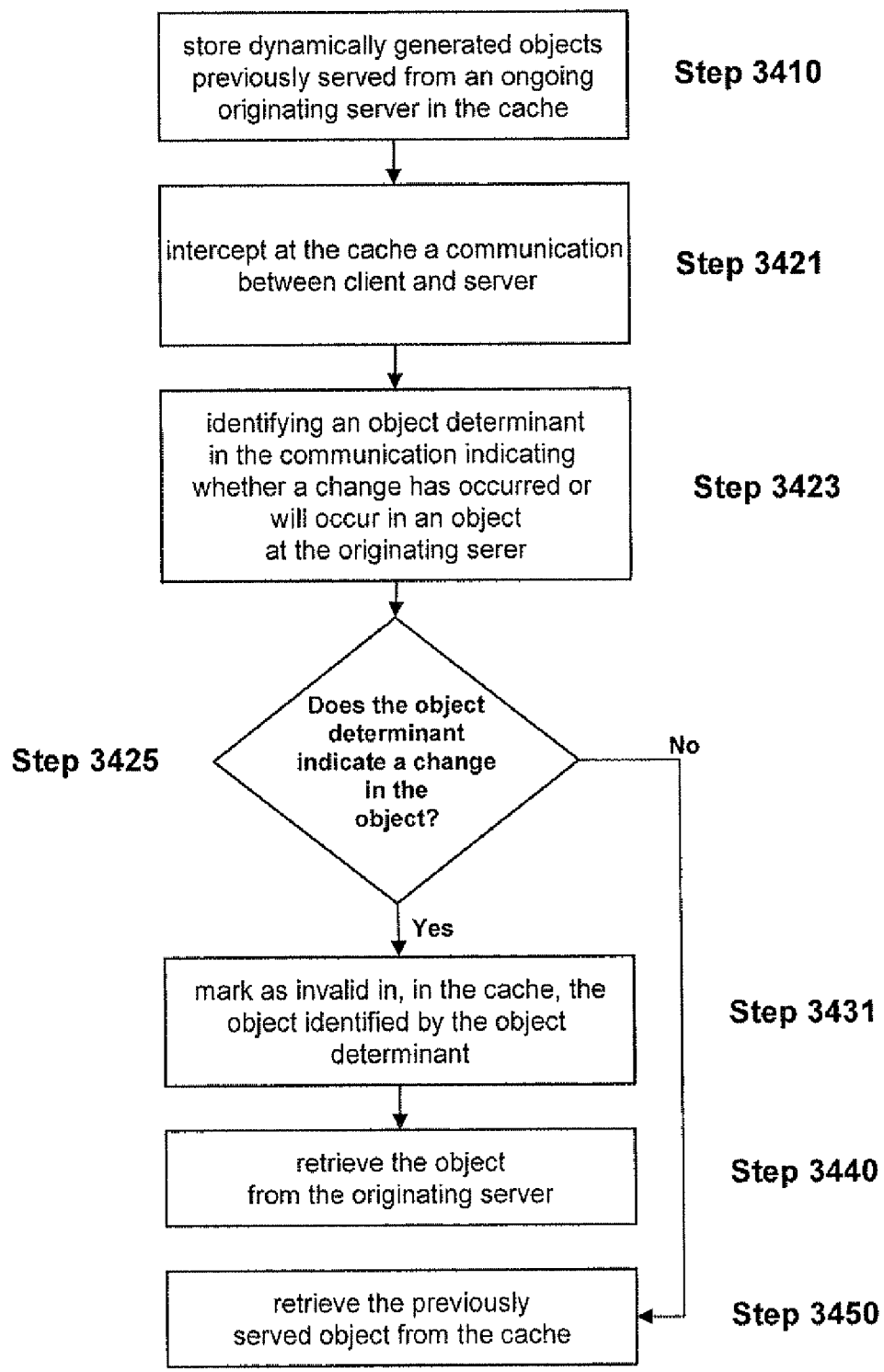
FIG. 29C is a flow diagram of steps taken in an embodiment of a method wherein a client request is parsed for object determinants.

The above described technique is illustrated in FIG. 29C. As with other embodiments described herein, step 3410 comprises storing, in the cache, objects, such as dynamically generated objects previously served from an originating server. The objects could be generated by an application running on the originating server 30, or could be drawn, for example, from a database accessed by the originating server 30. In some embodiments, the dynamically generated objects are identified as not cacheable or otherwise not identified as cacheable.

According to step 3421, the cache intercepts or otherwise receives a communication between the client and the server, such as a request from a client or a response from a server. In some embodiments, the request is for a specified object, the object having been previously served and stored in the cache. In another embodiment, the communication includes a response from a server having a requested object. In one embodiment, such receipt or interception occurs according to established caching protocol and communications standards. Although the cache manager 3232 or appliance 1250 may be generally described as receiving a request, response or communication, in receiving such request, response or communication, the cache 3232 or appliance 1250 may intercept or obtain by any suitable means and/or mechanisms the request, response or communication even though not communicated directly or explicitly to the cache.

In step 3423, an object determinant is identified in the intercepted communication. The cache manager 3232 may extract, interpret, parse, access, read, or otherwise process the intercepted communication to determine or identify one or more objects determinants in the communications. Any parameter, value, syntax, data, structure or set of one or more characters of the communication may be used to identify an object determinant. In one embodiment, the cache manager 3232 may identify the name or identifier of an object in a request from the client 10 to the server 30, in which the client requests the object. In another embodiment, the cache manager 3232 may identify the name or identifier of a first object in the request of the client 10 or response from the server 30 that indicates a change has occurred or will occur to a second object stored in the cache. In other embodiments, the cache manager 3232 determines if any patterns of characters in the request match any object determinants associated with an object or group of objects in the cache. In some embodiments, an object determinant may be determined for an object not currently stored in cache. In other embodiments, an object determinant may be determined for an object currently marked as invalid. In other embodiments, an object determinant for a requested object is determined to be associated with an object determinant of a cached object. In yet another embodiment, upon the first reference, request, or response for an object in a communication, the cache manager 3232 establishes the identified object determinant as the object determinant for the object.

By receiving and parsing the communication, such as a client request or server response, to identify an object determinant, the cache manager 3232 or appliance 1250 may effectively determine whether to mark as invalid a cached object that has been associated with the identified object determinant. Thus, according to step 3425, a determination is made as to whether the object determinant indicates a change to the cached object. In some embodiments, the identified object determinant may be part of a communication that does not alter, modify or generate an object. In other embodiments, the identified object determinant is a part of a communication that indicates a change has occurred or will occur to the object associated with the object determinant. For example, the communication may be a get request for a dynamically generated object or a submit request that will change the data used for one or more dynamically generated objects. In some embodiments, the existence of the object determinant in the communication indicates a change has or will occur on one or more objects. In another embodiment, the type or name of a command, directive or instruction in the communication along with the object determinant indicates a change has or will occur on one or more objects. In yet a further embodiment, the existence, value or setting of a parameter or variable of a command, directive or instruction indicates a change has or will occur on one or more objects associated with an object determinant.

In other embodiments, the cache manager 3232 performs a hash function, algorithm, or operation on the intercepted communication or object determinant to determine if a change has occurred in the object. In some embodiments, the hash value is compared with a previous stored hash value for the object and if different then the cache manager 3232 recognizes the object has changed. In yet another embodiment, a hash value for the object may be included in the communication or object determinant. In one embodiment, the communication indicates the object has changed by the value or setting of a parameter, such as with a Boolean flag. In other embodiments, an entity tag control and validation mechanism as will be described in more detail below may be used to identify the object and determine if the object has changed.

If a change is indicated, then at step 3431, then the object associated with or identified by the object determinant is marked as invalid. In some embodiments, an object requested by the intercepted communication is marked as invalid in accordance with step 3431, and retrieved from the originating server 30 in accordance with step 3440. Otherwise, in other embodiments, the requested object is retrieved from the cache in accordance with step 3450. In one embodiment, any object marked as invalid will be flushed from the cache.

f. Invalidation of Groups of Objects Based on Object Determinants

The above embodiment describes the case of invalidating a previously served object in the cache manager 3232 based on identification of an object determinant in the client request. This general concept may also be used, in another embodiment, to identify and invalidate a group of objects with which one or more object determinants have been associated. This embodiment is illustrated in FIG. 29D.

Figure 29D:
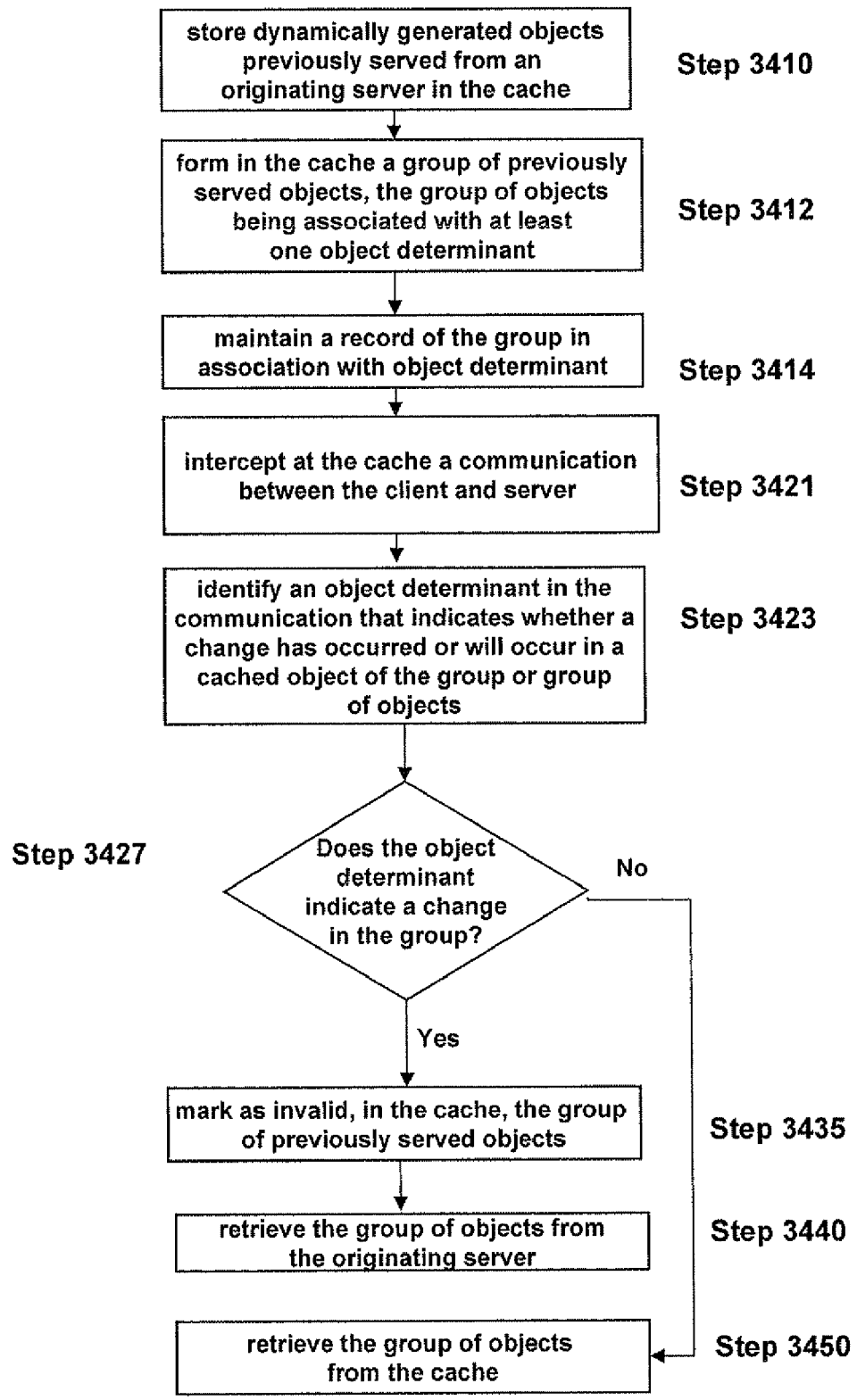
FIG. 29D is a flow diagram of steps taken in an embodiment of a method incorporating invalidation of groups of objects using object determinants.

The method described in FIG. 29D begins in the same fashion as the method of FIG. 29C. Step 3410 comprises storing, in the cache, objects, such as dynamically generated objects previously served from an originating server. In some embodiments, one or more of the objects are not identified as cacheable. According to step 3412 and similar to FIG. 29B, previously served objects are formed into groups. In one embodiment and in accordance with the object determinant technique, a group of objects is associated with or identified by at least one object determinant. As described more fully below, in some embodiments, the association of groups with object determinants depends on the nature and details of the users caching policy, such as a policy defined, controlled or used by the policy engine 3236. In other embodiment, the one or more object determinant of the group comprises the one or more object determinants of the objects in the group. In another embodiment, the object determinant of the group comprises a combination of object determinants of objects in the group.

According to step 3414, a record is maintained of the group, along with its associated object determinants, if applicable. This step is similar to step 3414, illustrated in FIG. 29B. In one embodiment, the record and/or any object determinants of the group is maintained in a look-up table. In other embodiments, the record and/or any object determinants of the group may be maintained in a hash-table format. The hash-table may be designed to efficiently store non-contiguous keys that may have wide gaps in their alphabetic and numeric sequences. In another embodiment, an indexing system can be built on top of a hash-table. In some embodiments, the cache manager 232 maintains the association of objects as a group with one or more object determinants in a database, or a data structure or object in memory. In further embodiments, a flag, property or attribute of each object in the group is assigned or set to a value identifying the group, such as a value equal to, identifying, or referencing the name or identifier of the group, or a group's object determinant. In some embodiments, a group of objects is arranged, placed or located in a portion of cache memory identified as holding the group. In another embodiment, the one or more object determinants are stored in association with the group of objects.

Steps 3421 and 3423 are similar to steps 3421 and 3423 as illustrated in FIG. 29C. According to step 3421, the cache manager 3232 or appliance 1250 intercepts or otherwise receives a communication between the client 10 and server 30, such as a request from a client for an object previously served and stored in the cache. In one embodiment, the cache manager 3232 intercepts a request from the client 10 to the server 30. In some embodiments, the request is for an object stored in cache. In other embodiments, the request is an instruction, command or directive to the server 30 that will cause a change to an object stored in cache, such as to cause an object to be dynamically generated. In another embodiment, the cache manager 3232 intercepts a response from a server 30 to the client 10 comprising or identifying an object stored in cache.

In step 3423, an object determinant is identified in the intercepted communication. As noted above, the object determinant indicates whether a change has occurred or will occur in the requested object, at the originating server 30. However, in the embodiment of FIG. 29D, the object determinant may be associated with a group of objects. This enables efficient invalidation of all objects stored in the cache that may be affected by a particular object determinant. In some embodiments, an object determinant of an object in the group is identified. In other embodiments, an object determinant, for example, a group object determinant, for the group of objects is identified. In another embodiment, a combination of object determinants of one or more objects in the group are identified.

Thus, according to step 3427, a determination is made as to whether the object determinant indicates a change in the group of previously served objects. In some embodiments, the existence of the object determinant of the group in the intercepted communication indicates a change has occurred or will occur to one or more, or all of the objects in the group. In other embodiments, the name and type of a command, directive or instruction in the intercepted communication indicates such changes. In yet another embodiment, the existence, value or setting of any parameters or variables in the communication may also indicate such changes.

If at step 3427, the object determinant indicates a change in the group, then the group of previously served objects is marked as invalid in the cache in accordance with step 3435. In some embodiments, one or more, or all of the objects of the group are requested and retrieved from the originating server 30 in accordance with step 3440. If at step 3427, the object determinant does not indicate a change in the group, then in some embodiments, any objects requested as part of intercepted communication and previously served and stored in the cache is retrieved from the cache manager 3232 in accordance with step 3450. In an embodiment, any object or group of objects marked as invalid may be flushed by the cache manager 3232 from the cache.

g. Designation of Groups

The cache administrator may specifically designate which objects get included into a particular group. Whenever an object is stored in the cache, the administrator may make that object a member of one of the configured or implicit groups depending on the configuration. The configured groups can be based on configurations that an administrator has previously established or alternatively based on application behavior and other data related to object invalidation. An object may also be part of an implicit group if its configured group is dynamic. Objects in the implicit group are grouped by the value of the significant invalidation parameters.

By permitting very flexible grouping of objects, a cache can achieve a level of flexibility and coordination in invalidation that is necessary to effectively cache dynamically generated content. The cache can invalidate a very specific group of objects simultaneously, thereby making the cache more responsive to the frequent need to invalidate dynamically generated content. At the time the cache assigns an object to a group, the group determines a number of things relative to that object, including the invalidation parameters and the hit determinants, in order to associate one or more object determinants therewith.

In the customer resource management ("CRM") example, the cache administrator may pre-designate each of the groupings. For example, the administrator configures the cache to group each of the sales departments by name. Thus the administrator can designate an auto department, a motorcycle department, etc., and each time an object determinant is recognized in a request coming to the cache, the cache can then invalidate all objects stored in a designated group linked to an appropriate department via the object determinant.

h. Ruled-Based Grouping

Alternatively, the cache administrator may establish rules that allow the cache appliance to determine on the run which objects to include in a particular group or groups. Such rules-based groupings may rely on the designation of groups by virtue of established rules that link the object to significant object determinants that the cache utilizes to create the relevant groups. An example of this approach may involve configuring the cache with rules that the cache uses to recognize what objects to put in each group.

Again turning to the CRM example, a rule may state that each subdivision of the Sales Department that is set up on the application should be recognized by the cache as its own grouping. In this way the groupings can be created without the cache administrator having to specifically identify each grouping but allows the cache to determine based on the relevant rules. This technique creates a more flexible and often less work intensive way to designate groupings. The cache administrator could configure a rule that states that every subdivision department of Sales (i.e., sales\auto, sales\motorcycle etc.) should generated a new grouping by the cache. As a request from the Auto Sales Department is processed and returned by the application via the cache, the cache can recognize each subgrouping of sales and automatically create a grouping for it, based on the pre-configured rule.

The rule may be implemented by the cache each time it sees a new request for an object of the type report/sales/auto or report/sales/motorcycle, etc. This process can then be repeated when a Motorcycle Sales Department request showing that it is a sub-grouping of the Sales Department, then the Bicycle Sales Department and so forth, as the cache recognizes these subgroups and establishes an object grouping for each of them. When a known invalidation request comes to the cache linked to one of these groupings, or if a relevant object determinant is identified in a client request (for example a post of a sales report to the Motorcycle Sales Department sales/motorcycle found in the parsing the request), the cache knows to invalidate all the cached objects in the Motorcycle Sales Department Grouping.

In this way, when a cache recognizes that a change has occurred or will occur to data served by the application (either because the cache recognizes that contents of a request received by the cache will trigger a change at the application or because of the occurrence of some outside change), the above technique enables the cache to quickly and simply identify which objects require invalidation through the process of grouping. In this way, the cache is able to invalidate large numbers of dynamically generated objects that are no longer fresh because of changes in the application or database state.

The ability of the cache to successfully store and serve out of its cache memory dynamically generated content can also be enhanced with an intelligent statistical engine that examines the pattern of request and response traffic in order to determine, over a period of time, the set of objects that would provide the most caching benefit. The engine can either be integrated into the cache appliance itself, or run in a separate computer as a heuristic to select some subset of objects for further investigation to determine suitability for dynamic caching.

i. Further Use of Object Determinants

As described above, object determinants may be any data structure that indicates whether a change has occurred or will occur, in the originating server, to the group of previously served objects stored in the cache with which the object determinant is associated. Object determinants could be set up on the basis of predefined string values embedded in the request. For example, when a request comes in with a certain USERID, the USERID can be linked to a group of objects in the cache memory that should be invalidated each time a post or other request comes from that certain USERID. Potential candidates for object determinants could also include using service identifiers of the server that originally served the object. The service identifier contains service IP address, TCP port and service identifier present in the HTTP request.

Another potential object determinant present in the request the request uniform resource locator ("URL"). In the case of caching of static objects, the request URL is typically sufficient to uniquely identify the object. For requests for dynamically generated content, however, the information present in the URL may not be sufficient to identify the cached object. The cache must therefore inspect other information in the request to find object determinants including in HTTP headers, cookie header or in other custom HTTP headers. The cache can additionally look for a subset of relevant parameter information in a variety of other places in the client request, including, without limitation: in the URL query string, in the POST body, in a cookie header, or in any other request or response headers.

The problem in parsing a URL for object determinants is that the URL and other headers may contain a lot of information in addition to what is relevant for the cache's decision. The cache must therefore be able to parse through quite a lot of information to be able to identify the appropriate object determinants. In addition, the data in the header is often arbitrarily ordered, meaning there are no standardized ways that such data is placed into the HTTP header and therefore a simple comparison is often insufficient to locate the relevant object determinants in such string.

If there is no pre-configured policy to match a particular object determinant to a relevant object or group of objects stored in cache memory, the cache may still, in another embodiment, make such a determination. For example, the cache may examine and parse various aspects of the request to discover whether any other object determinants may be found in such request and used to link such request to particular objects stored in the cache memory that should be invalidated. Alternatively, one could also enable the cache to examine a request for certain object determinants that the cache determines, based on certain pre-defined heuristics, may meaningfully linked to particular objects or group of objects. For example, when the request comes into the cache for an update of a calendar associated with a particular USERID, an embodiment could be set up to recognize that all cached objects with USERID equal to the USERID of the request updating the calendar, and that contains the user's calendar for any one particular day, will need to be invalidated.

The cache may also assume that the object determinants are present as a group of name=value or similar pairs in a non-specified order in the URL Stem, in the queries present in the URL, in the POST body or in a Cookie header. In an embodiment, it is assumed that the query is formatted as a list of name=value pairs. The user can therefore configure which parameter names are significant. Every cached object is keyed using first its access URL. The URL may look like /site/application/special/file.ext?p1=v1&p2=v2&p3=v3. The /site/application/special/file.ext part is the URL stem. The p1=v1&p2=v2&p3=v3 part is the URL query and contains parameter-value pairs. These parameter-value pairs may also be present in the POST body or in the Cookie headers.

In an embodiment, the user or administrator establishes that p1 and p2 shall be the invalidation parameters or object determinants. The cache will thereafter automatically group objects that have matching p1 and p2 values. One way of implementing this grouping is to map p1 and p2 to primary keys in database tables, i.e., to uniquely identifiable objects in the table that the cache will know how to reference in order to determine validation status. To update something in those database tables, in order to reflect the fact that data stored in the cache is no longer valid, the cache will specify new values for p1 and p2 and when the cache recognizes such new values the next time it goes to serve such content, it will know to invalidate the linked objects stored in its memory. The cache, when it encounters such a request, on seeing the update request knows that it has to invalidate the group with matching p1 and p2 values—because the cache understands that data in the origin will change, thereby affecting all objects that are related to those p1 and p2 object determinants.

To address the more complex case where the administrator has not pre-configured specific parameters embedded in the request as object determinants, the cache can deploy user-configured policies to extract the relevant object determinants from the request to assist in identifying when to invalidate groupings of objects. The determinant string is then used to locate the group of objects stored in the cache and invalidate such objects. These object determinants can be used to configure the cache to generate lists of significant parameter values. If an incoming write-request has matching values for the significant parameters then the objects tied to those parameter names should be invalidated. Alternatively, a user could specify the policy framework action that can extract the object determinant string from the request. The object determinant string is extracted from the write-request and all objects with matching determinant strings are invalidated. In this alternative approach, a request arrives at the cache, the cache makes a determination whether the request string matches an invalidation policy. The invalidation policy specifies objects in which content group should be invalidated.

Alternatively, the cache could use any other user information that may be present in the client request. As noted above, the authentication and authorization integration allows the cache access to the user information. The USERID or the GROUPID could be one of the determinants in the event the relevant grouping of cached objects are linked to a user or a group of users. Although user information is often an important object determinant, the user information often may not be present in the HTTP request. In a further embodiment, the dynamic caching aspects can be combined with a system and method for integrating the cache with a variety of other networking elements including the ability to perform certain kinds of authentication, access control and audit (AAA) infrastructure. Thus, the level of security accorded to data that is generated by the applications is applied to data that is instead served from a cache. This technique allows the applications to cache sensitive, access controlled information that could not otherwise be cached.

This approach allows the cache to identify users that do not include identifiable user information in the HTTP request but that may be identifiable via the AAA approach described in the Integrated Caching patent. Such an approach enables the cache to identify the relevant user to a particular request through examining the authorization state information that can be shared from the AAA processing. In a further embodiment, the integration enables the application of security policies to information stored in the cache to prevent unauthorized users from accessing information stored at the cache.

This approach also address the challenge posed by the fact that a significant portion of dynamically generated data requires that the client requesting such data be authorized and authenticated before the cache can respond to the relevant request from the client. The cache must have the ability to authorize requests made by authenticated users so that applications can cache access-controlled objects and by integrating such dynamic caching technology with authentication and authorization information, this security can be achieved. The USERID or the GROUPID will be one of the object determinants if the objects are personalized to a user or a group of users. Thus, the level of security accorded to data that is generated by the applications is applied to cached information as well. This technique allows the applications to cache sensitive, access controlled information that could not otherwise be cached.

Finally, other information like time of day, state of the database at the origin, etc., may be parsed from the request and used as object determinants to determine whether objects stored in the cache are still valid. The cache may take care of this situation by configuring appropriate expiration behavior in groupings of objects that are configured to be sensitive to such external variables.

To further address the challenge presented by the fact that requests for dynamic content must be parsed and interpreted by the cache, the cache in accordance with an embodiment can limit which parameters are deemed to be relevant object determinants for the cache. In this way, the success rate for serving objects from the cache rather than forwarding such requests to the applicable application server can be enhanced. By way of example, a request query from a client may contain both a city and a state parameter. However, the cache may be configured to comply with the requirements of the application for which the cache is storing content to recognize that the response can be served to requests coming from clients that the query shows come from all clients in a given state without regard to the city value. For this purpose, the city parameter is not relevant and the cache could recognize this fact. An alternate embodiment involves configuring the cache so that a response can be served from the cache if just the city parameter makes a match regardless of what is specified for the state parameter.

In summary, the cache implements generalized parameterized object matching. In this approach, the cache is configured to recognize the subset of information in the request that will be useful as object determinants, and that are linked to a particular object so that when such object determinants are recognized, the cache can utilize the presence (or conversely the absence of such determinants) in evaluating whether the object or group of objects remains fresh and capable of being served from the cache. The cache maintains a table that it consults each time a request comes in to check against the configured parameters to determine if the requested data remains fresh, and which also allows the cache to match the relevant data to the proper object stored in the cache memory.

j. Incarnation Numbers

In yet another embodiment, the cache can utilize incarnation numbers to invalidate a group of objects. Where a cache needs to change the state of each of a group of objects at one time because of a change in the state at the origin, incarnation numbers provides a simple technique for effecting this invalidation. Whereas identifying each object and changing the state individually is an inefficient approach to assuring freshness of data stored in a cache, use of incarnation numbers enables a much more simple and effective approach to invalidating groups of objects. The present embodiment describes how each object points to a data structure that represents the group and therefore the server need only send a command that changes the state in the data structure for the group. When a subsequent request for a cached object arrives from a client, the cache must first figure out whether the state has changed. To do so it looks up the data structure to reference whether the state has changed for the group.

In order to implement the data structure effectively, the cache must be able to determine whether to look up for a state change. Therefore, the cache must be able to determine whether it has already looked at the state change in the group or not. This is where the incarnation numbers are helpful. The cache associates dynamically generated objects into content groups. Each of these content groups may be represented through a hash table look-up process with a particular index value or "incarnation number" contained in a data structure. Thereafter, whenever the cache receives a client request that the cache recognizes as causing a state change, the client parses the client request for the relevant parameters, performs the hash look-up based on the recognized object determinants, and increments the index or incarnation number in the data structure. Each time an object stored within a designated grouping is requested by a client, the cache performs the hash algorithm on the object, and compares it to the original stored value in the data structure for such content group. If the stored value is the same as the number calculated by the cache for such object, then the cache knows the content remains fresh and can be served to the requestor. In the event the cache detects a discrepancy between the current incarnation number calculated for such object in and the number stored for such content group in the data structure, the cache knows that the stored object is no longer fresh. The cache then invalidates the stored object and sends the request along to the application server. When the response comes back the cache appliance will store the new response in the cache memory and link such response again to the new data structure. Thereafter, each time the cache receives a request for an object in that grouping, the cache can make the comparison and assuming no further changes have been made to the data structure, the cache can serve the newly stored object.

By utilizing invalidation of a group of objects in this fashion, the cache is able to invalidate very quickly—and the time taken is constant regardless of the number of objects invalidated. Through this faster and more efficient process of invalidation, the techniques enable the cache to more effectively handle dynamically generated objects. The approach allows cache appliances that sit in front of applications to more aggressively store and serve dynamically generated objects without serving invalid or stale content because of rapid changes in such data. The embodiment enables the cache to serve data that frequently or unpredictably changes thereby improving the performance of the cache. The cache is also able to invalidate objects and group of objects stored in the cache memory using user commands and also by examining and grouping various kinds of web traffic.

2. Connection Pooling

In one embodiment, a network appliance 1250 (also referred to herein as interface unit 1250) relieves servers 30 of much of the processing load caused by repeatedly opening and closing connections to clients by opening one or more connections with each server and maintaining these connections to allow repeated data accesses by clients via the Internet. This technique is referred to herein as "connection pooling".

For completeness, the operation of connection pooling is briefly described next with reference to FIG. 30. The process begins in FIG. 30 when a client 10 requests access to one of the servers in the server farm tended by interface unit 1250. A connection is opened between interface unit 1250 and the requesting client, and interface unit 1250 receives the client request to access the server, as shown in step 4302. Interface unit 1250 determines the identity of the requested server as shown in step 4304. In one embodiment, this is accomplished by examining the destination network address specified by the client request. In another embodiment, this is accomplished by examining the network address and path name specified by the client request.

After determining the identity of the server 30 to which the client request should be directed, interface unit 1250 determines whether a free connection (that is, one that is not in use) to the server is already open, as shown in step 4306. If so, processing resumes at step 4310. If not, interface unit 1250 opens a connection to the server, as shown in step 4308. Interface unit 1250 then translates the client request and passes it to the server, as shown in step 4310, and as more fully described with respect to FIG. 31, below. After server processing, interface unit receives a response from the server, as shown in step 4312. The server response is translated and passed to the requesting client, as shown in step 4314 and described further below. Finally, interface unit 1250 closes the connection with the client as shown in step 4316. However, the connection between interface unit 1250 and server is not disconnected. By maintaining open connections with the servers and by opening and closing connections with the client as needed, interface unit 1250 frees the servers 30 of nearly all of the connection loading problems associated with serving clients over the Internet.

As will be discussed further below, some embodiments are related to step 4316, where interface unit 1250 closes the connection with the client 10. There are a number of scenarios that result in interface unit 1250 closing the connection with the client. For example, the client may initiate a FIN (finish) command or a RST (reset) command. In both of these scenarios, interface unit 1250 waits until it receives one of these commands before it loses the connection between itself and the client. Inefficiencies with connection pooling occur when the client is not using or finished with the connection but does not relay this information to interface unit 1250 for a period of time. Because interface unit 1250 is waiting for a command from the client in order to reuse the connection for another client, the connection is tied up unnecessarily.

As will be explained in more detail below, Hyper-Text Transfer Protocol (HTTP) 1.1 (by default) and HTTP 1.0 (with the Connection: Keep-Alive Technique) enable the client and/or interface unit 1250 to keep the connection open with the server even after receiving a server response to a request. The client and/or interface unit 1250 may then issue other requests via the same connection, either immediately or after considerable time (or "think time"). A client is in "think time" when the human operator of the client is deciding the next link on the browser to click, and so forth. This can result in connections being maintained by the server even though the server is not processing any requests via the connections. Here, server administrators may be forced to guard against too many simultaneous connections on the server by setting a Keep-Alive timeout after which the connection which has been idle or in "think time" is closed. One embodiment allows the connection to the server to be used by client 10' while the client 10 is "thinking". Of course, if client 10' makes a request when client 10 is using the server connection, then client 10' must use a different connection to the server. However, the efficiency of the connection pooling of one embodiment is realized when a very small number of connections is exceeded and moves into the general case. The general case being when 'n' client connections may be statistically multiplexed onto 'm' server connections, where 'n' is greater than 'm'.

Figure 30:
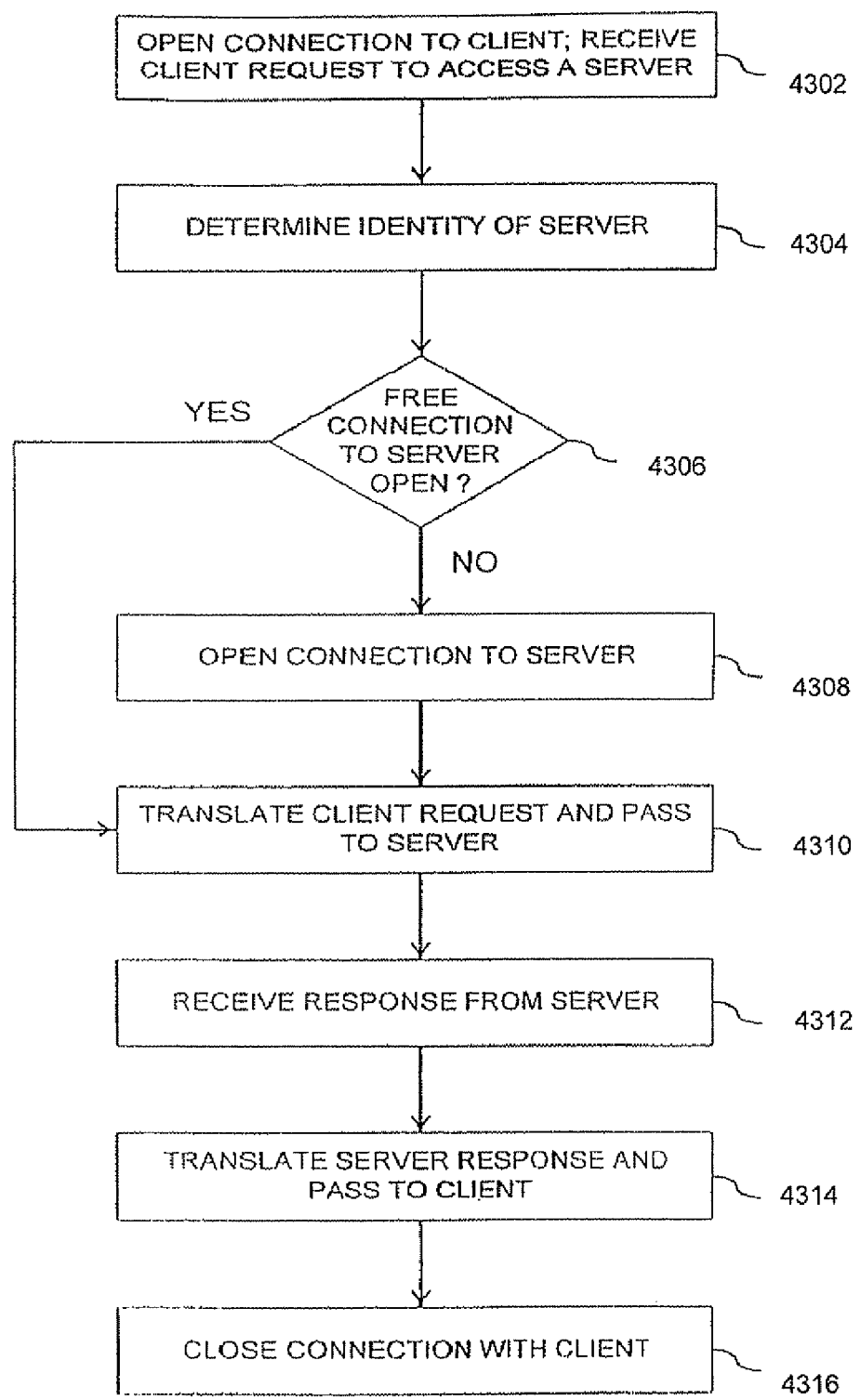
FIG. 30 is a flowchart of steps taken in one embodiment of a method of connection pooling.
Figure 31:
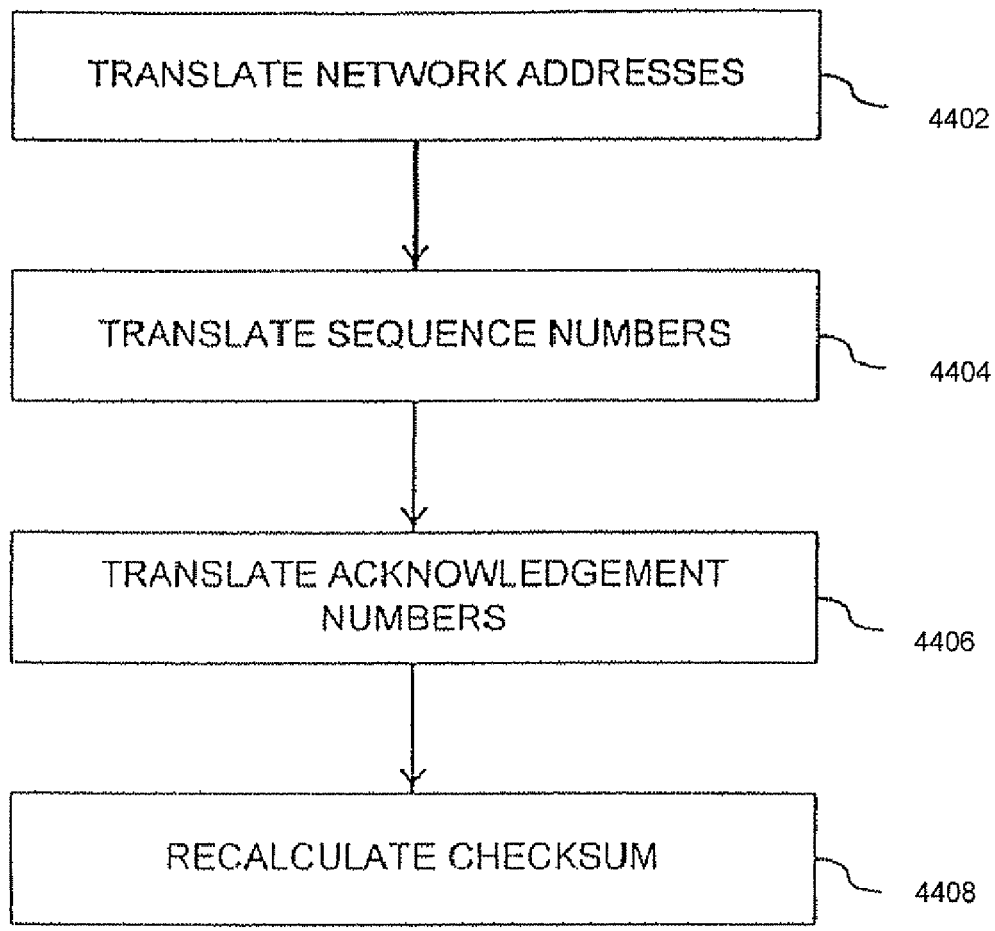
FIG. 31 is a flowchart of steps taken in one embodiment of a method of translating client and server requests.

FIG. 31 is a flowchart depicting the operation of one embodiment of translating client and server requests, as shown in steps 4310 and 4314 (FIG. 30). In an embodiment, the message traffic is in the form of TCP/IP packets, a protocol suite that is well-known in the art. The TCP/IP protocol suite supports many applications, such as Telnet, File Transfer Protocol (FTP), e-mail, and HTTP. The embodiment is described in terms of the HTTP protocol. However, the concepts apply equally well to other TCP/IP applications, as will be apparent to one skilled in the art after reading this specification.

Each TCP packet includes a TCP header and an IP header. The IP header includes a 32-bit source IP address and a 32-bit destination IP address. The TCP header includes a 16-bit source port number and a 16-bit destination port number The source IP address and port number, collectively referred to as the source network address, uniquely identify the source interface of the packet. Likewise, the destination IP address and port number, collectively referred to as the destination network address, uniquely identify the destination interface for the packet. The source and destination network addresses of the packet uniquely identify a connection. The TCP header also includes a 32-bit sequence number and a 32-bit acknowledgment number.

The TCP portion of the packet is referred to as a TCP segment. A TCP segment includes a TCP header and body. The body part of the TCP segment includes a HTTP header and the message. There are two mechanisms for determining the length of the message, including one based on chunked transfer encoding and another based on content-length. A content-length header file is found in the HTTP header. If a content-length header field is present, its value in bytes represents the length of the message-body. Alternatively, if a chunked transfer encoding header is present in the HTTP header, and indicates that the "chunked" transfer coding has been applied, then the length of the message is defined by the chunked encoding. The chunked encoding modifies the body of a message in order to transfer the message as a series of chunks, each with its own indicator contained in the chunk-size field.

As will be discussed in detail below, one embodiment utilizes the content-length parameter and/or the chunked transfer encoding header to increase the efficiency of connection pooling between servers and clients by avoiding the situation where the client is in "think time". Without this embodiment, interface unit 1250 either waits for a command from the client before it reuses the connection for another client or the connection times out when the connection has been idle for too long.

The 32-bit sequence number, mentioned above, identifies the byte in the string of data from the sending TCP to the receiving TCP that the first byte of data in the TCP segment represents. Since every byte that is exchanged is numbered, the acknowledgment number contains the next sequence number that the sender of the acknowledgment expects to receive. This is therefore the sequence number plus one of the last successfully received bytes of data. The checksum covers the TCP segment, i.e., the TCP header and the response data (or body). This is a mandatory field that must be calculated and stored by the sender, and then verified by the receiver.

In order to successfully route an inbound packet from a client to the intended server, or to route an outbound packet from a server to a client, interface unit 1250 employs a process known as "network address translation". Network address translation is well-known in the art, and is specified by request for comments (RFC) 1631, which can be found at the URL http://www.safety.net/RFC1631.txt.

However, in order to seamlessly splice the client and server connections, a novel translation technique was described in detail in the commonly-owned, U.S. patent application Ser. No. 09/188,709, filed Nov. 10, 1998, entitled, "Internet Client-Server Multiplexer," referred to herein as "connection multiplexing". According to this technique, a packet is translated by modifying its sequence number and acknowledgment number at the TCP protocol level. A significant advantage of this technique is that no application layer interaction is required.

Referring to FIG. 31, the network address of the packet is translated, as shown in step 4402. In the case of an in-bound packet (that is, a packet received from a client), the source network address of the packet is changed to that of an output port of interface unit 1250, and the destination network address is changed to that of the intended server. In the case of an outbound packet (that is, one received from a server), the source network address is changed from that of the server to that of an output port of interface unit 1250, and the destination address is changed from that of interface unit 1250 to that of the requesting client. The sequence numbers and acknowledgment numbers of the packet are also translated, as shown in steps 404 and 406 and described in detail below. Finally, the packet checksum is recalculated to account for these translations, as shown in step 4408.

As mentioned above, an embodiment is related specifically to an apparatus, method and computer program product for efficiently pooling network client-server connections though the content-length parameter and/or the chunked transfer encoding header to increase the efficiency of connection pooling between servers and clients. The increase in efficiency is the result of avoiding occupying the connection while the client is in "think time". In one embodiment, the content length parameters is used to determine the length of the message. In another embodiment, chunked transfer encoding is used to determine the length of the message. The two embodiments will be described next with reference to FIGS. 32 and 33, respectively.

Figure 32:
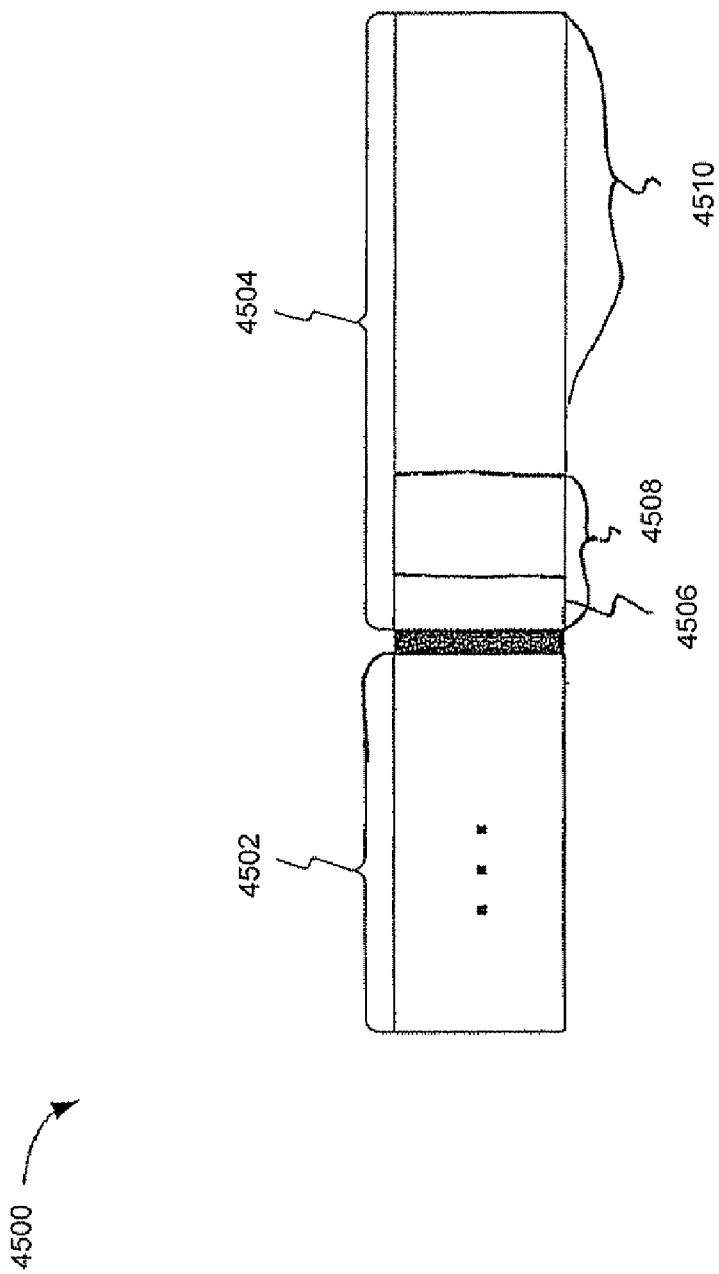
FIG. 32 illustrates one embodiment of a content length parameter.

FIG. 32 illustrates the TCP portion of a TCP packet called the TCP segment 4500. The TCP segment 4500 includes a TCP header 4502 and a body 4504. The body 4504 contains, among other information, a HTTP header and the message. A content length parameter 4506 is found in the HTTP header. How an embodiment utilizes the content length parameter 4506 to provide more efficient connection pooling is described below with reference to FIGS. 35 and 36.

Figure 33:
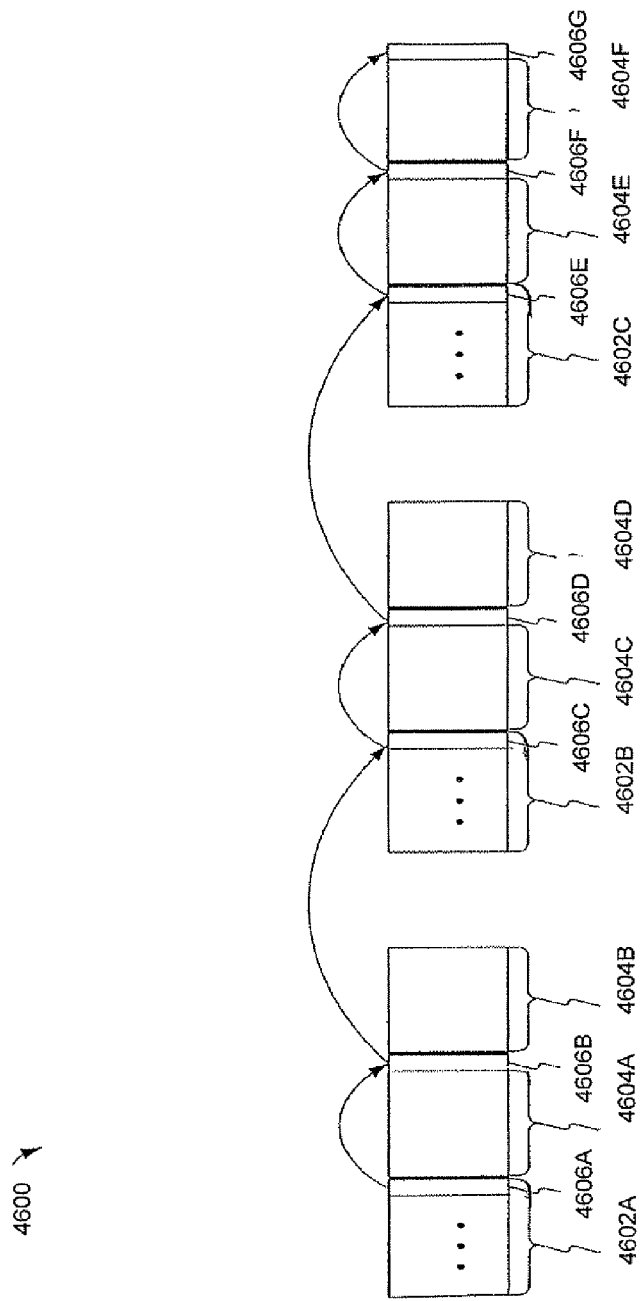
FIG. 33 illustrates one embodiment of chunk-size fields.

FIG. 33 illustrates the TCP portion of a TCP packet called the TCP segment 4600. As stated above, if a chunked transfer encoding header is present in the HTTP header, and indicates that the "chunked" transfer encoding has been applied, then the length of the message is defined by the chunked encoding. The chunked encoding modifies the body of a message in order to transfer the message as a series of chunks, each with its own indicator contained in the chunk-size field. The TCP segment 4600 includes a TCP header (not shown) and a body. The body contains, among other information, a HTTP header 4602A-4602C and the message. HTTP header 4602A-4602C is comprised of seven chunk-size fields 4606A-4606G; and six chunk message data 4604A-4604F, The chunk-size fields 4606A-4606G are linked together, as illustrated in FIG. 33. The chunk-size field 4606A indicates the length of the message in the chunk message data 4604A, chunk-size field 4606C indicates the length of the message in the chunk message data 4604C, and so forth. The last chunk-size field 4606G always contains the length value zero indicating that there is no more message data to follow. This is an indication that all of the message has been sent to the client. How an embodiment utilizes the chunk-size fields 4606A-4606G to provide more efficient connection pooling is described below with reference to FIGS. 37 and 38. It is important to note that TCP segment 4600 in FIG. 33 is for illustration purposes only.

Figure 34:
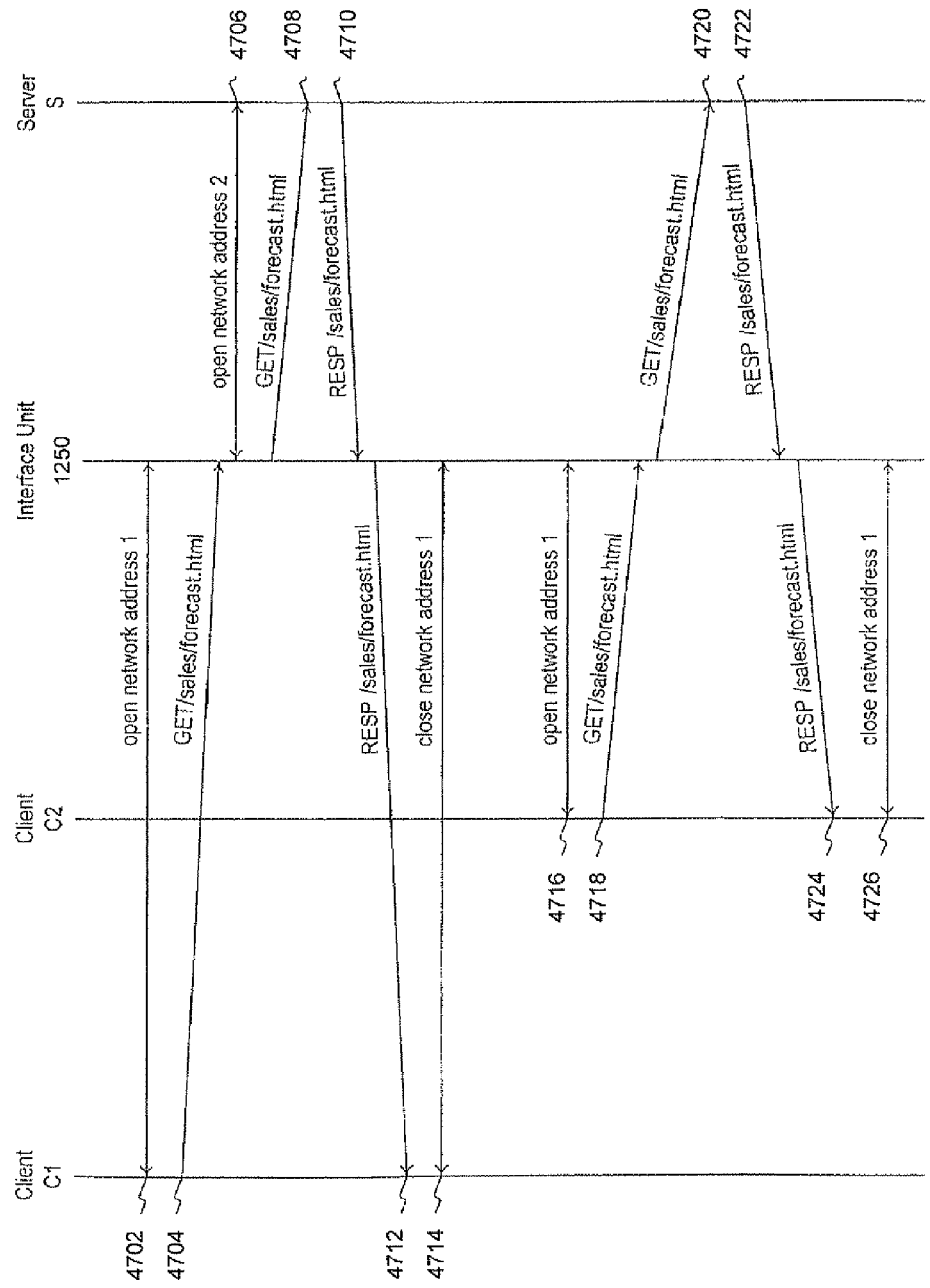
FIG. 34 is a message flow diagram depicting one embodiment of connection pooling.

Prior to describing the detail of how an embodiment utilizes the content length parameter to increase the efficiency of connection pooling, connection pooling as it is described in U.S. patent application Ser. No. 09/188,709, filed Nov. 10, 1998, entitled, "Internet Client-Server Multiplexer," will first be discussed for completeness. FIG. 34 is a message flow diagram illustrating connection pooling. FIG. 34 shows interface unit 1250 connecting two clients, C1 and C2, to a server S. The two clients C1 and C2, may comprise any of the clients 10 discussed herein, and the server S may comprise any of the servers 30 discussed herein. First, interface unit 1250 opens a connection with client C1 using network address 1 provided by client C1 as shown by flow 4702. Flow line 4702 is shown as a two-way flow because the TCP/IP protocol employs a multi-stage handshake to open connections.

Once the connection is opened, interface unit 1250 receives a GET request from client C1 specifying a path name of/sales/forecast.html, as shown by flow line 704. Because no free connection is open between interface unit 1250 and server S, interface unit 1250 opens a connection with server S. Interface unit 1250 maps this request to network address 2, which specifies server S, as shown by flow line 4706. Interface unit 1250 also passes the GET request to that server, as shown by flow line 4708. Server S responds with the requested web page, as shown by flow line 4710. Interface unit 1250 forwards the web page to client C1, as shown by flow line 4712. Finally, the connection between client C1 and interface unit 1250 is closed, as shown by flow line 4714. According to the TCP/IP protocol, closing a network connection can involve a multi-stage process. Therefore, flow line 4714 is shown as bidirectional. It is important to note that interface unit 1250 does not close the connection with server S, but rather keeps it open to accommodate further data flows.

Next, a connection is opened between interface unit 1250 and client C2 using network address 1 provided by client C2, as shown by flow line 4716, Next, interface unit 1250 receives a GET request from client C2 specifying the Web page /sales/forecast.html, as shown by flow line 4718. Because a free connection is already open between interface unit 1250 and server S, it is unnecessary for interface unit 1250 to burden server S with the processing load of opening a further connection. Interface unit 1250 merely uses a free open connection. Interface unit 1250 maps the GET request to server S, transfers it, and forwards it to server S, as shown by flow line 4720. Interface unit 1250 receives the response from server S, as shown by flow line 4722, and forwards it to client C2 as shown by flow line 4724. Finally, interface unit 1250 closes the connection with client C2, as shown in flow line 4726. Once again, interface unit 1250 does not close the connection with server S. Instead, interface unit 1250 keeps the connection open to accommodate further data flows.

As discussed above, there are a number of scenarios that result in interface unit 1250 closing the connection with client C2, as shown in flow line 4724. For example, the client may initiate a FIN (finish) command, which occurs once the client has retrieved all requested data (or message). The client may also initiate a RST (reset) command. In addition to closing the connection between interface unit 1250 and the client, the RST command results in a number of housekeeping operations being performed to keep the server side connection in good order. In particular, the TCP protocol guarantees that the RST command will have the right SEQ (sequence) number so that the server will accept the TCP segment; however, the RST command is not guaranteed to have the right ACK (acknowledge) number. To take care of this scenario, interface unit 1250 keeps track of the bytes of data sent by the server and the bytes acknowledged by the client. If the client has not yet acknowledged all the data by the server, interface unit 1250 calculates the unacknowledged bytes, and sends an ACK to the server. Furthermore, the server side PCB may be placed on a timeout queue to allow any pending server data transfers to drain.

Furthermore, although not shown in FIG. 34, the server can also close a connection between itself and interface unit 1250. The server would send a FIN command to interface unit 1250. In this case, both the connection between the server and interface unit 1250 and the connection between interface unit 1250 and client will be closed.

Another aspect is to maximize offload of connection processing from the server by minimizing the occasions on which the server closes the connection. There are three cases:

(1) The protocol version HTTP/1.1 is used. In this case, no explicit Keep-Alive header is required. By default, the server keeps the connection open; it is up to the client to close the connection. An embodiment offloads the server by reusing the server side connection. Because it is up to the client to close the connection, inefficiencies with connection pooling occur when the client is finished with the connection but does not relay this information to interface unit 1250 for a period of time. Because interface unit 1250 is waiting for a command from the client in order to reuse the connection for another client, the connection is tied up unnecessarily.

(2) The protocol version HTTP/1.0 is used and the "Connection: Keep-Alive" header is provided by the client. In this case, the server keeps the connection open; it is up to the client to close the connection. An embodiment offloads the server by reusing the server side connection. As with protocol version HTTP/1.1, inefficiencies with connection pooling occur when the client is finished with the connection but does not relay this information to interface unit 1250 for a period of time.

(3) The protocol version HTTP/1.0 is used and the "Connection: Keep-Alive" header is not provided by the client. In this case, the server will normally close the connection after fully satisfying one GET request. If the server closes the connection after each request this denies that interface unit 1250 the opportunity to reuse the server side connection. As it turns out much of the Internet still uses HTTP/1.0 without "Connection: Keep Alive". A novel technique for allowing the reuse of server side connections in this specific, important case was described in detail in the commonly-owned, U.S. patent application Ser. No. 09/188,709, filed Nov. 10, 1998, entitled, "Internet Client-Server Multiplexer". Interface unit 1250 inspects the GET packet to detect this situation. When this case is detected, interface unit 1250 inserts "Connection: Keep-Alive" into the GET packet. Since this is done invisibly to the client, interface unit 1250 must keep track of the number of "Bytes Added" on the server side connection. The "Bytes Added" does not affect the Sequence numbers in the GET packet since the sequence number is that of the first byte. However, interface unit 1250 must add "Bytes Added" to the sequence number of subsequent packets from the client to the server. Conversely, the server will acknowledge the additional bytes, but interface unit 1250 must subtract them before sending the acknowledgment to the client—which does not know that these bytes were added.

Figure 35:
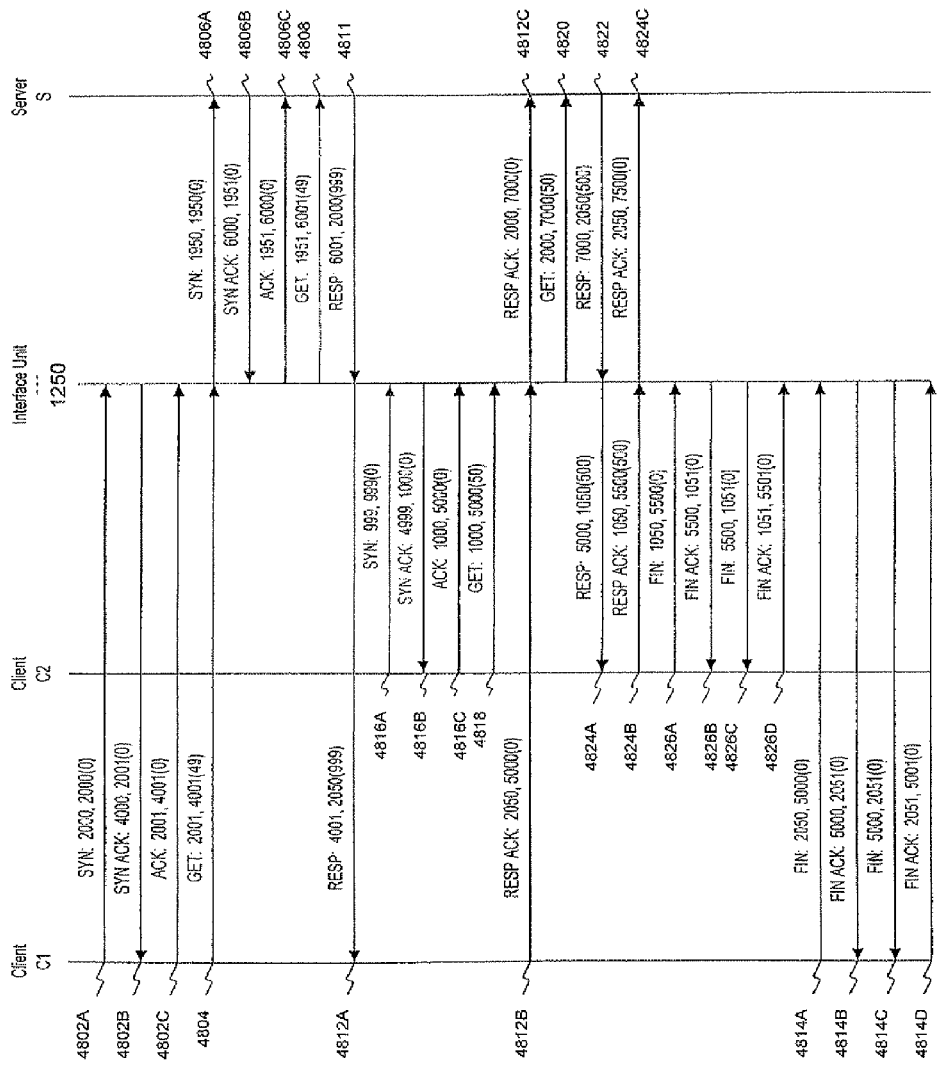
FIG. 35 is a detailed flow diagram illustrating one embodiment of the steps taken to use the content length parameter to increase efficiency of connection pooling between clients and servers.
Figure 36:
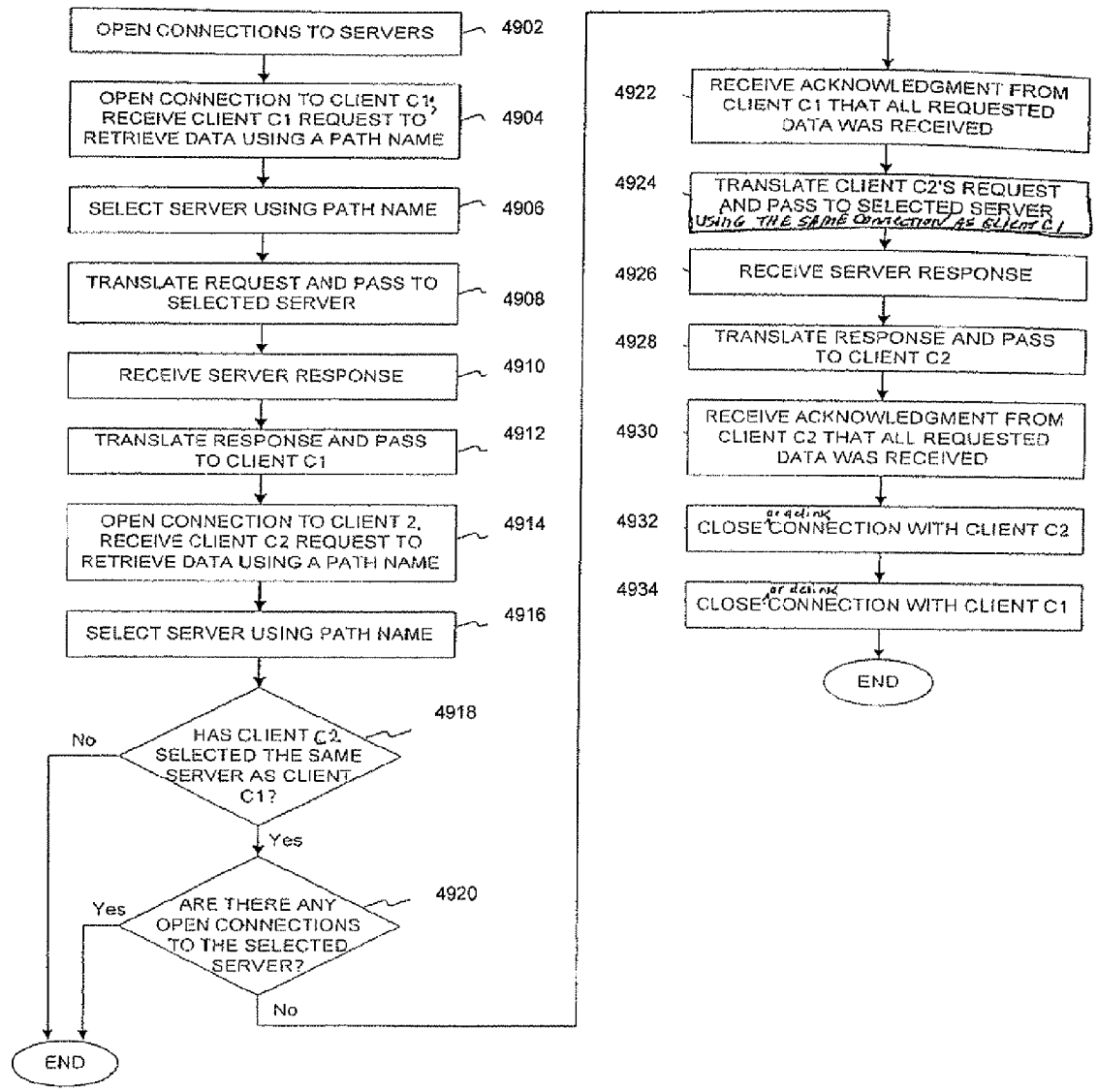
FIG. 36 is a flowchart depicting one embodiment of the steps taken to use the content length parameter to increase efficiency of connection pooling between clients and servers.
Figure 37:
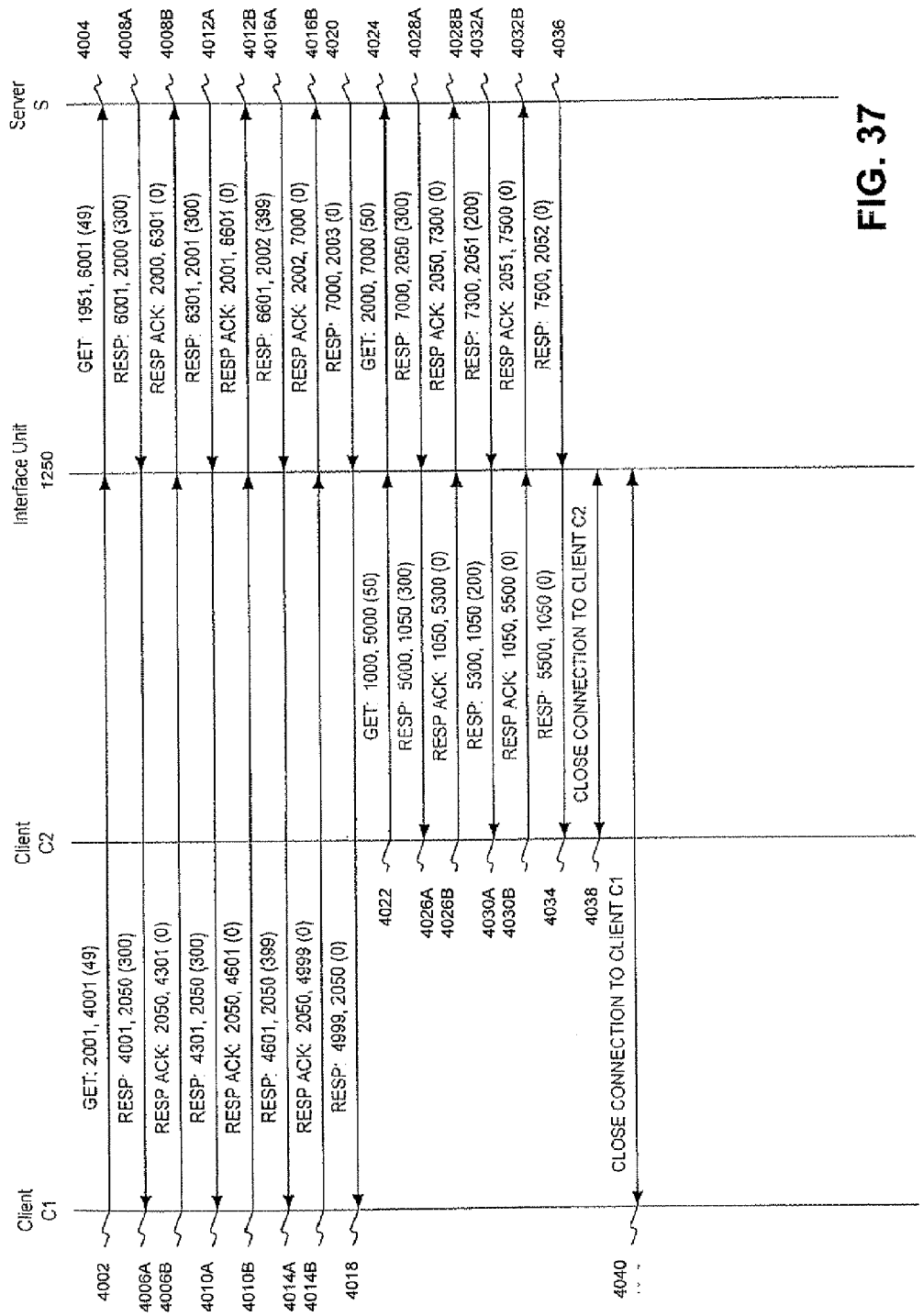
FIG. 37 is a detailed flow diagram illustrating one embodiment of the steps taken to use chunk-size fields to increase efficiency of connection pooling between clients and servers.
Figure 38:
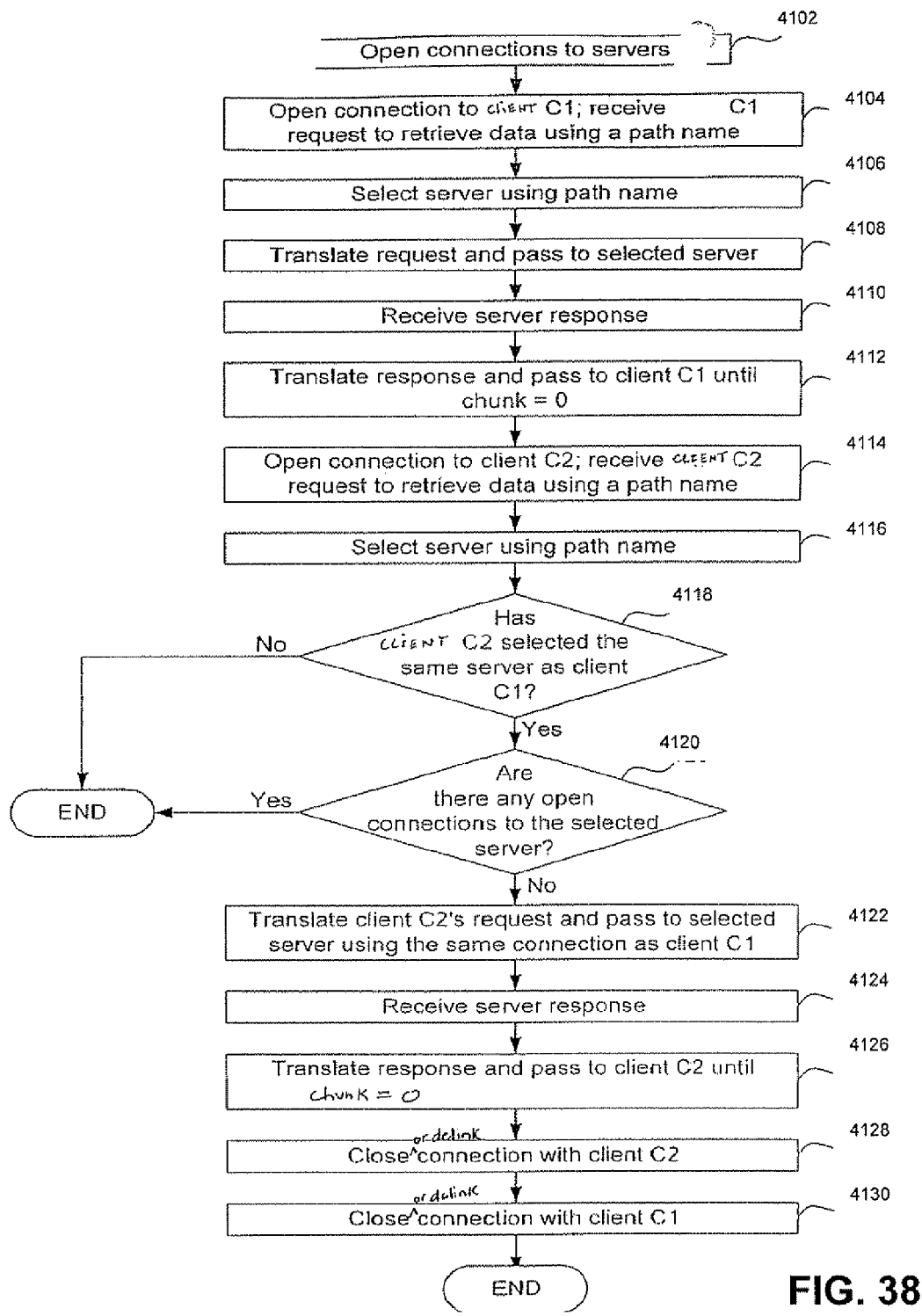
FIG. 38 is a flowchart depicting one embodiment of the steps taken to use chunk-size fields to increase efficiency of connection pooling between clients and servers.

As mentioned above, connection multiplexing is achieved by manipulating sequence and acknowledgment numbers. Sequence and acknowledgment numbers of segments received by interface unit 1250 are modified and mapped to values expected by the recipient. To the client, data appears to be coming from the server and vice versa. For example if "Inflow" denotes a segment received by interface unit 1250 and "Outflow" denotes the corresponding outbound segment, the sequence and acknowledge numbers are changed in the following manner:

> Outflow sequence number=Inflow sequence number−
> Inflow starting sequence number+Outflow starting sequence number
>
> Outflow acknowledge number=Inflow acknowledge number−Inflow starting acknowledge number+
> Outflow starting acknowledge number To address the addition of the "Connection: Keep Alive" header for HTTP/1.0 packets, interface unit 1250 keeps track of "Bytes Added" on the appropriate half of the connection—in this case the server side. The sequence number and acknowledgment number formulas are changed as follows:

> Outflow sequence number=Inflow sequence number−
> Inflow starting sequence number+Outflow starting sequence number+Outflow Bytes Added
>
> Outflow acknowledge number=Inflow acknowledge number−Inflow starting acknowledge number+
> Outflow starting acknowledge number−Inflow
> Bytes Added Specific examples of translations accomplished using these equations while incorporating the content length parameter technique of an embodiment to provide more efficient connection pooling is described below with reference to FIGS. 35 and 36 (relating to content length parameter) and FIGS. 37 and 38 (relating to chunk-size fields).

FIG. 35 is a detailed flow diagram illustrating the translations of acknowledgment and sequence numbers performed by an embodiment while incorporating the content length parameter technique. The label for each flow in FIG. 35 is of the form T:S,A(L), where T represents a TCP segment type, S is the sequence number, A is the acknowledgment number, and L is the content length parameter. The content length parameter describes the number of bytes of data in the message.

Flows 4802A-4802C present one method of opening the connection between client C1 and interface unit 1250. Each flow represents a TCP segment. In TCP segment 4802A, the SYN flag in the TCP header is set, indicating a new connection request from client C1. Client C1 has established a starting sequence number of 2000 and an acknowledgment number of 2000. Interface unit 1250 responds with a SYN ACK segment specifying a starting sequence number of 4000, and incrementing the acknowledgment number to 2001, as shown by flow 4802B. Each entity (e.g., client, server, interface unit) within the network sets its own unique sequence number and/or acknowledgment number, as is well known in the art. Client C1 responds with an ACK segment specifying a sequence number of 2001 and incrementing the acknowledgment number to 4001, as shown by flow 4802C. Client C1 then sends a GET segment specifying a length of 49 bytes, as shown by flow 4804.

Assume that interface unit 1250 determines that no free open connections exist with server S and therefore sends a SYN segment to server S, specifying a starting sequence number of 1950, as shown in flow 806A. Server S responds with a SYN ACK segment specifying a starting sequence number of 6000 and incrementing the acknowledgment number to 1951, as shown in 4806B. Interface unit 1250 responds with an ACK segment, as shown by flow 8060. Interface unit 1250 then forwards the GET segment from client C1 to server S, after modifying the sequence and acknowledgment numbers according to the translation equations described above, as shown by flow line 4808.

Server S responds with the requested data specifying a sequence number of 6001, an acknowledgment number of 2000, and a content length parameter of 999, as shown by flow 4810. Interface unit 1250 receives the RESP segment, translates the sequence and acknowledgment numbers, and forwards the RESP segment to client C1, as shown by flow line 4812A.

At this point, interface unit 1250 receives a request by client C2 to open a connection. As above, flows 4816A-4816C present one method of opening the connection between client C2 and interface unit 1250. Again, each flow represents a TCP segment. In TCP segment 4816A, the SYN flag in the TCP header is set, indicating a new connection request from client C2. Client C2 has established a starting sequence number of 999 and an acknowledgment number of 999. Interface unit 1250 responds with a SYN ACK segment specifying a starting sequence number of 4999, and incrementing the acknowledgment number to 1000, as shown by flow 4816B. Client C2 responds with an ACK segment specifying a sequence number of 1000 and incrementing the acknowledgment number to 5000, as shown by flow 4816C. Client C2 then sends a GET segment specifying a length of 50 bytes, as shown by flow 4818.

Assume at this point that interface unit 1250 has no available connections to server S. The goal is to reuse the same connection to server S that was previous used for client C1 if client C1 is finished with the connection or is in "think time". Instead of waiting for client C1 to initiate a FIN (finish) command or a RST (reset) command to free up the connection, interface unit 1250 uses the content length parameter to confirm that all of the requested data has been received by client C1. Here, at flow 4812B, interface unit 1250 receives confirmation from client C1 that client C1 has in fact received all of the requested data. This indicates to interface unit 1250 that, even though client C1 may be pausing for some reason before it sends a FIN or RST command, client C1 is finished with the connection. Interface unit 1250 modifies the acknowledgment and sequence numbers and forwards the RESP ACK segment to server S, as shown by flow 812C.

Using the same connection as used with client C1, interface unit 1250 then forwards the GET segment from client C2 to server S, after modifying the sequence and acknowledgment numbers according to the translation equations described above, as shown by flow line 4820. Server S responds with the requested data specifying a sequence number of 7000, an acknowledgment number of 2050, and a content length parameter of 500, as shown by flow 822.

Interface unit 1250 receives the RESP segment, translates the sequence and acknowledgment numbers, and forwards the RESP segment to client C2, as shown by flow line 4824A. Here, at flow 4824B, interface unit 1250 gets confirmation from client C2 that client C2 has in fact received all of the requested data. Interface unit 1250 modifies the acknowledgment and sequence numbers and forwards the RESP ACK segment to server S, as shown by flow 4824C.

The connection between client C2 and interface unit 1250 is then closed or delinked once interface unit 1250 receives a FIN or RST command from client C2, as shown by flows 4826A-4826D. Likewise, the connection between client C1 and interface unit 1250 is then closed or delinked once it receives a FIN or RST command from client C1, as shown by flows 4814A-4814D. It is important to note, however, that interface unit 1250 maintains the connection with server S It is also important to note that the sequence of events as they were described with reference to FIG. 36 is for illustration purposes only.

FIG. 36 is a flowchart depicting the operation of the use of the content length parameter to increase the efficiency of the pooling of connections between clients and servers according to an embodiment. Interface unit 1250 maintains connections with a plurality of servers, and routes client requests to these servers based on the path name specified in the client request. First, interface unit 1250 opens connections with the servers, as shown in step 4902. Next, in response to a client C1 request, interface unit 1250 opens a connection to client C1 and receives a request from client C1 to retrieve data using a path name, as shown in step 4904.

Interface unit 1250 then selects the server hosting the content specified by the path name, as shown in step 4906. In alternative embodiments, interface unit 1250 consults other predefined policies to select the appropriate server, such as the load of the servers and the state of the servers. Interface unit 1250 manages and maintains a database of servers and server farms that it tends. Among other things, information in this database includes currently active policies and rules that allow interface unit 1250 to direct incoming packets to the correct server. Depending on network conditions and services desired, these policies and rules can change very quickly.

Interface unit 1250 then translates the request and passes the translated request to the selected server, as shown in step 4908. Interface unit 1250 receives the response from server S, as shown in step 4910. Interface unit 1250 then translates the response and passes the translated response on to client C1, as shown in step 4912.

Assume for illustration purposes that at this point interface unit 1250 receives a request from client C2 to retrieve data. Interface unit 1250, in response to the client C2 request, opens a connection to client C2 and receives a request from client C2 to retrieve data using a path name, as shown in step 4914. Interface unit 1250 then selects the server hosting the content specified by the path name, as shown in step 4916.

In step 4918, interface unit 1250 determines whether client C2 has selected the same server as client C1. If the outcome to step 4918 is negative, then interface unit 1250 proceeds in a fashion necessary to satisfy client C2's request (which is not important to this embodiment). At this point the flowchart in FIG. 36 ends. Alternatively, if the outcome to step 4918 is positive, then interface unit 1250 determines whether there are any open connections to the selected server, as shown in step 920.

If the outcome to step 4920 is positive, then interface unit 1250 proceeds in a fashion necessary to satisfy client C2's request (which is not important to this embodiment). At this point the flowchart in FIG. 9 ends. Alternatively, if the outcome to step 4920 is negative, then interface unit 1250 utilizes the content length parameter to confirm that client C1 received all of the data that client C1 requested, as shown in step 4922. It is important to note that interface unit 1250 does not wait for client C1 to send a FIN or RST command in order to determine that client C1 is finished with the connection or is in "think time". This allows for more efficient connection pooling due to the fact that interface unit 1250 can utilize each connection quicker than if interface unit 1250 waited for the client to close the connection prior to reusing the connection for another client.

In step 4924, interface unit 1250 then translates the request and passes the translated request to the selected server using the same connection as client C1 used, as shown in step 4924. Interface unit 1250 receives the response from server S, as shown in step 4926. Interface unit 1250 then translates the response and passes the translated response on to client C2, as shown in step 4928. Interface unit 1250 utilizes the content length parameter to confirm that client C2 received all of the data that client C2 requested, as shown in step 4930.

Next, interface unit 1250 closes or delinks the connection with client C2 in step 4932. Finally, interface unit 1250 closes or delinks the connection with client C1 in step 4934, and the flowchart in FIG. 36 ends. As stated above with reference to FIG. 35, the sequence of events as they were described with reference to FIG. 36 is for illustration purposes only.

FIG. 37 is a detailed flow diagram illustrating the translations of acknowledgment and sequence numbers performed by an embodiment while incorporating the chunk-size fields technique. The label for each flow in FIG. 37 is of the form T:S,A(L), where T represents a TCP segment type, S is the sequence number, A is the acknowledgment number, and L is a chunk-size field. The total values of the chunk-size fields describes the number of bytes of data in the TCP segment.

For simplicity, we assume that connections to both client C1 and client C2 have already been established. Client C1 then sends a GET segment specifying a length of 49 bytes, as shown by flow 4002. Interface unit 1250 determines that no free open connections exist with server S and therefore opens a connection with server S (not shown in FIG. 37). Interface unit 1250 then forwards the GET segment from client C1 to server S, after modifying the sequence and acknowledgment numbers according to the translation equations described above, as shown by flow line 4004.

For illustration purposes, assume that the data in the response segment has a total content data length of 999. Further assume that the data will be transmitted in two 300 data chunks and one 399 data chunk. Note that this is for illustration purposes only and is not intended to limit. Therefore, the server S first responds with a chunk of the requested data (or message) specifying a sequence number of 6001, an acknowledgment number of 2000, and a chunk-size field of 300, as shown by flow 4008A. Interface unit 1250 receives the RESP segment, translates the sequence and acknowledgment numbers, and forwards the RESP segment to client C1, as shown by flow line 4006A. Client C1 acknowledges receipt of the data to interface unit 1250, as shown by flow line 4006B. Interface unit 1250 in return passes this acknowledgment on to server S, as shown by flow line 4008B.

Server S next responds with the second chunk of the requested data specifying a sequence number of 6301, an acknowledgment number of 2001, and a chunk-size field of 300, as shown by flow 4012A. Interface unit 1250 receives the RESP segment, translates the sequence and acknowledgment numbers, and forwards the RESP segment to client C1, as shown by flow line 4010A. Client C1 acknowledges receipt of the data to interface unit 1250, as shown by flow line 4010B. Interface unit 1250 in return passes this acknowledgment on to server S, as shown by flow line 4012B.

Server S next responds with the third chunk of the requested data specifying a sequence number of 6601, an acknowledgment number of 2002, and a chunk-size field of 399, as shown by flow 4016A. Interface unit 1250 receives the RESP segment, translates the sequence and acknowledgment numbers, and forwards the RESP segment to client C1, as shown by flow line 4014A. Client C1 acknowledges receipt of the data to interface unit 1250, as shown by flow line 4014B. Interface unit 1250 in return passes this acknowledgment on to server S, as shown by flow line 4016B.

Finally, server S responds with the final chunk of the zero data (indicated by a chunk-size field that equals zero) specifying a sequence number of 7000, an acknowledgment number of 2003, and a chunk-size field of 0, as shown by flow 4020. Interface unit 1250 receives the RESP segment, translates the sequence and acknowledgment numbers, and forwards the RESP segment to client C1, as shown by flow line 4018. This indicates to interface unit 1250 and client C1 that all of the requested data has been transmitted.

At this point, client C2 then sends a GET segment specifying a length of 50 bytes, as shown by flow 4022. Assume at this point that interface unit 1250 has no available connections to server S. The goal is to reuse the same connection to server S that was previous used for client C1 if client C1 is finished with the connection or is in "think time". Instead of waiting for client C1 to initiate a FIN (finish) command or a RST (reset) command to free up the connection, the interface unit uses the chunk-size field that equaled zero to confirm that all of the requested data has been received by client C1. This indicates to interface unit 1250 that, even though client C1 may be pausing for some reason before it sends a FIN or RST command, client C1 is finished with the connection. Interface unit 1250 modifies the acknowledgment and sequence numbers and forwards the GET segment to server S, as shown by flow 4024.

For illustration purposes, assume that the data in the response segment has a total content data length of 500. Further assume that the data will be transmitted in one 300 data chunk and one 200 data chunk. Note that this is for illustration purposes only and is not intended to limit. Therefore, the server S first responds with a chunk of the requested data specifying a sequence number of 7000, an acknowledgment number of 2050, and a chunk-size field of 300, as shown by flow 1028A. Interface unit 1250 receives the RESP segment, translates the sequence and acknowledgment numbers, and forwards the RESP segment to client C2, as shown by flow line 1026A. Client C2 acknowledges receipt of the data to interface unit 1250, as shown by flow line 4026B. Interface unit 1250 in return passes this acknowledgment on to server S, as shown by flow line 4028B.

Server S next responds with the second chunk of the requested data specifying a sequence number of 7300, an acknowledgment number of 2051, and a chunk-size field of 200, as shown by flow 4032A. Interface unit 1250 receives the RESP segment, translates the sequence and acknowledgment numbers, and forwards the RESP segment to client C2, as shown by flow line 4030A. Client C2 acknowledges receipt of the data to interface unit 1250, as shown by flow line 4030B. Interface unit 1250 in return passes this information on to server S, as shown by flow line 4032B.

Finally, server S responds with the final chunk of the zero data (indicated by a chunk-size field that equals zero) specifying a sequence number of 7500, an acknowledgment number of 2052, and a chunk-size field of 0, as shown by flow 4036. Interface unit 1250 receives the RESP segment, translates the sequence and acknowledgment numbers, and forwards the RESP segment to client C2, as shown by flow line 4034. This indicates to interface unit 1250 and client C2 that all of the requested data has been transmitted.

The connection between client C2 and interface unit 1250 is then closed or delinked once interface unit 1250 receives a FIN or RST command from client C2, as shown by flow 4038. Likewise, the connection between client C1 and interface unit 1250 is then closed or delinked once it receives a FIN or RST command from client C1, as shown by flow 4040. It is important to note, however, that interface unit 1250 maintains the connection with server S. It is also important to note that the sequence of events as they were described with reference to FIG. 37 is for illustration purposes only and does not limit.

FIG. 38 is a flowchart depicting the operation of the use of the chunk-size fields to increase the efficiency of the pooling of connections between clients and servers according to an embodiment. Interface unit 1250 maintains connections with a plurality of servers, and routes client requests to these servers based on the path name specified in the client request. First, interface unit 1250 opens connections with the servers, as shown in step 4102. Next, in response to a client C1 request, interface unit 1250 opens a connection to client C1 and receives a request from client C1 to retrieve data using a path name, as shown in step 4104.

Interface unit 1250 then selects the server hosting the content specified by the path name, as shown in step 4106. Interface unit 1250 then translates the request and passes the translated request to the selected server, as shown in step 4108. Interface unit 1250 receives the response from server S as shown in step 4110. Interface unit 1250 then translates the response and passes the translated response on to client C1 until chunk-size field is equal to zero, as shown in step 4112.

Assume for illustration purposes that at this point interface unit 1250 receives a request from client C2 to open a connection. Interface unit 1250, in response to a client C2 request, opens a connection to client C2 and receives a request from client C2 to retrieve data using a path name, as shown in step 4114. Interface unit 1250 then selects the server hosting the content specified by the path name, as shown in step 4116.

In step 4118, interface unit 1250 determines whether client C2 has selected the same server as client C1. If the outcome to step 4118 is negative, then interface unit 1250 proceeds in a fashion necessary to satisfy client C2's request. At this point the flowchart in FIG. 38 ends. Alternatively, if the outcome to step 4118 is positive, then interface unit 1250 determines whether there are any open connections to the selected server, as shown in step 4120.

If the outcome to step 1120 is positive, then interface unit 1250 proceeds in a fashion necessary to satisfy client C2's request. At this point the flowchart in FIG. 38 ends. Alternatively, if the outcome to step 4120 is negative, then interface unit 1250 utilizes the fact that chunk-size field equaled zero in step 4112 to confirm that client C1 received all of the message data that client C1 requested. It is important to note that interface unit 1250 does not wait for client C1 to send a FIN or RST command in order to determine that client C1 is finished with the connection or is in "think time".

In step 4122, interface unit 1250 then translates the request and passes the translated request to the selected server using the same connection as client C1 used. Interface unit 1250 receives the response from server S, as shown in step 4124. Interface unit 1250 then translates the response and passes the translated response on to client C2 until chunk-size field equals zero, as shown in step 4126. Interface unit 1250 utilizes the chunk-size field to confirm that client C2 received all of the message data that client C2 requested.

Next, interface unit 1250 closes or delinks the connection with client C2 in step 4128. Finally, interface unit 1250 closes or delinks the connection with client C1 in step 4130, and the flowchart in FIG. 38 ends. As stated above with reference to FIG. 37, the sequence of events as they were described with reference to FIG. 38 is for illustration purposes only and does not limit.

The previous embodiments are described specifically when implemented within an interface unit, such as interface unit 1250, that is connected to servers in a farm for the purpose of offloading connection processing overhead from the servers. However, they can also be applied within other kinds of devices that are in the network connection path between the client and the servers. As network traffic flows through such devices, they all have the opportunity to offload connection processing. Some examples of such devices are:

Load Balancers which distribute client network connections between a set of servers in a server farm (local or geographically distributed).

Bandwidth managers which monitor network traffic and meter packet flow.

Firewalls monitor packets and allow only the authorized packets to flow through.

Routers and switches also lie in the path of the network traffic. The industry trend may be to integrate additional functionality (such as load balancing, bandwidth management and firewall functionality) within these devices.

Embodiments can also be applied within computer systems which are the end points of network connections. In this case, add-on cards can be used to offload the main processing elements within the computer system.

3. Integrated Caching

Figure 39:
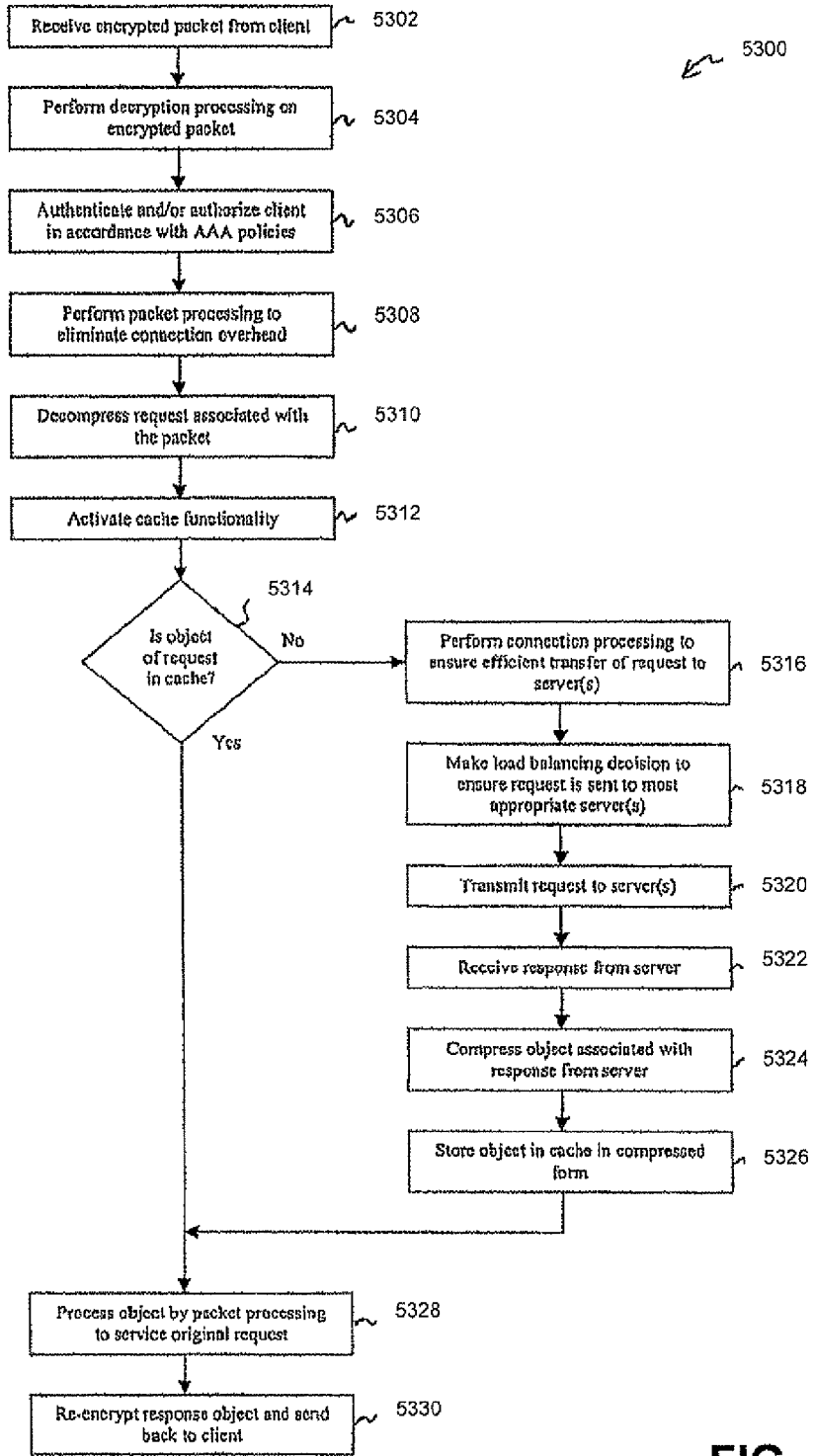
FIG. 39 is a flowchart of one embodiment of the steps taken to a provide integrated caching functionality.

FIG. 39 illustrates a flowchart 5300 of a sequence of events that may occur in an appliance that provides integrated caching functionality in accordance with an embodiment. However, the embodiment is not limited to the description provided by the flowchart 5300. Rather, it will be apparent to persons skilled in the relevant art(s) from the teachings provided herein that other functional flours are within the scope and spirit of the embodiment. These other functional flows could involve different processing, different sequencing and other variations on the integration of caching.

The method of flowchart 5300 can be implemented in one or more device(s) that are communicatively coupled to a data communication network. For example, the method of flowchart 5300 can be implemented in an appliance such as appliance 1250 described above in reference to FIG. 1A, having a software architecture 3200 as described above in reference to FIG. 28A. The method of flowchart 5300 will be described with continued reference to this exemplary embodiment.

As shown in FIG. 39, the method of flowchart 5300 begins at step 5302, in which appliance 1250 receives an encrypted packet from one of clients 10. In an embodiment, appliance 1250 is configured to act as a proxy SSL endpoint for servers 30, decrypting encrypted packets received from clients 10, and then sending there on for further processing as necessary and ultimately on to an appropriate resource based on address information within the encrypted packets. The appropriate resource may be, for example, any of servers 30 or the cache managed by appliance 1250. At step 5304, appliance 1250 performs decryption processing on the packet.

At step 5306, appliance 1250, which is configured in accordance with an embodiment to carry out AAA policies for access control, authenticates and/or authorizes the client from which the encrypted packet was received.

At step 5308, appliance 1250, which is configured in accordance with an embodiment to perform certain types of packet processing, carries out packet processing on the decrypted packets to reduce the connection overhead processing requirements generated by the applicable network protocols.

At step 5310, appliance 1250, which is configured in accordance with an embodiment to compress and decompress content, decompresses a request associated with the packet. In an embodiment, the request comprises a web object request.

At step 5312, appliance 1250 is then able to activate the cache functionality, which receives a clear and/or authorized and/or decompressed and/or packet-processed request for an object. Because of the prior processing described in reference to steps 5302, 5304, 306, 5308 and 5310, the cache management logic can make a decision as to whether the object has been cached or is cacheable based on a clear/authorized/ decompressed/packet processed request and is therefore able to process a much wider array of requests then traditional caches and to carry out the caching more efficiently than under traditional approaches. Furthermore, because the cache management logic is working in the kernel space along with the other processes, it relates to the relevant object as a data structure with equal status in relation to such data structure as each of the other applications and therefore the integration is earned out in an extremely efficient manner, As shown at step 5314, if the object is not already in the cache memory, appliance 1250 sends a request on to one or more servers 30. Before the request is sent, however, several additional processing steps may occur.

For example, at step 5316, appliance 1250 optionally performs connection processing to ensure efficient transit of the request to the server(s) and at step 5318, appliance 1250 optionally makes a load balancing decision to ensure that the request is sent to the most appropriate server(s). Also, in an embodiment, the request is encrypted before it is sent to the server(s) via a back-end encryption process, thereby providing end-to-end network security. At step 5320, the request is transmitted to the server(s), At step 5322, appliance 1250 receives a response back from one of the servers 30. If back-end encryption is supported as discussed above, appliance 1250 decrypts the response from the server.

At step 5324, appliance 1250 compresses an object associated with the response from the server. In an embodiment, the object comprises a web object.

At step 5326, the cache management logic in appliance 1250 stores the object in the cache in compressed form. The cache management logic is able to store compressed objects in this fashion due to the processing abilities—Once the object is stored in the cache, future client requests for the object can be served from the cache without performance of steps 5316, 5318, 5320, 5322, 5324 and 5326 as described above. This is indicated by the line directly connecting decision step 5314 to step 5328 in flowchart 5300.

At stop 5328, after the object has been received from a server or retrieved from the cache, appliance 1250 performs packet processing on the connection to more efficiently service the original client request. At step 5330, the response object is then re-encrypted and delivered back to the client.

Each of the processing steps described above occurs at the kernel/OS level of appliance 1250. By implementing the cache in the middle of, and integrated with, other processing steps in the kernel/OS space, an embodiment is able to bring out additional functionality and improve performance of the cache.

Such integration permits a cache implementation in accordance with an embodiment to perform additional functions that are traditionally beyond the functional abilities of a cache. For example, an embodiment permits the cache to work with encrypted and/or compressed objects.

Another example of additional functionality that may be achieved by an embodiment involves the caching of end-to-end encrypted HTTPS traffic. Typically, caches only store unencrypted HTTP responses from servers. Certain caches may in some cases support SSL encrypted HTTPS delivery from the cache to the clients but, in any case, traditional caches are not able to cache responses that have been encrypted by the server and so are unable to support end-to-end (i.e. server to client) encryption. Typically, when a response is encrypted by the server in the form of HTTPS, the cache is not able to decrypt such a response and is therefore unable to store the response in its cache memory. For this reason, traditional caches fail to provide any benefit in the face of end-to-end encrypted traffic in an embodiment, the integrated caching appliance serves as a two-way termination point for the SSL encrypted HTTPS traffic.

For example, in a embodiment, the integrated caching appliance acts as a termination point both to encrypted traffic between the server and the appliance, and between the appliance and the clients. In this manner, the appliance is able to decrypt and cache SSL-encrypted responses received from servers and when serving such responses to a client, re-encrypt such response and securely deliver it to the requesting client, thereby enabling end-to-end encryption and thus increasing the applicability of caching to a wider variety of web traffic.

In an embodiment, the appliance can also serve as an endpoint in an SSL virtual private network (SSL VPN). In particular, the appliance can act as a proxy SSL endpoint for any resource in a private data communication network, decrypting encrypted packets received from a client and then sending there on to the appropriate destination server resource based on address information within the encrypted packets. A data communication session established between client and a gateway may be encrypted with the gateway serving as an encryption endpoint as described in the preceding paragraphs of the present application. As described, the client may use Secure Sockets Layer (SSL), IPSec, or some other encryption method to establish the encrypted data communication session by which an interception mechanism on the client directs traffic to the gateway while making the client browser think it is communicating directly with the destination servers or destination networks, In such an embodiment, the encrypted data communication session can be terminated at the gateway, which also includes an integrated cache as described herein. In this way caching functionality can be integrated into the SSL VPN functionality.

The gateway can also perform any applicable AAA. policies to the request and consequently, the gateway will serve cached objects only to appropriately authenticated clients, as well as permitting requests only for users authorized to access a particular cached object. This is possible because the cache is integrated in such a way that the access control policies of the gateway are enforced before the cache sees any particular request. Thus, cached objects get the benefit of access control without the cache itself needing to perform the authentication and authorization. Through the integration of the cache with such other functions, the cache itself becomes more efficient and more effective at handling the variety of data that passes across today's networks. An embodiment also is able to improve the efficiency of the overall network performance by introducing the benefits of cache functionality to a broader array of web traffic.

Some other unique results of the mode of integration described above in accordance with an embodiment are as follows. One result is the ability to cache pre-compressed data and serve it to compression-aware clients. Another result is the ability to cache access controlled data. Yet another result is the ability to work with external caches to provide scalability of the cache. Because the cache is integrated with redirection and traffic management capabilities at the gateway, external caches can be deployed to provide a second-tier of caching thereby extending the capacity (and the benefits) of caching significantly. Through an embodiment, this capacity is created without the cache module itself having to explicitly perform cache redirection policies.

In terms of performance, by integrating the cache as described above, the processors of the cache are freed from performing the variety of connection processing tasks that caches, acting as a nodes on a network, are traditionally required to perform, and are thus able to perform its caching functions at their highest performance levels. Indeed, by enabling the caching of compressed data, the cache is able to function even more efficiently and allow users to realize even higher performance.

As previously noted in this application, the efficiency arises as a result of the way the cache is integrated with the other network services and technologies including load balancing technology, encryption, AAA, compression and other types of acceleration and packet processing. As a result, processing duplications and other' inefficiencies introduced by traditional modes of integration are avoided. These inefficiencies, caused by unnecessary copying and context switching, arise because each object received by the device must be copied to a message and then into a processor memory prior to processing by the relevant application. The request must then be copied back to the object or packet level for processing by the cache introducing additional memory copies. In contrast, an embodiment carries out the integration at the OS or kernel level, thereby enabling the cache to operate on the object as a data structure where the cache has equal status as the other applications and/or processes in relating to and processing such data structure and where the need for such additional memory copies is obviated as all processes are working with the same data structure. The result is a more efficient integration.

a. Caching with Proactive Validation in a Data Communication Network

Because web objects can change over time, each potentially cacheable object is said to have a useful life, or "freshness", The concept of freshness refers to the fact that the application server that originally generated the content also determines the period of time that such object can be served by a cache that may store such object—Caches must be able to determine whether or not the copy of an object stored in its memory is still "fresh," or whether the cache needs to retrieve a new copy of the object from the origin server. An embodiment implements a novel approach to assuring object freshness. Many conventional cache implementations try to keep the cached content fresh by fetching the content from the origin on a pre-determined schedule. The fetching of content from the origin occurs at times established by the cache administrator typically based on one or both of the following approaches: either at (i) regular specified intervals or (ii) when the content is about to expire.

There are two problems typically associated with the above commonly-employed approaches. First, unnecessary processing loads are imposed upon the origin server because that server is required to provide content to the cache requesting the refreshment (whether such refresh occurs at specified intervals or as the content is about to expire) without regard to whether such content will ultimately be served to clients, Second the cache incurs additional processor load based on the extra processing overhead generated because the cache needs to keep track of the elements that must be refreshed and the time at which they have to be refreshed.

A cache in accordance with an embodiment solves the above problems using a novel pre-fetching approach. The prefetching of the content is not performed in accordance with a predefined schedule or Just prior to expiration of the content. Instead, an embodiment performs pre-fetching only when both of the following conditions have been met: (1) a client has made a request for, the specified content and (2) that content is 'about to expire'.

This approach addresses both problems described above. Pro-active revalidation is more likely to generate a request for refreshing of content from the origin server only where such content is being actively accessed. This minimizes the amount of 'unnecessary' load on the origin server—As discussed above, where the cache requests refreshment of objects that are not ultimately served to clients (or only rarely get served depending on the sensitivity of the cache), the cache is inefficiently utilizing both its own resources as well as the resources of the origin server. An embodiment avoids the inefficient use of the cache and server resources by requesting only that content that is being actively accessed. The approach also, for the same reason, reduces the bandwidth used for pre-fetching and therefore makes more efficient use of network resources than traditional approaches.

Furthermore, an embodiment uses the expiry information included in the cached object itself to determines whether to request refreshment of the object from the origin server. Such expiry information is typically included in the headers of the relevant object. This embodiment thus avoids the inefficiencies of staring any additional information for fetching unlike many traditional approaches which require the cache to keep a table tracking the schedule for refreshment. Using a 'demand-based' pre-fetching technique also enhances benefits that are inherent to pre-fetching. This technique reduces the number of cache misses for frequently accessed objects since such objects are very likely to undergo pro-active revalidation, just before they expire. This technique can also prevent the surge of traffic to an origin server that can occur when a large response that is in great demand expires. In the traditional approach, all of the requests for such content miss the cache and get sent to the origin server because the cache content has expired. By contrast, in an embodiment, the content of the cache memory will generally be refreshed just prior to expiration and therefore the situation where cache misses occur while the cache is refreshing are much less likely to arise.

In an embodiment, the aggressiveness of pre-fetching can be controlled through adjusting the length of the duration before the expiry where the content is determined to be about to expire and also the number of client requests required to trigger refreshment by the cache of the relevant object.

b. Optimizing Processing of Large Non-Cacheable Responses Using "Negative Cells"

In accordance with an embodiment, the cache recognizes and does not store objects that are above a specified size in order to improve the object hit ratio. Caches typically have limited memory space devoted to storing cached objects and therefore certain responses that exceed allocated memory space are ultimately rejected as non-cacheable and not stored by the cache. With traditional caches, the cache attempts to store the large response in its cache memory and only aborts storing the response once the cache recognizes that the response size exceeds a predefined maximum size. Traditional caches will repeatedly attempt to cache the large response each time a request for such response is received by the cache from the server In each case, the cache will need to determine that the object is non-cacheable as exceeding the memory space, Thus, this is a manifestly inefficient approach.

In accordance with an embodiment, the cache employs an optimization to avoid expending effort in storing such responses. Whenever the cache detects a response that becomes non-cacheable due to response size, it stores a notation regarding the corresponding request in a data structure termed a "negative cell." The notation indicates that the request is non-cacheable, In the fixture, when a client requests the same object, the request is matched to the notation regarded the first request stored in the data structure. Eased on the match, the cache will not try to cache the response and instead the request will completely bypass the cache.

There is no user configuration required for specifying the duration for which a negative cell should remain in the cache, In fact, the users are not even aware that this particular mechanism is being employed. In an embodiment, the cache uses the regular expiry information that it would have employed to cache the big response, to cache the "negative information" about that response.

4. Client-Side Acceleration

Figure 40A:
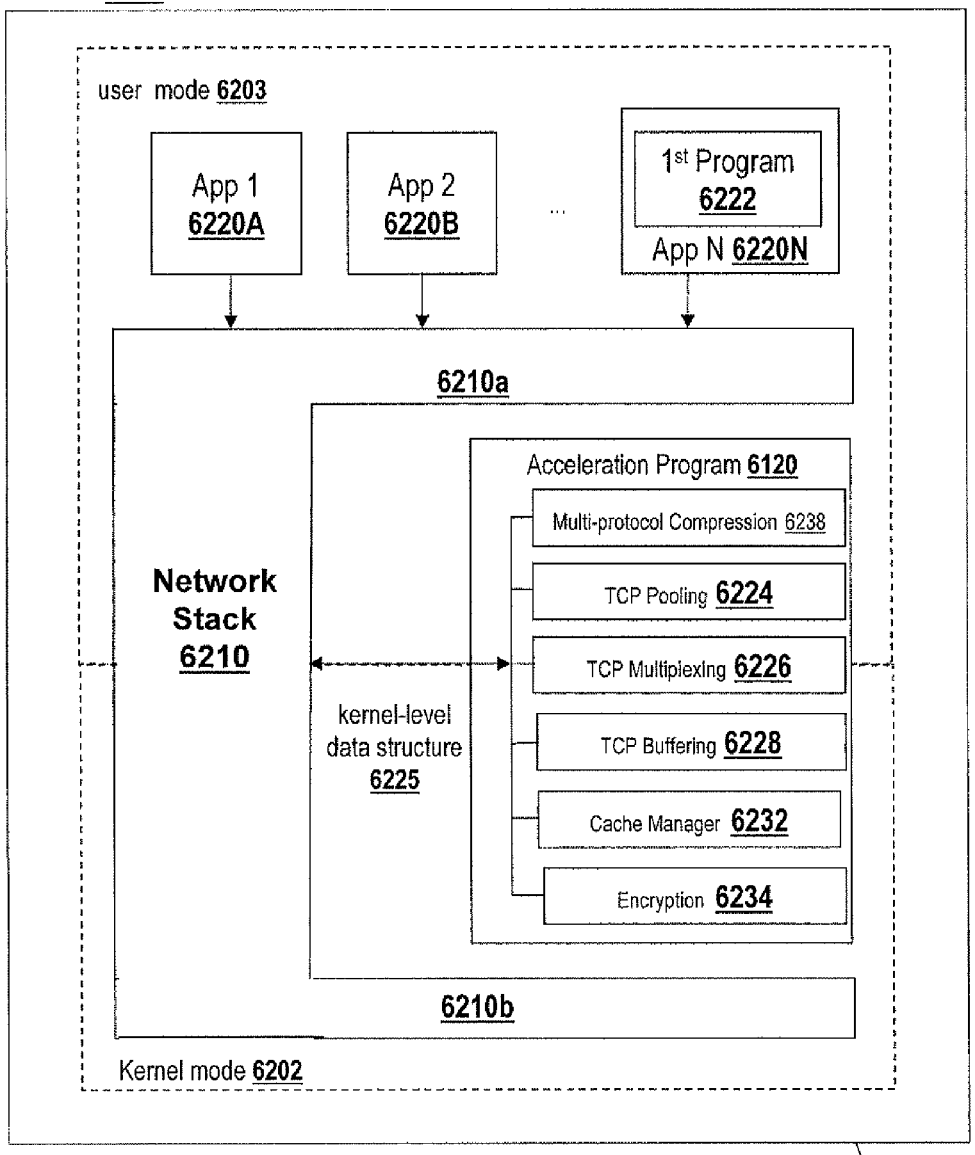
FIG. 40A is a block diagram of an embodiment of a client-side acceleration program.

In one embodiment, a client-side acceleration program may perform one or more acceleration techniques to accelerate, enhance or otherwise improve a client's communications with and/or access to a server, such as accessing an application provided by a server. Referring now to FIG. 40A, a client 6205 having an acceleration program 6120 is depicted. In brief overview, the client 6205 operates on computing device 6100 having an operating system with a kernel mode 6202 and a user mode 6202, and a network stack 6210 with one or more layers 6210a-6210b. The client 6205 may comprise any and all of the clients 10 previously discussed. Although only one client 6205 is shown, any number of clients 10 may comprise the client 6205. The client 6205 may have installed and/or execute one or more applications 6220a-6220n. In some embodiments, one or more applications 6220a-6220n may communicate via the network stack 6210 to a network. One of the applications 6220N may also include a first program 6222, for example, a program which may be used in some embodiments to install and/or execute the acceleration program 6120.

The network stack 6210 of the client 6205 may comprise any type and form of software, or hardware, or any combinations thereof, for providing connectivity to and communications with a network. In one embodiment, the network stack 6210 comprises a software implementation for a network protocol suite. The network stack 6210 may comprise one or more network layers, such as any networks layers of the Open Systems Interconnection (OSI) communications model as those skilled in the art recognize and appreciate. As such, the network stack 6210 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 6210 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 210 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 6210, such as for voice communications or real-time data communications.

Furthermore, the network stack 6210 may include one or more network drivers supporting the one or more layers, such as a TCP driver or a network layer driver. The network drivers may be included as part of the operating system of the computing device 100 or as part of any network interface cards or other network access components of the computing device 6100. In some embodiments, any of the network drivers of the network stack 6210 may be customized, modified or adapted to provide a custom or modified portion of the network stack 6210 in support of any of the techniques described herein. In other embodiments, the acceleration program 6120 is designed and constructed to operate with or work in conjunction with the network stack 6210 installed or otherwise provided by the operating system of the client 205.

The network stack 6210 comprises any type and form of interfaces for receiving, obtaining, providing or otherwise accessing any information and data related to network communications of the client 6205. In one embodiment, an interface to the network stack 6210 comprises an application programming interface (API). The interface may also comprise any function call, hooking or filtering mechanism, event or call back mechanism, or any type of interfacing technique. The network stack 6210 via the interface may receive or provide any type and form of data structure, such as an object, related to functionality or operation of the network stack 6210. For example, the data structure may comprise information and data related to a network packet or one or more network packets. In some embodiments, the data structure comprises a portion of the network packet processed at a protocol layer of the network stack 6210, such as a network packet of the transport layer. In some embodiments, the data structure 6225 comprises a kernel-level data structure, while in other embodiments, the data structure 6225 comprises a user-mode data structure. A kernel-level data structure may comprise a data structure obtained or related to a portion of the network stack 6210 operating in kernel-mode 6202, or a network driver or other software running in kernel-mode 6202, or any data structure obtained or received by a service, process, task, thread or other executable instructions running or operating in kernel-mode of the operating system.

Additionally, some portions of the network stack 6210 may execute or operate in kernel-mode 6202, for example, the data link or network layer, while other portions execute or operate in user-mode 6203, such as an application layer of the network stack 6210. For example, a first portion 6210a of the network stack may provide user-mode access to the network stack 6210 to an application 6220a-6220n while a second portion 6210a of the network stack 6210 provides access to a network. In some embodiments, a first portion 6210a of the network stack may comprise one or more upper layers of the network stack 6210, such as any of layers 5-7. In other embodiments, a second portion 6210b of the network stack 6210 comprises one or more lower layers, such as any of layers 1-4. Each of the first portion 6210a and second portion 6210b of the network stack 6210 may comprise any portion of the network stack 6210, at any one or more network layers, in user-mode 6203, kernel-mode, 6202, or combinations thereof, or at any portion of a network layer or interface point to a network layer or any portion of or interface point to the user-mode 6203 and kernel-mode 6203.

The acceleration program 6120 of the present may comprise software, hardware, or any combination of software and hardware. In some embodiments, the acceleration program 6120 comprises any type and form of executable instructions constructed and designed to execute or provide the functionality and operations as described herein. In some embodiments, the acceleration program 6120 comprises any type and form of application, program, service, process, task or thread. In one embodiment, the acceleration program 6120 comprises a driver, such as a network driver constructed and designed to interface and work with the network stack 6210. The logic, functions, and/or operations of the executable instructions of the acceleration program 6120 may perform one or more of the following acceleration techniques: 1) multi-protocol compression 6238, 2) transport control protocol pooling 6224, 3) transport control protocol multiplexing 6226, 4) transport control protocol buffering 6228, and 5) caching via a cache manager 6232, which will be described in further detail below. Additionally, the acceleration program 6120 may perform encryption 6234 and/or decryption of any communications received and/or transmitted by the client 6205. In some embodiments, the acceleration program 6120 also performs tunneling between the client 6205 and another computing device 6100, such as a server 30. In other embodiments, the acceleration program 6120 provides a virtual private network connection to a server 30.

In some embodiments, the acceleration program 6120 operates at one or more layers of the network stack 6210, such as at the transport layer. In one embodiment, the acceleration program 6120 comprises a filter driver, hooking mechanism, or any form and type of suitable network driver interface that interfaces to the transport layer of the network stack, such as via the transport driver interface (TDI). In some embodiments, the acceleration program 6120 interfaces to a first protocol layer, such as the transport layer and another protocol layer, such as any layer above the transport protocol layer, for example, an application protocol layer. In one embodiment, the acceleration program 6120 may comprise a driver complying with the Network Driver Interface Specification (NDIS), or a NDIS driver. In another embodiment, the acceleration program 6120 may comprise a min-filter or a miniport driver. In one embodiment, the acceleration program 6120, or portion thereof, operates in kernel-mode 6202. In another embodiment, the acceleration program 6120, or portion thereof, operates in user-mode 6203. In some embodiments, a portion of the acceleration program 6120 operates in kernel-mode 6202 while another portion of the acceleration program 6120 operates in user-mode 6203. In other embodiments, the acceleration program 6120 operates in user-mode 6203 but interfaces to a kernel-mode driver, process, service, task or portion of the operating system, such as to obtain a kernel-level data structure 6225. In further embodiments, the acceleration program 6120 is a user-mode application or program, such as application 6220a-6220n.

The acceleration program 6120 may operate at or interface with a protocol layer in a manner transparent to any other protocol layer of the network stack 6210. For example, in one embodiment, the acceleration program 6120 operates or interfaces with the transport layer of the network stack 6210 transparently to any protocol layer below the transport layer, such as the network layer, and any protocol layer above the transport layer, such as the session, presentation or application layer protocols. This allows the other protocol layers of the network stack 6210 to operate as desired and without modification for using the acceleration program 6120. As such, the acceleration program 6120 can interface with the transport layer to accelerate any communications provided via any protocol carried by the transport layer, such as any application layer protocol over TCP/IP.

Furthermore, the acceleration program 6120 may operate at or interface with the network stack 6210 in a manner transparent to any application 6220a-6220n, a user of the client 6205, and any other computing device, such as a server, in communications with the client 6205. The acceleration program 6120 may be installed and/or executed on the client 6205 in a manner such as the acceleration program 6120 may accelerate any communications of an application 6220a-6220n without modification of the application 6220a-6220n. In some embodiments, the user of the client 6205 or a computing device in communications with the client 6205 are not aware of the existence, execution or operation of the acceleration program 6120. As such, in some embodiments, the acceleration program 6120 is installed, executed, and/or operated transparently to an application 6220a-6220n, user of the client 6205, another computing device, such as a server, or any of the protocol layers above and/or below the protocol layer interfaced to by the acceleration program 6120.

In some embodiments, the acceleration program 6120 performs one or more of the acceleration techniques 6224, 6226, 6228, 6232 in an integrated manner or fashion. In one embodiment, the acceleration program 6128 comprises any type and form of mechanism to intercept, hook, filter, or receive communications at the transport protocol layer of the network stack 6210. By intercepting a network packet of the client 6205 at the transport layer and interfacing to the network stack 6210 at the transport layer via a data structure, such as a kernel-level data structure 6225, the acceleration program 120 can perform transport layer related acceleration techniques on the network packet, such as transport control protocol (TCP) buffering, TCP pooling and TCP multiplexing. Additionally, the acceleration program 6120 can perform compression 6225 on any of the protocols, or multiple-protocols, carried as payload of network packet of the transport layer protocol In one embodiment, the acceleration program 6120 uses a kernel-level data structure 6225 providing access to any portion of one or more network packets, for example, a network packet comprising a request from a client 6205 or a response from a server. In one embodiment, the kernel-level data structure may be used by the acceleration program 6120 to perform the desired acceleration technique. In one embodiment, the acceleration program 6120 is running in kernel mode 6202 when using the kernel-level data structure 6225, while in another embodiment, the acceleration program 6120 is running in user-mode 6203 when using the kernel-level data structure 6225. In some embodiments, the kernel-level data structure may be copied or passed to a second kernel-level data structure, or any desired user-level data structure. Although the acceleration program 6120 is generally depicted in FIG. 40A as having a first portion operating in user-mode 6203 and a second portion operating in kernel-mode 6202, in some embodiments, any portion of the acceleration program 6120 may run in user-mode 6203 or kernel-mode 6202. In some embodiments, the acceleration program 6120 may operate only in user-mode 6203, while in other embodiments, the acceleration program 6120 may operate only in kernel-mode 6202.

Furthermore, by intercepting at the transport layer of the network stack 6210 or obtaining access to the network packet via a kernel-level data structure 6225, the acceleration program 6120 can perform or apply the plurality of acceleration techniques at a single interface point or at a single point of execution or time of executing any executable instructions of the acceleration program 6120. For example, in one embodiment, in a function or set of instructions of the acceleration program 6120, a plurality of the acceleration techniques may be executed, such as by calling a set of executable instructions constructed and designed to perform the acceleration technique. In some embodiments, the acceleration program 6120 at one interface point, place of execution, or in a set of instructions call one or more application programming interfaces (APIs) to any program, service, process, task, thread, or executable instructions designed and constructed to provide 1) multi-protocol compression 6238, 2) transport control protocol pooling 6224, 3) transport control protocol multiplexing 6226, 4) transport control protocol buffering 6228, and 5) caching via a cache manager 6232 and in some embodiments, encryption 6234.

By executing the plurality of acceleration techniques at one place or location in executable instructions of the acceleration program 6120 or at one protocol layer of the network stack 6210, such as the transport layer, the integration of these acceleration techniques is performed more efficiently and effectively. In one aspect, the number of context switches between processes may be reduced as well as reducing the number of data structures used or copies of data structures in memory needed or otherwise used. Additionally, synchronization of and communications between any of the acceleration techniques can be performed more efficiently, such as in a tightly-coupled manner, in a set of executable instructions of the acceleration program 6120. As such, any logic, rules, functionality or operations regarding the order of acceleration techniques, which techniques to perform, and data and information to be shared or passed between techniques can be performed more efficiently. The acceleration program 6120 can intercept a TCP packet at the transport layer, obtain the payload of the TCP packet via a kernel-level data structure 6225, and then perform desired acceleration techniques in a desired order. For example, the network packet may be first compressed and then cached. In another example, the compressed cached data may be communicated via a buffered, pooled, and/or multiplexed TCP connection to a server.

In some embodiments and still referring to FIG. 40A, a first program 6222 may be used to install and/or execute the acceleration program 6120, automatically, silently, transparently, or otherwise. In one embodiment, the first program 6222 comprises a plug-in component, such an ActiveX control or Java control or script that is loaded into and executed by an application 6220a-6220n. For example, the first program comprises an ActiveX control loaded and run by a web browser application 6220, such as in the memory space or context of the application 6220. In another embodiment, the first program 6222 comprises a set of executable instructions loaded into and run by the application 6220a-6220n, such as a browser. In one embodiment, the first program 6222 comprises a designed and constructed program to install the acceleration program 6120. In some embodiments, the first program 6222 obtains, downloads, or receives the acceleration program 6120 via the network from another computing device. In another embodiment, the first program 6222 is an installer program or a plug and play manager for installing programs, such as network drivers, on the operating system of the client 6205.

In other embodiments, the first program 6222 may comprise any and all of the functionality described herein in Section B. In one embodiment, the first program 6222 may comprise a collection agent 404. In another embodiment, the first program may comprise a program for installing a collection agent. In another embodiment the first program 6222 may also comprise a computing environment 15. In one embodiment the first program 6222 may comprise means for installing a computer environment such as an execution environment or virtual execution environment. In one embodiment the first program 6222 may comprise an application streaming client 442 as previously discussed. In another embodiment the first program 6222 may comprise an application to be executed on a client 10.

In other embodiments, the first program 6222 may comprise a portion of the functionality, operations and logic of the acceleration program 6120 to facilitate or perform any of the functionality, operations and logic of the acceleration program 6120 described herein, such as any of the acceleration techniques. In some embodiments, the first program 6222 is used to establish a connection, such as a transport layer connection, or a communication session with an appliance or a server, such as a Secure Socket Layer (SSL) communication session. In one embodiment, the first program 6222 is used to establish or facilitate the establishment of a virtual private network connection and communication session.

The cache manager 6232 of the acceleration program 6120 or the client 6205 as depicted in FIG. 40A may comprise software, hardware or any combination of software and hardware to provide cache access, control and management of any type and form of content, such as objects or dynamically generated objects served by the servers 30. The data, objects or content processed and stored by the cache manager 6232 may comprise data in any format, such as a markup language, or communicated via any protocol. In some embodiments, the cache manager 6232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory of the client 6205. In other embodiments, the cache memory element may comprise memory having a faster access time than memory otherwise used by the client 6205. In another embodiment, the cache memory element may comprise any type and form of storage element of the client 6205, such as a portion of a hard disk. In yet another embodiment, the cache manager 6232 may use any portion and combination of memory, storage, or the processing unit for caching data, objects, and other content.

Furthermore, the cache manager 6232 may include any logic, functions, rules, or operations to perform any embodiments of the techniques described herein. For example, the cache manager 6232 includes logic or functionality to invalidate objects based on the expiration of an invalidation time period or upon receipt of an invalidation command from a client 6205a-6205n or server 30. In some embodiments, the cache manager 6232 may operate as a program, service, process or task executing in the kernel space 6202, and in other embodiments, in the user space 6203. In one embodiment, a first portion of the cache manager 6232 executes in the user space 6203 while a second portion executes in the kernel space 6202. In some embodiments, the cache manager 6232 can comprise any type of general purpose processor (GPP), or any other type of integrated circuit, such as a Field Programmable Gate Array (FPGA), Programmable Logic Device (PLD), or Application Specific Integrated Circuit (ASIC).

The encryption engine 6234 of the acceleration program 6120 or the client 6205 comprises any logic, business rules, functions or operations for handling the processing of any security related protocol, such as SSL or TLS, or any function related thereto. For example, the encryption engine 6234 encrypts and decrypts network packets, or any portion thereof, communicated by the client 6205. The encryption engine 6234 may also setup or establish SSL or TLS connections on behalf of the client 6205. As such, the encryption engine 6234 provides offloading and acceleration of SSL processing. In one embodiment, the encryption engine 6234 uses a tunneling protocol to provide a virtual private network between a client 6205 and another computing device, such as a server Still referring to FIG. 40A, the multi-protocol compression engine 6238 of the acceleration program 6120 or the client 6205 comprises any logic, business rules, function or operations for compressing one or more protocols of a network packet, such as any of the protocols used by the network stack 6210 of the client 6205. For example, multi-protocol compression 6238 may include compression and decompression utilities comprising GZip compression and decompression, differential compression and UnCompression, or any other proprietary or publicly-available utility for compressing and decompressing data to be transmitted over a network. In one embodiment, multi-protocol compression engine 6238 compresses bi-directionally between the client 6205 and another computing device, such as a servers, any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). As such, the multi-protocol compression engine 6238 accelerates performance for users accessing applications via desktop clients, e.g., Microsoft Outlook and non-Web thin clients, such as any client launched by enterprise applications like Oracle, SAP and Siebel, and even mobile clients, such as the Pocket PC.

The acceleration program 6120 also performs transport protocol layer acceleration techniques of buffering, pooling and multiplexing as will be described in further detail below. As such, the acceleration program 6120 comprises any type and form of executable instructions having logic, rules, functions and operations to perform any of these techniques as described herein. The acceleration program 120 intercepts, controls, and manages at the transport layer of the network stack 210 any transport layer application programming interface (API) calls made by an applications 6220a-6220n via the network stack 6210. The acceleration program 6120 responds to any requests of the client 6205 in a transparent manner such that the client 6205 receives a response as expected from the transport protocol layer of the network stack 6210. For example, in one embodiment, the acceleration program 6120 intercepts in the network stack 6210 of the client 6205 a request to establish a transport layer connection with another computing device, such as a server, and may use a pool of one or more transport layer connections established by the acceleration program 6120 to respond to the request. In another embodiment, the acceleration program 6120 multiplexes a request from a first application 6220a via an established transport layer connection used by a second application 6220b.

In some embodiments, the acceleration program 6120 comprises a mechanism for buffering or holding communications of the client 6205 at the client 6205 before transmitting on a network. For example, the rate of consumption by the client 6205 of received communications from a network, such as from a server, may be less than the rate of production of communications transmitted by the client 6205 on the network. As such, the client 6205 may be sending more requests to a server 30 at a rate greater than by which the client 6205 can consume and process responses from such requests. The acceleration program 6120 can intercept a communication, and determine if a rate of consumption and/or rate of production of the client 6205 is below a predetermined threshold, such as a threshold configured by a user, the client 6205 or another computing device. If the determined rate is below the desired threshold, the acceleration program 6120 stores the intercepted communication to a memory element of the client until the performance of the client 6205 increases the rate of consumption and/or production to a rate equal to or higher than the predetermined or desired threshold. At that point, the acceleration program 6120 communicates the client's communications on the network. As such, a client-side mechanism is provided to throttle communications of the client 6205 based on performance of consumption and/or production of communications by the client 6205.

The application 6220a-6220n depicted in FIG. 40A can be any type and/or form of application such as any type and/or form of web browser, web-based client, client-server application, a thin-client computing client, an ActiveX control, or a Java applet, or any other type and/or form of executable instructions capable of executing on client 6205 or communicating via a network 6204. The application 6220a-6220n can use any type of protocol and it can be, for example, an HTTP client, an FTP client, an Oscar client, or a Telnet client. In some embodiments, the application 6220a-6220n uses a remote display or presentation level protocol. In one embodiment, the application 6220a-6220n is an ICA client, developed by Citrix Systems, Inc. of Fort Lauderdale, Fla. In other embodiments, the application 6220a-6220n includes a Remote Desktop (RDP) client, developed by Microsoft Corporation of Redmond, Wash. In other embodiments, the application 6220a-6220n comprises any type of software related to VoIP communications, such as a soft IP telephone. In further embodiments, the application 6220a-6220n comprises any application related to real-time data communications, such as applications for streaming video and/or audio.

Figure 40B:
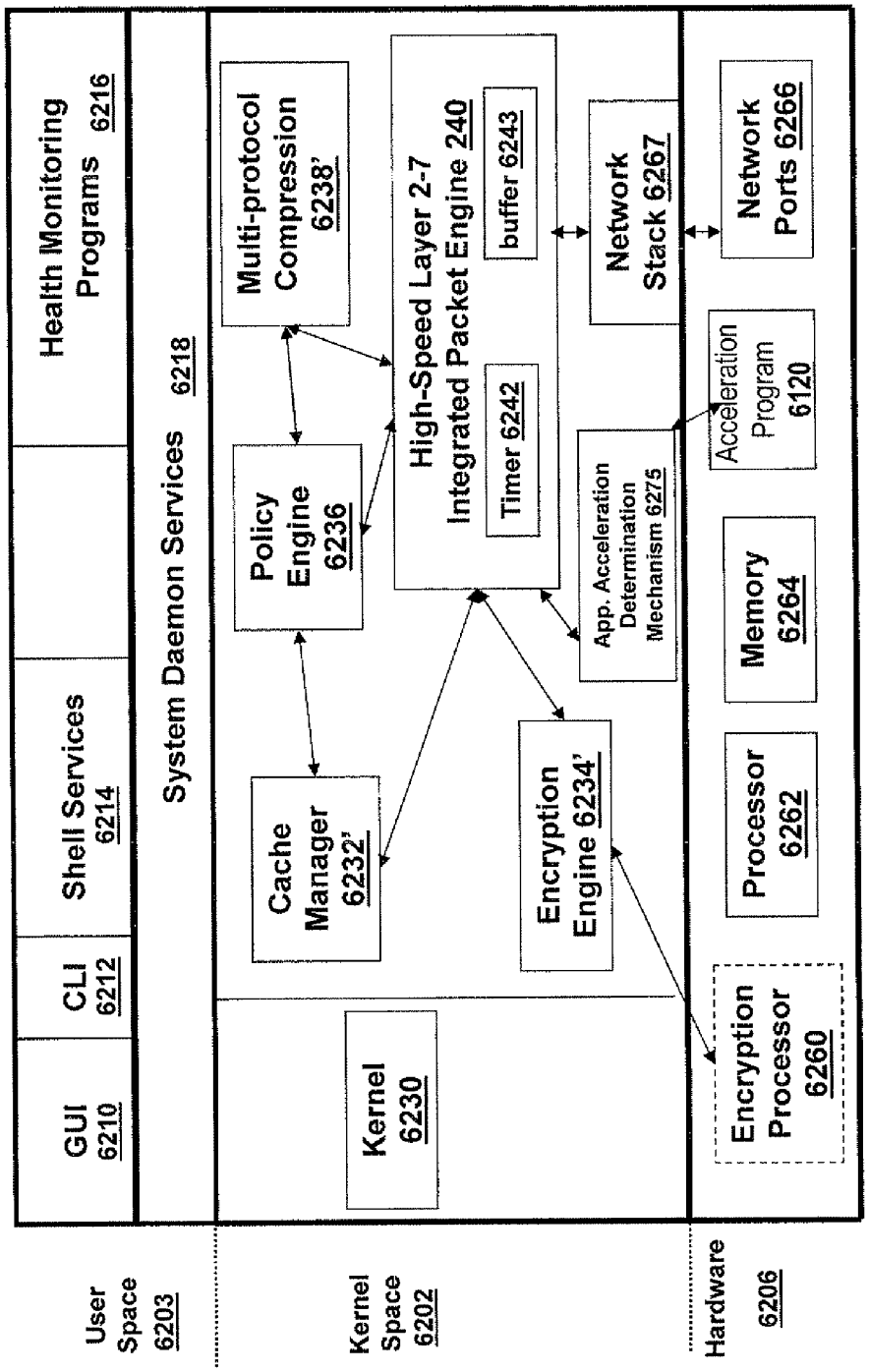
FIG. 40B is a block diagram of an embodiment of an appliance for providing a client-side acceleration program.

FIG. 40B illustrates an example architecture of an appliance 1250 similar to the appliance architecture depicted in FIG. 28A. In brief overview, the appliance 1250 comprises a hardware layer 6206 and a software layer divided into a user space 6203 and a kernel space 6202. Hardware layer 6206 provides the hardware elements upon which programs and services within kernel space 6202 and user space 6203 are executed. Hardware layer 6206 also provides the structures and elements which allow programs and services within kernel space 6202 and user space 6203 to communicate data both internally and externally with respect to appliance 1250. The software layer comprises programs, services, processes, tasks, threads and other executable instructions to provide the logic, functions, and operations of the appliance 1250.

The appliance 1250 comprises an application acceleration determination mechanism 6275 and a client-side acceleration program 6120. The application acceleration determination mechanism 6275 comprises software, hardware, or any combination of hardware and software. In some embodiments, the application acceleration determination mechanism 6275 comprises any type and form of executable instructions, such as a program, services, process, task or thread having logic, function, rules, or operations for determining whether an application 6220a-6220n executing on a client 6205 and/or server 30 can be accelerated or whether access or communications between a client 6205 and a server 30 can be accelerated. In one embodiment, a database is used by the application acceleration determination mechanism 6275 to determine whether an application 6220a-6220n can be accelerated. For example, the database may associate an application 6220a-6220n with one or more acceleration techniques capable of accelerating the application 6220a-6220n, and may be further based on user, type, form, location, processing capability and other characteristics of the client 6205 and/or server 30. In some embodiments, the application acceleration determination mechanism 6275 uses a look-up table, file, data structure or object in memory comprising information identifying if an application 6220a-6220n by name, type or category can be accelerated by an acceleration technique. In other embodiments, the appliance 1250 and/or application acceleration determination mechanism 6275 includes a configuration mechanism, such as a user interface, graphical, command line or otherwise, to receive user input to identify, specify or configure whether an application 6220a-6220n or access to a server 30 can be accelerated.

In some embodiments, the application acceleration determination mechanism 6275 requests from the server 30 information identifying whether an application 6220a-6220n may be accelerated and in further embodiments, by what acceleration technique(s) and for what type and form of clients 6205. In yet another embodiment, the application acceleration determination mechanism 6275 comprises a database of historical information regarding the performance of an application 6220a-6220n between a client 6205 and a server 30, with and without one or more client-side acceleration techniques, to provide a database of comparative and heuristic information about where the application 6220a-6220n is accelerated, or capable of being accelerated, using any client-side acceleration techniques. For example, the appliance 1250 may capture network related performance information related to the performance of the application 6220a-6220n from the client 6205. As such, the determination of whether an application 6220a-6220n is capable of being accelerated may be adapted to, based on or influenced by changing operational and performance characteristics of the network 6204.

In one aspect, an application 6220a-6220n may either not be capable of being accelerated or may be capable of being accelerated but the acceleration would not be effective, or would otherwise be minimal. In one embodiment, the type and form of application 6220a-6220n may not use a protocol or may not communicate in a manner suitable for use with an acceleration technique. In another embodiment, the protocol or manner in which the application 6220a-6220n communicates may allow for performing an acceleration technique but based on any of the operational or performance characteristics of the client 6205, appliance 1250 or server 30, the acceleration technique would not be effective or otherwise would provide minimal acceleration. As such, the application acceleration determination mechanism 6275 may determine the application 6220a-6220n is not desired to be accelerated based on whether the application 6220a-6220n is able to be accelerated or whether the acceleration would meet a desired pre-determined threshold of performance improvement.

In another aspect, the appliance 6250 stores a client-side acceleration program 6120 in a storage or memory element of the appliance 1250, such as storage or memory provided by the hardware layer 6206 of the appliance. In one embodiment, the appliance 1250 dynamically determines via the application acceleration determination mechanism 6275 an application 6220a-6220n to be used or being used by the client 6205 can be accelerated by the acceleration program 6120 executing on the client 6205 and transmits or otherwise communicates the acceleration program 6120 from storage or memory of the appliance 1250 to the client 6205. In another embodiment, the appliance 1250 determines communications between the client 6205 and a server 30 can be accelerated by the acceleration program 6120 executing on the client 6205 and communicates the acceleration program 6120 to the client 6205. In some embodiments, the appliance 1250 receives, downloads or obtains the acceleration program 6120 from another computing device 6100, such as a server 30.

In some embodiments, the acceleration program 6120 receives, downloads or obtains policy information from the policy engine 3236 of the appliance 1250. In other embodiments, the acceleration program 6120 executes and operates a policy engine, either independently of or in conjunction with the policy engine 3236 of the appliance 1250. In other embodiments, the packet engine 3240, or portion thereof, may be operated on the client 6205, such as part of the acceleration program 6120. As such, the acceleration program 6120 may operate on the client 6205 in accordance with the packet processing timer 3242 as described above. In one embodiment, the acceleration program 6120 may perform integrated acceleration techniques in one point in execution and responsive to the granular time intervals provided by the pack processing timer 3242.

In some embodiments, the health monitoring program 3216 may check and determine the status, error or history of any client-side acceleration program 6120 on any client 6205 in communication with the appliance 1250 or to which the appliance 1250 transmitted the acceleration program 6120. In some embodiments, the health monitoring program 3216, or a portion thereof, executes on the client 6205.

Figure 41A:
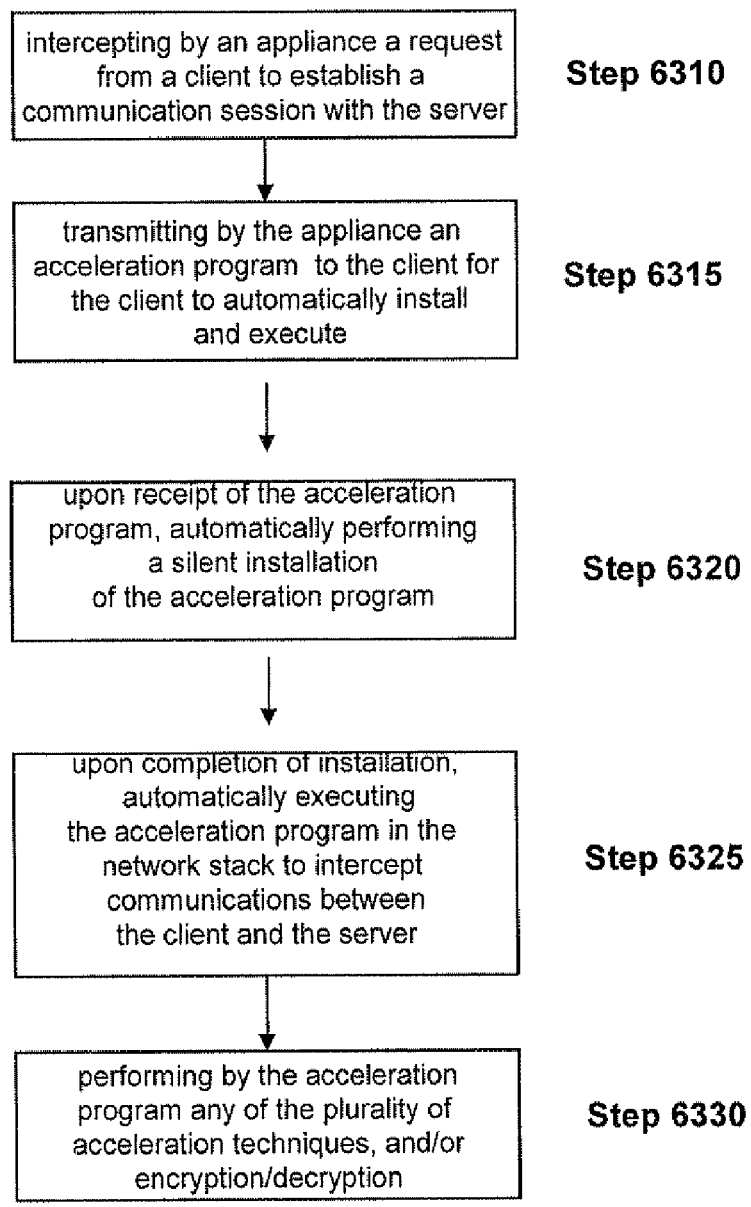
FIG. 41A is a step diagram of an embodiment of a method for dynamically providing and automatically installing and executing a client-side acceleration program.

Referring now to FIG. 41A, an embodiment of a method 6300 for dynamically providing by the appliance 1250 an acceleration program 6120, and automatically installing and executing the acceleration program 6120 by the client 6205 is depicted. In brief overview, at step 6310, the appliance 1250 intercepts a request from a client 6205 to establish a communication session with the server. At step 6315, the appliance 1250 transmits the acceleration program 6120 to the client 6205 for the client 6205 to automatically install and execute. At step 6320, upon receipt of the acceleration program 6120, the client 6205 automatically executes or performs a silent installation of the acceleration program 6120. At step 6325, upon completion of installation of the acceleration program 6120, the client 6205 automatically executes the acceleration program 6120 in the network stack 6210 to intercept communications between the client 6205 and the server 30. At step 6330, the acceleration program 6120 performs any of the plurality of acceleration techniques and may encrypt and/or decrypt communications.

In further detail, at step 6310, the appliance 1250 may intercept or otherwise receive by any suitable means and mechanisms a request from the client 6205 to establish a communication session with the server 30. In one embodiment, the packet engine 6240 of the appliance 1250 intercepts communications from the client 6205. In other embodiments, the appliance 1250 establishes a first transport layer connection with the client 6205, for example, with the acceleration program 6120, and a second transport layer connection with the server 6205 on behalf of the client 6205. As such, the appliance 1250 may receive, intercept or otherwise obtain any of the client's communications transmitted to the server 30. In some embodiments, the appliance 1250 intercepts a request for the client 6205 to establish a transport layer connection with the server 30. In other embodiments, the appliance 1250 intercepts a request to establish a communication session via any protocol layer above the transport layer connection, such as an application layer protocol of HTTP. This embodiment of the method may be practiced with a request to establish a communication session at any protocol layer of the network stack 6210 of the client 6205.

At step 6315, the appliance 1250 transmits the acceleration program 6120 to the client 6205. The appliance 1250 may transmit the acceleration program 6120 at any point before, during, or after establishing the communication session requested by the client 6205. In one embodiment, the appliance 1250 transmits the acceleration program 6120 to the client 6205 in response to intercepting the client request. In another embodiment, the appliance 1250 forwards the request to the server 30 and transmits the acceleration program 6120 to the client 6205. In some embodiments, the appliance 1250 establishes the communication session with the server 30, and upon establishment of the communication session, the appliance 1250 transmits the acceleration program 6120. In yet another embodiment, the appliance 1250 performs authentication and/or authorization of the client 6205, or the user of the client 6205, and if the authenticated user or client 6205 is so authorized, the appliance 1250 transmits the acceleration program 6120 to the client 6205. In one embodiment, the appliance 1250 forwards the client's request to the server 30 for authentication and/or authorization, and if the server 30 authenticates and/or authorizes the client's request, the appliance 1250 transmits the acceleration program 6120 to the client 6205.

In some embodiments, the appliance 1250 transmits the acceleration program 6120 from storage or memory of the appliance 1250. In other embodiments, the appliance 1250 requests the acceleration program 6120 from the server 30 and forwards the received acceleration program 1620 to the client 6205. In another embodiment, the server 30 transmits the acceleration program 6120 to the client 6205. In one embodiment, the appliance 1250 transmits a Uniform Resource Locator (URL) to the client 6205 for the client 6205 to obtain, download or receive the acceleration program. In some embodiments, the URL identifies a location of the acceleration program 6120 in storage or memory of the appliance 1250, while in other embodiments, the URL identifies the acceleration program 6120 on a server 30, such as a web server providing the acceleration program 6120 for download. In one embodiment, the acceleration program 6120 is stored on the client 6205, and the appliance 1250 transmits a key, such as an encryption or license key, to the client 6205 for the client 6205 to install and make use of the acceleration program 6120 stored on the client 6205. In some embodiments, the appliance 1250 transmits to the client 6205 any files, configuration, data or other information to be used to install and execute the acceleration program 6120 on the client 6205.

In one embodiment, the acceleration program 6120 is designed and constructed to be automatically installed and executed by the client 6205. The acceleration program 6120 may include any files, entries, configuration, data, or instructions to cause the acceleration program 6120 to be registered or recognized by the operating system of the client 6205 in accordance with the type and form of operating system. In one embodiment, another computing device, such as a server or an appliance, transmits the acceleration program to the client 6205 and the client 6205 automatically installs and executes the acceleration program 6120. In one embodiment, the acceleration program 6120 is designed and constructed to be a plug-and-play (PnP) device to be added to a running computing device 6100. In some embodiments, the acceleration program 6120 is a self-installed executable, such as an executable including an installer program and the acceleration program 6120. In other embodiments, the acceleration program 6120 may include a plurality of files, for example an installation package or installation download, such as files necessary to register and install the acceleration program 6120 in the operating system of the client 6205. For example, the acceleration program 6120 may comprise an .inf file and a .sys file. An .inf file provides Windows Setup in Microsoft Windows family of operating systems with the information required to set up a device, such as a list of valid logical configurations for the device and the names of driver files associated with the device. In some embodiments, the .inf file may comprise an autorun .inf file, which is a configuration file that tells or informs the operating system which executable to start, and any configuration information related to starting the executable. In one embodiment, the .sys file is the driver file comprising the acceleration program 6120, or a portion thereof.

At step 6320, the client 6205 automatically installs the acceleration program 6120. The acceleration program 6120 may be installed in any suitable manner in accordance with the operating system of the client 6205. In one embodiment, the client 6205 installs the acceleration program 6120 upon receipt of the acceleration program 6120. In some embodiments, the client 6205 automatically performs or executes a silent installation of the acceleration program 6120. In one embodiment, the silent installation is performed transparently to a user or application of the client 6205. In other embodiments, the silent installation of the acceleration program 6120 does not require a reboot or restart of the client 6205. In another embodiment, the silent installation does not require interaction by the user to start and/or complete the installation. In other embodiments, the silent installation of the acceleration program 120 occurs while the client 6205 is running and transparently to a network layer, session layer, and/or application layer of the network stack 6210. In some embodiments, the acceleration program 6120 is a self-installed executable that is executed by the client 6205. In other embodiments, the client 6205 uses a plug and play manager to install the acceleration program 6120. In one embodiment, the client 6205 comprises an installation manager which receives and installs the acceleration program 6120. In another embodiment, the acceleration program 6120 transmitted by the appliance 1250 also includes an installation program that installs the acceleration program 6120.

In another embodiment, the acceleration program 6120 is automatically installed via a silent installation. In one embodiment, a silent installation comprises an installation unattended by a user. In another embodiment, a silent installation comprises an installation not requiring or having interaction by the user to start and/or complete the installation. In some embodiments, the installation is silent in that the installation process does not display information regarding a status or progress of the installation. In one embodiment, the installation is silent in that it is transparent to the user. In other embodiments, the installation is silent because the installation of the acceleration program 6120 does not require a reboot or restart of the client 6205. In another embodiment, the installation is silent in that the installation occurs seamlessly during operation of the client 6205 without interruption or disruption to the client's operation. As such, the acceleration program 6120 can be installed in a manner that is transparent to the user or an application of the client 6205 by not requiring a reboot and not displaying any information to the user related to the installation.

In order to prevent or avoid a reboot or restart of the client 6205, in some embodiments, the client 6205, such as the operating system of the client 6205, has a plug and play manager to install and configure drivers, such as a network driver in one embodiment of the acceleration program 6120, for Plug and Play devices while the operating system is running. In one embodiment, the plug and play manager is not instructed to reboot or restart the client 6205 based on the configuration of the installation package of the acceleration program 6120. In another embodiment, the .inf file does not comprise an instruction to reboot or restart the computer. In one embodiment, the acceleration program 6120 can be implemented as a side-by-side component instead of replacing shared, in-use, dynamic-link libraries (DLLs). In other specific embodiments, for a network driver of the acceleration program 6120, the acceleration program 6120 uses the INetCfgPnpReconfigCallback network driver API, so that a user will not be required to reboot the operating system to cause configuration changes to take effect in the driver. Additionally, the acceleration program 6120 may have a notify object that calls the SendPnpReconfig API within its implementation of the ApplyPnpChanges method of the INetCfg-ComponentControl to send configuration information to the driver of the network component that owns the object. The SendPnpReconfig API provides the notify object with a mechanism to send data to the driver and in some embodiments, is used to avoid requiring a user to reboot the operating system before configuration changes take effect.

At step 6325, upon completion of installation of the acceleration program 6120 automatically, silently, transparently, or otherwise, the acceleration program 120 is automatically executed on the client 6205. In some embodiments, the installation program that installs the acceleration program 6120 starts or executes the acceleration program 6120. In some embodiments, the installer program for the acceleration program 6120 makes a system call to load or execute the acceleration program 120 in memory of the client 6205. In one embodiment, the installation of the acceleration program 6120 comprises an instruction, command or directive to start the acceleration program 6120. In one embodiment, the acceleration program 6120 includes an automatic run configuration, such as an autorun.inf file, that notifies the client 6205 to automatically run the acceleration program 6120. In other embodiments, a plug and play manager or the operating system of the client 6205 automatically executes the acceleration program 6120 upon installation. In one embodiment, the acceleration program 6120 comprises a service, process, thread or task that is started by the client 6205. In some embodiments, the acceleration program 6120 is a service of the operating system that is configured to automatically start. In one embodiment, the acceleration program 6120 comprises a network driver loaded in the memory of the network stack of the operating system of the client In another embodiment, the acceleration program 6120 comprises a network driver that is loaded into memory of the client 6205. In some embodiments, the acceleration program 6120 is loaded into memory allocated to the network stack 6210. In some cases, the acceleration program 6120 is loaded and executed in a memory area or space that allows the acceleration program 6120 to access a protocol layer of the network stack, such as the transport layer. In other cases, the acceleration program is loaded and executed in a memory that allows the acceleration program 6120 to access a kernel-level data structure 6225. In other embodiments, the acceleration program 6120 is loaded into memory of an application 6220a-6220n. In another embodiment, the acceleration program 6120 executes independently in its own memory space or context. In one embodiment, the acceleration program 6120 runs in the memory space or context of an application 6220a-6220n. In some embodiments, the acceleration program 6120 is loaded into user-mode memory or memory allocated to the user-mode 6203, while in other embodiments, the acceleration program 6120 is loaded into kernel-mode memory or memory allocated to the kernel-mode 6202

In some embodiments, the acceleration program 6120 is loaded into memory and/or executed on the client 6205 transparently to a user of the client, an application of the client 6205, the appliance 1250 or the server 30. In other embodiments, the acceleration program 6120 executes to interface with the transport layer of the network stack 6210, and executes transparently to any protocol layer above the transport layer, such as a session or application layer, and any protocol layer below the transport layer, such as the network layer. In one embodiment, the acceleration program 6120 executes transparently to any transport layer connection of the client 6205, or the transport layer itself.

At step 6330, the loaded, started or otherwise executing acceleration program 6120 performs any of the plurality of acceleration techniques of the acceleration program 6120, such as any techniques provided by 1) multi-protocol compression 6238, 2) transport control protocol pooling 6224, 3) transport control protocol multiplexing 6226, 4) transport control protocol buffering 6228, and 5) caching via a cache manager 6232. The acceleration program 6120 may also perform any encryption and/or decryption of communications between the client 6205 and the server 30. In one embodiment, the acceleration program 6120 performs multi-protocol compression. In another embodiment, the acceleration program 6120 performs transport control protocol pooling, and in a further embodiment, the acceleration program 6120 performs multiplexing via the pooled transport layer connection. In one embodiment, the acceleration program 6120 performs transport control protocol buffering. In some embodiments, the acceleration program 6120 performs caching. In other embodiments, the acceleration program 6120 performs caching and compression. In one embodiment, the acceleration program 6120 performs caching with transport layer pooling and multiplexing. In another embodiment, the acceleration program 6120 performs multi-protocol compression with transport layer pooling and multiplexing. In another embodiment, the acceleration program 6120 performs caching and/or compression with TCP buffering, and in a further embodiment, with TCP pooling and multiplexing.

As such, the client-side acceleration program 6120 is dynamically provided by the appliance 1250 and automatically installed and executed on the client 6205 in a silent manner or transparent to the user or application of the client 6205 to perform one or more client-side acceleration techniques to communications between the client 6205 and a server 30. The acceleration program 6120 may perform these acceleration techniques transparently to any protocol layer of the network stack and transparently to a user of the client, application of the client, appliance, or server.

Figure 41B:
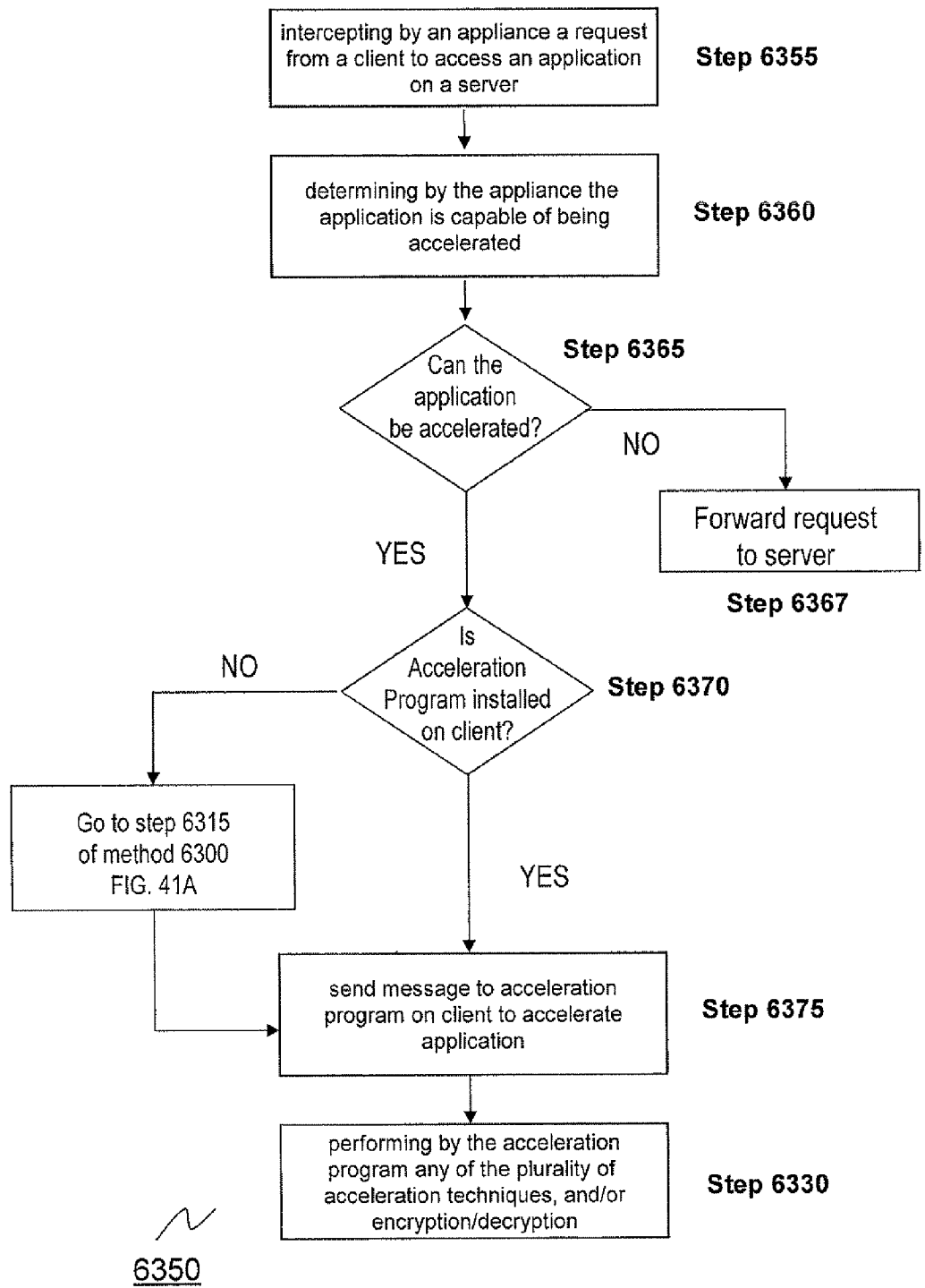
FIG. 41B is a step diagram of an embodiment of a method for determining an application can be accelerated.

In another aspect, the appliance 1250 may determine if an application requested to be accessed by the client 6205 can be accelerated, and provide the acceleration program 6120 to the client 6205 if the application can be accelerated. Referring now to FIG. 41B, another embodiment of a method is depicted. The method may be practiced upon requests to establish a connection or communication session as well as requests to access an application on a server. In brief overview of method 6350, at step 6355, the appliance 1250 intercepts a request from a client 6205 requesting access to an application 6220a-6220n on a server 30. At step 6260, the appliance 1250 determines if the application 6220 is capable of being accelerated. At step 6365, if the application 6220 cannot be accelerated, then the application forwards the request to the server at step 6267. At step 6365, if the application 6220 can be accelerated, then the appliance 1250 determines if the acceleration program 6120 is installed on the client 6205 or has been previously transmitted to the client 6205. If the acceleration program 6120 has not yet been provided to the client 6205, then the method 6350 continues at step 6315 of the method 6300 described above to transmit, install and execute the acceleration program. If the acceleration program 6120 has been installed and is executing on the client 6205, then the appliance 1250, at step 6375, sends a message to the acceleration program 6120 on the client 6205 to accelerate the application 6220. At step 6330 of method 6350, the acceleration program 6120 performs a plurality of acceleration techniques on the communications for the application 6220, and may encrypt and/or decrypt such communications.

In further detail, at step 6355, the appliance 1250 may intercept by any suitable means and mechanisms a request from the client 6205 to access an application provided by the server 30. In one embodiment, the packet engine 6240 of the appliance 1250 intercepts communications from the client 6205. In other embodiments, the appliance 1250 establishes a first transport layer connection with the client 6205, for example, with the acceleration program 6120, and a second transport layer connection with the server 6205 on behalf of the client 6205. As such, the appliance 1250 may receive, intercept or otherwise obtain any of the client's communications transmitted to the server 30. In some embodiments, the appliance 1250 intercepts a request for the client 6205 to access an application 6220 via an established transport layer connection with the server 30. In other embodiments, the appliance 6205 intercepts a request to establish a communication session via any protocol layer above the transport layer connection, such as an application layer protocol of HTTP. In one embodiment, the appliance 6205 intercepts a request from the client 205 to display and provide an application 6220 from the server 30 via a remote display protocol, such as ICA or RDP.

At step 6360, the appliance 1250 determines whether the application 6220 requested by the client 6205 can be accelerated. In some embodiments, the appliance 1250 identifies, extracts or otherwise processes an application identifier from the intercepted client request that identifies the application by name, type or category. In one embodiment, the application acceleration determination mechanism 6275 is used by the appliance 1250 to determine if or whether the application 6220 can be accelerated. In some embodiments, the application acceleration determination mechanism 6275 performs a query or lookup in a database, lookup table, or other structured source of data in memory or storage, such as a data structure or object, to determine if the application 6220 can be accelerated. In another embodiment, the appliance 1250 sends a communication such as request to a server 30 to determine whether the application 6220 can be accelerated.

In other embodiments, the appliance 1250 has a performance log or history to determine if the application 6220 has been accelerated before and whether the acceleration had improvement on the performance and operation of the application 6220. As such, the appliance 1250 may determine that an application 6220 can be accelerated if such acceleration meets a predetermined threshold of improvement to performance or operations of the application 6220. In yet another embodiment, the appliance 1250 provides heuristic rules based on the current operation and performance of the network 6204, client 6205 or server 30. In one embodiment, the application 6220 may be determined to be capable of being accelerated if the client 6205 has certain performance and operational characteristics or capabilities, for example, a certain speed processor or a minimum amount of memory. In some embodiments, the application 6220 may be determined to be capable of being accelerated based on a configured policy or rule, such as in the policy manager of the appliance 1250. For example, an application 6220 to be communicated between a remote user with a certain type of client 6205 accessing a certain type of application 220 and/or server 30 may be accelerated. In other embodiments, the application 6220 may be determined to be capable of acceleration based on an authentication and authorization of the user or the client 6205. In yet another embodiment, the application 6220 may be determined to not be desired to be accelerated. For example, the application 6220 is of a type that is infrequently used.

At step 6365, if the application 6220 is determined not to be capable of being accelerated or otherwise it is desired not to apply acceleration techniques to the application 6220 on the client 6205, the appliance 1250 forwards the intercepted client request to the server 30 at step 6368 and does not transmit or provide the acceleration program 6120 to the client 6205. In one embodiment, the appliance 1250 may perform or provide appliance-based acceleration of the appliance 6220. In other embodiments, the appliance 1250 does not perform acceleration of the application 6220 on the appliance 1250. In yet another embodiment, the appliance 1250 may perform some acceleration techniques and not others for the application 6220 if the appliance 1250 determines the application 6220 is not capable of or otherwise desired to be accelerated.

At step 6365, if the application 6220 is determined to be capable of being accelerated or otherwise it is desired to apply acceleration techniques to the application on the client 6205, the appliance 1250 determines if the acceleration program 6120 has been provided to the client 6205. In one embodiment, the appliance 1250 determines if the acceleration program 6120 has been installed on the client 6205 or is executing on the client 6205. In some embodiments, the appliance 1250 sends a communication to the acceleration program 6120 on a client 6205 to determine if the acceleration program 6120 is running on the client 6205. In other embodiments, the appliance 1250 checks a log file or history file to determine if the acceleration program 6120 has been transmitted to the client 6205. In another embodiment, the appliance 1250 checks with a health monitoring program 6216 of the appliance 1250 or the client 6205 to determine if the acceleration program 6120 is executing on the client 6205.

If the appliance 1250 determines the acceleration program 6120 has not been transmitted, installed and/or executed on the client 6205, the appliance 1250 will provide the acceleration program 6120 in accordance with the steps of method 6300 described in conjunction with FIG. 41A. For example, the appliance 1250 transmits the acceleration program 6120 to the client 6205, which the client 205 upon receipt automatically installs and executes. In one embodiment, upon performance of the suitable steps of the embodiment of method 6300, the appliance 1250 may communicate at step 6275 a message to the acceleration program to apply one or more of the accelerations techniques to the application 6220. In other embodiments, if the acceleration program 6120 is already installed and executing, then at step 6375 the appliance 1250 communicates a message to the acceleration program 6120 to apply one or more of the accelerations techniques to the application 6220.

In some embodiments, the acceleration program 6120 performs any of the acceleration techniques available by the acceleration program 6120 to the identified application 6120. In other embodiments, the appliance 1250 indicates to the acceleration program 6120 which of the acceleration techniques to perform for the application 6220. In one embodiment, the acceleration program 6120 may apply the desired acceleration techniques for the application 6120 on a per session basis. That is, the message from the appliance 1250 to the acceleration program 6120 only informs the acceleration program 6120 to perform acceleration techniques for this instance or session of the application 6220. In other embodiments, once the acceleration program 6120 receives a message from the appliance 1250 to apply acceleration techniques for the identified application 6220, the acceleration program 6120 applies the acceleration techniques for any instances or sessions of the application 6220, or until the client 6205 is rebooted or restarted, or the appliance 6205 is rebooted or restarted.

In one embodiment, the message from the appliance 1250 at step 6375 is not application specific. For example, the message informs the acceleration program 6120 to execute one or more of the acceleration techniques for any application of the client 6205. In some embodiments, the message sent to the client 6205 informs the acceleration program 6120 to stop using any one or more of the acceleration techniques for the application 6220, or for all applications 6220a-6220n. In another embodiment, the appliance 1250 communicates a message to the acceleration program 6120 to ignore certain applications 6220. In yet another embodiment, the appliance 1250 communicates a message to the acceleration program 6120 to provide configuration data or information to the acceleration program 6120, such as an update to an acceleration technique or application of a new acceleration technique.

At step 6330, the acceleration program 6120 performs any of the plurality of acceleration techniques of the acceleration program 6120 for the application 6220, such as any techniques provided by 1) multi-protocol compression 6238, 2) transport control protocol pooling 6224, 3) transport control protocol multiplexing 6226, 4) transport control protocol buffering 6228, and 5) caching via a cache manager 6232. The acceleration program 6120 may also perform any encryption and/or decryption of communications of the application 6220 between the client 6205 and the server 30. In one embodiment, the acceleration program 6120 performs multi-protocol compression of application related data. In another embodiment, the acceleration program 6120 performs transport control protocol pooling, and in a further embodiment, the acceleration program 6120 performs multiplexing via the pooled transport layer connection. In one embodiment, the acceleration program 6120 performs transport control protocol buffering. In some embodiments, the acceleration program 6120 performs caching. In other embodiments, the acceleration program 6120 performs caching and compression. In one embodiment, the acceleration program 6120 performs caching with transport layer pooling, and in a further embodiment also with multiplexing. In another embodiment, the acceleration program 6120 performs multi-protocol compression with TCP buffering, and in a further embodiment, with transport layer pooling and, in yet a further embodiment, also with multiplexing. In another embodiment, the acceleration program 6120 performs caching with compression, and in a further embodiment, with TCP pooling, and in yet a further embodiment, with multiplexing.

As such, an appliance 1250 dynamically determines whether to the accelerate an application or whether the application can be accelerated, and communicates to the client-side acceleration program 6120 to perform on the client 6205 any one or more of the acceleration techniques for the application 6220. Furthermore, in some embodiments, a plurality of acceleration programs 6120 may be dynamically delivered to the client 6205 by the appliance and automatically installed and executed by the client 6205. For example, an acceleration program may be provided in accordance with the techniques and methods for each connection to a server 6205, or each communication session with an application 6220. As such, the client 6205 may automatically install and execute a plurality of acceleration programs 6120 to handle and perform acceleration for each server 630 or each application 6220a-6220n.

Figure 41C:
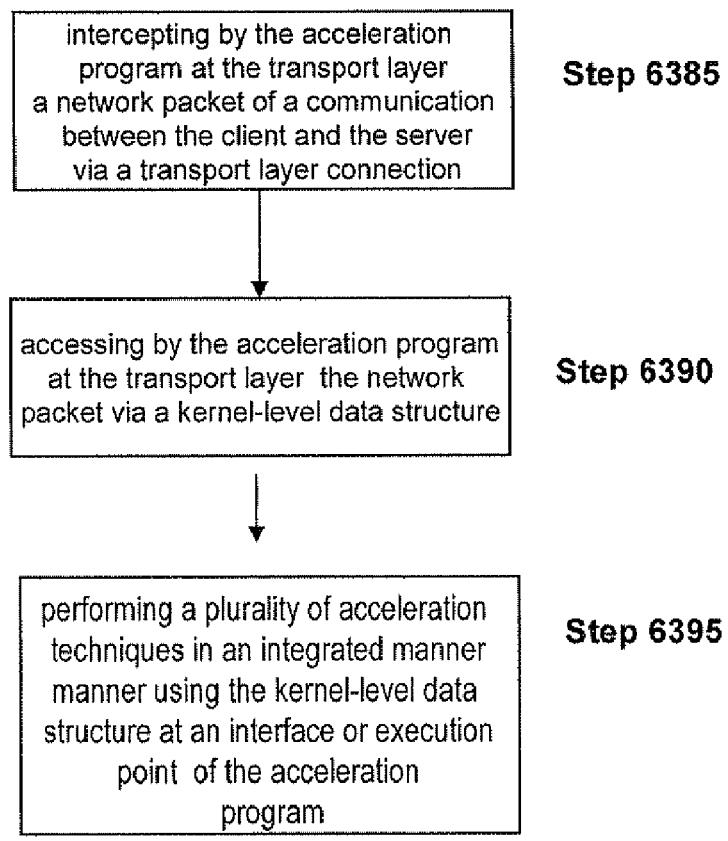
FIG. 41C is a step diagram of another embodiment of a method of performing a plurality of acceleration techniques by the acceleration program for intercepting at the transport layer and using a kernel-level data structure.

Referring now to FIG. 41C, an embodiment of a method 6380 for performing a plurality of acceleration techniques in an integrated manner is depicted. In brief overview, at step 6280, the acceleration program 6120 intercepts at the transport layer a network packet of a communication between the client 6205 and server 30 via a transport layer connection. At step 6390, the acceleration program 6120 accesses at the transport layer the network packet via a kernel-level data structure, for example, a data structure provided via an API to the network stack 6210 of the client 6205. At step 6395, the acceleration program 6120 performs a plurality of the acceleration techniques in an integrated manner using the kernel-level data structure at an interface point or point of execution in the acceleration program 6120.

In further detail, at step 6385, the acceleration program 6120 intercepts by any suitable means and mechanism a network packet of a communication between the client 6205 and the server 30 via a transport layer connection. In one embodiment, the acceleration program 6120 intercepts a network packet of, or related to, a request by the client, or a response thereto, to establish a transport layer connection between the client 6205 and the server 30. In another embodiment, the acceleration program 6120 intercepts a network packet of, or related to, a request, or a response thereto, to access or use an application 6220 via the transport layer connection between the client 6205 and the server 30. In one embodiment, the acceleration program 6120 intercepts the network packet at the transport protocol layer via a transport driver interface or otherwise a network driver interfaced at a transport protocol layer of the network stack 6210. In another embodiment, the acceleration program 6120 intercepts the network packet at the transport protocol layer, or any other protocol layer of the network stack 6210 via a Network Driver Interface Specification (NDIS) driver, or a mini-port driver, or a mini-filter driver. In some embodiments, the acceleration program 120 intercepts the network packet at the transport layer via a hooking or filtering mechanism.

At step 6390, the acceleration program 6120 accesses, or otherwise obtains information and data of the network packet intercepted at the transport layer via a kernel-level data structure 6225. By using the kernel-level data structure 6225, the acceleration program 6120 can obtain information and data on the payload(s) or the one or more protocols carried or transported by the network packet at the transport layer. In some embodiments, using a kernel-level data structure to represent the network packet at the layers of the network stack at and/or above the transport layer enables the acceleration program 6120 to perform or operate the plurality of acceleration techniques at the transport layer and for protocol layers carried by the transport layer network packet. In one embodiment, using a single kernel-level data structure 6225 prevents or avoids copying and memory allocation along with context switching from using multiple data structures at various protocol layers of the network stack 6210. In one embodiment, the acceleration program 6120 copies the kernel-level data structure 6225 to a second data structure, which may comprise another kernel-level data structure or a user-level data structure.

At step 6395, the acceleration program 6120 performs, executes or operates the plurality of acceleration techniques at single interface point or location in the program 6210 or in a set of executable instructions or one point of execution of the program 6210. The acceleration program 6120 performs any of the plurality of acceleration techniques of the acceleration program 6120, such as any techniques provided by 1) multi-protocol compression 6238, 2) transport control protocol pooling 6224, 3) transport control protocol multiplexing 6226, 4) transport control protocol buffering 6228, and 5) caching via a cache manager 6232. The acceleration program 6120 may also perform any encryption and/or decryption of communications of the application 6220 between the client 6205 and the server 30 at the same point in execution of the acceleration techniques of the acceleration program 6120.

In one embodiment, the acceleration program 6120 performs in a set of executable instructions, such as function call or one place or location, any desired plurality of the acceleration techniques subsequent to each other. For example, the acceleration program 6120 obtains the intercepted network packet via a kernel-level data structure and then executes instructions representing the logic, function, rules or operation of the acceleration techniques subsequent to each other. As such, information and data of the network packet can be extracted or obtained once via the kernel-level data structure 6225 and used as input, parameters, arguments and conditions for any of instructions of the acceleration program 6120 representing the acceleration techniques. Although the network packet carries higher level protocol data and information, the acceleration program 6120 in some embodiments, processes the network packet and the higher level protocol data and information at one point and at one time during execution. Additionally, the acceleration program 6120 may perform each of a plurality of acceleration techniques in any desired order in an integrated manner, such as compression data stored to the cache manager 6232, or compressing/uncompressing data retrieved from the cache.

In one embodiment, the acceleration program 6120 performs multi-protocol compression and caching subsequently to each other. In another embodiment, the acceleration program 6120 performs subsequent to each other operations related transport control protocol pooling and multiplexing via the pooled transport layer connection. In one embodiment, the acceleration program 6120 performs transport control protocol buffering subsequently to compression and caching, or to TCP pooling and/or multiplexing. In some embodiments, the acceleration program 6120 performs caching. In one embodiment, the acceleration program 6120 performs caching subsequently with transport layer pooling and multiplexing. In another embodiment, the acceleration program 6120 performs multi-protocol compression subsequently with transport layer pooling and multiplexing. In another embodiment, the acceleration program 6120 performs caching and/or compression subsequently with TCP buffering, and in a further embodiment, subsequently with TCP pooling and multiplexing.

Although the acceleration program is generally described as subsequently performing the acceleration techniques, subsequent execution may also include other logic, functions, and operations not related to acceleration but integrated and executed in between each acceleration technique. The acceleration program still obtains operational and performance efficiency with such integration as the executable instructions for the acceleration techniques and any other operations or function are executed at a single interface point or point of execution in the acceleration program. Furthermore, the acceleration techniques for protocol layers carried or above the transport protocol layer are processed at one time and/or at one location at the transport layer. As such, acceleration techniques for these higher level protocols do not need to be applied again as the network packet traverses and gets processed in these higher levels of the network stack 6210, or at a later point in the network stack 6210.

In other aspects, a first program 6222 and the acceleration program 6120 (or also referred to as the second program in this embodiment) can be used. In one embodiment, the first program 6222 along with the second program 6120 can be used to facilitate and establish a virtual private network connection with a server 30, such as via appliance 1250, over which the client-side acceleration techniques may be applied. In another embodiment, the first program 6222 is used to install and execute the second program, or the acceleration program 6120.

Figure 42A:
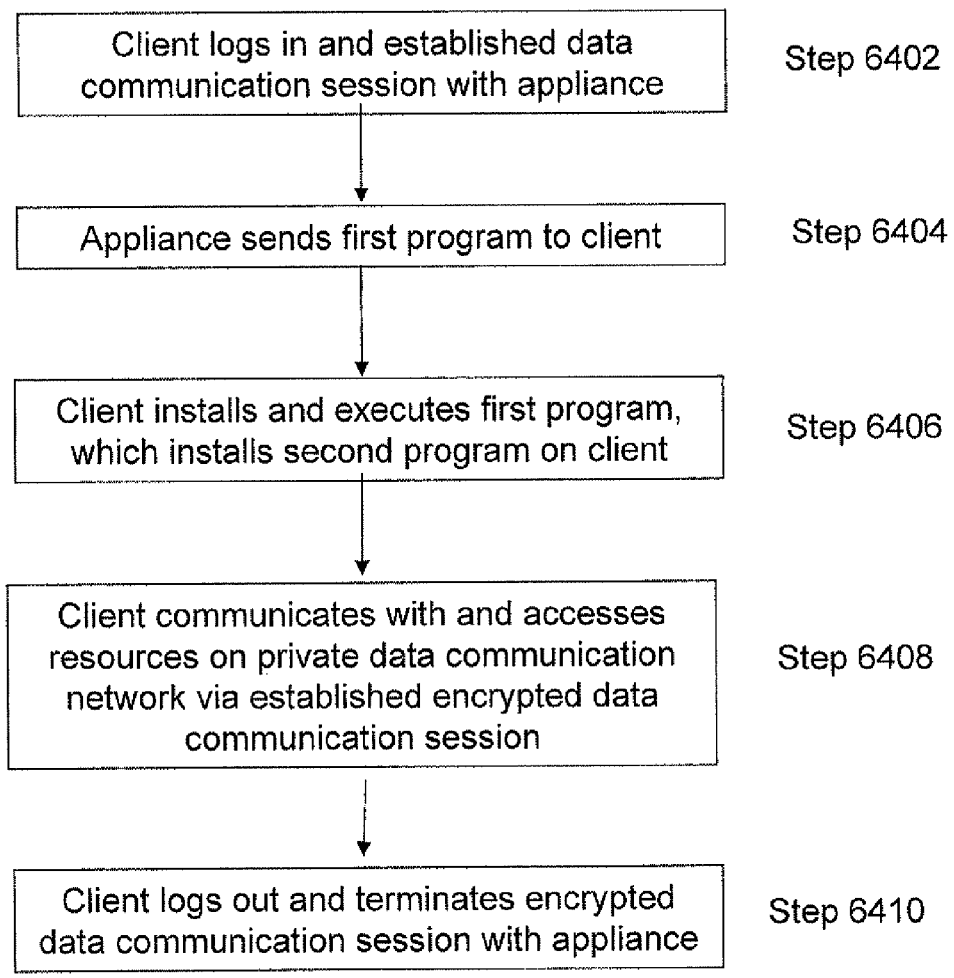
FIG. 42A is a step diagram of another embodiment of a method to automatically install and execute the acceleration program on the client via a first program.

Referring now to FIG. 42A, an embodiment of a method 6400 for practicing this aspect is depicted. In brief overview, at step 6402, the client 6205 logs in and establishes a communication session with the appliance 6205, At step 6404, the appliance 1250 sends the first program 6222 to the client 6205. At step 6406, the client 6205 installs and executes the first program 6222, which in turns installs and executes the acceleration program 6120, i.e., the second program. At step 6407, the client 6205 communicates with and accesses resources on a private network via an established encrypted data communication session. At step 6410, the client 6205 logs out from the appliance 1250 and terminates the communication session with the appliance 1250.

At step 6402 of method 6400, the client 6205 performs a log in procedure and establishes an encrypted data communication session with appliance 1250 via network 6204. In one embodiment, the encrypted data communication session is used as a tunnel to bridge traffic from client 6205 to any of servers 30 which reside behind appliance 1250 in private data communication network. In an embodiment, client 6205 uses a web browser, such as Microsoft Internet Explorer® or Netscape Navigator®, to log in and establish a data communication session with appliance 1250 using Secure Sockets Layer (SSL) or other encryption methods, such as IPSec, and Transport Layer Security (TLS). In another embodiment, a protocol such as Hypertext Transfer Protocol over Secure Sockets Layer (HTTPS) may be used to initiate the encrypted data communication session.

At step 6404, in response to log in and establishment of the encrypted data communication session, appliance 1250 sends a first program to client 6205 over network 6204. The first program is designed and constructed, or otherwise configured, to act as a tunnel endpoint for communication over the encrypted data communication session. In one embodiment, the first program comprises a plug-in application that is automatically installed and executed by the browser of the client 6204. For example, the first program may comprise an ActiveX control that is provided as a plug-in to be executed by a Microsoft Internet Explorer® Web browser. In another embodiment, the first program may comprise a Java applet that is provided as a plug-in to be executed by a Netscape Navigator® Web browser or another control or programming component that works across network environments.

At step 406, client 6205 installs and executes the first program 6222, wherein executing the first program comprises installing a second program on client 6205. In one embodiment, the first program 6222 may be automatically installed and executed, such as using any of the techniques discussed in conjunction with method 6300 and FIG. 41A. In some embodiments, the first program 6222 obtains, downloads or receives the second program, or the acceleration program 6120, from the appliance 1250. In another embodiment, the first program 6222 comprises a installer or install manager for the second program, such as the acceleration program 6120 to automatically install and execute the second program, such as by way of a silent installation or an installation transparent to a user of the client 6205, application 6220 of the client 6205, the appliance 1250 or the server 30.

In one embodiment, the second program is configured, in part, to intercept communications from applications 6220 running on client 6205 that are destined for resources on network 6204 and to provide the intercepted communications to the first program 6222 for sending to appliance 1250 via the encrypted data communication session. The second program may also be configured to provide intranet network name resolution service and optionally split network traffic. By splitting the traffic, an embodiment is able to determine what traffic is channeled to an SSL tunnel or encryption tunnel of the first program 6222 and what traffic is permitted or allows to continue along for processing by the transport layer of the network stack 6210 under normal, routine, or typical operations of the client 6205. In an embodiment, the second program comprises a dynamic interceptor (for instance, a filter device driver) that is inserted as a "hook" into an operating system of client 6205. For example, the second program may comprise a filter device driver that is attached to the transport layer stack of the client operating system, such as the transport layer stack of a Microsoft Windows® operating system.

At step 6408, once the first and second programs have been installed, applications running on client 6205 may communicate with and access resources, such as applications and data, on private data communication network 6204 via the established encrypted data communication session. The manner in which this communication occurs will be discussed in more detail below with respect to FIG. 42B. Note that, in an one embodiment, the functions of the first program and second program as described above are performed by a single control or programming component that is automatically installed and executed by client 6205, such as the acceleration program 6120. In addition to providing a virtual private network connection and communications, the first program 6222 and/or second program, such as the acceleration program 6120, may perform any of the acceleration techniques described herein on communications of the client via the virtual private network connection, e.g. the encrypted tunnel or bridge to appliance 1250.

At step 6410, client 6205 performs a log out procedure to disconnect from network 6204, which terminates the encrypted data communication session with appliance 1250. In one embodiment, at time of logging out, the first program 6222 automatically cleans up the modifications made to the operating system of the client 6205 to return the operating system to a state prior to the installation of the first program 6222 and/or second program. In one embodiment, the first program 6222 and/or second program also includes an uninstaller or uninstall instructions to remove the first and second programs from the operating system of the client 6205 or from further operation on the client 6205 in a non-intrusive manner to the continued operations of the client 6205. In yet another embodiment, the first program 6222 and/or the acceleration program 6120 removes any files, such an temporary files or cookies, used by applications of the client 6205 during any communication connections or sessions provided.

Figure 42B:
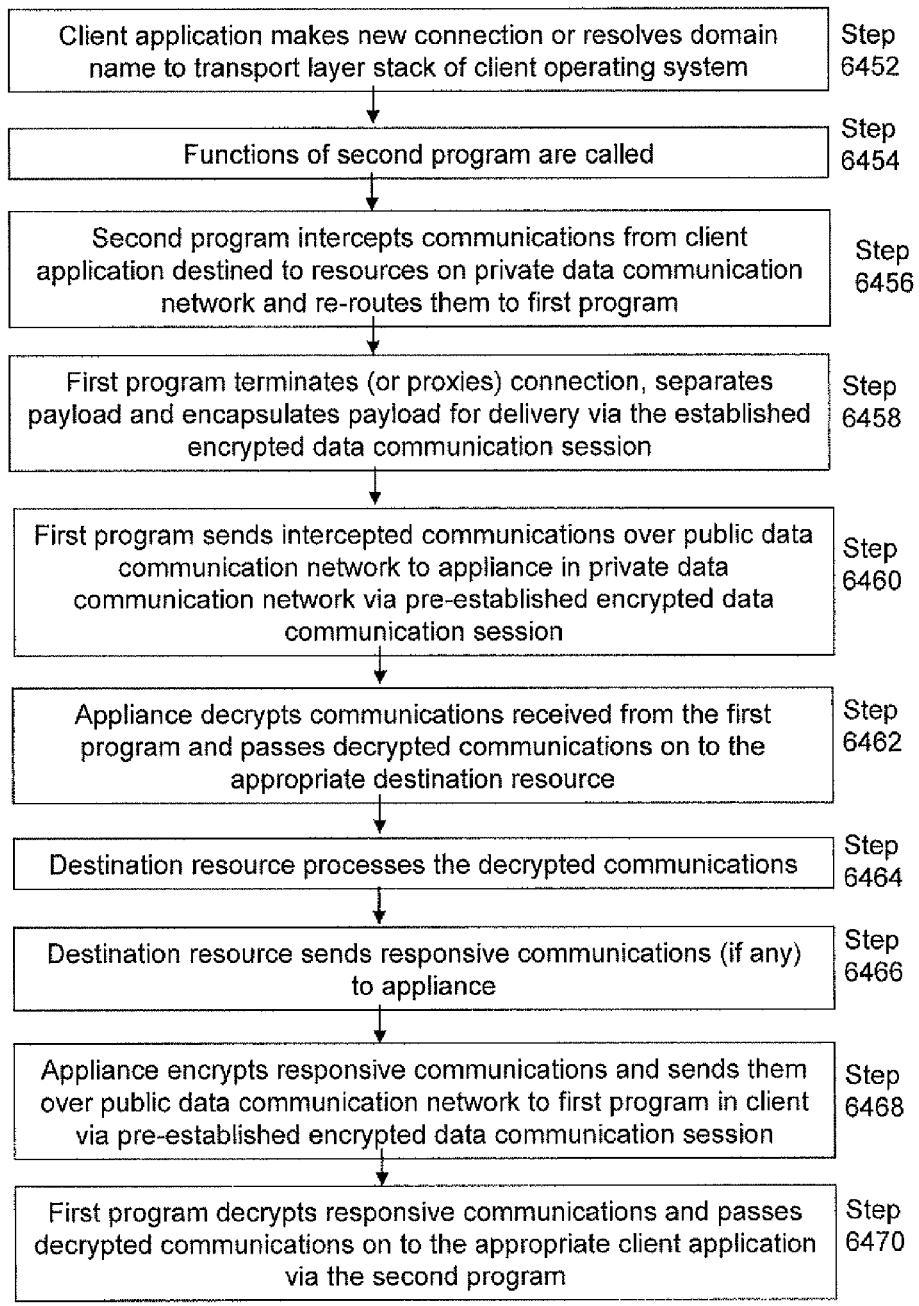
FIG. 42B is a step diagram of an embodiment of a method for a first program and the acceleration program to provide a virtual private network connectivity and perform one or more acceleration techniques.

FIG. 42B depicts an embodiment of another method 6450 by which a client 6205 communicates with and accesses resources on a private data communication network 6204. For example, the method 6450 represents a method by which step 6408 of method 6400 may be carried out. In brief overview, at step 6452, the client 6205 makes a new connection or resolves a domain name, such as a TCP/IP domain name resolution, via the first program and/or second program. At step 6454, the second program is executed. At step 6456, the second program intercepts communications from the client 6205 destined to the private network and re-routes or sends the communications to the first program 6222. At step 6458, the first program 6222 terminates or proxies the connection, separates the payload and encapsulates the payload for delivery via the established encrypted communication session. At step 6460, the first program 6222 sends intercepted communications over public network to appliance 1250 in private network via pre-established encrypted communication session. At step 6462, the appliance 1250 decrypts communications received from the first program and forwards the decrypted communications to the appropriate destination resource, such as a server 30. At step 6464, the destination resource processed the decrypted communications, and at step 6464 the destination resource sends responsive communication, if any, to the appliance 1250. At step 6468, the appliance 1250 encrypts responsive communications and sends the encrypted communications over public network to first program 6222 of client 6205 via pre-established encrypted communication session. At step 6470, the first program 6222 decrypts responsive communications and forwards decrypted communications on to the appropriate client application via the second program.

At step 6452, an application 6220 of a client 6205 makes a new connection or resolves a domain name via the transport protocol layer of the network stack 6210 of the client 6205. In one embodiment, the application 6220 may request to establish a transport layer connection between the client 6205 and a server 30, or between the client 6205 and the appliance 1250. In another embodiment, the application 220 or the client 6205 may request access to an application 6220 provided by the server 30. For example, the server 30 may provide for server-based computing or thin-client computing by transmitting a remote display protocol of ICA or RDP representing output of an application 6220 executing on the server 30. In another embodiment, the client 6205 may request access to resources of a server 30, such as files or directories, or email services. In some embodiments, the client 6205 may be on a public network 40 and the server 30 on a private network 40'. In other embodiments, the client 6205 and server 30 may be on different private networks.

At step 6454, the second program executes one or more functions automatically or otherwise before any transport layer functions are initiated. In some embodiments, the second program is or otherwise comprises the acceleration program 6120. In one embodiment, the second program intercepts or otherwise receives the client request of step 6452. In some embodiments, the application 6220 of the client 6205 makes API calls to the network stack 6210 which are intercepted by the second program. Prior to any API calls being processed by the transport layer of the network stack 6210, the second program is hooked into or otherwise interfaced to the network stack 6210 to execute logic, rules, functions or operations prior to the communication being transmitted or processed for transmission via a transport layer connection.

At step 6456, the second program intercepts communications from the client 205, such as by any application 6220a-6220n on client 6205 that are destined for resources on a network 40' and re-routes them to the first program 6222, which in an embodiment comprises an ActiveX control plug-in, a Java applet or other control or programming component that works across network environments. The second program may access, read or otherwise obtain destination information from the network packet or packets providing the intercepted communications to determine the communication is destined for a network, such as a private network 40' behind appliance 1250. For example, the second program may extract or interpret the destination IP address and/or port from the network packet. Upon determination an intercepted communication is destined for network 40', the second program communicates the intercepted communication to the first program 6222 via any suitable interface means and mechanism, such as via any inter-process communication interface or an API call. In one embodiment, the intercepted communication is sent to the first program 6222 as is, or in other embodiments, the intercepted communication is pre-processed by the second program prior to sending to the first program 6222. For example, the second program may remove the payload from the intercepted communication and forward the payload to the first program 6222.

At step 6458, each intercepted communication is terminated or proxied by the first program 6222, and the first program 6222 prepares the intercepted communication for transmission via the established encrypted data communication session. In one embodiment, the first program 6222 separates out the payload and encapsulates the payload for delivery via the established encrypted data communication session. In another embodiment, the first program 6222 encapsulates the intercepted communicated as received from the second program. In some embodiment, the payload is a TCP payload and is encapsulated into a new TCP connection between the client 6205 and the server 30, such as via appliance 1250.

At step 6460, the first program 6222 sends the intercepted communications over network 6204 to appliance 1250 via the pre-established encrypted data communication session. In some embodiments, the first program 6222 encrypts the intercepted communications and sends the encrypted intercepted communications to appliance 1250. In one embodiment, encryption is carried out in accordance with SSL protocols. In another embodiment, encryption is TLS based. Any type and form of encryption and/or decryption may be used by either first program 6222 or the acceleration program 6120.

At step 6462, appliance 1250 acts as a proxy terminating the connection sent by the first program 6222. The appliance 1250 decrypts the communications received from the first program 6222, and forwards the decrypted communications onto the appropriate destination resource on network 40' via a second connection that the appliance 1250 has established with the destination resource on network 40'. In one embodiment, decryption is carried out in accordance with SSL protocols or other applicable encryption and decryption protocols. In some embodiments, the appliance 1250 performs one or more acceleration techniques on the communication forwarded to the destination resource, such as one or more of the following: techniques provided by 1) multi-protocol compression 6238', 2) transport control protocol pooling 6224', 3) transport control protocol multiplexing 6226', 4) transport control protocol buffering 6228', and 5) caching via a cache manager 6232'.

At step 6464, the destination resource processes the decrypted communications. In one embodiment, the decrypted communications is a request to establish a connection or communication session. In another embodiment, the decrypted communications is a request to start or access an application 6220 on behalf of the client 6205. In other embodiments, the decrypted communications is a request for a web page, such as a HTTP request to receive a web page from a web server 30.

At step 6466, if the decrypted communications include a request for which there is a response, then the destination resource sends out responsive communications to appliance 1250. In some embodiments, the response includes an acknowledgement of establishing a connection or communication session as requested by the client 6205. In other embodiments, the response includes an error message. In one embodiment, the response includes an authentication request or a challenge-response mechanism. In some embodiments, the response includes an acceleration program 6120 to be used by the client 6205. In another embodiment, the response includes HTML, such as a web page to be displayed by the client 6205. In other embodiments, the response includes an object, such as a dynamically generated object.

At step 6468, appliance 1250 sends the responsive communications over network 40 to the first program 6220 on client 6205 via the pre-established encrypted data communication session. In one embodiment, the appliance 1250 encrypts the responsive communications and sends the encrypted responsive communications to the first program 6222. In some embodiments, encryption is carried out in accordance with SSL protocols or other applicable encryption and decryption protocols. Furthermore, the appliance 1250 may perform any of the acceleration techniques on communications to the client 6205, such as multi-protocol compression 6238', caching 6232' or TCP buffering 6228'.

At step 6470, the first program 6222 decrypts the responsive communications and forwards the communication to the appropriate application 6222 via the second program. The first program 6222 may use any suitable interface means and mechanism to communicate to the second program, such as via any type and form of inter-process communication mechanism or an API call. The second program provides the responsive communication via the network stack 6210 of the client 6205 to the application 6220. As such, the application 6220 transparently receives the responsive communication without any changes or modification to the application 6220.

In accordance with another embodiment, client 6205 performs additional processing of the intercepted communications before sending the communications over the network 40 at step 6458. Because an embodiment provides a VPN solution that acts as a proxy terminating connections at the client before encrypting such data, the additional processing can be performed more effectively. Such processing can include Domain Name Service (DNS) name resolution of the intercepted communications in order to enable client applications to use whatever IP addresses they choose as well as dynamically change those addresses at run time. Such additional processing permits embodiments to be effectively integrated with other technologies such as global service load balancing to achieve greater availability and greater efficiency among distributed gateways or servers. The additional connection processing can also enable the keeping of detailed logs and statistics regarding the intercepted communications.

In another embodiment, an appliance 1250 terminates communications received from the first program on client 6205 and further processes one or more requests included therein rather than forwarding the communications to a destination on network 40' as shown at step 6462. This further processing can include back-end encryption wherein communications are re-encrypted by appliance 1250 before delivery to the appropriate destination on network 40', thereby providing end-to-end network security. The destination will thereafter decrypt the traffic and respond appropriately. Further, such processing can permit appliance 1250 to serve responses out of a cache rather than requiring additional work by a destination server, perform local network load balancing, global service load balancing and/or compression on the communications to enhance the efficiency and responsiveness of network 40.

In accordance with the above-described methods, a VPN based on an encrypted data communication session is established between client 205 and network 40. For example, in an embodiment, a secure VPN is established via HTTPS. Thereafter, all communications from client 6205 to network 40 are routed via the first program to appliance 1250, and vice-versa, through this encrypted data communication session. It should be noted that although the encrypted data communication session may be established using HTTPS, the communications that are passed through the encrypted data communication session need not be HTTPS packet data or even HTTP packet data. For example, the communications may also comprise Transmission Control Protocol/User Datagram Protocol (TCP/UDP) or Internet Control Message Protocol (ICMP) packet data, although these examples are not intended to be limiting. Furthermore, although the method described in reference to FIG. 42B describes a request-response type communication between an application on client 6205 and a resource on network 40, encrypted communications need not be request-response based. Rather, the communications can be of any type. Thus, any client application that can establish a connection or communication session, such as a UDP session, can send and receive encrypted communications In another aspect, the acceleration program 6120 may dynamically bypass from the client any intermediary device to connect or communicate with a server 30. For example, a client 6205 may connection with a server via one or more intermediaries, such as the appliance 1250. For one reason or another, an intermediary may no longer be available for use by the client 6205 to communicate with the server 30, for example, the appliance 1250 may be down for maintenance or may be in the process of rebooting or restarting. The acceleration program 6120 determines the intermediary is not available and automatically establishes a different connection or communication session path with the server 30. This may occur transparently to the user or application of the client 6205 such that the connection and/or communication session does not appear to have changed or otherwise has been disrupted.

Figure 43:
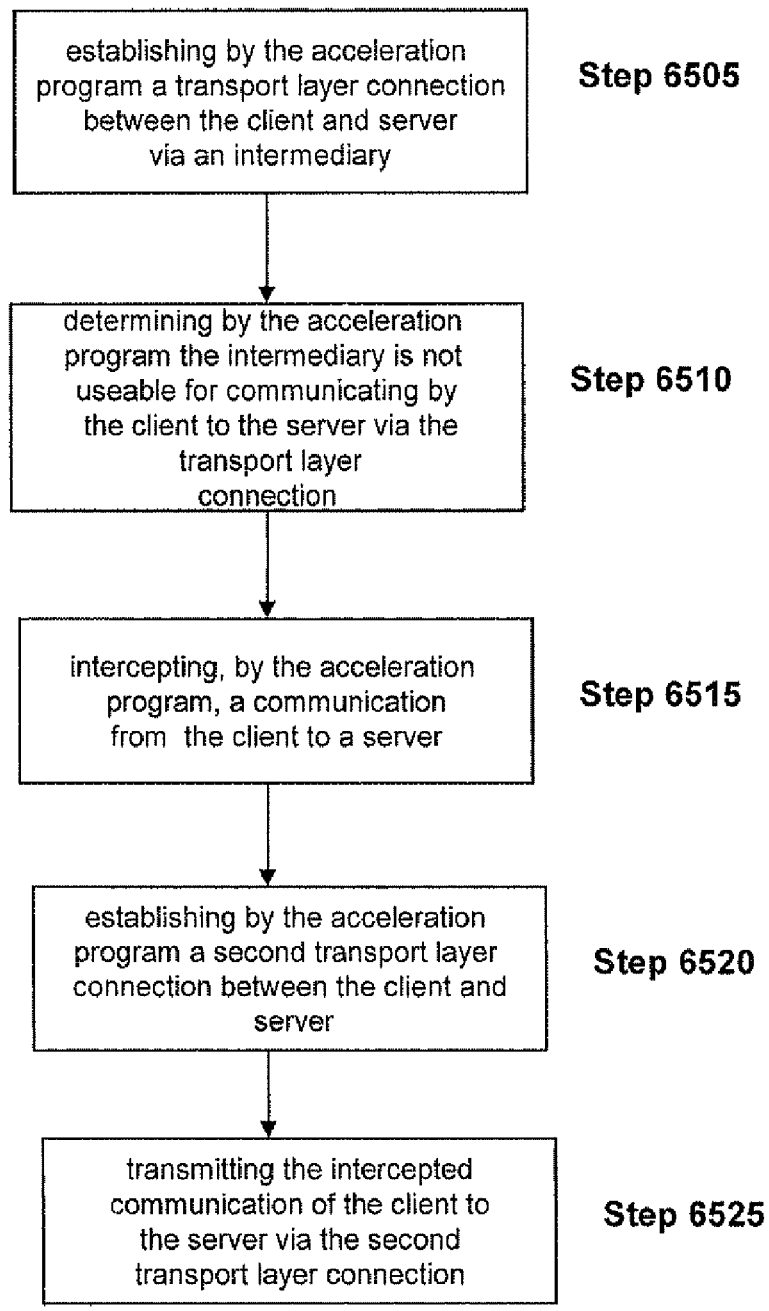
FIG. 43 is a step diagram of an embodiment of a method for redirecting a client's communication to a server to bypass an intermediary determined not useable to transmit the communication to the server.

Referring now to FIG. 43, an embodiment of a method 6500 for automatically bypassing an intermediary is depicted. In brief overview, at step 6505, the acceleration program 6120 establishes a transport layer connection between the client 6205 and server 30 via an intermediary, such as appliance 1250. At step 6510, the acceleration program 6120 determines the intermediary is not useable for communicating by the client 6205 to the server 30 via the established transport layer connection. At step 6515, the acceleration program 6120 intercepts on the client 6205 a communication from the client 6205 to the serve 30. At step 6520, the acceleration program 6120 establishes a second transport layer connection between the client 6205 and the server 30, and as a result, bypasses the intermediary determines as not useable for the client's communications to the server 30. At step 6525, the acceleration program 6120 transmits the intercepted communication of the client 6205 to the server 30 via the second transport layer connection.

In further detail, at step 6505, the acceleration program 120 establishes a transport layer connection between the client 6205 and the server 30 via an intermediary. In one embodiment, the intermediary comprises an appliance 6205. In other embodiments, the intermediary comprises one of the following: a cache, a server, a gateway, a firewall, a bridge, a router, a switch, a hub, a proxy, or any software application or program acting as or providing the functionality and operations of any of these types and forms of intermediaries. In one embodiment, the intermediary may operate on the server 30. In some embodiments, the transport layer connection is established via a plurality of intermediaries of the same type and form or of a different types and forms. In another embodiment, the transport layer connection comprises of the connection of a pool of transport layer connection either established as the client 6205 or at the appliance 1250.

At step 6510, the acceleration program 120 determines the intermediary is not available or otherwise is not useable for communicating by the client 6205 to the server 30 via the established transport layer connection. The acceleration program 6120 may determine the status or availability of the intermediary by any suitable means and/or mechanism. In one embodiment, the acceleration program 6120 determines the intermediary is not available by receiving an error message or failure reply associated with a transmission to the intermediary. For example, the acceleration program 6120 may receive a failed transport layer communication response when transmitting a communication from the client 6205 via the established transport layer connection. In another embodiment, the acceleration program 6120 may transmit a ping command to the intermediary on a predetermined frequency to monitor the status and availability of the intermediary. If the acceleration program 6120 does not receive a reply from the intermediary or in some embodiments, receives a delayed reply or a reply with a longer than desired latency, the acceleration program 6120 may determine the intermediary is not available or useable by the client 6205. In other embodiments, a server 30, appliance 1250 or the intermediary may send a message to the client 6205 or acceleration program 6120 providing information identifying the intermediary is not available or otherwise is not useable by the client 6205. In some embodiments, the established transport layer connection is disrupted or interrupted, or in other embodiments, is closed.

At step 6515, the acceleration program 6120 intercepts a communication from the client 6205 to the server 30 destined to travel via the intermediary through the established transport layer connection. The acceleration program 6120 may intercept the communication at any point and at any protocol layer in the network stack 6210. In one embodiment, the acceleration program 6120 intercepts the communication at the transport protocol layer prior to transmission on the established transport layer connection. For example, in some embodiments, the acceleration program 6120 comprises a network driver having a transport driver interface or otherwise interfaced to the transport protocol layer. Other embodiments may include a first program 6222 and the acceleration program 6120 as a second program as discussed in conjunction with FIGS. 42A-42B, in which either the first program 6222 or the acceleration program 6120 intercepts the communication.

At step 6520, the acceleration program 6120 establishes a second transport layer connection to the server 6205 for the client 6205 in order to bypass the intermediary determined to be unavailable or not useable by the client at step 6510. In one embodiment, the acceleration program 6120 establishes a second transport layer connection directly to the server 30, for example, when the client 6205 and server are on the same network 6205 or on different networks routable between the client 6205 and the server 30. In another embodiment, the acceleration program 6120 establishes the second transport layer connection with a second intermediary, such as a second appliance 1250'. In some embodiments, the acceleration program 6120 requests the appliance 1250 to establish another transport layer connection with the server 1250. In one embodiment, the appliance 1250 uses a second transport layer connection of a pool of transport layer connections to the server 30. In another embodiment, the acceleration program 6120 request the server 30 to establish the second transport layer connection. In some embodiments, the acceleration program 6120 uses a second transport layer connection from a pool of transport layer connections established by the acceleration program 6120 with the server 30.

In one embodiment, the acceleration program 120 establishes the second transport layer connection at step 6520 transparently to a user or application 6220 of the client 6205, or in some embodiments, transparently to any protocol layer above or below the transport layer. In some aspects, the second transport layer connection is established automatically for the client 6205 upon determination at step 6510 that the intermediary is not available or should not be used by the client 6205. In other embodiments, the second transport layer connection is established automatically upon failure of transmission of the intercepted communication to the server 30, e.g., the first attempt to transmit the communication. In some embodiments, the second transport layer connection is established automatically upon failure of one or more retried transmissions of the communication, or upon exhausting a predetermined number of retries. In another embodiment, the second transport layer connection is established upon determination the intermediary is delaying the rate of transmit or receipt of network packets, causing latency or otherwise affecting the use of the transport layer connection in an undesired manner. In one embodiment, the acceleration program 6120 performs load-balancing and establishes a second transport layer connection bypassing the intermediary to offload any processing or operations of the intermediary to the client 6205 and/or second intermediary.

At step 6525, the acceleration program 6120 transmits the intercepted communication of the client 6205 to the server 30 via the second transport layer connection. In one embodiment, the acceleration program 6120 transmits the intercepted communication directly to the server 30. In other embodiments, the acceleration program 6120 transmits the intercepted communication via a second intermediary, such as a second appliance 1250. By using the second transport layer connection, the acceleration program 6120 bypasses the intermediary and continues the operations of an application 6220 of the client 6205 with the server 30. In one embodiment, an application 6220 of the client 6205 continues with operations and communications with the server 6220 as if the application 6220 was continuing to use the previously or first established transport layer connection. As such, the acceleration program 6120 prevents, avoids or circumvents any communication interruption, disruption, latencies, delays or other operational or performance issues that may occur if the intermediary was not bypassed by the acceleration program 6120. In another aspect, this technique automatically provides the client 6205 continuous access to a server 30 or remotely-accessed application even if there is an issue with or disruption in access from an intermediate device.

Moreover, the redirection and bypassing techniques described above can be used to perform load-balancing and traffic management on the client 6205 to access one or more servers 30 providing applications 6220*a*-6220*n*, or other content and functionality to the client 6205. For example, in one embodiment, an intermediary or appliance used by the client to access a server may be overloading with increasing transport layer connections, and decreasing rate of responses, performance or other operations. Upon determination of decreasing performance of the intermediary or appliance, the acceleration program 6120 can redirect the client to another intermediary or appliance, or server to bypass any performance bottlenecks in the client's end-to-end connectivity to the server.

Figure 44:
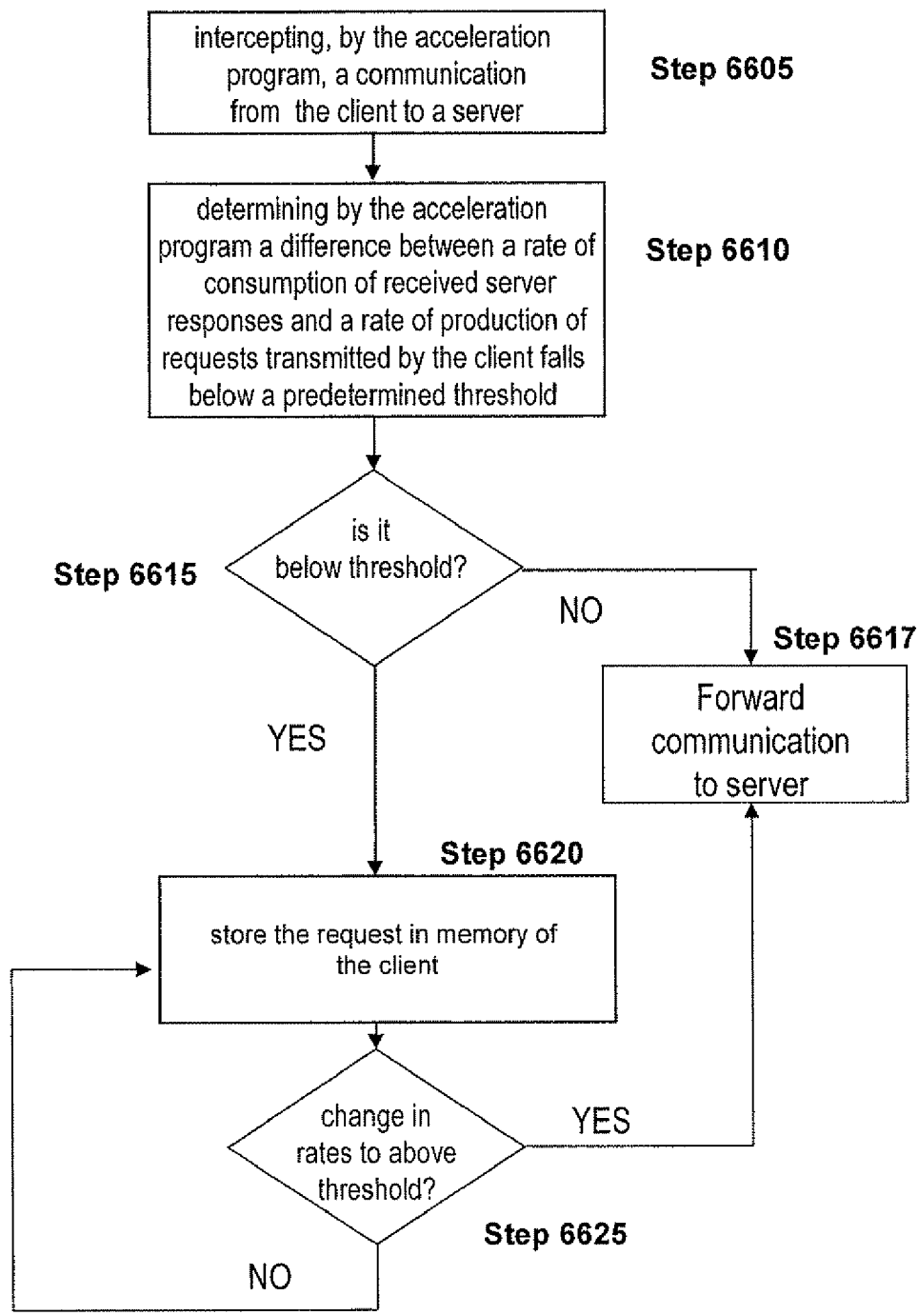
FIG. 44 is a step diagram of an embodiment of a method for performing a client-side acceleration technique of transport control protocol buffering.
Figure 45A:
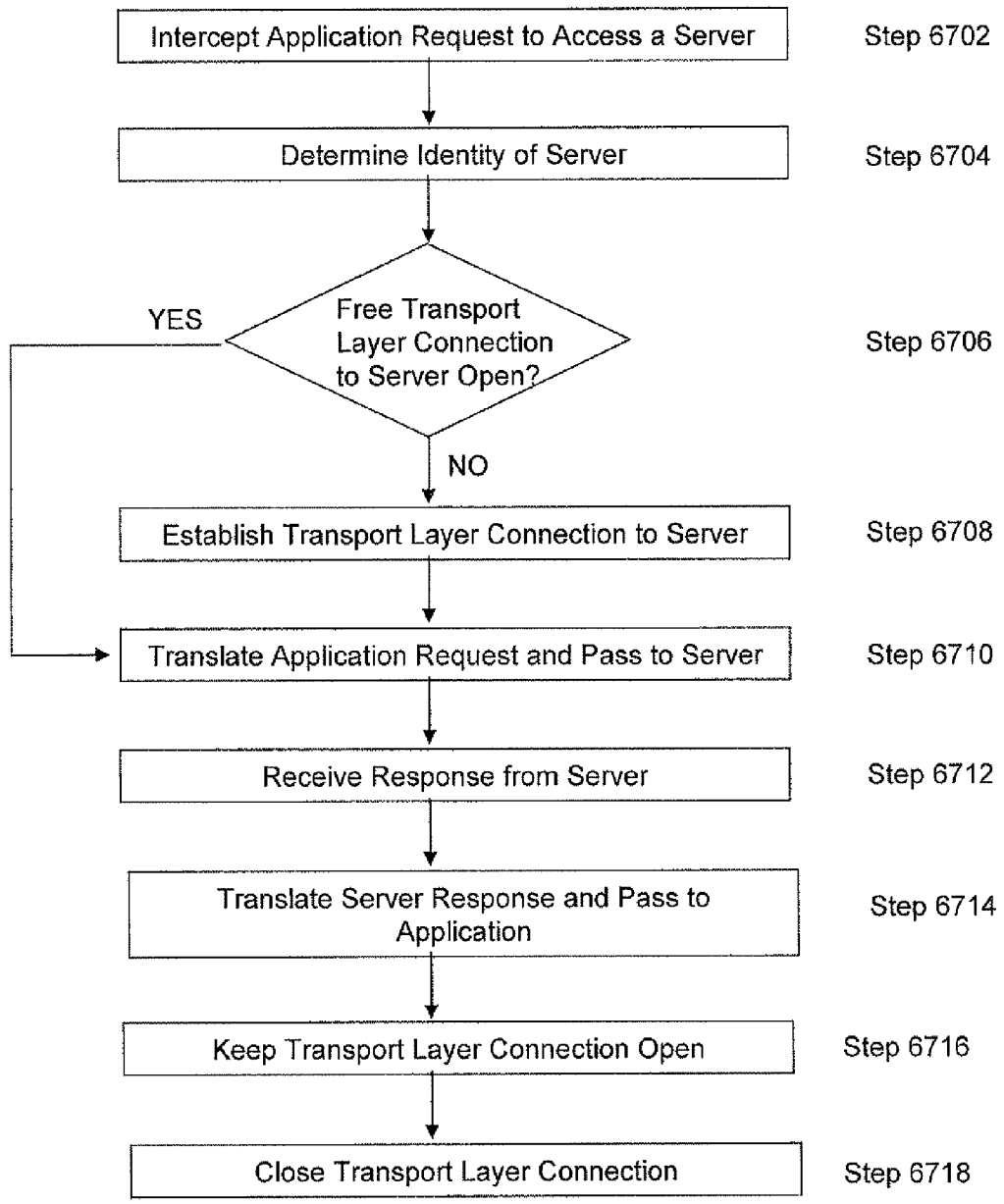
FIG. 45A is a step diagram of an embodiment of a method for performing a client-side acceleration technique of transport control protocol connection pooling.
Figure 45B:
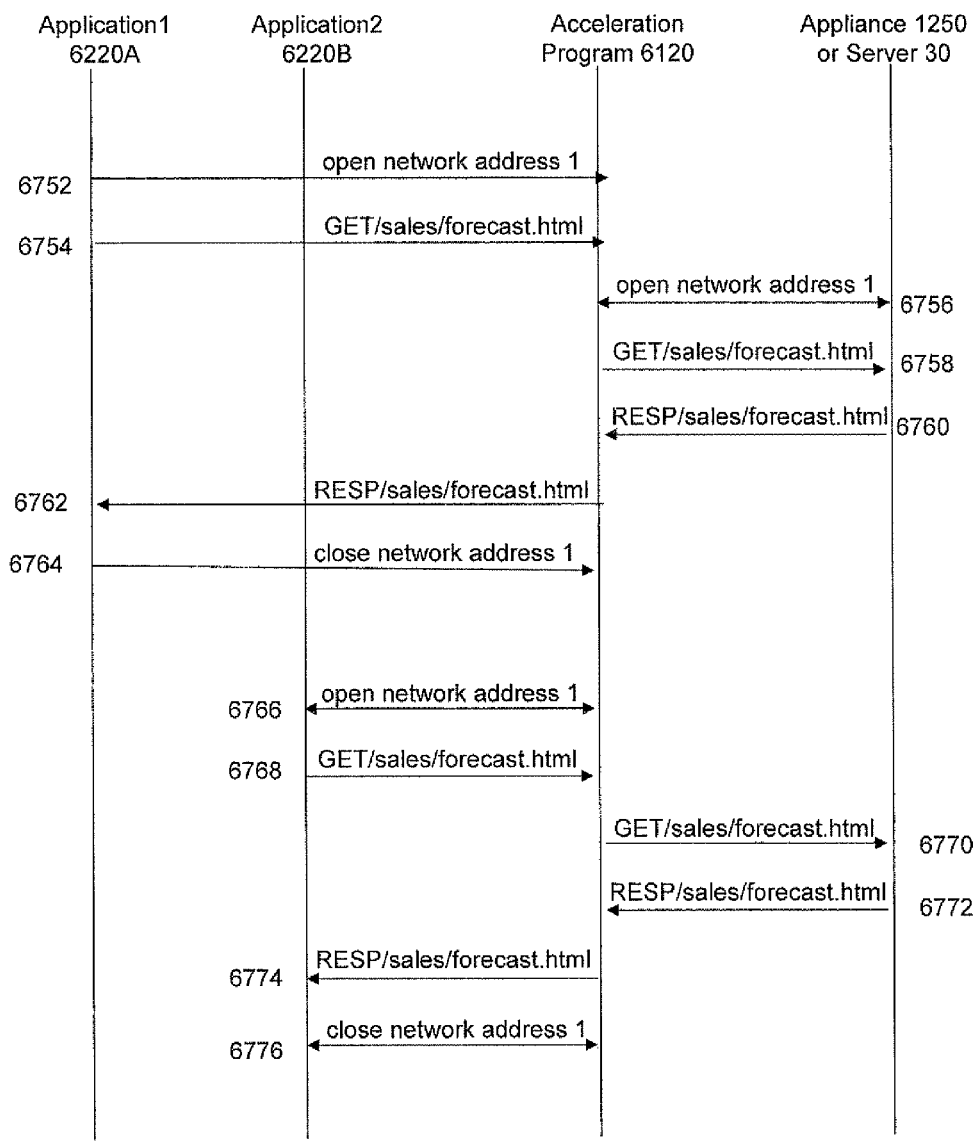
FIG. 45B is a diagrammatic view of a set of HTTP transactions performed by a plurality of applications via a pool of one or more transport layer connections in one embodiment.

In other aspects, client-side acceleration techniques may be related to or performed at the transport protocol layer of the network stack of the client. The acceleration program 6120 may comprises executable instructions to perform any one or more of 1) transport control protocol (TCP) buffering 6228, 2) TCP connection pooling 6224, and 3) TCP multiplexing 6226. In some embodiments, as the acceleration program 6120 transparently processes communications intercepted at the transport protocol layer of the client's network stack, the acceleration program 6120 can control and manage the TCP connections of the client, and the use and transmission over the connections by applications 6220*a*-6220*n* of the client 6205. FIG. 44 depicts an embodiment of method 6600 of practicing the TCP buffering techniques, while FIGS. 45A-45B depicts an embodiment of the TCP connection pooling technique and FIGS. 46, 47, and 48 the TCP multiplexing technique.

In brief overview of an embodiment of method 6600 depicted in FIG. 44, at step 6605, the acceleration program 6120 intercepts a communication from the client 6205 to the server 30, such as a request to access the server 30 by the client 205. At step 610, the acceleration program 6120 determines whether a difference between a rate of consumption of received server responses and a rate of production of requests transmitted by the client falls below a predetermined threshold. If at step 6615, the difference in product and consumption rates does not fall below the predetermined threshold, the acceleration program 6120 forwards the communication to the server 260 at step 6617. If at step 6615, the difference in rates is below the predetermined threshold, then at step 6620, the acceleration program 6120 stores the communication in memory of the client 6205. At step 6625, the acceleration program 6120 determines if the difference in rates has changed to above the predetermined threshold, and if so forwards the stored communication to the server 30. Otherwise, the acceleration program 6120 maintains the communication in memory of the client 6205 until a point in time the difference in rates change at step 6625 to above the predetermined threshold. For example, if the client 6205 is transmitting requests to the server 30 at a greater rate than by which the client 6205 can consume the generated responses, the acceleration program 6120 holds further transmission until a future point in time at which the difference in the rates haves changed.

In further detail, at step 6605, the acceleration program intercepts a communication from the client 6205 to the server 30. The acceleration program 6120 may intercept the communication at any point and at any protocol layer in the network stack 6210. In one embodiment, the acceleration program 6120 intercepts the communication at the transport protocol layer prior to transmission on the established transport layer connection. For example, in some embodiments, the acceleration program 6120 comprises a network driver having a transport driver interface or otherwise interfaced to the transport protocol layer. Other embodiments, may include a first program 6222 and the acceleration program 6120 as a second program as discussed in conjunction with FIGS. 42A-42B, in which either the first program 6222 or the acceleration program 6120 intercepts the communication. In one embodiment, the communication comprises a request by the client 6205 to use or otherwise access a resource of the server 30, such as an application 6220.

At step 6610, the acceleration program 6120 determines whether a difference between a rate of consumption and a rate of production of the client 6205 falls below a predetermined threshold. In one embodiment, the acceleration program 6120 counts and tracks the number of requests transmitted by the client 6205 to the server 30, and in another embodiment, the acceleration program 6120 counts and tracks number of responses received by the client 6205 from the server 30. In some embodiments, the client 6205 tracks responses transmitted and requests received on a per application 6220 basis. The responses and requests may be tracked at any protocol layer of the network stack 6210. In one embodiment, the number of requests transmitted by the client 6205 or application 6220 is counted and tracked from the point of submission to the transport layer or to a transport layer connection between the client 6205 and server 30. Likewise, in another embodiment, the number of responses received by the client 6205 or application 6220 from the server 30 is counted and tracked from the point of receipt at to the transport layer or from the transport layer connection between the client 6205 and server 30, and/or at the point the response is provided to a protocol layer, such as an application layer, above the transport layer of the network stack 6210.

In some embodiments, the acceleration program 6120 accesses, inspects or otherwise obtains information and data about the send and receive TCP buffers of the transport layer connection established by the acceleration program 6120 between the client 6205 and server 30. For example, the acceleration program 6120 may determine the default and maximum size of any TCP/IP buffer and the currently used portions of the buffer to determine a difference in rates between sending and receiving of network packets from the client 6205 to the server 30. In other embodiments, the acceleration program 6120 uses any type and form of congestion algorithm to determine if there is congestion causes by a difference in consumption and product of network packets from the client 6205 to the server 30. In another embodiment, the acceleration program 6120 interfaces with or obtains information or data from a congestion algorithm uses by the transport layer connection, such as by a network driver or TCP service provider. For example, in one embodiment, the acceleration program 6120 determines information and data regarding the congestion window used by the connection.

The predetermined threshold can be configured, specified, defined or identified by any suitable means and mechanism of the acceleration program 6120. In one embodiment, the threshold may be specified as a percentage, relative, absolute or otherwise, between the production rate and consumption rate of the client 6205 and/or application 6220. The rates for consumption and/or product may be identified by a number of consumed receipts and produced transmissions respectively, over any time period at any granularity. In some embodiments, the threshold may be specified as a quantity difference between the rate of production and consumption of the client 6205 and/or application 6220, and in some embodiments, a quantity difference over a time period. For example, the threshold may be specified as the point in time the client 6205 has produced 6100 requests more than the client 6205 has consumed. In another example, the threshold may be specified as the point in time when the client 6205 is producing 610 requests per time period to the server 30 more than the requests consumed by the client 6205 during the same time period.

At step 6615, if the difference in product and consumption rate of the client 6205 and/or application 6220 is not below the predetermined threshold, the acceleration program 6120 forwards the communication to the server 6260 at step 6617. In some embodiments, the acceleration program performs any of the acceleration techniques for the communication. For example, the communication may be forwarded to the server via a pooled multiplexed transport layer connection, and additionally, may be compressed. In other embodiments, the client 6205 may forward the communication to an appliance 1250 providing a connection for the client 6205 to the server 30.

At step 6615, if the difference in product and consumption rate of the client 6205 and/or application 6220 is below the predetermined threshold, the acceleration program 6120, at step 6620, stores the communication in memory of the client 6205. In some embodiments, the memory may be memory of the kernel-mode 6202 of the client 6205, while, in other embodiments, the memory may be in user-mode 6203 of the client 6205. In one embodiment, the acceleration program 6120 may store the communication in cache via the cache manager 6232. In other embodiments, the acceleration program 6120 may use an object, data structure or other data element accessible by the acceleration program 6120 to buffer, hold or otherwise store the intercepted communication. In one embodiment, the intercepted communication may be stored in a compressed manner in memory. In another embodiment, the acceleration program 6120 sends the intercepted communication to a first program 6222 to store or hold in memory for transmission at a later point in time.

At step 6625, the acceleration program 6120 determines when to transmit the stored communication to the server 30. In one embodiment, the acceleration program 6120 performs steps 6610 and 6615 to determine if the difference in production and consumption rates of the client 6205 are above the threshold upon which the acceleration program 6120 forwards the stored communication to the server 30 at step 6617. In some embodiments, the acceleration program 6120 compares the difference in production and consumption rates on a regular or predetermined frequency or on a polling or event basis, and when the difference rises above the predetermined threshold, the acceleration program 6120 forwards the communication to the server 30. In other embodiments, the acceleration program 6120 sets or configures a timer to determine how long to store the intercepted communication. Upon expiration of the timer the acceleration program 6120 transmits the stored communication to the server 30. In another embodiment, the acceleration program 6120 checks the number of server responses consumed by the client 6205 since storing the intercepted communication. If the number of consumed responses is greater than a predetermined number, the acceleration program 6120 releases the intercepted communication from the memory buffer or storage and submits the communication for transmission to the server 30.

If at step 6625, the acceleration program 6120 determines the rates of production or consumption have not changed in a suitable manner, the acceleration program 6120 holds or maintains the intercepted communication in memory until a suitable point of time is reached. In one embodiment, the acceleration program 6120 forwards the communication to the server at step 6617 even if the production and/or consumption rates do not change. For example, after a period of time waiting for the production and/or consumption rate to change and the rates do not change, the acceleration program 6120 forward the communication to the server 30.

Although the TCP buffering technique is generally discussed in relation to an intercepted communication or request, the embodiments of the method 6600 may be practiced subsequently, nearly simultaneously or concurrently for multiple intercepted communications of the client 6205 to the server 30. Additionally, in another embodiment, the method 6600 may be practiced on the client regarding communications from the client to multiple servers 30. For example, a first instance of method 6600 may be practiced between the client 6205 and a first server 30', and a second instance of method 6600 may be practiced between the client 6205 and a second server 30". Furthermore, in some embodiments, the method 6600 may be practiced for a first application 6200*a* and also for a second application 6200*b*, using the respective production and consumption rates of each application. In other embodiments, the method 6600 may be practiced for a first application 6200*a* but not a second application 6200*n*.

According to another aspect, the client-side acceleration program 6120 reduces the processing load of servers 30 and/or appliance 1250 caused by repeatedly opening and closing connections of the client clients by opening one or more connections with each server and maintaining these connections to allow repeated data accesses by applications of the client 6205 to the server 30. This technique is generally referred to herein as "connection pooling." Referring now to FIG. 45A, in brief overview of method 6700, at step 6702, the acceleration program 6120 intercepts an application's request to access a server, and at step 6704, determines the identity of the server associated with the request. At step 6706, the acceleration program 6120 determines if the acceleration program 6120 has an established transport layer connection to the server 30 free for use by the application 6220. If there is not a transport layer connection to the server 30 free for use by the application 6220, the acceleration program 6220 establishes, at step 6708, a transport layer connection to the server 30 for use by the client 6205. At step 6706, if there is a transport layer connection available for use by the application 6220, at step 6710, the acceleration program 6120 translates the application's request for transmission or communication via the available transport layer connection.

In further overview, at step 6712, the acceleration program 6120 receives the response to the request from the server 30, and at step 6714 translates the response into a response to the application 6220. At step 6716, the acceleration program 6120 may maintain or keep the transport layer connection open for use by any of the applications 6220*a*-6220*n* of the client 6205. By maintaining on the client 6205 open transport layer connections with the servers 30 and by opening and closing connections with the applications as needed, the acceleration program 6120 frees the servers of TCP connection loading problems associated with serving the client 6205 over the network 40, such as the Internet. At step 6718, the acceleration program 6120 at some point closes the transport layer connection if the connection is determined no longer used by one or more application 6220 of the client 6205 to access the server 30.

In further detail, at step 6702, the acceleration program 6120 intercepts a request by any application 6220a-6220n of the client 6205 to access a server 30. In some embodiments, the request is intercepted at the transport protocol layer before establishing or transmitting the request via a transport layer connection. In other embodiments, the request is intercepted at any protocol layer above the transport layer or a transport layer connection. In one embodiment, the request of the application 6220 is a request to open or establish a transport layer connection with the server 30. In some embodiments, in response to the request, the acceleration program 6120 establishes a first transport layer connection of a pool of transport layer connections for use by applications 6220a-6220n of the client 6205. In another embodiment, the application request is a request to access the server via an established transport layer connection of the client 6205.

At step 6704, the acceleration program 6120 determines the identity of the server 30 from the request by any suitable means and mechanism. In some embodiments, the domain name or internet protocol address of the server 30 is identified or otherwise referenced by the contents of the request, for example a text string of the request may identify the domain name of a server 30. In one embodiment, the identity of the server 30 is determined by the header information of a TCP packet, such as the destination internet protocol address and port number. In another embodiment, the server 30 is associated with the application 6220, and the acceleration program 6120 looks up or queries the association in a database or other structured information storage.

At step 6706, the acceleration program 6120 determines if there is a transport layer connection available for use or is otherwise free to use by the application 6220. In one embodiment, the acceleration program 6120 may have not yet established a transport layer connection with the server 30, and as such, there is not a transport layer connection available for the application 6220 to use. In another embodiment, the acceleration program 6120 may have a previously established transport layer connection with the server 30 but determines that another application 6220 is currently actively using the connection. As will be discussed in further detail below, the acceleration program 6120 determines if an established transport layer connection is available for use by another application or can be shared by applications 6220s-6220n based on the length of a message being received from the server 30 for the application 6220, such as a response to a request, and/or if the communications between the server 30 and application 6220 are currently idle.

At step 6708, if the acceleration program 6120 determines a transport layer connection is not available for use by the application 6220, the acceleration program 6120 establishes a transport layer connection with the server 30. In some embodiments, the transport layer connection established at step 6708 is the first transport layer connection with the server 30, and in other embodiments, the transport layer connection is a second transport layer connection of a plurality of transport layer connections to the server 30. In yet another embodiment, the acceleration program 6120 waits for an already established transport layer connection to become available or free to communicate the application's request to the server 30. For example, the acceleration program 6120 may determine a first application 6220a may be shortly completing a transaction with the server 30 via an established connection.

At step 6710, the acceleration program 6120 translates the application's request to be transmitted via the transport layer connection to the server 6106. In some embodiments, the acceleration program 6120 uses one port number for the transport layer connection communication for all applications 6220a-6220n of the client 6205 sharing the connection. In some cases, the acceleration program 6120 tracks the requests and outstanding responses for the requests on an application by application basis. As such, the acceleration program 6120 recognizes which application 6220 is transmitting and receiving network packets via the transport layer connection to the server 30 at any given point in time. In one embodiment, only one application 6220 at a time is sending and receiving on the transport layer connection and thus the acceleration program 6220 understands which application 6220 is using the connection. In some embodiments, the acceleration program 6120 associates a process id of the application 6220 with the request. In other embodiments, the acceleration program 6120 provides and associates a port number with the application 6220, and modifies the port number in the TCP network packet to be transmitted to application's assigned port number. In another embodiment, the port number is provided by the application 6220 and the acceleration program 6120 changes or otherwise provides the port number accordingly in the TCP network packet.

At step 6712, the acceleration program 6120 receives a response to the application's request from the server 30. In one embodiment, the server 30 does not respond to the request. In another embodiment, the server 30 responds with an error or failure message. In some embodiments, the server 30 responds with multiple responses. In other embodiments, the server 30 responds with a response comprising multiple network packets or multiple TCP segments. In another embodiment, the server 30 responds with one or more network packets identifying the source port number associated with or assigned to the application 6220. In one embodiment, the server 30 responds with one or more network packets identifying a source port number of the transport layer connection and used for multiple applications of the client 6205.

At step 6714, the acceleration program 6120 translates or otherwise processes the response from the server 30 in a manner responsive to the application 6220. In one embodiment, the acceleration program 6120 replaces the source port number of the received network packet or packets with the port number of the application 6220. In another embodiment, the acceleration program 6120 determines via a tracking mechanism the application 6220 currently using the transport layer connection and passes the response to the application 6220 via the network stack 6210. In one embodiment, the response is not altered and passed for processing via the protocol layers of the network stack 6210 above the transport layer of the connection. In some embodiments, the acceleration program 6120 waits for multiple portions, such as TCP segments, of the response to be received before processing and forwarding the response to the application 6220. In one embodiment, the acceleration program 6120 passes the response to a first program 6222, which interfaces with and provides the response to the application 6220.

At step 6716, the acceleration program 6120 maintains or keeps the transport layer connection open in a pool of one or more transport layer connections from the client 6205 to the server 30. In one embodiment, the acceleration program 6120 or a transport layer driver of the network stack 6210 includes a keep-alive mechanism that periodically probes the other end of a connection when the connection is otherwise idle, for example where when there is no data to send. The keep-alive mechanism may send this message in order to receive a response to confirm the connection is still active although the connection may be idle. The keep-alive message and corresponding response may include any type and form of format, command, directive or communication. As such, in some embodiments, the acceleration program 6120 transmits or causes to transmit via a transport layer driver a keep-alive message to the transport layer connection. In some embodiments, the acceleration program 6120 sets a frequency for the keep-alive messages, and in other embodiments, changes the frequency of the keep-alive messages based on the behavior or activity of the applications 6220a-6220n using the connection.

In some embodiments, the acceleration program 6120 intercepts any RST and/or FIN commands, i.e., TCP/IP commands to reset and/or terminate the TCP connection, received over the transport layer connection. In one embodiment, the acceleration program 6120 ignores, takes no action on, or otherwise drops, deletes or flushes the intercepted RST and/or FIN command. In another embodiment, the acceleration program 6120 intercepts and receives a RST and/or FIN commands but sends a message to the other end of the connection to keep or maintain the connection open. In other embodiments, the acceleration program 6120 establishes a new transport layer connection in response to a closing of an established transport layer connection due to processing of a RST and/or FIN command.

In other embodiments, the acceleration program 6120 inserts an instruction, command or directive in an intercepted communication of the client 6205 to direct the server 30 to keep the connection open or to otherwise not close the connection unless the client 6205 sends a command to do so. For example, in one embodiment, the acceleration program 6120 intercepts a communication of a GET request of the HTTP protocol, such as protocol version 1.0, and inserts a keep-alive header, e.g., "Connection: Keep-Alive", into the communication to the server 30. In other embodiments, a GET request or other HTTP command may include the keep-alive header. In these embodiments, the acceleration program 6120 may intercept the communication and check for the keep-alive header and then forward the communication to the server 30. In some embodiments, version 1.1 or greater of HTTP is used by which the keep-alive mechanism is implicit such that the server 30 keeps the connection open until the client 6205 requests to the close the connection. In other embodiments, the acceleration program 6120 keeps the transport layer connection open to the server 30 until the client 6205 is rebooted or restarted, the network 40 becomes unavailable or the client 6205 is disconnected from the network 40, or the server 30 is rebooted or restarted.

At step 6718, the acceleration program 6120 may close any one or more of the transport layer connections between a client 6205 and a server 30 at any desired point in time. In some embodiments, the acceleration program 6120 closes a transport layer connection upon the termination of the one or more applications 6220a-6220n on the client 6205 using the connection. In other embodiments, the acceleration program 6120 closes a transport layer connection upon expiration of a time out period for any application 6220a-6220n to use the connection. For example, the acceleration program 6120 may configure, set or provide a timer to expire upon a predetermined time period and if the connection is or remains idle during the time period, the acceleration program 6120 closes the connection. In some embodiments, the server 30 may be rebooted, restarted, or the connection disrupted or interrupted and the acceleration program 6120 closes the connection. In some embodiments, the acceleration program 6120 transmits or causes to be transmitted a RST and/or FIN command to close connection upon completion of sending requests to and receiving all the data of responses from the server 30. In other embodiments, the transport layer connection or pool of transport layer connections are closed upon restart or reboot of the client 6205, disconnection to the network 40 or unavailability of the network 40, or restart or reboot of the server 30.

In some embodiments, a first transport layer connection to the server 30 is kept open while a second transport layer connection to the server is closed as the acceleration program 6120 determines only the first transport layer connection is needed for sharing a connection to the server 30 by one or more applications 6220a-6220n of the client 6205. In other embodiments, the acceleration program 6120 maintains a pool of one transport layer connection to any server 30 and establishes a second or a plurality of connections to a given server 30 based on increased requests, communications or transport layer connection usage of the applications 6220a-6220n on the client 6205

Although an embodiment of method 6700 is generally discussed in relation to a pool of one or more transport layer connections from the client 6205 to a server 30, the acceleration program 6120 may establish subsequently, nearly simultaneously, or concurrently a pool of transport layer connections between the client and each of a plurality of servers 30. As such, a first application 6220a and a second application 6220b may be using a first pool of one or more transport layer connections to server 30a, and a third application 6220c and a fourth application 6220d using a second pool of one or more transport layer connection to server 30b. Furthermore, each of the steps of an embodiment of the method 6700 can be performed in different instances and at different frequencies. In some embodiments, multiples instances of the acceleration program 6120 may be used to handle each pool of one or more transport layer connections to each server 30.

Now referring to FIG. 45B, a flow diagram is depicted of an acceleration program 6120 providing a transport layer connection for use by two applications 6220a and 6220b of a client 6205, to a server 30 in one embodiment, or to an appliance 1250, in another embodiment. The acceleration program 6120 on client 6205 opens a first transport layer connection between client 6205 and the server 30, or appliance 1250, using network address 1 provided by application 6220 as depicted by step 6752. Step 6752 is shown as a two-way step because the TCP/IP protocol employs a multi-stage handshake to open connections.

Once the transport layer connection is established, the acceleration program 6120 intercepts a GET request from application 6220a specifying a path name of/sales/forecast.html, as shown by step 6754. Because no free transport layer connection is open between acceleration program 6120 and server 30, or appliance 6205, acceleration program 6120 opens a transport layer connection. In one embodiment, acceleration program 6120 maps the request of the application 6220a to a second network address of network address 2 which specifies server 30, as shown by step 6756. For example, the acceleration program 120 performs network address translation to modify the destination IP address and/or destination port to a server 30' requested by the application 6220a or to another server 30" that can also handle or respond to the request. In another embodiment, the acceleration program 6120 sends the request to the server 30, or appliance 1250, as received or as generated by the application 6220s.

Acceleration program 6120 also passes the GET request to that server 30, or appliance 1250, as shown by step 6758. In one embodiment, the appliance 1250 forwards the request to the server 30, and in a further embodiment, the appliance 1250 forwards the request via a pooled or pooled and multiplexed transport layer connections between the appliance 1250 and the server 30. In some embodiments, the server 30 responds with the requested web page, as shown by step 6760. Acceleration program 6120 forwards the web page to application 6220*a*, as shown by step 6762. In one embodiment, the transport layer connection between the acceleration program 6120 and the server 30, or appliance 1250, is closed, as shown by step 6764. In other embodiments, the acceleration program 6120 intercepts the close request, and ignores the request leaving the transport layer connection open. According to the TCP/IP protocol, closing a network connection can involve a multi-stage process. Therefore, the flow line of step 6764 is shown as bidirectional. In other embodiments and in accordance with the techniques of the pooling aspect, the transport layer connection established for and used by the first application 6220 is kept open or otherwise maintained to accommodate further data steps from the same application 6220*a* or a different application, such as the second application 6220*b*.

At step 6766, the acceleration program 6120 intercepts a request from the second application 6220*a* to the server 30, or appliance 1250. If there is a free transport layer connection open and/or useable by the second application 6220*b*, such as the transport layer connection established at step 6756 for the first application 6220*a*, the acceleration program 6120 uses this previously established transport layer connection. As such, a second transport layer connection does not need to be opened at step 6766. Otherwise, the acceleration program 6120 establishes a second transport layer connection to the server 30, or appliance 1250. At step 6768, the acceleration program intercepts a request from the second application 6220*b*, for example requesting the Web page /sales/forecast.html, and transmits the request to the server 30, or appliance 1250, at step 6770. Because a free connection is already open between the acceleration program 6120 and server 6120, it is unnecessary for the acceleration program 6120 to burden the server 6120 with the processing load of opening a further connection. At step 6772, the acceleration program 6120 intercepts or receives a response from the server 30, such as via appliance 1250 from the transport layer connection, and forwards the response to second application 6220*b*. At step 6776, the acceleration program 120 intercepts a close request from the second application 6220*b*, and in some embodiments, closes the connection, while in other embodiments, ignores the request, and keeps the connection to accommodate further data requests from the first application 6220*a*, the second application 6220*b*, or yet another application 6220*c*-6220*n* of the client 6205.

There are a number of scenarios that result in the acceleration program 6120 closing the connection with server 30, or appliance 1250, at step 6776. For example, the client 6205 or acceleration program 6120 may initiate a FIN (finish) command upon determination that the client 6205 has retrieved all the requested data for applications 6220*a* and 6220*b*, or upon termination, shutting down or exiting applications 6220*a* and 6220*b*. In some embodiments, the client 6205 or acceleration program 6120 may also initiate a RST (reset) command under similar conditions. In addition to closing the connection between the acceleration program 6120 and the server 30, or the appliance 1250, the RST command results in a number of housekeeping operations being performed to keep the server side connection in good order. In particular, the TCP protocol guarantees that the RST command will have the right SEQ (sequence) number so that the server will accept the segment. However, the RST command is not guaranteed to have the right ACK (acknowledge) number. To take care of this scenario, the acceleration program 6120 keeps track of the bytes of data sent by the server 30, or appliance 1250, and the bytes acknowledged by the client 6205. If the client 6205 has not yet acknowledged all the data by the server 30, the acceleration program 6120 calculates the unacknowledged bytes, and sends an ACK to the server 6205.

Furthermore, although not shown in FIG. 45B, the server 30, or appliance 1250, can also close a connection between itself and the client 6205. The server 30, or appliance 1250, would send a FIN command to the client 6205. In response, in some embodiments, the acceleration program 6120 closes the connection, and a further embodiment, re-establishes another connection with the server 30, or appliance 1250.

Moreover, although an embodiment of method 6700 of FIG. 45A and the example flow diagram of FIG. 45B are generally discussed as pooling one or more transport layer connections for use by a plurality of applications, the pooling technique can be applied to a single application 6220 that requests or initiates a plurality of transport layer connections and requests via these connections. For example, in an embodiment of HTTP protocol, a transport layer connection may be established for each HTTP request from an application. Using the techniques, a pool of one or more transport layer connections can be used by the application 220 without opening and closing transport layer connections for each request.

In another aspect, techniques for multiplexing application requests via the same or shared transport layer connection may be used, such as a transport layer connection established via the pooling techniques described in conjunction with FIGS. 45A-45B. In some embodiments, the availability of an established transport layer connection is determined and requests may be multiplexed from a plurality of applications via the connection by checking whether the content of a response from the server 30 to an application's requests has been completely received. As will be discussed in further detail below, in one embodiment, the content-length parameter of a response is used, and in another embodiment, a chunked transfer encoding header of a response is used to check if all the data of a response has been received. In one aspect, whether all the data from a response has been received is checked to determine if a pooled connection is currently free for use by an application, and/or whether to establish another transport layer connection to the pool of connections to the server, such at steps 6706 and 6708 of method 6700 depicted in FIG. 45. In another embodiment, the technique of checking the content length for a response is used as a technique for multiplexing requests from a plurality of applications via the same transport layer connection.

Figure 46:
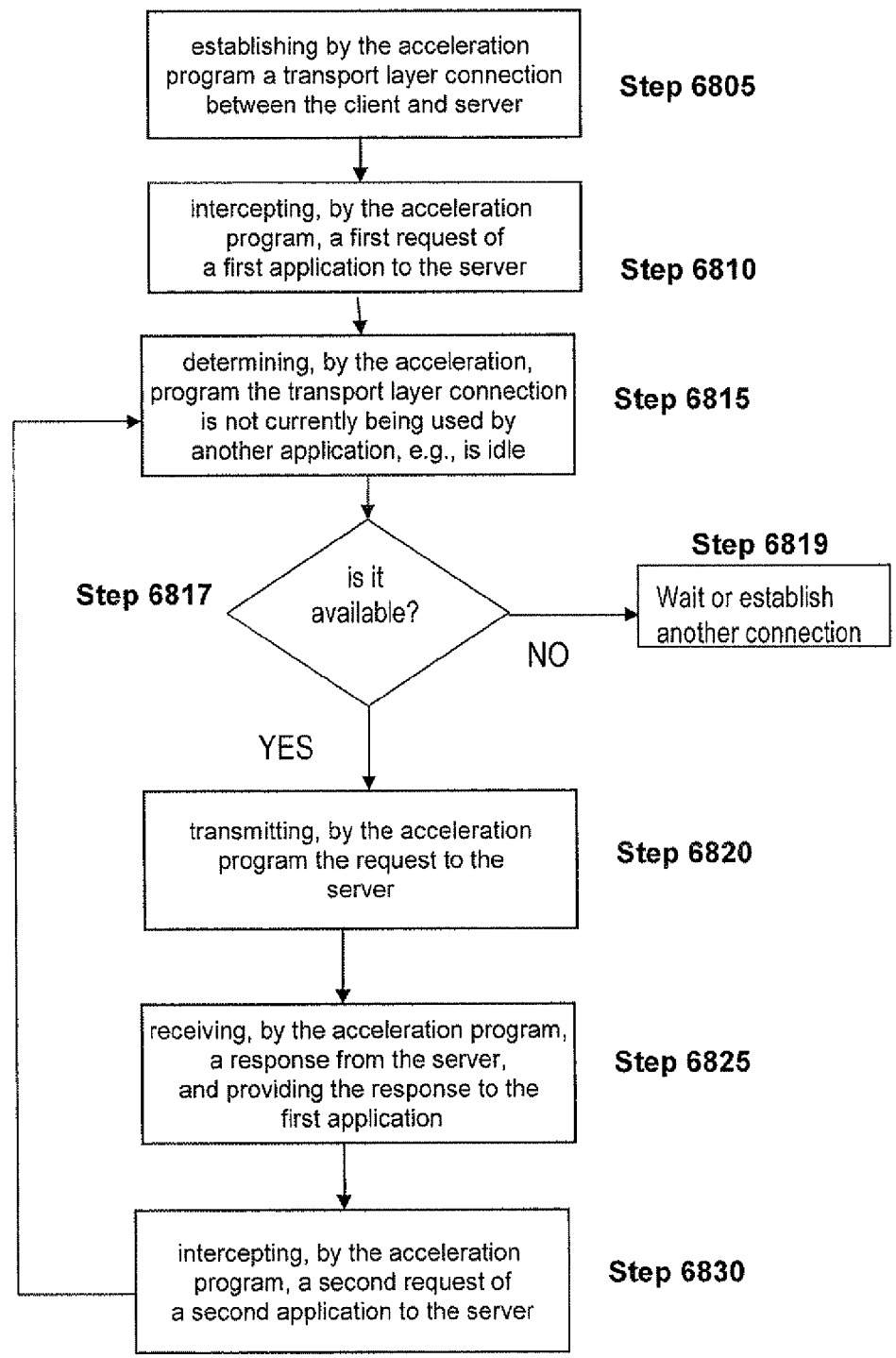
FIG. 46 is a step diagram of an embodiment of a method for performing a client-side acceleration technique of transport control protocol multiplexing.

Referring now to FIG. 46, an embodiment of a method 6800 for multiplexing requests via a single transport layer connection from the client 6205 to the server 30 is depicted. In brief overview, at step 6805, the acceleration program 6120 establishes a transport layer connection between the client 6205 and server 30. At step 6810, the acceleration program 6120 intercepts a first request of a first application 6220*a* to the server 30. At step 6815, the acceleration program 6120 determines whether the transport layer connection is currently being used by another application or is otherwise idle. At step 6817, if the transport layer connection is available to use by the application 6220*a* then at step 6820, the acceleration program 6120 transmits the request to the server. Otherwise, at step 6817, if the transport layer connection is not available to use by the application 6220a, then the acceleration program 6120 at step 6819 either waits for a time period and returns to step 6815, or establishes a second transport layer connection for use by the application 6220. At step 6825, the acceleration program 6120 receives a response to the application's request from the server. At step 6830, the acceleration program 6120 intercepts a second request, by a second application 6220b, and proceeds at step 6815 to determine if the transport layer connection is available for use by the second application 6220b. In some embodiments, the acceleration program 6120 intercepts the request of the second application 6220b at step 6830 prior to receiving the response of the first request at step 6825, or prior to receiving all of the data of the response. As discussed further herein, in some embodiments, the acceleration program 6120 uses content length checking technique to determine when the transport layer connection is idle or an application has received all the data to a response to a request.

In further detail, at step 6805, the acceleration program 6120 establishes a transport layer connection between the client 6205 and server 30. In some embodiments, the acceleration program 6120 establishes the transport layer connection with or via the appliance 1250, or an intermediary. In one embodiment, the acceleration program 6120 establishes the transport layer connection as a pool of transport layer connection to the server 30. As such, in some embodiments, the transport layer connection may comprise a second or a third transport layer connection to the server 30. In other embodiments, the acceleration program 6120 may establish the transport layer connection via a first program 6222 as previously discussed herein. In some embodiments, the acceleration program 6120 established the transport layer connection in response to a request by a first application 6220a of the client 6205.

At step 6810, the acceleration program 6120 intercepts a first request by a first application 6220a to access the server 30. In some embodiments, the request is intercepted at the transport protocol layer before establishing or transmitting the request via the transport layer connection. In other embodiments, the request is intercepted at any protocol layer above the transport layer or above the transport layer connection. In some embodiments, the request is intercepted by a first program 6222. In one embodiment, the request of the application 6220a is a request to open or establish a transport layer connection with the server 30. In another embodiment, the application request is a request to access the server via the established transport layer connection or via the appliance 1250.

At step 6815, the acceleration program 120 determines whether the transport layer connection is idle or available for use by the first application 6220a, or to communicate the first request of the first application 6220a. In some embodiments, the acceleration program 6120 determines from a pool of one or more transport layer connections, which transport layer connection in the pool is idle or free to use by the first application 6220a. In one embodiment, the acceleration program 6120 determines the transport layer connection is idle because the acceleration program 6120 established the transport layer connection in response to the request, or immediately prior to the request. In some embodiments, the acceleration program 6120 may have not received any requests from any application 6220 and recognizes this request as the first request to be intercepted and processed by the acceleration program 6120. In another embodiment, the acceleration program 6120 tracks the number of outstanding responses for any requests transmitted on the transport layer connection, and if there are no outstanding responses, the acceleration program 6120 recognizes the transport layer connection is available for use by the first application 6220a. In yet another embodiment, the acceleration program 6120 recognizes the transport layer connection is currently idle. For example, the acceleration program 6120 may be initiating keep-alive requests to the server to keep the connection open. In some embodiments, the transport layer connection is idle as the last transaction has been completed but the server 30 and/or client 6205 has not yet transmitted a RST and/or FIN command.

Figure 47:
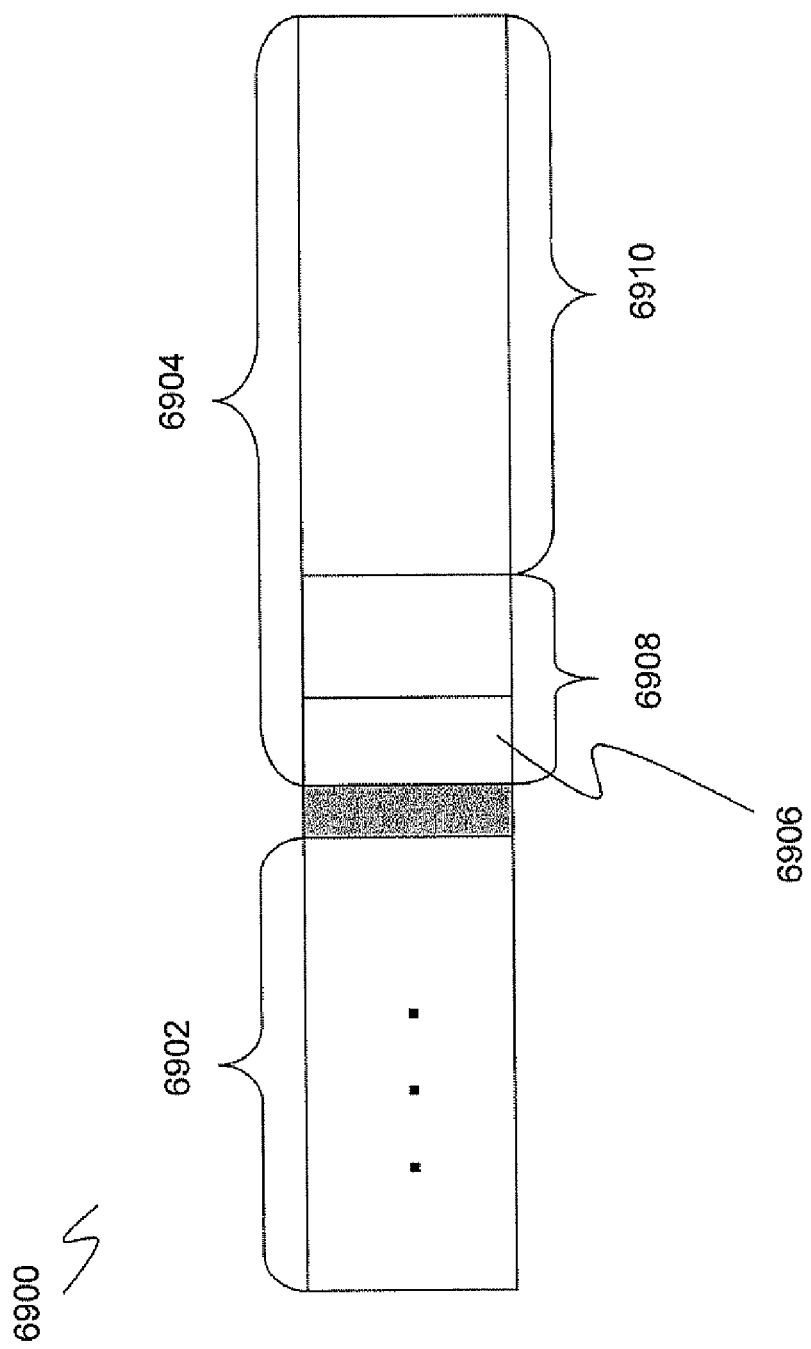
FIG. 47 is a diagrammatic view of an embodiment of a content length identifier of a transport layer packet.

In some embodiments, the acceleration program 6120 may check the content length of a response to determine if the response from the server 30 to the first request of the first application 6202a is complete or otherwise, the acceleration program 6120 has received all the data to the response. As mentioned above, these techniques in some embodiments are also used to determine to establish another connection for the pooling technique. In regards to this technique, FIGS. 47 and 48 will be used to describe checking the content-length parameter of a response in one embodiment, or in another embodiment, a chunked transfer encoding header of a response to determine whether all the data of a response has been received. FIG. 47 depicts a TCP portion of a TCP packet referred to as a TCP segment 6900. The TCP segment 6900 includes a TCP header 6902, and a body 6904. The body 6904 comprises among other data and information, a HTTP header and message in an embodiment wherein the TCP packet carries an application layer protocol of HTTP. In some embodiments, a content length parameter 6906 is located, found or referenced by or in the HTTP header. In one embodiment, the acceleration program 120 uses the content length parameter 6906 to determine if all the data for a response is received.

Figure 48:
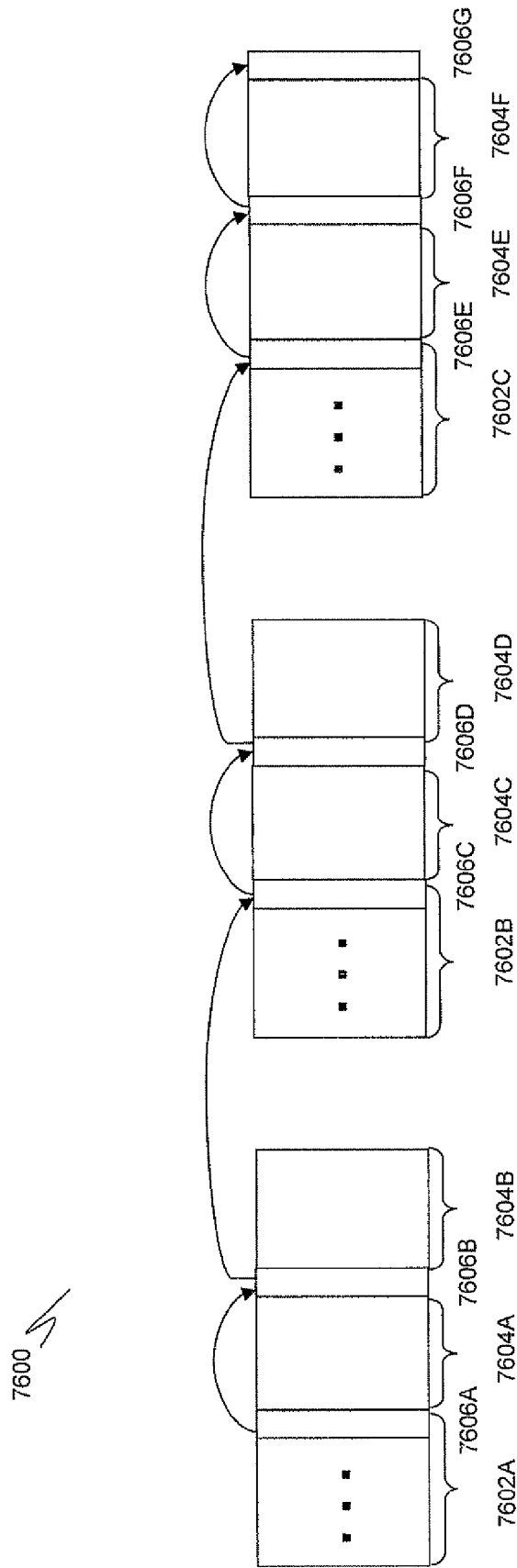
FIG. 48 is a diagrammatic view of another embodiment of a content length identifier of a message transmitted via multiple chunks.

FIG. 48 depicts another embodiment of a TCP segment of a TCP packet. In some embodiments of using the HTTP protocol over the transport layer connection, a chunked transfer encoding header may be present and indicating that chunked transfer encoding has been applied to the TCP segment or packet. As such, in this embodiment, the length of the message is defined by the chunked encoding. The chunked encoding modifies the body of the message in order to transfer the message as a series of chunks, each chunk with its own length indicator in a chunk-size field. The TCP segment 7600 includes a TCP header (now shown) and a body. The body comprises, among other information, a HTTP header 7602A-7602C and the message. The HTTP header 7602A-7602C comprises seven chunk-size fields 7606A-7601C, and six chunk message data 7604A-7604F.

The chunk-size field 7606A-7606G are linked together, or otherwise referenced or associated, as illustrated in FIG. 48. The chunk-size field 7606A indicates the length of the message in the chunk message data 7604A, the chunk-size field 7606C indicates the length of the message in the chunk message data 7604C, and so forth. The last chunk-size field 7606G comprises the length value zero indicating that there are no more chunks or any more of the message to follow. In another embodiment, the acceleration program 6120 determines via the chunk-size fields whether the client 6205 has received all the data to a response.

Although FIGS. 47 and 48 generally describes a technique for checking whether all the data for a response to a request has been received, these techniques are applicable to a server 30 or appliance 1250 sending an asynchronous message or communication to the client 6205. Furthermore, although these techniques are generally described in conjunction with FIGS. 47 and 48 for an HTTP protocol, these techniques can be used for any protocol at any protocol layer that provided an indication of the length of data to be transmitted or received by the client 6205. As such, in some embodiment, the acceleration program 6120 accesses, extracts, inspects, analyzes or otherwise processes any portion of the network packet, including at any protocol layer, to determine if all the data has yet been received in association with a request, response or communication between the client and the server or appliance. In yet another embodiment, the acceleration program 6120 tracks the numbers of bytes transmitted, received and acknowledged between the client 6205 and server 30 to determine if any bytes are outstanding between the client 6205 and server 30 for an application 6220.

By using the content length techniques described above, the acceleration program 6120 can reuse the same transport layer connection to the server 30 previously used or in the process of use by any other application 6220a-6220n of the client 6205. At step 6817, the acceleration program 6120 determines if the transport layer connection is available to transmit the first request, and if so at step 6820 transits the request to the server 30. Otherwise, at step 6819, the acceleration program 6120 may wait until all the data is received for an outstanding request of an application. For example, the acceleration program 6120 may set a timer, for example, to a short time period, and proceed to step 6815. In some embodiments, the acceleration program 6120 checks if the all the data has been received responsive to a packet processing timer of the network stack 6210 of the client 6205. In another embodiments, at step 6819, the acceleration program 6120 establishes another transport layer connection to transmit the first request of the first application 6220a.

At step 6820, the acceleration program 6120 may track which application 6220 currently has an outstanding request or response on the connection, or is currently using the connection. For example, only one application 6220 at a time may transmit a request and receive a response on the connection. As such, the acceleration program 6120 understands which application 6220 is using the connection. In some embodiments, the acceleration program 6120 uses one port number for the transport layer connection communication for all applications 6220a-6220n of the client 6205 sharing the connection. In some cases, the acceleration program 6120 tracks the requests and outstanding responses for the requests on an application by application basis. In some embodiments, the acceleration program 6120 associates a process id of the application 6220 with the request. In yet another embodiment, the acceleration program 6120 transmits the request of the first application 6220a with a request of the second application 6220b in the same network packet or packets, TCP segment or segments. In other embodiments, the acceleration program 6120 transmits a plurality of requests of applications 6220a-6220n via the same transport layer connection as part of a series of TCP segments of one or more TCP segment windows.

In other embodiments, the acceleration program 6120 uses a port numbering mechanism and/or scheme to track and recognize which response or message received is for which application 6220a-6220n. In other embodiments, the acceleration program 6120 provides and associates a port number with the application 6220, and modifies the port number in the TCP network packet to be transmitted to the application's assigned port number. In another embodiment, the port number is provided by the application 6220 and the acceleration program 6120 changes or otherwise provides the port number accordingly in the TCP network packet. As such, in some embodiments, the acceleration program 6120 may interweave requests from a plurality of applications 6220a-6220n of the client 6205 such that applications 6220a-6220n may use the transport layer connection at the same time.

At step 6825, the acceleration program 6120 receives a response to the first request of the first application 6220a from the server 30, such as via appliance 6205, and provides the response to the first application 6220a. In some embodiments, the acceleration program 6120 provides the response to the first application 6220a via the network stack 6210, such as allowing or initiating the processing of the response by the protocol layers above the transport layer of the connection. In another embodiment, the first program 6222 provides the response to the first application 6220a. In other embodiments, the acceleration program 6120 may provide the response to the first application 6220a via an inter-process communication mechanism or an interface, such as an API. In some embodiments, the acceleration program 6120 only receives a portion of the response, such as a first chunk in a multi-chunk message as described in FIG. 48.

At step 6830, the acceleration program 6120 intercepts a request of a second application 6220b to access the server 30. In some embodiments, the acceleration program 6120 intercepts the request of the second application 6220b prior to step 6825. In other embodiments, the acceleration program 6120 intercepts the request of the second application 6220b during receipt of the response at step 6825. In another embodiment, the acceleration program 6120 intercepts the request of the second application 6220b prior to the client 6205 or acceleration program 6120 receiving all the data for a response of the first request of the first application 6220a. Upon interception of the request of the second application 6220b, the acceleration program 6120 proceeds to step 6815 in an embodiment to determine whether to multiplex the second request via the transport layer connection or whether to establish another transport layer connection, such as another connection in a pool of connections. In other embodiments, the acceleration program 6120 transmits the request of the second application 6220b via the same connection as the first application 6220a while the first application 6220a has an outstanding response or has not received all the data from the response of the first request. In another embodiment, the acceleration program 6120 transmits the request of the second application 6220b after the first application 6220a has received the response and prior to any generated RST and/or FIN commands are generated in connection with the first application 6220a.

Although the acceleration program 6120 has generally been discussed in relation to the client-side implementation and execution of acceleration techniques, the acceleration program 6120 interfaces and works in conjunction with the appliance 1250, which also implements and executes appliance-side acceleration techniques. In one embodiment, the client-side acceleration program 6120 and the appliance 1250 may work in conjunction with each other to perform a plurality of the acceleration techniques on communications between the clients 6205 and the servers 30. In some embodiments, the client-side acceleration program 120 and the appliance 1250 both provide TCP pooling and multiplexing, such as to provide a cascading or end-to-end pooling and multiplexing mechanism between clients 6205 and servers 30. For example, the acceleration program 6120 may provide a first pooled transport layer connection to the appliance 1250, which in turns provides a second pooled transport layer connection to the server 30. In another example, the acceleration program 6120 may multiplex an application request via a first pooled transport layer connection on the client 6205, which in turns is multiplexed by the appliance 1250 via the second pooled transport layer connection to the server 30. In some embodiments, the acceleration program 120 provides a throttling mechanism for transmitting requests from the client 6205 while the appliance 1250 provides a throttling mechanism for transmitting responses from the servers 30 to the clients 6205. In another embodiment, the acceleration program 6120 performs client-side caching for the client 6205 while the appliance 1250 provides caching of objects, such as dynamically generated objects, for the client 6205 along with other clients 6205.

In some embodiments, in addition to or in conjunction with performing acceleration techniques on the client 6205 and/or appliance, the acceleration program 6120 and the appliance may provide a virtual private network connection and communications between the client 6205 and a network 40 access via the appliance 1250. In another embodiment, the acceleration program 6120 may compress data communicated from an application 6220, and the appliance 1250 may decompress the compressed data upon receipt thereof. Conversely, appliance 1250 may compress data communicated from an application 6220 on the server 30 on a private data communication network 40' and the acceleration program 6120 may decompress the compress data upon receipt thereof. Also, the acceleration program 6120 and appliance 1250 may act as endpoints in an encrypted data communication or tunneling session, in which the acceleration program 6120 encrypts data communicated from an application 6220, and appliance 1250 decrypts the encrypted data upon receipt thereof. In a similar manner, appliance 1250 encrypts data communicated from an application 6220 on private data communication network and the acceleration program 6120 may decrypt the data upon receipt thereof.

E. Example of Accelerating Delivery of a Computing Environment

In view of the structure, functions, and operations described above in Sections B C and D, in some embodiments, the delivery of a computing environment to a client may be accelerated. For example, the embodiments described herein may be used to deliver a streaming application and data file processable by the application from a central corporate data center to a remote user location, such as a branch office of the company. The appliance and acceleration program provide end-to-end acceleration techniques for accelerating any transport layer payload, such as streamed applications and data files, from a server to a remote client. The application delivery management system provides application delivery techniques to deliver a computing environment to a desktop of a remote user based on a plurality of execution methods and based on any authentication and authorization policies applied via a policy engine. With these techniques, a remote user may obtain a computing environment and access to server stored applications and data files from any network connected device.

Figure 49A:
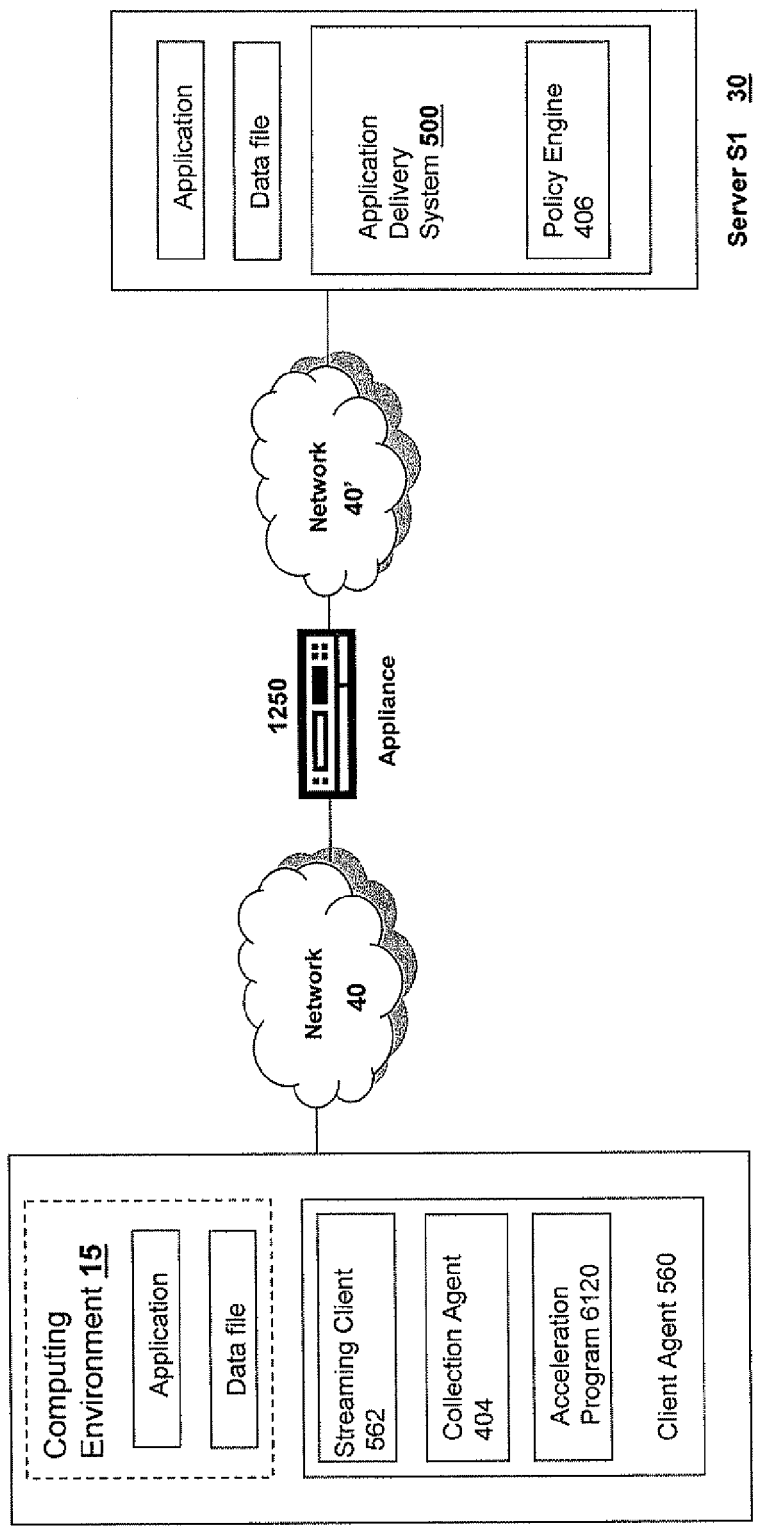
FIG. 49A is a block diagram depicting an example embodiment of a networked computer system for accelerating the delivery of a computing environment to a remote client.

Referring now to FIG. 49A, an embodiment for practicing the systems and methods of acceleration and application delivery described above is depicted. In brief overview, a client 10 is in communication with a server 30 via network 40, 40' and appliance 1250. For example, the client 10 may reside in a remote office of a company, e.g., a branch office, and the server 30 may reside at a corporate data center. The client 10 comprises a client agent 560, and a computing environment 15. The computing environment 15 may execute or operate an application that accesses, processes or uses a data file. The computing environment 15, application and/or data file may be delivered via the appliance 1250 and/or the server 30. In some embodiments, the client 10 also includes an acceleration program 4120, a collection agent 404, and a streaming client 562. The server 30 includes an application delivery system 500, and in some embodiments, a policy engine 406.

In one embodiment, the application delivery system 500 may reside or execute on a server 30. In another embodiment, the application delivery system 500 may reside or execute on a plurality of servers 30-30". In some embodiments, the application delivery system 500 may execute in a server farm. In one embodiment, the server 30 executing the application delivery system 500 may also store or provide the application and data file. In another embodiment, a first set of one or more servers 30 may execute the application delivery system 500, and a different server 30' may store or provide the application and data file. In some embodiments, each of the application delivery system 500, the application, and data file may reside or be located on different servers. In one embodiment, the application delivery system 500 also includes the policy engine 406. In another embodiment, the policy engine 406 executes separately from the application delivery system 500. In some embodiments, the policy engine 406 is on the same server 30 as the application delivery system 500. In other embodiments, the policy engine 406 executes on the appliance 1250. In yet another embodiment, any portion of the application delivery system 500 and/or policy engine 406 may reside, execute or be stored on or distributed to the appliance 1250, or a plurality of appliances.

In some embodiments, the client agent 560 includes any of the streaming client 562, collection agent 404, and/or acceleration program 6120 as previously described above. In one embodiment, the client agent 560, streaming client 562, collection agent 404, and/or acceleration program 6120 form or are incorporated into a single program or set of executable instructions providing the functionality, logic and operations of each. In other embodiments, each of the streaming client 562, collection agent 404, and acceleration program 6120 execute separately from the client agent 560. In one embodiment, the client 10 executes the client agent 560. In another embodiment, the client 10 executes the client 10 executes the streaming client 562. In some embodiments, the client 10 executes the collection agent 404. In one embodiment, the client 10 executes the acceleration program 6120. In some embodiments, the client 10 executes the client agent 560 with one or more of the streaming client 562, collection agent 404, or acceleration program 6120. In other embodiments, the client 10 executes the streaming client 562 and acceleration program 6120. In one embodiment, the client 10 executes the acceleration program 6120 and the collection agent 404.

In some embodiments, the client 10 obtains the client agent 560, streaming client 562, and/or collection agent 404, from the server 30. In other embodiments, the client 10 obtains the client agent 560, streaming client 562, and/or collection agent 404 from the appliance 1250. In one embodiment, any of the client agent 560, streaming client 562, and/or collection agent 404 may be stored on the appliance 1250. For example, in some embodiments, the client agent 560, streaming client 562, and/or collection agent 404 may be cached in the appliance 1250. In other embodiments, upon determination by the appliance 1250 an application can be accelerated, the appliance 1250 may transmit the client agent 560, streaming client 562, acceleration program 6120 and/or collection agent 404 to the client 10. In some embodiments, the client 10 may automatically install and execute any of the client agent 560, streaming client 562, acceleration program 6120 and/or collection agent 404. In yet another embodiment, any of the client agent 560, streaming client 562, acceleration program 6120 and/or collection agent 404 may execute transparently to a user or application of the client, or to any portion of the network stack of the client.

In some embodiments, the appliance 1250 establishes a VPN or SSL VPN connection for the client 10 to the server 30 or network 40'. In other embodiments, the appliance 1250 acts as a proxy, access server or load-balancer to provide access to the one or more servers 30. In one embodiment, the appliance 1250 and/or acceleration program 6120 accelerates the delivery of the streaming client 562, collection agent 404, and/or client agent 560 to the client 10. In one embodiment, the appliance 1250 accelerates the delivery of the acceleration program 6120 to the client 10. In other embodiments, the appliance 1250 and/or acceleration program 6120 accelerates the delivery of the computing environment 15, application, and/or data file, to the client 10 In one embodiment, the client 10 has a computing environment 15 and the appliance 1250 and/or acceleration program 6120 accelerates the delivery of the application and/or data file. In one embodiment, the appliance 1250 and/or acceleration program 6120 accelerates the delivery of the application. In another embodiment, the appliance 1250 and/or acceleration program 6120 accelerates the delivery of the data file. In yet another embodiment, the appliance 1250 and/or acceleration program 6120 accelerates the delivery of a computing environment 15, such as an execution environment or virtualized execution environment previously described herein.

In one embodiment, the appliance 1250 uses information collected from the collection agent 404 to determine if a computing environment 15, application, and/or data file may be accelerated. In some embodiments, the policy engine of the appliance 1250 comprises the policy engine 406. In other embodiments, the appliance 1250 communicates or interfaces with the policy engine 406 to determine authentication and/or authorization of a remote user or a remote client 10 to access the computing environment 15, application, and/or data file from a server 30. In another embodiment, the appliance 1250 communicates or interfaces with the policy engine 406 to determine authentication and/or authorization of a remote user or a remote client 10 to have the application delivery system 500 deliver one or more of the computing environment 15, application, and/or data file. In yet another embodiment, the appliance 1250 establishes a VPN or SSL VPN connection based on the policy engine's 404 authentication and/or authorization of a remote user or a remote client 10 In one embodiment, the appliance 1250 controls the flow of network traffic and communication sessions based on policies of the policy engine 406. For example, the appliance 1250 may control the access to a computing environment 15, application or data file based on the policy engine 406.

Figure 49B:
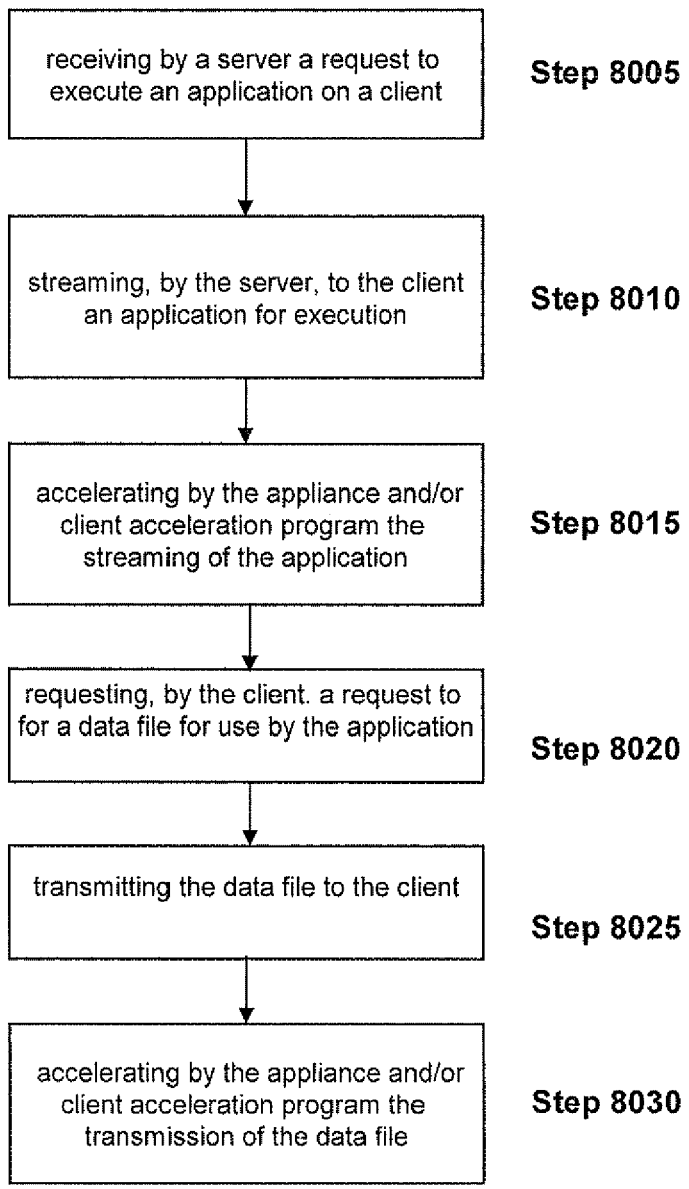
FIG. 49B is a flow diagram depicting one embodiment of steps of a method for accelerating the delivery of a computing environment to a remote client.

Referring now to FIG. 49B, an embodiment of a method for accelerating delivery of a computing environment to a remote user of a client at a remote location is depicted. In brief overview of method 8000, at step 8005, the server 30 receives a request to execute an application on the client 10. At step 8010, the server 30 streams to the client 10 an application for execution. At step 8015, the appliance 1250 and/or client-side acceleration program 6120 accelerates the transmission or delivery of the application to the client 10. At step 8020, the client 10 or application requests a data file from the server 30 for use by the application. At step 8025, the server 30 and/or appliance 1250 transmits the data file to the client 10. At step 8030, the appliance 1250 and/or client-side acceleration program 6120 accelerates the transmission or delivery of the data file to the client 10.

In further detail, at step 8005, a server 30 receives a request to execute an application on a client 10. In some embodiments, the user of the client 10 makes the request. In other embodiments, an application, operating system or computing environment 15 transmits the request. In another embodiment, the appliance 1250 intercepts the request from the client 10 and forwards the request to the server 30. In one embodiment, the appliance 1250 forwards the request to the server 30 based on authentication and/or authorization of the user or client 10. In another embodiment, the appliance 1250 forwards the request to the server 30 based on information provided by the collection agent 404. In one embodiment, the request includes a request to execute the application by one method of a plurality of execution methods. For example, the user of the client 10 may request to execute the application as an application streamed from the server, as a locally installed and executed application, or as a server-based application executing on the server 30 and displaying remotely to the client 10. In some embodiments, the request is based on a file-type association. For example, a user may select a file associated with an application that is used to read or access the file.

At step 8010, in response to the request of step 8005, the server 30 transmits the application for execution to the client 10. In some embodiments, the server 30 streams the application to the client 10. For example, by streaming the application in some embodiments, the application operates on the client 10 without installation. In other embodiments, the server 30 transmits to the client 10 an application for local installation and execution. For example, using the automatic installation and execution techniques described in conjunction with the acceleration program 6120 in Section C, the client 10 may automatically install and execute the application upon receipt. In another embodiment, the server 30 executes the application on a server on behalf of the client, and transmits display out to the client 10 via a remote display or presentation layer protocol. In yet another embodiment, the appliance 1250 streams the application to the client 10 or transmits the application to the client 10 for installation and/or execution. In some embodiments, the appliance 1250 and/or server 30 transmit the computing environment 15 comprising the application. In other embodiments, the appliance 1250 and/or server 30 transmit the computing environment 15 in response to a request.

At step 8015, the appliance 1250 and/or acceleration program 6120 accelerates the delivery of the application for execution to the client 10. In one embodiment, the appliance 1250 performs or applies one or more of the plurality of acceleration techniques described in Section C above. In another embodiment, the acceleration program 6120 performs or applies one or more of the plurality of client-side acceleration techniques also described in Section C above. In some embodiments, the acceleration program 1250 and appliance 6120 work together or in conjunction with each other to perform a plurality of acceleration techniques both on the client 10 and on the appliance 1250. For example, the acceleration program 6120 may perform a first set of one or more acceleration techniques while the appliance 1250 performs a second set of one or more acceleration techniques. In one embodiment, the acceleration program 1250 and appliance 6120 perform the same acceleration techniques. In another embodiment, the acceleration program 1250 and appliance 6120 perform different acceleration techniques.

In one embodiment, the appliance 1250 and/or acceleration program 6120 accelerates any payload communicated via a transport layer connection between the client 10 and server 30. In some embodiments, the server 30 streams the application as one or more data files via a transport layer connection, such as a payload of a TCP/IP packet. In other embodiments, the server 30 streams the application via an application layer protocol or streaming protocol over a transport layer connection. In another embodiment, the server 30 transmits display output via an ICA or RDP protocol via the transport layer connection. In any of these embodiments, the appliance 1250 and/or acceleration program 6120 accelerates the delivery of the application via payloads of transport layer packets.

At step 8020, the client 10 transmits a request for a data file for use by the application or the computing environment 15. In some embodiments, the request for the data file is transmitted with the request to execute an application in step 8005. In one embodiment, the request to execute an application includes the request for the data file. In other embodiments, the application or the computing environment requests the data file in the course of performing any functionality, operations, or logic of the application or computing environment. For example, the application or computing environment 15 may request any macros, scripts, configuration data, profile, templates or rules from a server 30. In some embodiments, the application requests the data file as a background process or task of the application. In one embodiment, the user of the application or computing environment 15 requests the data file to read, access or otherwise process the file with the application or computing environment. For example, the user may open a file for edit via an application, such as opening a document for edit via a word processing application. In some embodiments, the user drags and drops a file into an application of the computing environment to request the data file. In other embodiments, the user may request the data file via a file and directory interface, e.g., file explorer in Windows operating system, to a storage of a networked or remote storage system, such as a network driver of a central server.

At step 8025, the server 30 or appliance 1250 transmits the requested data file to the client 10. In some embodiments, the server 30 or appliance 1250 transmits the data file to the client 10 in response to the request of step 8020. In other embodiments, the server 30 or appliance 1250 transmits the data file to the client 10 without a request from the client 10. For example, the server 30 may "push" an update to a data file to the client 10. In one embodiment, the server 30 transmits the requested data file to the client 10. In another embodiment, the appliance 1250 transmits the requested data file to the client 10. For example, in one embodiment, the appliance 1250 intercepts a request for the data file, checks the cache of the appliance 1250 for the data file, and transmits the cached data file to the client 10. In yet another embodiment, the acceleration program 6120 intercepts the data file request at the client 10 and provides the data file to the client 10 via a cache of the acceleration program 6120. In some embodiments, the appliance 1250 or server 30 transmits the data file via a streaming protocol, or a stream. In other embodiments, the appliance 1250 or server 30 transmits the data file via any type and form of caching protocol.

At step 8030, the appliance 1250 and/or acceleration program 6120 accelerates the delivery or transmission of the data file to the client 10. In some embodiments, the data file may be transmitted via any type and form of protocol, such as an application layer protocol over a transport layer protocol. In one embodiment, the appliance 1250 accelerates the transmission of the data file. In another embodiment, the acceleration program 6120 accelerates the transmission of the data file. In some embodiments, the appliance 1250 in conjunction with the acceleration program 1250 accelerates the transmission of the data file. As discussed herein, the appliance 1250 and/or acceleration program 6120 may perform one or more of a plurality of acceleration techniques on the client 10 and appliance 30 to accelerate the transmission of the data file. In some embodiments, the appliance 1250 and/or acceleration program 6120 may cache one or more data files on the client 10 or appliance 1250 for use by the application or computing environment 15.

Representative Examples

As an example embodiment, a user may be located at a branch office working on a local machine 10. The user may desire to use a word processing application such as MICROSOFT Word to edit a company document, both residing on remote machines 30 located in a central office. The user may then navigate a web browser to a corporate web site hosted by remote machine 30. Once the user is authenticated by the remote machine 30, the remote machine 30 may prepare and transmit to the local machine 10 an HTML page that includes a Program Neighborhood window as described herein in FIGS. 3A and 3B in which appears graphical icons representing application programs to which the local machine 10 has access. The user of local machine 10 may invoke execution of an application by clicking an icon. A policy engine as described in FIGS. 4A-4D may then determine whether and how the local machine 10 may access the word processing application. The application may then be locally installed and executed using the techniques described in FIGS. 20-21. The user may then use the application to select a document on the remote machine 30 for editing. An appliance 1250 may then accelerate delivery of the file to the local machine 10 using any techniques described herein, such as TCP multiplexing.

As another example, a second user may be located at a branch office working on a local machine 10. The user may wish to access, through the user's corporate account, an email containing an attached file. The email application and the email data files may reside in a central office. Upon a user request to access the email application, a policy engine as described in FIGS. 4A-4D may determine to stream the email application to the user using the streaming techniques described herein. A policy engine may also determine to install an acceleration program as described herein on the local machine 10. The application streaming may be accelerated using techniques described herein, such as dynamic caching. Upon local installation, the user may then select the email and accompanying attachment to view. An appliance 1250 may accelerate the delivery of the file by using an acceleration technique such as TCP pooling as described herein. The appliance may also cache some or all of the data files delivered to the remote machine so as to accelerate later requests. The caching may be done either on the appliance 1250 or on the local machine 10 in conjunction with the acceleration program.

As a third example, a user located at a branch office may wish to access a spreadsheet program such as MICROSOFT Excel to update a spreadsheet. The user may use a local machine 10 to establish an SSL connection to a remote machine 30 at a central office, and select the spreadsheet application from a program neighborhood as described in FIGS. 3A and 3B. A collection agent as described in FIG. 4D may then collect information about the local machine to determine whether the spreadsheet application may be streamed to the local machine 10. The spreadsheet application may then be streamed to the local machine 10 via the SSL connection. The SSL connection may be accelerated by an appliance 1250 providing SSL or TCP connection pooling and multiplexing as described herein. The application streaming may be also accelerated by an appliance 1250 providing any of the dynamic caching techniques described herein. The user may then select a file from within the spreadsheet application for editing. The local machine 10 may transmit a request for the file to the remote machine. An appliance 1250 may then use the compression techniques described herein to accelerate delivery of the file to the user.

Although generally described above as an application delivery system and appliance accelerating delivery of a computing environment to a client, the application delivery system and appliance may accelerate the delivery of a plurality of computing environments, applications and/or data files to a client. For example, the application delivery system and appliance may accelerate delivery to the client of a first computing environment associated with one type of operating system and a second computing environment associated with a second type of operating system. Additionally, the application delivery system and appliance may accelerate the delivery of a computing environment, application, and/or data file to a plurality of clients. Furthermore, although generally described above as an application delivery system and appliance accelerating delivery of a computing environment to a remote user or remote client, the application delivery system and appliance may accelerate delivery of a computing environment, application, and/or data file to any client, local, remote or otherwise, such as a client on a LAN of the server.

Moreover, although generally described above as an appliance between the client and the application delivery system, a plurality of appliances may be used between one or more clients and one or more servers. In some embodiments, a first appliance resides on the network of the client, and a second appliance resided on the network of the server. In one embodiment, the first appliance and second appliance communicate with each other in performing the operations described herein. For example, the first appliance and second appliance may communicate via any internode, high-performance, or appliance to appliance communication protocol. Additionally, a plurality of application delivery systems may be used in conjunction with one appliance or a plurality of appliances. The application delivery system and appliance may be deployed in a wide variety of network environments and infrastructure architectures.

F. Example of an Appliance Controlling Actions Allowed on a Resource by a Client via a SSL VPN Connection In view of the structure, functions, and operations described herein, in some embodiments, the appliance 1250 controls a level of access and the actions allowed to be performed on a resource accessed by a client via a SSL VPN connection provided by the appliance. The appliance allows organizations to grant users a level of access based on their access scenario—who they are, where they are, what device they are using and what connection they are using to connect to the network. The appliance 1250 determines the user's access scenario and then determines the appropriate level of access based on policies for the access scenario. Based on the level of access, the appliance 1250 controls what actions a user make take on the resource. The appliance allows organizations to control whether a client or user of the client is allowed to view, edit, print or save a resource such as a file.

For example, a user in a vulnerable configuration—a location, device, connection and/or identity that is determined to not be secure for certain levels of access—may try to access a resource on a private or corporate network via an SSL VPN connection of the appliance. In this scenario, the user could be provided with access to an application, document or file with view only or file preview capabilities. The appliance may detect via information from a collection agent that the location, device, connection and/or user identify is vulnerable and identifies or assigns a level of access based on applying one or more policies. According to the assigned level of access, the appliance controls any actions that can be taken on the file resource. As a result, the user may be provided with read-only access without any local caching to remote device which was determined to be vulnerable. The appliance controls the actions the user may perform on the file. At this level of access, the user cannot edit, print or download the file, but can read it. The appliance may prevent the download of the file to storage of the client.

In another example, a user may be working from home on a non-company computing device and connects to the corporate network via a SSL VPN connection of the appliance. The user may want to access a resource, such as a document on the corporate network. Based on the detected location, device, connection and/or identity, the appliance may identify or assign a level of access to the remote user that allows a "LiveEdit" capability—an ability to edit the document in memory and save it on the server. Using the features of the systems and methods described herein, such as LiveEdit and file type association, the appliance controls the actions the user may perform on the document. The appliance may restrict or grant file download and upload capabilities based on the who, what, where and how of this user, e.g., location, device, connection, and/or identity. For example, the appliance may prevent the remote user from uploading a document from storage of the remote device to a corporate server.

In these embodiments, the features of the appliance in providing a level of access with action control based on information about the user and/or client, such as location, device, connection, and/or identity, allows organizations to control whether users are allowed to view, edit, print or save data files via an SSL VPN connection without the files being downloaded to the local device. With the appliance, organizations can be assured the valuable information, confidential information or intellectual property is not left on the local device. The appliance provides action control on applications, data and information communicated via an SSL VPN connection using one or more techniques including HTML file preview for supported documents, Live Edit, URL rewriting, controlled caching and file type associates.

Figure 50:
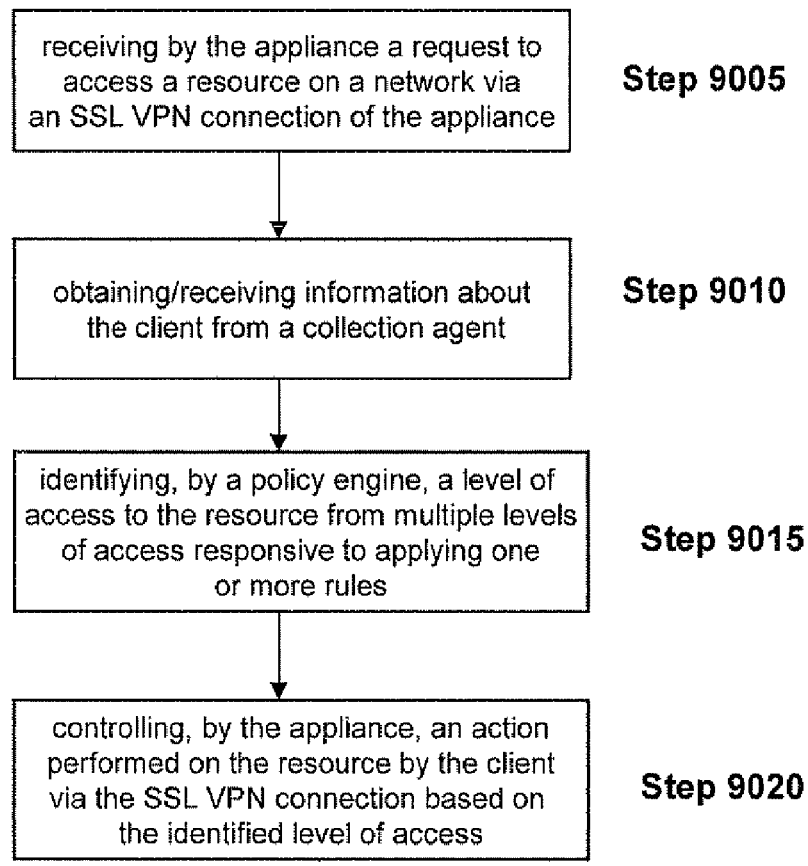
FIG. 50 is a flow diagram depicting one embodiment of steps of a method for controlling by an appliance an action performed by a client on a resource accessed via a virtual private network connection provided by the appliance to a network.

Referring now to FIG. 50, an embodiment of a method 9000 for providing levels of access with access control via an SSL VPN connection of the appliance 1250 is depicted. In brief overview, at step 9005, the appliance receives a request from a client to access a resource on a network via a SSL VPN connection provided by the appliance to the network. At step 9010, the appliance receives information about the client from a collection agent, such as information about the location, device, connection, and/or identity of device or user. At step 9015, the appliance identifies via a policy engine a level of access to the resource from multiples levels of access responsive to applying one or more policies to the received information. At step 9020, the appliance controls an action performed on the resource by the client via the SSL VPN connection based on the identified level of access, such as allowing or denying the user of the client to view, edit, print or save a document.

In further detail, at step 9005, a client requests access to a resource on a network via an SSL VPN connection to the network provided by the appliance. In some embodiments, the resource may be a computing environment 15, an application, data, document, or file. In one embodiment, the appliance establishes the SSL VPN connection with the client upon receiving the request for the resource. In another embodiment, the client transmits a first request to establish the SSL VPN connection via the appliance and a second request to access the resource via the SSL VPN connection. In some embodiments, the client is on a first network 40. e.g., public network, and the appliance is providing a SSL VPN connection for the client to a second network 40', e.g., a private corporate network.

In one embodiment, the client requests to access the resource via the client agent 560 (see for example, FIG. 49A). In some embodiments, an ICA client on the client transmits the request to access the resource. In another embodiment, the client requests to access the resource via a web interface, such as a web interface 558 provided by the application delivery system 500 described above. In some embodiments, the application delivery system and/or appliance provides a GUI having a list of one or more resources, such as applications or data files, the user and/or client has access to according to policies applied by the appliance. In another embodiment, the list of resources accessible by the client or user is provided by applying the policy-based level of access operations as described in conjunction with FIGS. 4A-4E.

At step 9010, the appliance 1250 obtains, receives, has or is otherwise provided information about the client requesting access to the resource. In some embodiments, a collection agent 404, such as the collection agent 404 described above in conjunction with FIGS. 4A and 49A, is used to detect information about the client. In one embodiment, the appliance 1250 transmits the collection agent 404 to the client upon request to establish a SSL VPN connection. In another embodiment, the appliance 1250 transmits the collection agent 404 upon request to access the resource via the SSL VPN connection. In yet another embodiment, the appliance transmits instructions to the collection agent 404 to obtain information about the client upon a request to establish the SSL VPN connection and/or upon the request to access the resource. In one embodiment, the appliance 1250 stores information about the client in storage or memory, and uses this stored information in performing this step.

In some embodiments, the collection agent 404 obtains information to determine the location, device, connection, and/or identity of the user and/or client, e.g., the who, what, where and how of this user. As discussed in conjunction with FIGS. 4A-4E, the collection agent 404 may gather the following information 412 about the client and provide it to the appliance: an HTTP header, a local network of the client, an internet protocol address of the client on the local network, a method of authentication used by the client, a machine ID of the client, a type of operating system type, existence of a patch to the operating system, or a Machine Access Control (MAC) address of a network card.

In some embodiments, the gathered information of the collection agent 404 includes network connection information pertains to type of network, bandwidth capabilities, performance or operational characteristics of the network connection. The appliance 1250, client agent or collection agent 404 may collect any user authentication credentials or any other information identifying the user. In other embodiments, the collection agent 404 may collect any information identifying or indicating the location of the device, for example, based on the IP address. In another embodiment, the collection agent 404 collects any type and information about the device including operating system, configuration, system parameters, processor, memory, disk size, applications, services, processes, tasks, etc.

At step 9015, the appliance 1250 identifies a level of access to the resource from multiple levels of access responsive to applying one or more rules or policies based on the information about the client, such as the information provided by the collection agent. As discussed in conjunction with FIG. 4B, the policy engine 406 uses the collection information to determine if one or more conditions used by the policy engine are satisfied or not. For example, a condition of a policy may require the client to have a particular operating system, patch or be running a personal firewall application to have access to a resource. The appliance may use the collection information to determine if the location, device, connection, and/or identity of the user and/or client satisfies or does not satisfy a condition or policy. In one embodiment, the policy engine makes an access control decision based upon the collected information as described above in conjunction with FIG. 4C.

Using the systems and methods described herein, the appliance 1250 provides granular control of access to a plurality of resources accessible by the client and/or user as discussed above in conjunction with FIGS. 4A-4E. Based on the location, device, connection, and/or identity of the user and/or client, the appliance applies one or more policies to the collected information to assign a level of access for the user and/or client to each of the resources. For example, the appliance may assign a level of access to a first user and/or first client that provides view only access to a first file, "LiveEdit" access to a second file, edit and print access to a third file, and save access to a fourth file. The appliance may identify and assign a second level of access to a second user and/or second client that provides write access to the first file, view only access to the second file, print access to the third file, and view only access to the fourth file. In another example, the appliance may assign a level of access providing a different set of one or more upload and/or download capabilities to each of the users and/or clients. The policy engine may provide accessible control on a user and/or client basis and on the basis of collected information thereof to any one or more of the multiple resources accessible via the appliance.

As discussed herein, the appliance may identify and assign a level of access to a user and/or client based on the collection information to control the type and form of computing environment delivery (e.g., LiveEdit, file type association, streaming, etc.) as well as the type and form of acceleration of the computing delivery or any portion thereof (e.g., compression, caching, TCP pooling/multiplexing, etc.)

At step 9020, the appliance controls any action performed on the resources based on the identified level of access. In one embodiment, the appliance based on the policies determines the level of access to the resource allows one or more of the following actions to be performed on the resource: view, print, edit and save. In one embodiment, controls the action the user of the client may perform on the file based on the identified level of access, such as view, edit, save or print. In one embodiment, the appliance prevents a download of the resource to storage of the client based on the identified level of access. In some embodiments, the appliance allows or denies a user of the client to view the resource. In other embodiments, the appliance allows or denies a user of the client to print the resource. In another embodiment, the appliance allows or denies a user of the client to edit the resource. In one embodiment, the appliance allows or denies a user of the client to save the resource.

The appliance may control any combination of actions performed on a resource. For example, in one embodiment, the appliance allows a user to edit and save the resource but not print. In another embodiment, the appliance allows a user to view and print the document but not edit or save it. In one embodiment, the appliance allows the user to save the file locally but not save to the server. In some embodiments, the appliance the user to save the file to a server accessed via the appliance but not to the storage of the client. In yet another embodiment, the appliance allows a user to perform a "LiveEdit" on a document but not print it. In still other embodiments, the appliance may allow a user to upload a resource but not download a resource. In some embodiments, the appliance may allow a user to download resources but not upload resources.

In controlling the actions performed by a client or user of the client, the appliance may use any techniques described herein, and in any combination. In one embodiment, the appliance delivers a computing environment, application or file via a thin-client computing or server-based computing model, by streaming of the computing environment or by providing a computing environment for local execution. In another embodiment, the appliance provides the LiveEditing capabilities as described in FIGS. 27A-27F. In one embodiment, the appliance controls the actions performed on a resource by delivering or having the user access the resource via the client agent 560.

The appliance and/or application delivery system 500 may use any of the file type association techniques described in conjunction with FIG. 5, and as otherwise described herein, to control the action performed on a resource based on the file type being access. The appliance via policy or otherwise may assign a type of application or computing environment delivery mechanism based on the type of file. For example, a type of file requested by the user for access via the SSL VPN connection may be associated with a program that does not provide edit capabilities. In another embodiment, the requested file is associated with a program that provides view only or preview capabilities. In some embodiments, the requested file is associated with a program that provided LiveEditing capabilities (see FIGS. 27A-27F). In other embodiments, the requested file is associated with a program that does not allow the user to print or save. The requested file may be associated with any type and form of program that only allows the user to perform the actions allowed or identified by the level of access assigned to the user or client of the user.

In some embodiments, the appliance and/or client agent controls the contents of a cache to control the actions performed on a resource, for example, using the cache based techniques as discussed in conjunction with FIG. 7 or 14. The appliance and/or client agent may control the actions performed by the user on the resource by delivering or accessing the resource in a controlled manner in cache, e.g., not downloaded to the client. In one embodiment, the resource such as an application is run from cache. In another embodiment, the resource, such as a file is read or accessed via the cache. In other embodiments, the appliance and/or client agent removes the resource from the cache to prevent further access to the resource, for example, upon detecting a change in condition of the client or completion of the user's activity with the resource.

In some embodiments, the appliance changes any contents of the network traffic communications to the client in order to control the type of actions performed by the user on a resource. In some embodiments, the appliance rewrites any portion of HTML, XML or other web-based content to control actions on resources. In one embodiment, the appliance performs Uniform Resource Location (URL) rewriting to control the actions performed on a resource. In some embodiments, the appliance rewrites a URL, such in an HTTP page, provided to a client so that the URL identifies a resource of the appliance. In other embodiments, the appliance rewrites a URL to identify a controlled access copy of a resource, such as a read-only copy of a file. In some embodiment, the appliance rewrites a URL to point the user to a portable document format (PDF) read-only version of a file. In yet another embodiment, the appliance rewrites a URL to have the resource accessed by an application, such as a client agent, or any portion thereof. In some embodiments, the appliance rewrites a URL so that the resource is access by the user via any system or method of the application delivery system 500 described herein.

With the levels of access and action control features of the appliance described above, organizations can provided fine granular control of actions taken by remote users based on the type of resources being accessed via an SSL VPN connection as well as the location, device, connection and/or identity of the remote user or client. The appliance manages, protects and provides access to valuable, confidential business information and intellectual property—even across public networks—without compromising security. The appliance can be configured with policies to determine both the level of access and action control of a resource on any type of user scenario and for any type of resource.

Embodiments may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

What is claimed:

1. A method of controlling by an appliance an action performed by a client on a resource accessed via a virtual private network connection provided by the appliance to a network, the method comprising:
   (a) receiving, by an appliance, a request from a client operated by a user to perform an action on a resource on a network being accessed via a secure socket layer virtual private network (SSL VPN) connection provided by the appliance to the network, the client comprising a computing environment, the action comprising one of printing, editing or saving the resource via the SSL VPN connection;
   (b) receiving, by the appliance, characteristics of the computing environment provided by a collection agent;
   (c) providing, by a policy engine of the appliance, one or more policies for controlling actions by the computing environment; and
   (d) controlling, by the appliance via the SSL VPN connection, whether the computing environment is allowed to perform the requested action on the resource based on application of the one or more policies on the received characteristics and the requested action.

2. The method of claim 1, comprising requesting, by the user of the client, access to a file on the network via the appliance, and controlling, by the appliance, the action the user of the client is allowed to perform on the file.

3. The method of claim 1, comprising determining, by the appliance, the level of access to allow one or more of the following actions to be performed on a file: view, print, edit and save.

4. The method of claim 1, comprising preventing, by the appliance, a download of the resource to storage of the client.

5. The method of claim 1, wherein step (d) comprises one of allowing or denying, by the appliance, the user of the client to view the resource.

6. The method of claim 1, comprising transmitting, by the appliance, the collection agent to the client.

7. The method of claim 1, comprising automatically executing the collection agent on the client in response to one of a request to establish the SSL VPN connection with the network or the request to access the resource.

8. The method of claim 1, comprising determining, by the collection agent, information comprising one or more of the following: an HTTP header, a local network of the client, an internet protocol address of the client on the local network, a method of authentication used by the client, a machine ID of the client, a type of operating system type, existence of a patch to the operating system, or a Machine Access Control (MAC) address of a network card.

9. The method of claim 1, comprising transmitting, by the policy engine, instructions to the collection agent identifying the type of information for the collection agent to collect.

10. The method of claim 1, comprising requesting, by the collection agent, instructions from the policy engine on the type of information to collect.

11. The method of claim 1, determining, by the policy engine, the type of information to collect from the client based on a policy.

12. The method of claim 1, wherein the collection agent comprises one of the following: a script, bytecode, or a program.

13. The method of claim 1 wherein the collection agent transmits a request to the policy engine for instructions identifying the type of information the collection agent gathers.

14. A system for controlling an action performed by a client on a resource accessed via a virtual private network connection provided by an appliance to a network, the system comprising:
- an appliance providing one or more clients a secure socket layer virtual private network (SSL VPN) connection to a network;
- a client, operated by a user, requesting to perform an action on a resource on a network via the appliance, the client comprising a computing environment, the action comprising one of printing, editing or saving the resource via the SSL VPN connection;
- a collection agent providing to the appliance characteristics of the computing environment;
- a policy engine providing one or more policies for controlling actions by the computing environment; and
- wherein the appliance controls, via the SSL VPN connection, whether the computing environment is allowed to perform the requested action on the resource based on application of the one or more policies on the received characteristics and the requested action.

15. The system of claim 14, wherein a user of the client requests access to a file on the network via the appliance, and the appliance controls the action the user of the client is allowed to perform on the file.

16. The system of claim 14, wherein the policy engine determines the level of access to allow one or more of the following actions to be performed on a file: view, print, edit and save.

17. The system of claim 14, wherein the appliance prevents a download of the resource to storage of the client.

18. The system of claim 14, wherein the appliance one of allows or denies a user of the client to view the resource.

19. The system of claim 14, the appliance transmits the collection agent to the client.

20. The system of claim 14, wherein the collection agent automatically executes on the client in response to one of a request to establish the SSL VPN connection with the network or the request to access the resource.

21. The system of claim 14, wherein the collection agent determines information comprising one or more of the following: an HTTP header, a local network of the client, an internet protocol address of the client on the local network, a method of authentication used by the client, a machine ID of the client, a type of operating system type, existence of a patch to the operating system, or a Machine Access Control (MAC) address of a network card.

22. The system of claim 14, wherein the policy engine transmits instructions to the collection agent identifying the type of information for the collection agent to collect.

23. The system of claim 14, wherein the collection agent requests instructions from the policy engine on the type of information to collect.

24. The system of claim 14, wherein the policy engine determines the type of information to collect from the client based on a policy.

25. The system of claim 14, wherein the collection agent comprises one of the following: a script, bytecode, or a program.

26. The system of claim 14, wherein the collection agent transmits a request to the policy engine for instructions identifying the type of information the collection agent gathers.

27. An appliance for controlling an action performed by a client on a resource accessed via a virtual private network connection provided by the appliance to a network, the appliance comprising:
- means for receiving a request from a client operated by a user to perform an action on a resource on a network via a secure socket layer virtual private network (SSL VPN) connection provided by the appliance to the network, the client comprising a computing environment, the action comprising one of printing, editing or saving the resource via the SSL VPN connection;
- means for receiving characteristics of the computing environment from a collection agent;
- means for providing one or more policies controlling actions by the computing environment; and
- means for controlling, via the SSL VPN connection, whether the computing environment is allowed to perform the requested action on the resource based on application of the one or more policies on the received characteristics and the requested action.

28. A method of controlling by an appliance an action performed by a client on a resource accessed via a virtual private network connection provided by the appliance to a network, the method comprising the steps of:
(a) receiving, by an appliance, a request from a client operated by a user to access a resource on a network via a secure socket layer virtual private network (SSL VPN) connection provided by the appliance to the network, the client comprising a computing environment;
(b) receiving, by the appliance characteristics of the computing environment collected by a collection agent from the client;
(c) providing, by a policy engine of the appliance, one or more policies for controlling actions by the computing environment based on a type of delivery for the resource from the network; and
(d) controlling, by the appliance via the SSL VPN connection, whether the computing environment is allowed to perform the requested action on the resource via the type of delivery based on-application of the one or more policies on the received characteristics and the requested action.

* * * * *